US010380063B2

(12) United States Patent
Tang et al.

(10) Patent No.: US 10,380,063 B2
(45) Date of Patent: Aug. 13, 2019

(54) PROCESSORS, METHODS, AND SYSTEMS WITH A CONFIGURABLE SPATIAL ACCELERATOR HAVING A SEQUENCER DATAFLOW OPERATOR

(71) Applicant: Intel Corporation, Santa Clara, CA (US)

(72) Inventors: Jinjie Tang, Acton, MA (US); Kermin E. Fleming, Hudson, MA (US); Simon C. Steely, Hudson, NH (US); Kent D. Glossop, Merrimack, NH (US); Jim Sukha, Marlborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/721,802

(22) Filed: Sep. 30, 2017

(65) Prior Publication Data

US 2019/0102338 A1 Apr. 4, 2019

(51) Int. Cl.
*H03K 19/177* (2006.01)
*G06F 15/78* (2006.01)
(Continued)

(52) U.S. Cl.
CPC ........ *G06F 15/7892* (2013.01); *G06F 9/3001* (2013.01); *G06F 9/3004* (2013.01);
(Continued)

(58) Field of Classification Search
CPC ............... G06F 15/7892; G06F 9/3001; G06F 9/30036; G06F 9/3004; G06F 9/30076; G06F 9/30145; G06F 9/38; G06F 9/3802
(Continued)

(56) References Cited

U.S. PATENT DOCUMENTS

| | | | |
|---|---|---|---|
| 672,177 | A | 4/1901 | Metcalf |
| 5,560,032 | A | 9/1996 | Nguyen et al. |

(Continued)

FOREIGN PATENT DOCUMENTS

| | | | |
|---|---|---|---|
| EP | 2660716 | A1 | 11/2013 |
| EP | 2854026 | A1 | 4/2015 |

(Continued)

OTHER PUBLICATIONS

Abandonment from U.S. Appl. No. 15/640,544, dated Mar. 20, 2018, 2 pages.

(Continued)

*Primary Examiner* — Don P Le
(74) *Attorney, Agent, or Firm* — Nicholson De Vos Webster & Elliott LLP

(57) ABSTRACT

Systems, methods, and apparatuses relating to a sequencer dataflow operator of a configurable spatial accelerator are described. In one embodiment, an interconnect network between a plurality of processing elements receives an input of a dataflow graph comprising a plurality of nodes forming a loop construct, wherein the dataflow graph is overlaid into the interconnect network and the plurality of processing elements with each node represented as a dataflow operator in the plurality of processing elements and at least one dataflow operator controlled by a sequencer dataflow operator of the plurality of processing elements, and the plurality of processing elements is to perform an operation when an incoming operand set arrives at the plurality of processing elements and the sequencer dataflow operator generates control signals for the at least one dataflow operator in the plurality of processing elements.

24 Claims, 85 Drawing Sheets

(51) Int. Cl.
*G06F 9/38* (2018.01)
*G06F 9/30* (2018.01)

(52) U.S. Cl.
CPC ...... *G06F 9/30036* (2013.01); *G06F 9/30076* (2013.01); *G06F 9/30145* (2013.01); *G06F 9/38* (2013.01); *G06F 9/3802* (2013.01)

(58) Field of Classification Search
USPC ........................................................... 326/37
See application file for complete search history.

(56) References Cited

U.S. PATENT DOCUMENTS

| | | | |
|---|---|---|---|
| 5,574,944 | A | 11/1996 | Stager |
| 5,581,767 | A | 12/1996 | Katsuki et al. |
| 5,787,029 | A | 7/1998 | De Angel |
| 5,805,827 | A | 9/1998 | Chau et al. |
| 5,930,484 | A | 7/1999 | Tran et al. |
| 6,020,139 | A | 2/2000 | Schwartz et al. |
| 6,088,780 | A | 7/2000 | Yamada et al. |
| 6,141,747 | A | 10/2000 | Witt |
| 6,205,533 | B1 | 3/2001 | Margolus et al. |
| 6,314,503 | B1 | 11/2001 | D'Errico et al. |
| 6,393,454 | B1 | 5/2002 | Chu |
| 6,393,536 | B1 | 5/2002 | Hughes et al. |
| 6,604,120 | B1 | 8/2003 | De Angel |
| 6,725,364 | B1 | 4/2004 | Crabill |
| 7,000,072 | B1 | 2/2006 | Aisaka et al. |
| 7,181,578 | B1 | 2/2007 | Guha et al. |
| 7,257,665 | B2 | 8/2007 | Niell et al. |
| 7,486,678 | B1 | 2/2009 | Devanagondi et al. |
| 7,509,484 | B1 | 3/2009 | Golla et al. |
| 7,546,331 | B2 | 6/2009 | Islam et al. |
| 7,630,324 | B2 | 12/2009 | Li et al. |
| 7,660,911 | B2 | 2/2010 | McDaniel |
| 7,987,479 | B1 | 7/2011 | Day |
| 8,001,510 | B1 | 8/2011 | Miller et al. |
| 8,010,766 | B2 | 8/2011 | Bhattacharjee et al. |
| 8,055,880 | B2 | 11/2011 | Fujisawa et al. |
| 8,156,284 | B2 | 4/2012 | Vorbach et al. |
| 8,160,975 | B2 | 4/2012 | Tang et al. |
| 8,225,073 | B2 | 7/2012 | Master et al. |
| 8,495,341 | B2 | 7/2013 | Busaba et al. |
| 8,561,194 | B2 | 10/2013 | Lee |
| 8,578,117 | B2 | 11/2013 | Burda et al. |
| 8,812,820 | B2 | 8/2014 | Vorbach et al. |
| 8,935,515 | B2 | 1/2015 | Colavin et al. |
| 8,966,457 | B2 | 2/2015 | Ebcioglu et al. |
| 8,990,452 | B2 | 3/2015 | Branson et al. |
| 9,026,769 | B1 | 5/2015 | Jamil et al. |
| 9,104,474 | B2 | 8/2015 | Kaul et al. |
| 9,135,057 | B2 | 9/2015 | Branson et al. |
| 9,170,846 | B2 | 10/2015 | Delling et al. |
| 9,213,571 | B2 | 12/2015 | Ristovski et al. |
| 9,268,528 | B2 | 2/2016 | Tannenbaum et al. |
| 9,473,144 | B1 * | 10/2016 | Thiagarajan ..... H03K 19/17736 |
| 9,594,521 | B2 | 3/2017 | Blagodurov et al. |
| 9,658,676 | B1 | 5/2017 | Witek et al. |
| 9,696,928 | B2 | 7/2017 | Cain, III et al. |
| 9,760,291 | B2 | 9/2017 | Beale et al. |
| 9,762,563 | B2 | 9/2017 | Davis et al. |
| 9,847,783 | B1 * | 12/2017 | Teh .................... H03K 19/1776 |
| 9,923,905 | B2 | 3/2018 | Amiri et al. |
| 9,946,718 | B2 | 4/2018 | Bowman et al. |
| 10,108,417 | B2 | 10/2018 | Krishna et al. |
| 10,187,467 | B2 | 1/2019 | Nagai |
| 2002/0090751 | A1 | 7/2002 | Grigg et al. |
| 2002/0178285 | A1 | 11/2002 | Donaldson et al. |
| 2002/0184291 | A1 | 12/2002 | Hogenauer |
| 2003/0023830 | A1 | 1/2003 | Hogenauer |
| 2003/0028750 | A1 | 2/2003 | Hogenauer |
| 2003/0163649 | A1 | 8/2003 | Kapur et al. |
| 2003/0177320 | A1 | 9/2003 | Sah et al. |
| 2003/0225814 | A1 | 12/2003 | Saito et al. |
| 2003/0233643 | A1 | 12/2003 | Thompson et al. |
| 2004/0001458 | A1 | 1/2004 | Dorenbosch et al. |
| 2004/0022094 | A1 | 2/2004 | Radhakrishnan et al. |
| 2004/0022107 | A1 | 2/2004 | Zaidi et al. |
| 2004/0124877 | A1 | 7/2004 | Parkes |
| 2004/0263524 | A1 | 12/2004 | Lippincott |
| 2005/0025120 | A1 | 2/2005 | O'Toole et al. |
| 2005/0076187 | A1 | 4/2005 | Claydon |
| 2005/0108776 | A1 | 5/2005 | Carver et al. |
| 2005/0134308 | A1 | 6/2005 | Okada et al. |
| 2005/0138323 | A1 | 6/2005 | Snyder |
| 2005/0172103 | A1 | 8/2005 | Inuo et al. |
| 2006/0041872 | A1 | 2/2006 | Poznanovic et al. |
| 2006/0130030 | A1 | 6/2006 | Kwiat et al. |
| 2006/0179255 | A1 | 8/2006 | Yamazaki |
| 2006/0179429 | A1 | 8/2006 | Eggers et al. |
| 2007/0011436 | A1 | 1/2007 | Bittner et al. |
| 2007/0033369 | A1 | 2/2007 | Kasama et al. |
| 2007/0118332 | A1 | 5/2007 | Meyers et al. |
| 2007/0143546 | A1 | 6/2007 | Narad |
| 2007/0180315 | A1 | 8/2007 | Aizawa et al. |
| 2007/0203967 | A1 | 8/2007 | Dockser et al. |
| 2007/0276976 | A1 | 11/2007 | Gower et al. |
| 2008/0082794 | A1 | 4/2008 | Yu et al. |
| 2008/0133889 | A1 | 6/2008 | Glew |
| 2008/0133895 | A1 | 6/2008 | Sivtsov et al. |
| 2008/0184255 | A1 | 7/2008 | Watanabe et al. |
| 2008/0218203 | A1 * | 9/2008 | Arriens ............ H03K 19/17736 326/38 |
| 2008/0263330 | A1 | 10/2008 | May et al. |
| 2008/0270689 | A1 | 10/2008 | Gotoh |
| 2008/0307258 | A1 | 12/2008 | Challenger et al. |
| 2009/0063665 | A1 | 3/2009 | Bagepalli et al. |
| 2009/0119456 | A1 | 5/2009 | Park, II et al. |
| 2009/0300324 | A1 | 12/2009 | Inuo |
| 2009/0300325 | A1 | 12/2009 | Paver et al. |
| 2009/0309884 | A1 | 12/2009 | Lippincott et al. |
| 2009/0328048 | A1 | 12/2009 | Khan et al. |
| 2010/0017761 | A1 | 1/2010 | Higuchi et al. |
| 2010/0180105 | A1 | 7/2010 | Asnaashari |
| 2010/0217915 | A1 | 8/2010 | O'Connor et al. |
| 2010/0228885 | A1 | 9/2010 | McDaniel et al. |
| 2010/0262721 | A1 | 10/2010 | Asnaashari et al. |
| 2010/0302946 | A1 | 12/2010 | Yang et al. |
| 2011/0004742 | A1 | 1/2011 | Hassan |
| 2011/0008300 | A1 | 1/2011 | Wouters et al. |
| 2011/0083000 | A1 | 4/2011 | Rhoades et al. |
| 2011/0099295 | A1 | 4/2011 | Wegener |
| 2011/0107337 | A1 | 5/2011 | Cambonie et al. |
| 2011/0202747 | A1 | 8/2011 | Busaba et al. |
| 2011/0302358 | A1 | 12/2011 | Yu et al. |
| 2011/0314238 | A1 | 12/2011 | Finkler et al. |
| 2011/0320724 | A1 | 12/2011 | Mejdrich et al. |
| 2012/0017066 | A1 | 1/2012 | Vorbach et al. |
| 2012/0066483 | A1 | 3/2012 | Boury et al. |
| 2012/0079168 | A1 | 3/2012 | Chou et al. |
| 2012/0124117 | A1 | 5/2012 | Yu et al. |
| 2012/0126851 | A1 | 5/2012 | Kelem et al. |
| 2012/0174118 | A1 | 7/2012 | Watanabe et al. |
| 2012/0239853 | A1 | 9/2012 | Moshayedi |
| 2012/0260239 | A1 | 10/2012 | Martinez et al. |
| 2012/0278543 | A1 | 11/2012 | Yu et al. |
| 2012/0278587 | A1 | 11/2012 | Caufield et al. |
| 2012/0303932 | A1 | 11/2012 | Farabet et al. |
| 2012/0303933 | A1 * | 11/2012 | Manet ............... G06F 15/17337 712/30 |
| 2012/0317388 | A1 | 12/2012 | Driever et al. |
| 2012/0324180 | A1 | 12/2012 | Asnaashari et al. |
| 2012/0330701 | A1 | 12/2012 | Hyder et al. |
| 2013/0036287 | A1 | 2/2013 | Chu et al. |
| 2013/0067138 | A1 | 3/2013 | Schuette et al. |
| 2013/0080652 | A1 | 3/2013 | Cradick et al. |
| 2013/0080993 | A1 | 3/2013 | Stravers et al. |
| 2013/0081042 | A1 | 3/2013 | Branson et al. |
| 2013/0125127 | A1 | 5/2013 | Mital et al. |
| 2013/0145203 | A1 | 6/2013 | Fawcett et al. |
| 2013/0151919 | A1 * | 6/2013 | Huynh ...................... G06F 1/26 714/746 |
| 2013/0315211 | A1 | 11/2013 | Balan et al. |
| 2014/0098890 | A1 | 4/2014 | Sermadevi et al. |

(56) References Cited

U.S. PATENT DOCUMENTS

| | | | |
|---|---|---|---|
| 2014/0115300 A1 | 4/2014 | Bodine | |
| 2014/0188968 A1 | 7/2014 | Kaul et al. | |
| 2014/0380024 A1 | 12/2014 | Spadini et al. | |
| 2015/0007182 A1 | 1/2015 | Rossbach et al. | |
| 2015/0026434 A1 | 1/2015 | Basant et al. | |
| 2015/0033001 A1 | 1/2015 | Ivanov | |
| 2015/0082011 A1* | 3/2015 | Mellinger | G11C 29/021 713/1 |
| 2015/0089162 A1 | 3/2015 | Ahsan et al. | |
| 2015/0089186 A1 | 3/2015 | Kim et al. | |
| 2015/0106596 A1 | 4/2015 | Vorbach et al. | |
| 2015/0317134 A1 | 11/2015 | Kim et al. | |
| 2016/0098420 A1 | 4/2016 | Dickie et al. | |
| 2016/0239265 A1 | 8/2016 | Duong et al. | |
| 2017/0031866 A1 | 2/2017 | Nowatzki et al. | |
| 2017/0083313 A1 | 3/2017 | Sankaralingam et al. | |
| 2017/0092371 A1 | 3/2017 | Harari | |
| 2017/0163543 A1 | 6/2017 | Wang et al. | |
| 2017/0255414 A1 | 9/2017 | Gerhart et al. | |
| 2017/0262383 A1 | 9/2017 | Lee et al. | |
| 2017/0286169 A1 | 10/2017 | Ravindran et al. | |
| 2017/0293766 A1 | 10/2017 | Schnjakin et al. | |
| 2017/0315815 A1* | 11/2017 | Smith | G06F 9/3017 |
| 2017/0315978 A1 | 11/2017 | Boucher et al. | |
| 2017/0371836 A1* | 12/2017 | Langhammer | G06F 15/82 |
| 2018/0081834 A1 | 3/2018 | Wang et al. | |
| 2018/0088647 A1 | 3/2018 | Suryanarayanan et al. | |
| 2018/0095728 A1 | 4/2018 | Hasenplaugh et al. | |
| 2018/0188983 A1 | 7/2018 | Fleming, Jr. et al. | |
| 2018/0188997 A1 | 7/2018 | Fleming, Jr. et al. | |
| 2018/0189063 A1 | 7/2018 | Fleming et al. | |
| 2018/0189231 A1 | 7/2018 | Fleming, Jr. et al. | |
| 2018/0218767 A1 | 8/2018 | Wolff | |
| 2018/0248994 A1 | 8/2018 | Lee et al. | |
| 2018/0285385 A1 | 10/2018 | West et al. | |
| 2018/0293162 A1 | 10/2018 | Tsai et al. | |
| 2018/0300181 A1 | 10/2018 | Hetzel et al. | |
| 2019/0004878 A1 | 1/2019 | Adler et al. | |
| 2019/0004945 A1 | 1/2019 | Fleming et al. | |
| 2019/0004955 A1 | 1/2019 | Adler et al. | |
| 2019/0004994 A1 | 1/2019 | Fleming et al. | |
| 2019/0005161 A1 | 1/2019 | Fleming et al. | |
| 2019/0007332 A1 | 1/2019 | Fleming et al. | |
| 2019/0018815 A1 | 1/2019 | Fleming et al. | |
| 2019/0042217 A1 | 2/2019 | Glossop et al. | |
| 2019/0042513 A1 | 2/2019 | Fleming, Jr. et al. | |
| 2019/0095369 A1 | 3/2019 | Fleming et al. | |
| 2019/0095383 A1 | 3/2019 | Fleming et al. | |
| 2019/0101952 A1 | 4/2019 | Diamond et al. | |
| 2019/0102179 A1 | 4/2019 | Fleming et al. | |
| 2019/0129720 A1 | 5/2019 | Ivanov | |

FOREIGN PATENT DOCUMENTS

| | | |
|---|---|---|
| RU | 2374684 C1 | 11/2009 |
| WO | 2007031696 A1 | 3/2007 |
| WO | 2014035449 A1 | 3/2014 |

OTHER PUBLICATIONS

Advisory Action from U.S. Appl. No. 14/037,468, dated Aug. 11, 2017, 3 pages.

Arvind., et al., "Executing a Program on the MIT Tagged-Token Dataflow Architecture," Mar. 1990, IEEE Transactions on Computers, vol. 39 (3), pp. 300-318.

Asanovic K., et al., "The Landscape of Parallel Computing Research: A View from Berkeley," Dec. 18, 2006, Electrical Engineering and Computer Sciences University of California at Berkeley, Technical Report No. UCB/EECS-2006-183, http://www.eecs.berkeley.edu/Pubs/TechRpts/2006/EECS-2006-183.html, 56 pages.

Ball T., "What's in a Region?or Computing Control Dependence Regions in Near-Linear Time for Reducible Control Flow," Dec. 1993, ACM Letters on Programming Languages and Systems, 2(1-4):1-16, 24 pages.

Bohm I., "Configurable Flow Accelerators," Mar. 3, 2016, XP055475839. retrieved from http://groups.inf.ed.ac.uk/pasta/rareas_cfa.html on Oct. 25, 2018, 3 pages.

Burger D., et al., "Scaling to the End of Silicon with EDGE Architectures," Jul. 2004, pp. 44-55.

Carloni L.P., et al., "The Theory of Latency Insensitive Design," Sep. 2001, IEEE Transactions on Computer-Aided Design of Integrated Circuits and Systems, vol. 20 (9), 18 pages.

Cong J., et al., "Supporting Address Translation for Accelerator-Centric Architectures," Feb. 2017, IEEE International Symposium on High Performance Computer Architecture (HPCA), 12 pages.

Dennis J.B., et al., "A Preliminary Architecture for a Basic Data-Flow Processor," 1975, In Proceedings of the 2nd Annual Symposium on Computer Architecture, pp. 125-131.

Dijkstra E.W., "Guarded Commands, Nondeterminacy and Formal Derivation of Programs," Aug. 1975, Communications of the ACM, vol. 18 (8), pp. 453-457.

Eisenhardt S., et al., "Optimizing Partial Reconfiguration of Multi-Context Architectures," Dec. 2008, 2008 International Conference on Reconfigurable Computing and FPGAs, 6 pages.

Emer J., et al., "Asim: A Performance Model Framework," Feb. 2002, Computer, vol. 35 (2), pp. 68-76.

Emer J.S., et al., "A Characterization of Processor Performance in the VAX-11/780," 1984, 10 pages.

Extended European Search Report for Application No. 17207172.2, dated Oct. 1, 2018, 14 pages.

Extended European Search Report for Application No. 17210484.6, dated May 29, 2018, 8 pages.

Final Office Action from U.S. Appl. No. 13/994,582, dated Oct. 3, 2017, 11 pages.

Final Office Action from U.S. Appl. No. 14/037,468, dated Jun. 1, 2017, 18 pages.

Final Office Action from U.S. Appl. No. 14/037,468, dated Jun. 15, 2018, 7 pages.

Final Office Action from U.S. Appl. No. 14/037,468, dated May 16, 2016, 24 pages.

Final Office Action from U.S. Appl. No. 14/037,468, dated Oct. 5, 2016, 17 pages.

Fleming et al., U.S. Appl. No. 15/396,038, titled "Memory Ordering in Acceleration Hardware," 81 pages, filed Dec. 30, 2016.

Fleming et al., U.S. Appl. No. 15/396,049, titled "Runtime Address Disambiguation in Acceleration Hardware," filed Dec. 30, 2016, 97 pages.

Govindaraju V., et al., "Dynamically Specialized Datapaths for Energy Efficient Computing," 2011, In Proceedings of the 17th International Conference on High Performance Computer Architecture, 12 pages.

Hauser J.R., et al., "Garp: a MIPS processor with a Reconfigurable Coprocessor," Proceedings of the 5th Annual IEEE Symposium on Field-Programmable Custom Computing Machines, 1997, 10 pages.

Hoogerbrugge J., et al., "Transport-Triggering vs. Operation-Triggering," 1994, In Compiler Construction, Lecture Notes in Computer Science, vol. 786, Springer, pp. 435-449.

Ibrahim Eng., Walaa Abd El Aziz, "Binary Floating Point Fused Multiply Add Unit", Faculty of Engineering, Cairo University Giza, Egypt, 2012, 100 Pages.

Intemational Preliminary Report on Patentability for Application No. PCT/RU2011/001049, dated Jul. 10, 2014, 6 pages.

International Search Report and Written Opinion for Application No. PCT/RU2011/001049, dated Sep. 20, 2012, 6 pages.

International Search Report and Written Opinion received for PCT Patent Application No. PCT/US2017/050663, dated Dec. 28, 2017, 14 pages.

Kim et al., "Energy-Efficient and High Performance CGRA-based Multi-Core Architecture," Journal of Semiconductor Technology and Science, vol. 14 (3), Jun. 2014, 16 pages.

Knuth D.E., et al., "Fast Pattern Matching in Strings," Jun. 1977, SIAM Journal of Computing, vol. 6(2), pp. 323-350.

Lee T., et al., "Hardware Context-Switch Methodology for Dynamically Partially Reconfigurable Systems," Journal of Information Science and Engineering, vol. 26, Jul. 2010, pp. 1289-1305.

(56) References Cited

OTHER PUBLICATIONS

Marquardt A., et al., "Speed and Area Trade-OFFS in Cluster-Based FPGA Architectures," Feb. 2000, IEEE Transactions on Very Large Scale Integration (VLSI) Systems, vol. 8 (1), 10 pages.
Mei B., et al., "ADRES: An Architecture with Tightly Coupled VLIW Processor and Coarse-Grained Reconfigurable Matrix," 2003, In Proceedings of International Conference on Field-Programmable Logic and Applications, 10 pages.
Mirsky E., at al., "MATRIX: A Reconfigurable Computing Architecture with Configurable Instruction Distribution and Deployable Resources," 1996, In Proceedings of the IEEE Symposium on FPGAs for Custom Computing Machines, pp. 157-166.
Non-Final Office Action from U.S. Appl. No. 14/037,468, dated Oct. 19, 2017, 19 pages.
Non-Final Office Action from U.S. Appl. No. 15/396,038, dated Oct. 5, 2018, 38 pages.
Non-Final Office Action from U.S. Appl. No. 15/396,049, dated Jun. 15, 2018, 33 pages.
Non-Final Office Action from U.S. Appl. No. 15/859,473, dated Oct. 15, 2018, 10 pages.
Non-Final Office Action from U.S. Appl. No. 13/994,582, dated Mar. 23, 2017, 9 pages.
Non-Final Office Action from U.S. Appl. No. 13/994,582, dated Feb. 7, 2018, 12 pages.
Non-Final Office Action from U.S. Appl. No. 14/037,468, dated Aug. 27, 2015, 10 pages.
Non-Final Office Action from U.S. Appl. No. 14/037,468, dated Dec. 2, 2016, 16 pages.
Non-Final Office Action from U.S. Appl. No. 15/283,295, dated Apr. 30, 2018, 18 pages.
Non-Final Office Action from U.S. Appl. No. 15/396,395, dated Jul. 20, 2018, 18 pages.
Non-Final Office Action from U.S. Appl. No. 15/640,533, dated Apr. 19, 2018, 8 pages.
Non-Final Office Action from U.S. Appl. No. 15/640,534, dated Apr. 26, 2018, 8 pages.
Non-Final Office Action from U.S. Appl. No. 15/640,535, dated May 15, 2018, 13 pages.
Non-Final Office Action from U.S. Appl. No. 15/721,809, dated Jun. 14, 2018, 12 pages.
Notice of Allowance from U.S. Appl. No. 15/640,533, dated Oct. 10, 2018, 8 pages.
Notice of Allowance from U.S. Appl. No. 15/640,535, dated Oct. 9, 2018, 7 pages.
Notice of Allowance from U.S. Appl. No. 15/640,538, dated Oct. 17, 2018, 10 pages.
Notice of Allowance from U.S. Appl. No. 13/994,582, dated Aug. 7, 2018, 8 pages.
Notice of Allowance from U.S. Appl. No. 14/037,468, dated Aug. 28, 2018, 9 pages.
Notice of Allowance from U.S. Appl. No. 15/640,534, dated Sep. 12, 2018, 7 pages.
Parashar A., et al., "Efficient Spatial Processing Element Control via Triggered Instructions," IEEE Micro, vol. 34 (3), Mar. 10, 2014, pp. 120-137.
Parashar et al., "LEAP: A Virtual Platform Architecture for FPGAs," Intel Corporation, 2010, 6 pages.
Pellauer M., et al., "Efficient Control and Communication Paradigms for Coarse-Grained Spatial Architectures," Sep. 2015, ACM Transactions on Computer Systems, vol. 33 (3), Article 10, 32 pages.
Pellauer M., et al., "Soft Connections: Addressing the Hardware-Design Modularity Problem," 2009, In Proceedings of the 46th ACM/IEEE Design Automation Conference (DAC'09), pp. 276-281.
Schmit H., et al, "PipeRench: A Virtualized Programmable Datapath in 0.18 Micron Technology," 2002, IEEE 2002 Custom Integrated Circuits Conference, pp. 63-66.
Shin T., et al., "Minimizing Buffer Requirements for Throughput Constrained Parallel Execution of Synchronous Dataflow Graph," ASPDAC '11 Proceedings of the 16th Asia and South Pacific Design Automation Conference , Jan. 2011, 6 pages.
Smith A., et al., "Dataflow Predication," 2006, In Proceedings of the 39th Annual IEEE/ACM International Symposium on Microarchitecture, 12 pages.
Swanson S., et al., "The WaveScalar Architecture," May 2007, ACM Transactions on Computer Systems, vol. 25 (2), Article No. 4, 35 pages.
Taylor M.B., et al., "The Raw Microprocessor: A Computational Fabric for Software Circuits and General-Purpose Programs," 2002, IEEE Micro, vol. 22 (2), pp. 25-35.
Van De Geijn R.A., et al., "SUMMA: Scalable Universal Matrix Multiplication Algorithm," 1997, 19 pages.
Vijayaraghavan M., et al., "Bounded Dataflow Networks and Latency-Insensitive Circuits," 2009, In Proceedings of be 7th IEEE/ACM International Conference on Formal Methods and Models for Codesign, 11 pages.
Wikipedia, The Free Encyclopedia, "Priority encoder," https://en.wikipedia.org/w/index.php?Title=Priority_encoder&oldid=746908667, revised Oct. 30, 2016, 2 pages.
Wikipedia, The Free Encyclopedia, "Truth table," Logical Implication Table, https://enwikipedia.org/wiki/Truth_table#Logical_implication, revised Nov. 18, 2016, 1 page.
Wikipedia, "TRIPS Architecture," retrieved from https://en.wikipedia.org/wiki/TRIPS_architecture on Oct. 14, 2018, 4 pages.
Williston, Roving Reporter, Intel® Embedded Alliance, "Roving Reporter: FPGA + Intel® Atom TM = Configurable Processor," Dec. 2010, 5 pages.
Bluespec, "Bluespec System Verilog Reference Guide," Jun. 16, 2010, Bluespec, Inc, 453 pages.
Chandy K.M., et al., "Parallel Program Design: A Foundation," Addison-Wesley Publishing Company, Aug. 1988, 552 pages.
Compton K., et al., "Reconfigurable Computing: A Survey of Systems and Software," ACM Computing Surveys, Jun. 2002, vol. 34 (2), pp. 171-210.
"CORAL Collaboration: Oak Ridge, Argonne, Livermore," Benchmark codes, downloaded from https://asc.llnl.gov/CORAL-benchmarks/ on Nov. 16, 2018, 6 pages.
Dally W.J., et al., "Principles and Practices of Interconnection Networks," Morgan Kaufmann, 2003, 584 pages.
Fleming K., et al., "Leveraging Latency-Insensitivity to Ease Multiple FPGA Design," In Proceedings of the ACM/SIGDA International Symposium on Field Programmable Gate Arrays, FPGA'12, Feb. 22-24, 2012, pp. 175-184.
Fleming K.E., et al., "Leveraging Latency-Insensitive Channels to Achieve Scalable Reconfigurable Computation," Feb. 2013, 197 pages.
Kalte H., et al., "Context Saving and Restoring for Multitasking in Reconfigurable Systems," International Conference on Field Programmable Logic and Applications, Aug. 2005, pp. 223-228.
King M., et al., "Automatic Generation of Hardware/Software Interfaces," Proceedings of the 17th International Conference on Architectural Support for Programming Languages and Operating Systems, ASPLOS'12, Mar. 2012, 12 pages.
Li S., et al., "Case Study: Computing Black-Scholes with Intel® Advanced Vector Extensions," Sep. 6, 2012, 20 pages.
Matsen F.A., et al., "The CMU warp processor," In Supercomputers: Algorithms, Architectures, and Scientific Computation, 1986, pp. 235-247.
McCalpin J.D., "Memory Bandwidth and Machine Balance in Current High Performance Computers," IEEE Computer Society Technical Committee on Computer Architecture (TCCA) Newsletter, Dec. 1995, 7 pages.
McCalpin J.D., "Stream: Sustainable memory bandwidth in high performance computers," 2016, 4 pages.
Merrill D., et al., "Revisiting sorting for GPGPU stream architectures," In Proceedings of the 19th International Conference on Parallel Architectures and Compilation Techniques (PACT'10), Feb. 2010, 17 pages.
Natalie E.J., et al., "On-Chip Networks," Synthesis Lectures on Computer Architecture, Morgan and Claypool Publishers, 2009, 148 pages.

(56) References Cited

OTHER PUBLICATIONS

Non-Final Office Action from U.S. Appl. No. 15/396,402, dated Nov. 1, 2018, 22 pages.
Non-Final Office Action from U.S. Appl. No. 15/640,540, dated Oct. 26, 2018, 8 pages.
Panesar G., et al., "Deterministic Parallel Processing," International Journal of Parallel Programming, Aug. 2006, vol. 34 (4), pp. 323-341.
Raaijmakers S., "Run-Time Partial Reconfiguration on the Virtex-11 Pro," 2007, 69 pages.
Truong D.N., et al., "A 167-Processor Computational Platform in 65 nm CMOS," IEEE Journal of Solid-State Circuits, Apr. 2009, vol. 44 (4), pp. 1130-1144.
Ye Z.A., et al., "CHIMAERA: A High-Performance Architecture with a Tightly-Coupled Reconfigurable Functional Unit," Proceedings of the 27th International Symposium on Computer Architecture (ISCA'00), 2000, 11 pages.
Yu Z., et al., "An Asynchronous Array of Simple Processors for DSP Applications," IEEE International Solid-State Circuits Conference, ISSCC'06, Feb. 8, 2006, 10 pages.
"Benchmarking DNN Processors," Nov. 2016, 2 pages.
Chen Y., et al., "Eyeriss: A Spacial Architecture for Energy-Efficient Dataflow for Convolutional Neural Networks," Jun. 2016, 53 pages.
Chen Y., et al., "Eyeriss: A Spacial Architecture for Energy-Efficient Dataflow for Convolutional Neural Networks," International Symposium on Computer Architecture (ISCA), Jun. 2016, pp. 367-379.
Chen Y., et al., "Eyeriss: An Energy-Efficient Reconfigurable Accelerator for Deep Convolutional Neural Networks," IEEE International Conference on Solid-State Circuits (ISSCC), Feb. 2016, pp. 262-264.
Chen Y., et al., "Eyeriss: An Energy-Efficient Reconfigurable Accelerator for Deep Convolutional Neural Networks," IEEE International Solid-State Circuits Conference, ISSCC, 2016, 9 pages.
Chen Y., et al., "Eyeriss: An Energy-Efficient Reconfigurable Accelerator for Deep Convolutional Neural Networks," IEEE International Solid-State Circuits Conference, ISSCC 2016, Digest of Technical Papers, retrieved from eyeriss-isscc2016, spreadsheet, http://eyeriss.mit.edu/benchmarking.html, 2016, 7 pages.
Chen Y., et al., "Eyeriss: An Energy-Efficient Reconfigurable Accelerator for Deep Convolutional Neural Networks," IEEE Journal of Solid State Circuits (JSSC), ISSCC Special Issue, Jan. 2017, vol. 52 (1), pp. 127-138.
Chen Y., et al., "Eyeriss v2: A Flexible and High-Performance Accelerator for Emerging Deep Neural Networks," Jul. 2018, 14 pages.
Chen Y., et al., "Understanding the Limitations of Existing Energy-Efficient Design Approaches for Deep Neural Networks," Feb. 2018, 3 pages.
Chen Y., et al., "Using Dataflow to Optimize Energy Efficiency of Deep Neural Network Accelerators," IEEE Micro's Top Picks from the Computer Architecture Conferences, May/Jun. 2017, pp. 12-21.
Corrected Notice of Allowance from U.S. Appl. No. 15/640,535, dated Feb. 13, 2019, 7 pages.
Emer J., et al., "Hardware Architectures for Deep Neural Networks at CICS/MTL Tutorial," Mar. 27, 2017, 258 pages.
Emer J., et al., "Hardware Architectures for Deep Neural Networks at ISCA Tutorial," Jun. 24, 2017, 290 pages.
Emer J., et al., "Hardware Architectures for Deep Neural Networks at Micro-49 Tutorial," Oct. 16, 2016, 300 pages.
Emer J., et al., "Tutorial on Hardware Architectures for Deep Neural Networks," Nov. 2016, 8 pages.
Final Office Action from U.S. Appl. No. 15/859,473, dated Feb. 26, 2019, 13 pages.
"Full Day Tutorial Held at Micro-49," Oct. 15-19, 2016, retrieved from https://www.microarch.org/micro49/ on Feb. 14, 2019, 2 pages.
Han S., et al., "Deep Compression: Compressing Deep Neural Networks with Pruning, Trained Quantization and Huffman Coding," ICLR, Feb. 2016, 14 pages.
Han S., et al., "EIE: Efficient Inference Engine on Compressed Deep Neural Network," 43rd ACM/IEEE Annual International Symposium on Computer Architecture, ISCA 2016, Seoul, South Korea, Jun. 18-22, 2016, retrieved from eie-isca2016, spreadsheet, http://eyeriss.mit.edu/benchmarking.html, 7 pages.
Han S., et al., "EIE: Efficient Inference Engine on Compressed Deep Neural Network," ISCA, May 2016, 12 pages.
Hsin Y., "Building Energy-Efficient Accelerators for Deep Learning," at Deep Learning Summit Boston, May 2016, retrieved from https://www.re-work.co/events/deep-learning-boston-2016 on Feb. 14, 2019, 10 pages.
Hsin Y., "Deep Learning & Artificial Intelligence," at GPU Technology Conference, Mar. 26-29, 2018, retrieved from http://www.gputechconf.com/resources/poster-gallery/2016/deep-learning-artificial-intelligence on Feb. 14, 2019, 4 pages.
Non-Final Office Action from U.S. Appl. No. 15/719,285, dated Feb. 25, 2019, 47 pages.
Non-Final Office Action from U.S. Appl. No. 15/855,964, dated Dec. 13, 2018, 13 pages.
Notice of Allowance from U.S. Appl. No. 15/640,533, dated Feb. 14, 2019, 43 pages.
Notice of Allowance from U.S. Appl. No. 15/640,535, dated Feb. 6, 2019, 38 pages.
Notice of Allowance from U.S. Appl. No. 15/719,281, dated Jan. 24, 2019, 36 pages.
Suleiman A., et al., "Towards Closing the Energy Gap Between HOG and CNN Features for Embedded Vision," IEEE International Symposium of Circuits and Systems (ISCAS), May 2017, 4 pages.
Sze V., "Designing Efficient Deep Learning Systems," in Mountain View, CA, Mar. 27-28, 2019, retrieved from https://professional.mit.edu/programs/short-programs/designing-efficient-deep-leaming-systems-OC on Feb. 14, 2019, 2 pages.
Sze V., et al., "Efficient Processing of Deep Neural Networks: A Tutorial and Survey," Mar. 2017, 32 pages.
Sze V., et al., "Efficient Processing of Deep Neural Networks: A Tutorial and Survey," Proceedings of the IEEE, Dec. 2017, vol. 105 (12), pp. 2295-2329.
Sze V., et al., "Hardware for Machine Learning: Challenges and Opportunities," IEEE Custom Integrated Circuits Conference (CICC), Oct. 2017, 9 pages.
"Tutorial at MICRO-50," The 50th Annual IEEE/ACM International Symposium on Microarchitecture, Oct. 14-18, 2017, retrieved from https://www.microarch.org/micro50/ on Feb. 14, 2019, 3 pages.
"Tutorial on Hardware Architectures for Deep Neural Networks at ISCA 2017," The 44th International Symposium on Computer Architecture, Jun. 24-28, 2017, retrieved from http://isca17.ece.utoronto.ca/doku.php on Feb. 14, 2019, 2 pages.
Yang T., et al., "Deep Neural Network Energy Estimation Tool," IEEE Conference on Computer Vision and Pattern Recognition CVPR 2017, Jul. 21-26, 2017, retrieved from https://energyestimation.mit.edu/ on Feb. 21, 2019, 4 pages.
Yang T., et al., "NetAdapt: Platform-Aware Neural Network Adaptation for Mobile Applications," European Conference on Computer Vision (ECCV), Version 1, Apr. 9, 2018, 16 pages.
Yang T., et al ., "A Method to Estimate the Energy Consumption of Deep Neural Networks," Asilomar Conference on Signals, Systems and Computers, Oct. 2017, 5 pages.
Yang T., et al ., "Designing Energy-Efficient Convolutional Neural Networks using Energy-Aware Pruning," IEEE Conference on Computer Vision and Pattern Recognition (CVPR), Jul. 2017, 9 pages.
Yang T., et al., "Designing Energy-Efficient Convolutional Neural Networks using Energy-Aware Pruning," IEEE Conference on Computer Vision and Pattern Recognition CVPR 2017, Jul. 21-26, 2017, retrieved from http://www.rle.mit.edu/eems/wp-content/uploads/2017/07/2017_cvpr_poster.pdf on Feb. 21, 2019, 1 page.
Yang T., et al., "Designing Energy-Efficient Convolutional Neural Networks using Energy-Aware Pruning," IEEE CVPR, Mar. 2017, 6 pages.
Yang T., et al., "NetAdapt: Platform-Aware Neural Network Adaptation for Mobile Applications," European Conference on Computer Vision (ECCV), Version 2, Sep. 28, 2018, 16 pages.
Final Office Action from U.S. Appl. No. 15/396,049, dated Dec. 27, 2018, 38 pages.

(56) References Cited

OTHER PUBLICATIONS

Final Office Action from U.S. Appl. No. 15/721,809, dated Dec. 26, 2018, 46 pages.
Intel® Architecture, "Instruction Set Extensions and Future Features Programming Reference," 319433-034, May 2018, 145 pages.
Intel, "Intel® 64 and IA-32 Architectures Software Developer Manuals," Oct. 12, 2016, Updated—May 18, 2018, 19 pages.
Non-Final Office Action from U.S. Appl. No. 15/640,543, dated Jan. 3, 2019, 46 pages.
Notice of Allowance from U.S. Appl. No. 15/283,295, dated Jan. 3, 2019, 7 pages.
Notice of Allowance from U.S. Appl. No. 15/640,534, dated Jan. 4, 2019, 37 pages.
Notice of Allowance from U.S. Appl. No. 15/396,395, dated Dec. 28, 2018, 36 pages.
Canis A., et al., "LegUp: An Open-Source High-Level Synthesis Tool for FPGA-Based Processor/Accelerator Systems," ACM Transactions on Embedded Computing Systems, vol. 1(1), Article 1, Jul. 2012, 25 pages.
Corrected Notice of Allowance from U.S. Appl. No. 14/037,468, dated Apr. 1, 2019, 10 pages.
Corrected Notice of Allowance from U.S. Appl. No. 15/640,534, dated Apr. 26, 2019, 21 pages.
Final Office Action from U.S. Appl. No. 15/396,402, dated May 17, 2019, 85 pages.
Govindaraju et al.,"DySER: Unifying Functionality and Parallelism Specialization for Energy-Efficient Computing," Published by the IEEE Computer Society, Sep./Oct. 2012, pp. 38-51.
International Preliminary Report on Patentability for Application No. PCT/US2017/050663, dated Apr. 11, 2019, 11 pages.
Non-Final Office Action from U.S. Appl. No. 15/640,541, dated Apr. 12, 2019, 61 pages.
Non-Final Office Action from U.S. Appl. No. 15/640,542, dated Apr. 2, 2019, 59 pages.
Notice of Allowance from U.S. Appl. No. 15/283,295, dated Apr. 10, 2019, 49 pages.
Notice of Allowance from U.S. Appl. No. 15/396,395, dated May 15, 2019, 23 pages.
Notice of Allowance from U.S. Appl. No. 15/640,533, dated May 22, 2019, 19 pages.
Notice of Allowance from U.S. Appl. No. 15/640,534, dated Apr. 2, 2019, 9 pages.
Notice of Allowance from U.S. Appl. No. 15/855,964, dated Apr. 24, 2019, 15 pages.
Notice of Allowance from U.S. Appl. No. 15/859,466, dated May 17, 2019, 56 pages.
Smith A., et al., "Compiling for EDGE Architectures," Appears in the Proceedings of the 4th International Symposium on code Generation and Optimization, 2006, 11 pages.
"The LLVM Compiler Infrastructure," retrieved from http://www.llvm.org/, on May 1, 2018, maintained by the llvm-admin team, 4 pages.
Corrected Notice of Allowance from U.S. Appl. No. 14/037,468, dated May 29, 2019, 12 pages.
Notice of Allowance from U.S. Appl. No. 15/640,535, dated May 24, 2019, 19 pages.

* cited by examiner

```
void powY (int n) {
  int i, res = X;
  for (i=0,i<n, i++) {
      res = res * Y;
  }
  return res;
}
```
PROGRAM SOURCE
FIG. 3A
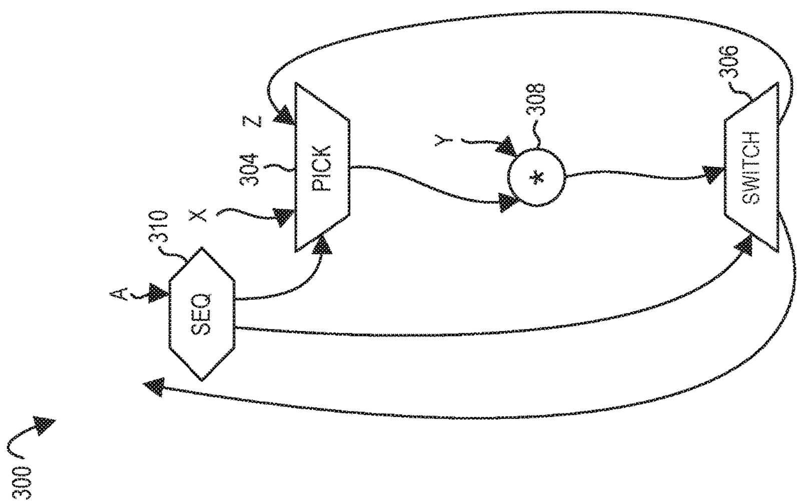
DATAFLOW GRAPH
FIG. 3B
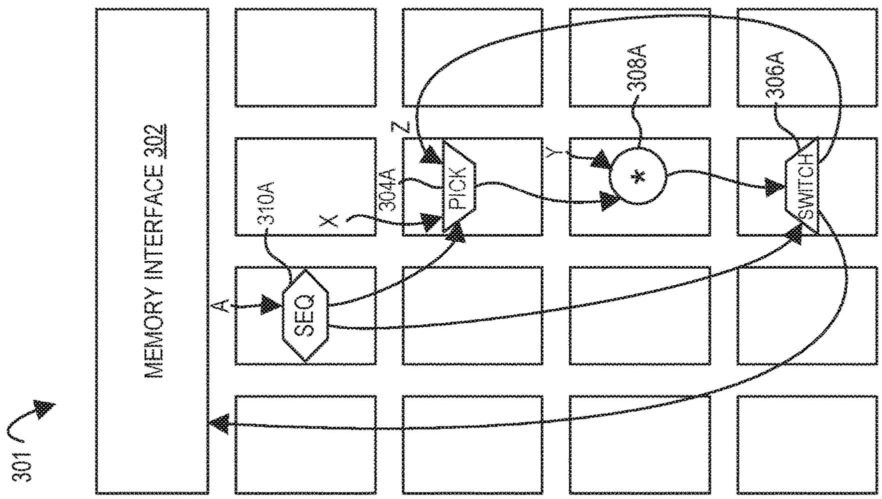
CONFIGURED CSA
FIG. 3C

500

```
void memcpy(void *A, void *B, int N) {
     for(int index = 0; index < N; index++) {
          a[index] = b[index]
     }
}
```

```
for ( i=0; i<N; i++) {

  a[i] = b[i];

}
```

```
ld32 Rdata, Raddr
ld32 Rdata2, Raddr2
mul32 Rv0, Rdata, 17
mul32 Rv1, Rdata2, Rdata2
add32 Rres, Rv0, Rv1
st32 Raddr, Rres
ld32 Rdata3, Raddr3
```

SEQUENTIAL ASSEMBLY 1702

FIG. 17A

```
.lic .i32 data; .lic .i64 addr;
.lic .i32 data2; .lic .i64 addr2;
.lic .i32 data3; .lic .i64 addr3;
.lic .i32 v0; .lic .i32 v1; .lic .i32 res
ld32 data, addr
ld32 data2, addr2
mul32 v0, data, 17
mul32 v1, data2, data2
add32 res, v0, v1
st32 addr, res, done, %ign
ld32 data3, addr3, %ign, done
```

DATAFLOW ASSEMBLY 1704

FIG. 17B

DATAFLOW GRAPH 1706

```
if (i < n)
    y = x + a;
else
    y = i + x;
```

C SOURCE CODE 1802

FIG. 18A

```
.lic .i1 test
cmplts32 test, i, n
switch32 %ign, aT, test, a
switch32 iF, %ign, test, i
switch32 xF, xT, test, x
add32 yT, xT, aT      # True path
add32 yF, iF, xF      # False path
pick32 y, test, yF, yT
add32 z, y, 1
```

DATAFLOW ASSEMBLY 1804

FIG. 18B

DATAFLOW GRAPH 1806

```
int i = 0;
int sum = 0;
do {
     sum = sum + i;
     i = i + 1;
} while (i < n);
return sum;
```

C SOURCE CODE 1902

FIG. 19A

```
# Loop control channels.
.lic .i1 picker
.lic .i1 switcher

# Offset values in picker with an initial 0.
.curr picker; .value 0; .avail 0

# Generate value of i for each loop iteration
pick32 top_i, picker, init_i, loopback_i
add32 bottom_i, top_i, 1
switch32 %ign, loopback_i, switcher, bottom_i

# Repeat value of n for each execution of the loop.
pick32 loop_n, picker, init_n, loopback_n
switch32 %ign, loopback_n, switcher, loop_n

# Comparison at the bottom of the loop.
cmplts32 switcher, bottom_i, loop_n
mov1 picker, switcher

# Add up the sum around the loop iteration.
pick32 top_sum, picker, init_sum, loopback_sum
add32 bottom_sum, top_sum, top_i
switch32 out_sum, loopback_sum, switcher, bottom_sum
```

DATAFLOW ASSEMBLY 1904

FIG. 19B

DATAFLOW GRAPH 1906

```
double final_sum = 0;
for(int i=0; i<n; ++1) {
    final_sum += x[i]*y[i];
}
```

C SOURCE CODE 2002

```
.lic .il loop_ctl
.lic .i64 x_addr; .lic .i64 y_addr
.lic .f64 x_val; .lic .f64 y_val
.lic .f64 final_sum
seqlts64 %ign, loop_ctl, %ign, %ign, base_i, n, 1
stride64 x_addr, loop_ctl, x, 8
ld64 x_val, x_addr
stride64 y_addr, loop_ctl, y, 8
ld64 y_val, y_addr
fmsredaf64 final_sum, %ign, 0, x_val, y_val, loop_ctl
```

DATAFLOW ASSEMBLY

FIG. 20B

DATAFLOW GRAPH 2006

INTEGER PE MICROARCHITECTURE

EXAMPLE INTEGER PE OPERATION FORMAT

EXAMPLE SEQUENCER COMPARE PE OPERATION FORMAT

OPTION 1 TO KEEP SEQUENCER STRIDE PE BINARY COMPATIBLE WITH INTEGER PE

OPTION 2 TO KEEP SEQUENCER STRIDE PE BINARY COMPATIBLE WITH INTEGER PE

SEQUENCER DATA INPUT TOKEN ARRIVAL TRACKING FSMs

CONTROLLER AND FSM TO SUPPORT ONE_TRIP_MODE

CIRCUITRY TO SUPPORT REDUCTION MODE IN SEQUENCER STRIDE PE

SEQ-CMP ALU OPCODE INPUT CIRCUITRY

3200

```
int64 A[r1][c1];
int64 B[r2][c2];
assert (c1 == r2);

for(i=0; i<r1; ++i)
  for(j=0; j<c2; ++j)
    for(k=0; k<c1; ++k)
    {
      mult[i][j] += A[i][k]*B[k][j]
    }
```

FIG. 32

SEQUENCER IMPLEMENTATION TO GENERATE A[i][k]

SEQUENCER IMPLEMENTATION TO GENERATE B[k][j]

OPTIMIZED SEQUENCER IMPLEMENTATION TO GENERATE A[i][k] AND B[k][j]

AN EXAMPLE TO TRANSFORM SPARSE MEMORY ACCESS PATTERN TO DENSE MEMORY ACCESS PATTERN FOR FUTURE PROCESSING

6000

| | INPUT QUEUE ID | OUTPUT QUEUE ID | DEPENDENCY QUEUE ID | MEMOP |
|---|---|---|---|---|
| LOGICAL | CHANNEL 0 5810 | COMPL. CHAN. 1 5820 | DEPLN: CHANNEL B0 DEPOUT: COUNTER C0 5830 | LOAD 5840 |
| BINARY (PROVISIONAL) | 001 | 010 | 1000/0001 | 00 |

FIG. 60

| | | INPUT QUEUE ID | OUTPUT QUEUE ID | DEPENDENCY QUEUE ID | OPERATION TYPE |
|---|---|---|---|---|---|
| 6202 | LOGICAL | CHANNEL 0 | COMPL. CHAN. 1 | DEPLN: COUNTER C0<br>DEPOUT: COUNTER C1 | LOAD |
| 6204 | LOGICAL | CHANNEL 1<br>CHANNEL 2 | NONE | DEPLN: COUNTER C1<br>DEPOUT: COUNTER C0 | STORE |

FIG. 62A

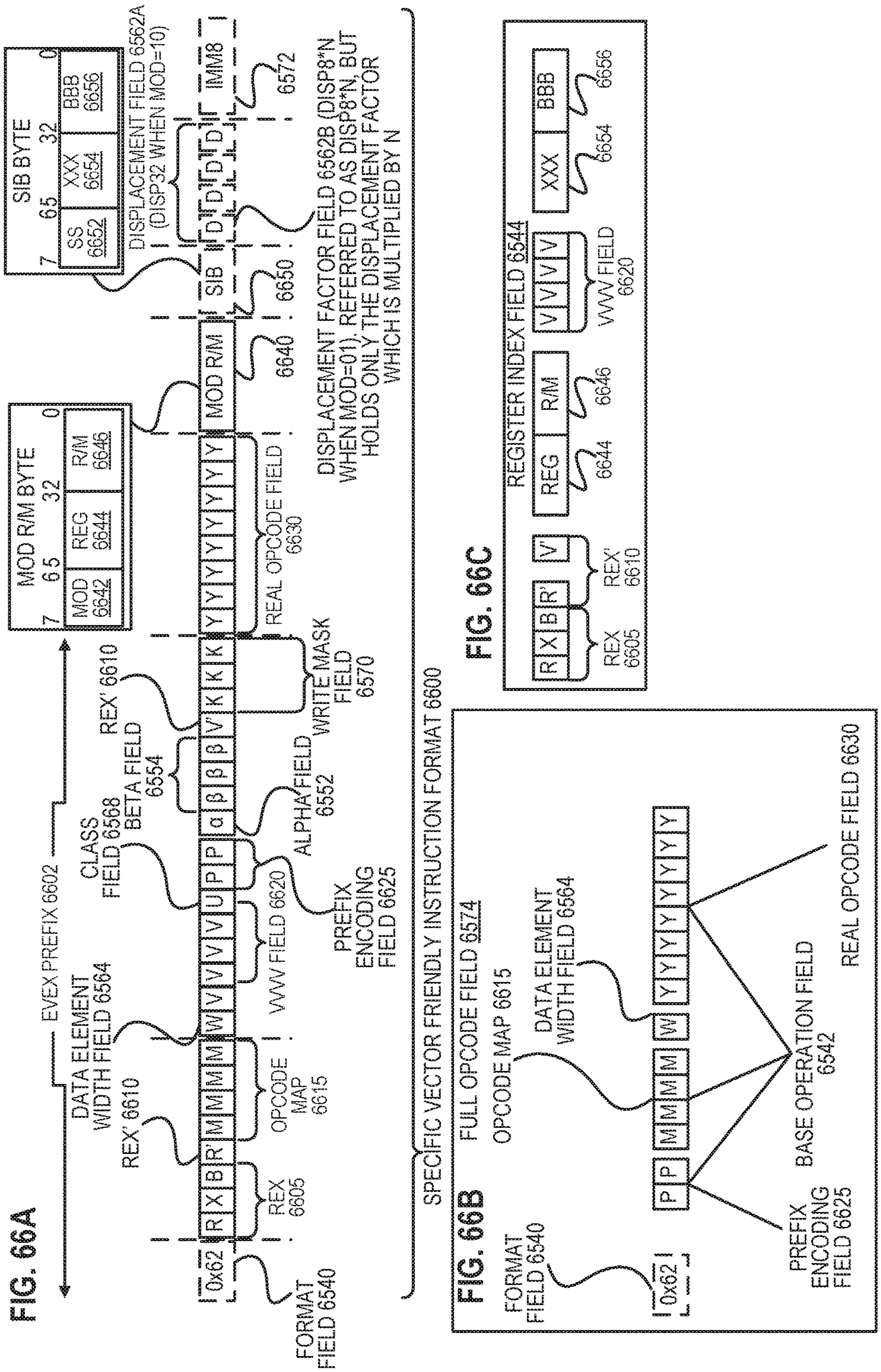
FIG. 66A
EVEX PREFIX 6602
SPECIFIC VECTOR FRIENDLY INSTRUCTION FORMAT 6600
0x62
FORMAT FIELD 6540
R X B R' M M M M
REX 6605
REX' 6610
OPCODE MAP 6615
DATA ELEMENT WIDTH FIELD 6564
W V V V V U P P
VVVV FIELD 6620
CLASS FIELD 6568
PREFIX ENCODING FIELD 6625
α β β β V' K K K
BETA FIELD 6554
ALPHA FIELD 6552
REX' 6610
WRITE MASK FIELD 6570
Y Y Y Y Y Y Y Y
REAL OPCODE FIELD 6630
MOD R/M BYTE
7 6 5 3 2 0
MOD 6642
REG 6644
R/M 6646
MOD R/M
6640
SIB BYTE
7 6 5 3 2 0
SS 6652
XXX 6654
BBB 6656
SIB
6650
DISPLACEMENT FIELD 6562A (DISP32 WHEN MOD=10)
D D D D
DISPLACEMENT FACTOR FIELD 6562B (DISP8*N WHEN MOD=01), REFERRED TO AS DISP8*N, BUT HOLDS ONLY THE DISPLACEMENT FACTOR WHICH IS MULTIPLIED BY N
IMM8
6572
FIG. 66B
FULL OPCODE FIELD 6574
FORMAT FIELD 6540
0x62
OPCODE MAP 6615
DATA ELEMENT WIDTH FIELD 6564
P P M M M M W Y Y Y Y Y Y Y Y
PREFIX ENCODING FIELD 6625
BASE OPERATION FIELD 6542
REAL OPCODE FIELD 6630
FIG. 66C
REGISTER INDEX FIELD 6544
R X B R'
REX 6605
V'
REX' 6610
REG
6644
R/M
6646
V V V V
VVVV FIELD 6620
XXX
6654
BBB
6656

PROCESSORS, METHODS, AND SYSTEMS WITH A CONFIGURABLE SPATIAL ACCELERATOR HAVING A SEQUENCER DATAFLOW OPERATOR

STATEMENT REGARDING FEDERALLY SPONSORED RESEARCH AND DEVELOPMENT

This invention was made with Government support under contract number H98230-13-D-0124 awarded by the Department of Defense. The Government has certain rights in this invention.

TECHNICAL FIELD

The disclosure relates generally to electronics, and, more specifically, an embodiment of the disclosure relates to a sequencer dataflow operator.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 3A illustrates a program source according to embodiments of the disclosure.

FIG. 3B illustrates a dataflow graph for the program source of FIG. 3A according to embodiments of the disclosure.

FIG. 3C illustrates an accelerator with a plurality of processing elements configured to execute the dataflow graph of FIG. 3B according to embodiments of the disclosure.

FIG. 5A illustrates a program source according to embodiments of the disclosure.

FIG. 5B illustrates a program source according to embodiments of the disclosure.

FIG. 17A illustrates sequential assembly code according to embodiments of the disclosure.

FIG. 17B illustrates dataflow assembly code for the sequential assembly code of FIG. 17A according to embodiments of the disclosure.

FIG. 18A illustrates C source code according to embodiments of the disclosure.

FIG. 18B illustrates dataflow assembly code for the C source code of FIG. 18A according to embodiments of the disclosure.

FIG. 19A illustrates C source code according to embodiments of the disclosure.

FIG. 19B illustrates dataflow assembly code for the C source code of FIG. 19A according to embodiments of the disclosure.

FIG. 20A illustrates C source code according to embodiments of the disclosure.

FIG. 20B illustrates dataflow assembly code for the C source code of FIG. 20A according to embodiments of the disclosure.

FIG. 32 illustrates a matrix multiplication code example according to embodiments of the disclosure.

FIG. 60 is a block diagram of an exemplary load operation, both logical and in binary according to embodiments of the disclosure.

FIG. 62A is a block diagram of exemplary memory arguments for a load operation and for a store operation according to embodiments of the disclosure.

FIG. 66A is a block diagram illustrating fields for the generic vector friendly instruction formats in FIGS. 65A and 65B according to embodiments of the disclosure.

FIG. 66B is a block diagram illustrating the fields of the specific vector friendly instruction format in FIG. 66A that make up a full opcode field according to one embodiment of the disclosure.

FIG. 66C is a block diagram illustrating the fields of the specific vector friendly instruction format in FIG. 66A that make up a register index field according to one embodiment of the disclosure.

DETAILED DESCRIPTION

Figure 1:
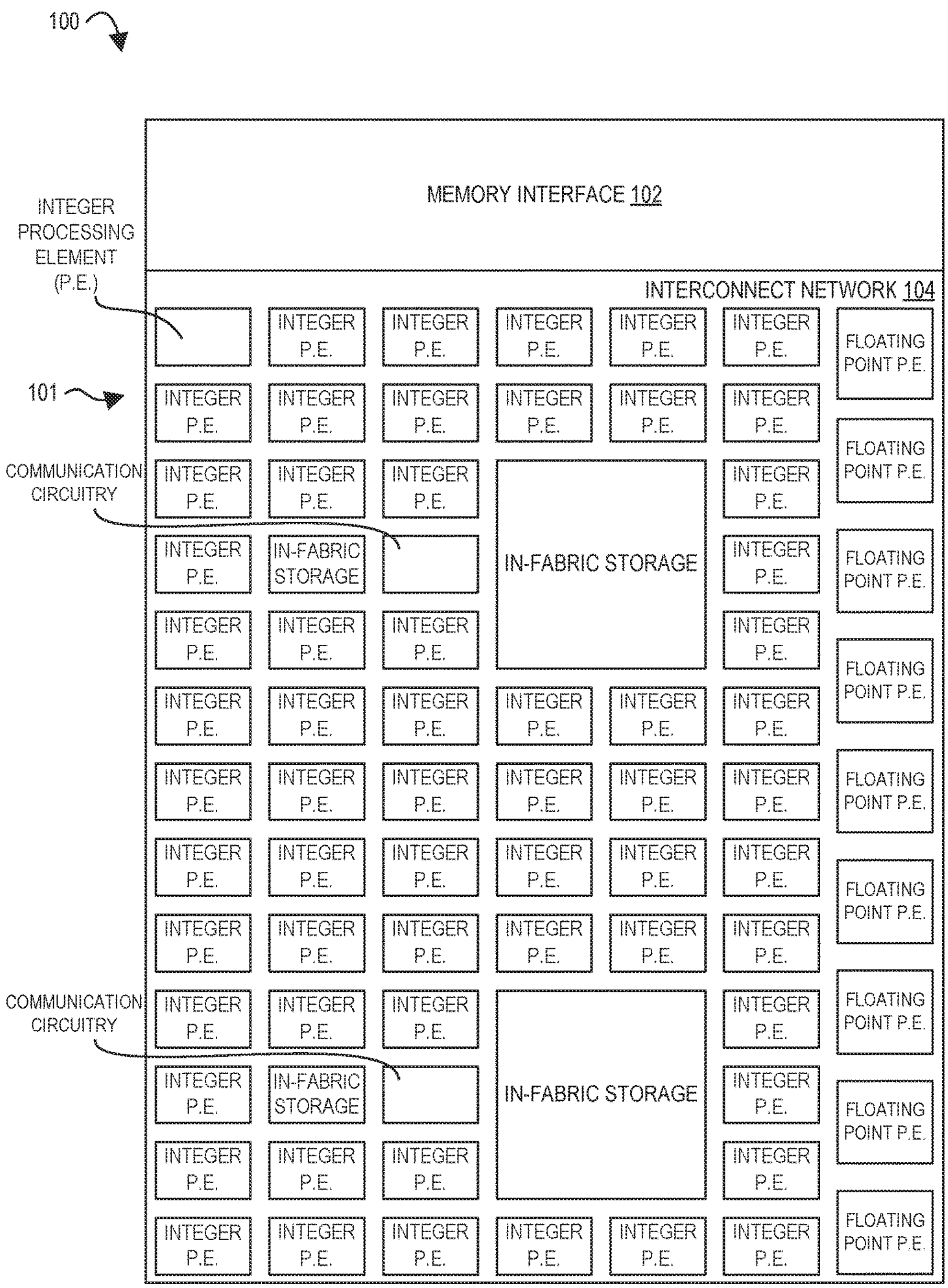
FIG. 1 illustrates an accelerator tile according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. One non-limiting example of an operation is a blend operation to input a plurality of vectors elements and output a vector with a blended plurality of elements. In certain embodiments, multiple operations are accomplished with the execution of a single instruction.

Exascale performance, e.g., as defined by the Department of Energy, may require system-level floating point performance to exceed 10^18 floating point operations per second (exaFLOPs) or more within a given (e.g., 20 MW) power budget. Certain embodiments herein are directed to a spatial array of processing elements (e.g., a configurable spatial accelerator (CSA)) that targets high performance computing (HPC), for example, of a processor. Certain embodiments herein of a spatial array of processing elements (e.g., a CSA) target the direct execution of a dataflow graph (or graphs) to yield a computationally dense yet energy-efficient spatial microarchitecture which far exceeds conventional roadmap architectures.

Certain embodiments of spatial architectures (e.g., the spatial arrays disclosed herein) are an energy efficient and high performance way to accelerate user applications. In certain embodiments, a spatial array (e.g., a plurality of processing elements coupled together by a (e.g., circuit switched) (e.g., interconnect) network) is to accelerate an application, for example, to execute some region of a single stream program (e.g., faster than a core of a processor). Certain embodiments of spatial architectures herein facilitate the mapping of sequential programs to spatial arrays.

The key architectural interface of embodiments of the accelerator (e.g., CSA) is the dataflow operator, e.g., as a direct representation of a node in a dataflow graph. From an operational perspective, dataflow operators behave in a streaming or data-driven fashion. Dataflow operators may execute as soon as their incoming operands become available. CSA dataflow execution may depend (e.g., only) on highly localized status, for example, resulting in a highly scalable architecture with a distributed, asynchronous execution model. Dataflow operators may include arithmetic dataflow operators, for example, one or more of floating point addition and multiplication, integer addition, subtraction, and multiplication, various forms of comparison, logical operators, and shift. However, embodiments of the CSA may also include a rich set of control operators which assist in the management of dataflow tokens in the program graph. Examples of these include a "pick" operator, e.g., which multiplexes two or more logical input channels into a single output channel, and a “switch” operator, e.g., which operates as a channel demultiplexor (e.g., outputting a single channel from two or more logical input channels).

These operators may enable a compiler to implement control paradigms such as conditional expressions and loops. Certain embodiments of a CSA may include a limited dataflow operator set (e.g., to a relatively small number of operations) to yield dense and energy efficient PE micro-architectures. Certain embodiments may include dataflow operators for complex operations that are common in HPC code. One example of a dataflow operator is a sequencer dataflow operator, e.g., to implement the control of for-style loops (e.g., loop constructs) in an efficient manner. One embodiment of a sequencer dataflow operator to implement a loop introduces a feedback path between the condition and post-condition update portions of the loop, for example, the for-loop terms are often dependent, e.g., the exit condition term (e.g., “M<i<N” or “i<N”) may often be followed by a decrement or increment term (e.g., “i++” or similar, where i is the loop counter variable). In certain embodiments, this may form a bottleneck in performance of the sequencer dataflow operator implementation which is resolved by introducing the compound sequencer operation, e.g., which is able to perform the condition and update of a for-loop pattern in a single operation (e.g., single cycle). In one embodiment, a for-loop includes one or more (e.g., all) of the following parts: the initialization, the condition, and the afterthought. In one embodiment, the initialization declares (e.g., and assigns value(s) to) any variables required. The type of a variable may be the same, e.g., if you are using multiple variables in initialization part. In one embodiment, the condition checks a condition, and quits the loop if false. In one embodiment, the afterthought is performed exactly once every time the loop ends and then repeats.

The CSA dataflow operator architecture is highly amenable to deployment-specific extensions. For example, more complex mathematical dataflow operators, e.g., trigonometry functions, may be included in certain embodiments to accelerate certain mathematics-intensive HPC workloads. Similarly, a neural-network tuned extension may include dataflow operators for vectorized, low precision arithmetic.

Certain embodiments herein provide a sequencer dataflow operator architecture and sequencer microarchitecture, e.g., so the generation of the (e.g., most common) control signals for a for-loop construct may reach peak performance of one loop iteration per cycle (e.g., cycle of an accelerator including the sequencer. Certain embodiments herein may greatly improving the performance of many high performance computing (HPC) applications. Certain embodiments of a sequencer dataflow operator decouple the generation of such loop control signals from the actual dataflow tokens for the loop construct itself, e.g., so for many HPC applications, memory prefetching and/or data speculation (and the associated energy waste) may be completely eliminated. Certain embodiments of a sequencer dataflow operator may be formed by modifying an integer processing element (PE) or processing elements (PEs) and/or with (e.g., relatively minor) configuration changes and microarchitectural extensions, the instantiated sequencer PEs may still operate as (e.g., basic) integer PEs. Full binary compatibility with an (e.g., basic) integer PE may also be achieved to minimize software engineering cost. Certain embodiments herein may include a sequencer dataflow operator (e.g., circuit) that use a coarse-grained approach to manipulate data (e.g., data tokens) (e.g., in contrast to control tokens) that are 64 bits wide, 32 bits wide, etc. and aim for the highest clock frequency achievable (e.g., 1-1.5 GHz) while still using energy efficient circuit network topologies/designs.

Certain embodiments herein include a sequencer dataflow operator (e.g., circuit) that minimizes the overhead in terms of energy, area, throughput, and latency. Certain embodiments herein include a sequencer dataflow operator (e.g., circuit) that minimizes that hardware resources utilized while achieving the highest performance possible.

Below also includes a description of the architectural philosophy of embodiments of a spatial array of processing elements (e.g., a CSA) and certain features thereof. As with any revolutionary architecture, programmability may be a risk. To mitigate this issue, embodiments of the CSA architecture have been co-designed with a compilation tool chain, which is also discussed below.

Introduction

Exascale computing goals may require enormous system-level floating point performance (e.g., 1 ExaFLOPs) within an aggressive power budget (e.g., 20 MW). However, simultaneously improving the performance and energy efficiency of program execution with classical von Neumann architectures has become difficult: out-of-order scheduling, simultaneous multi-threading, complex register files, and other structures provide performance, but at high energy cost. Certain embodiments herein achieve performance and energy requirements simultaneously. Exascale computing power-performance targets may demand both high throughput and low energy consumption per operation. Certain embodiments herein provide this by providing for large numbers of low-complexity, energy-efficient processing (e.g., computational) elements which largely eliminate the control overheads of previous processor designs. Guided by this observation, certain embodiments herein include a spatial array of processing elements, for example, a configurable spatial accelerator (CSA), e.g., comprising an array of processing elements (PEs) connected by a set of lightweight, back-pressured (e.g., communication) networks. One example of a CSA tile is depicted in FIG. 1. Certain embodiments of processing (e.g., compute) elements are dataflow operators, e.g., multiple of a dataflow operator that only processes input data when both (i) the input data has arrived at the dataflow operator and (ii) there is space available for storing the output data, e.g., otherwise no processing is occurring. Certain embodiments (e.g., of an accelerator or CSA) do not utilize a triggered instruction.

Coarse grained spatial architectures, such as an embodiment of the configurable spatial accelerator (CSA) shown in FIG. 1, are the composition of lightweight processing elements (PEs) connected by an interconnect network. Programs, e.g., viewed as control dataflow graphs, may be mapped onto the architecture by configuring the PEs and the network. Generally, PEs may be configured as dataflow operators, e.g., once all input operands arrive at the PE, some operation occurs, and results are forwarded downstream (e.g., to a destination PE(s)) in a pipelined fashion. A dataflow operator (e.g., the underlying operation) may be a load or a store, e.g., as illustrated in reference to the request address file (RAF) circuit in FIG. 10 below. Dataflow operators may choose to consume incoming data on a per operator basis.

Certain embodiments herein extend the capabilities of a spatial array (e.g., CSA) to perform parallel accesses to memory, for example, via a hazard detection circuit(s), e.g., in a memory subsystem.

FIG. 1 illustrates an accelerator tile 100 embodiment of a spatial array of processing elements according to embodiments of the disclosure. Accelerator tile 100 may be a portion of a larger tile. Accelerator tile 100 executes a dataflow graph or graphs. A dataflow graph may generally refer to an explicitly parallel program description which arises in the compilation of sequential codes. Certain embodiments herein (e.g., CSAs) allow dataflow graphs to be directly configured onto the CSA array, for example, rather than being transformed into sequential instruction streams. Certain embodiments herein allow a memory accessing (e.g., types of) dataflow operations to be performed by one or more processing elements (PEs) of the spatial array.

The derivation of a dataflow graph from a sequential compilation flow allows embodiments of a CSA to support familiar programming models and to directly (e.g., without using a table of work) execute existing high performance computing (HPC) code. CSA processing elements (PEs) may be energy efficient. In FIG. 1, memory interface 102 may couple to a memory (e.g., memory 202 in FIG. 2) to allow accelerator tile 100 to access (e.g., load and/store) data to the (e.g., off die or system) memory. Depicted accelerator tile 100 is a heterogeneous array comprised of several kinds of PEs coupled together via an interconnect network 104. Accelerator tile 100 may include one or more of integer arithmetic PEs, floating point arithmetic PEs, communication circuitry (e.g., network dataflow endpoint circuits), and in-fabric storage, e.g., as part of spatial array of processing elements 101. Dataflow graphs (e.g., compiled dataflow graphs) may be overlaid on the accelerator tile 100 for execution. In one embodiment, for a particular dataflow graph, each PE handles only one or two (e.g., dataflow) operations of the graph. The array of PEs may be heterogeneous, e.g., such that no PE supports the full CSA dataflow architecture and/or one or more PEs are programmed (e.g., customized) to perform only a few, but highly efficient operations. Certain embodiments herein thus yield a processor or accelerator having an array of processing elements that is computationally dense compared to roadmap architectures and yet achieves approximately an order-of-magnitude gain in energy efficiency and performance relative to existing HPC offerings.

Certain embodiments herein provide for performance increases from parallel execution within a (e.g., dense) spatial array of processing elements (e.g., CSA) where each PE utilized may perform its operations simultaneously, e.g., if input data is available. Efficiency increases may result from the efficiency of each PE, e.g., where each PE's operation (e.g., behavior) is fixed once per configuration (e.g., mapping) step and execution occurs on local data arrival at the PE, e.g., without considering other fabric activity. In certain embodiments, a PE is (e.g., each a single) dataflow operator, for example, a dataflow operator that only operates on input data when both (i) the input data has arrived at the dataflow operator and (ii) there is space available for storing the output data, e.g., otherwise no operation is occurring.

Certain embodiments herein include a spatial array of processing elements as an energy-efficient and high-performance way of accelerating user applications. In one embodiment, a spatial array(s) is configured via a serial process in which the latency of the configuration is fully exposed via a global reset. Some of this may stem from the register-transfer level (RTL) semantics of an array (e.g., a field-programmable gate array (FPGA)). A program for executing on an array (e.g., FPGA) may assume a fundamental notion of reset in which every part of the design is expected to be operational coming out of the configuration reset. Certain embodiments herein provide a dataflow-style array in which PEs (e.g., all) conform to a flow-controller micro-protocol. This micro-protocol may create the effect of a distributed initialization. This micro-protocol can allow for a pipelined configuration and extraction mechanism, e.g., with regional (e.g., not the entire array) orchestration. Certain embodiments herein provide for hazard detection and/or error recovery (e.g., handling) in a dataflow architecture.

Certain embodiments herein provide paradigm-shifting levels of performance and tremendous improvements in energy efficiency across a broad class of existing single-stream and parallel programs, e.g., all while preserving familiar HPC programming models. Certain embodiments herein may target HPC such that floating point energy efficiency is extremely important. Certain embodiments herein not only deliver compelling improvements in performance and reductions in energy, they also deliver these gains to existing HPC programs written in mainstream HPC languages and for mainstream HPC frameworks. Certain embodiments of the architecture herein (e.g., with compilation in mind) provide several extensions in direct support of the control-dataflow internal representations generated by modern compilers. Certain embodiments herein are direct to a CSA dataflow compiler, e.g., which can accept C, C++, and Fortran programming languages, to target a CSA architecture.

Figure 2:
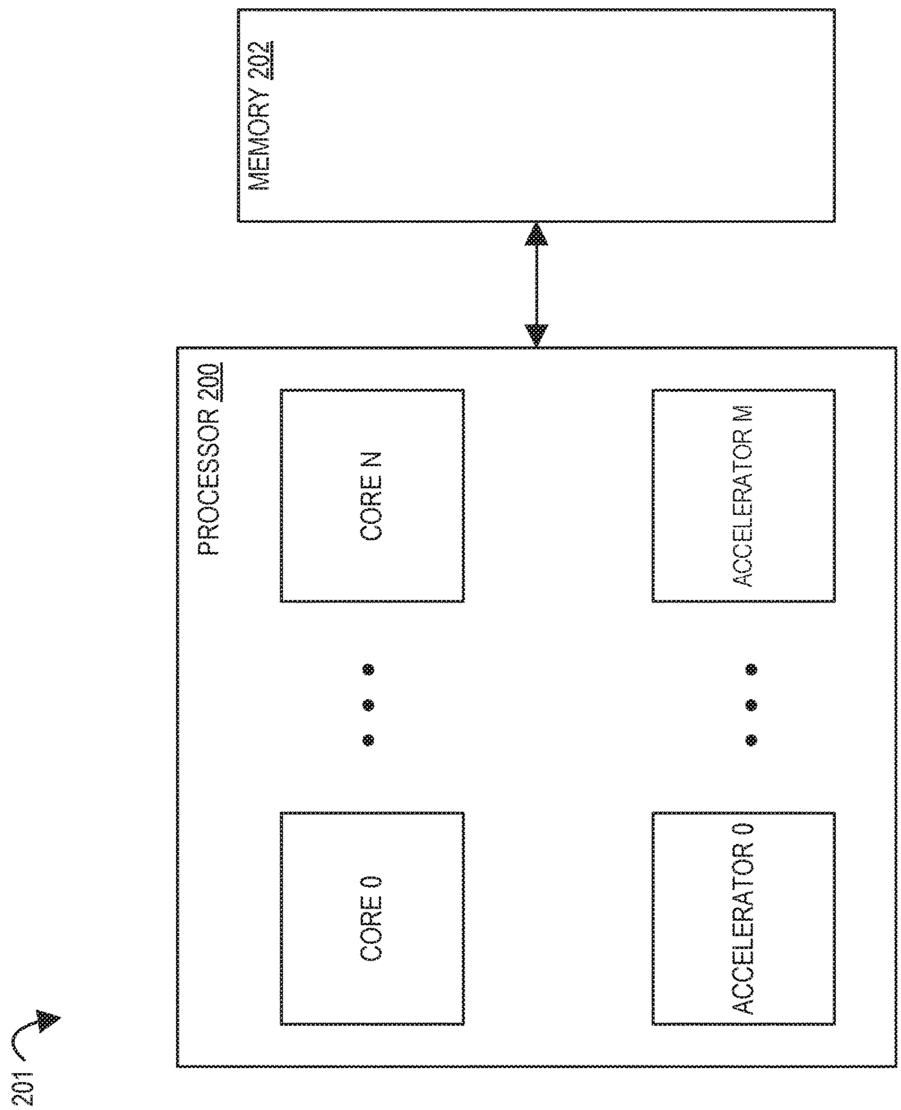
FIG. 2 illustrates a hardware processor coupled to a memory according to embodiments of the disclosure.

FIG. 2 illustrates a hardware processor 200 coupled to (e.g., connected to) a memory 202 according to embodiments of the disclosure. In one embodiment, hardware processor 200 and memory 202 are a computing system 201. In certain embodiments, one or more of accelerators is a CSA according to this disclosure. In certain embodiments, one or more of the cores in a processor are those cores disclosed herein. Hardware processor 200 (e.g., each core thereof) may include a hardware decoder (e.g., decode unit) and a hardware execution unit. Hardware processor 200 may include registers. Note that the figures herein may not depict all data communication couplings (e.g., connections). One of ordinary skill in the art will appreciate that this is to not obscure certain details in the figures. Note that a single headed arrow in the figures may not require one-way communication, for example, it may indicate two-way communication (e.g., to or from that component or device). Note that a double headed arrow in the figures may not require two-way communication, for example, it may indicate one-way communication (e.g., to or from that component or device). Any or all combinations of communications paths may be utilized in certain embodiments herein. Depicted hardware processor 200 includes a plurality of cores (0 to N, where N may be 1 or more) and hardware accelerators (0 to M, where M may be 1 or more) according to embodiments of the disclosure. Hardware processor 200 (e.g., accelerator(s) and/or core(s) thereof) may be coupled to memory 202 (e.g., data storage device), for example, via a (e.g., respective) memory interface circuit (0 to M, where M may be 1 or more). A memory interface circuit may be a request address file (RAF) circuit, e.g., as discussed below. A memory architecture herein (e.g., via a RAF) may handle memory dependencies, e.g., via dependency tokens. In certain embodiments of a memory architecture, a compiler emits memory operations which are configured on to a special memory interface circuit, e.g., a RAF. The spatial array (e.g., fabric) interface to the RAFs may be channel-based. Certain embodiments herein extend the definition of memory operations and the implementation of a RAF to support program order descriptions. Load operations may accept address streams for memory requests from the spatial array (e.g., fabric), and return data streams as requests are satisfied. Store operations may accept two streams, e.g., one for data and one for the (e.g., destination) address. In one embodiment, each of these operations corresponds to exactly one memory operation in the source program. In one embodiment, individual operation channels are strongly ordered, but no order is implied between the channels.

Hardware decoder (e.g., of core) may receive an (e.g., single) instruction (e.g., macro-instruction) and decode the instruction, e.g., into micro-instructions and/or micro-operations. Hardware execution unit (e.g., of core) may execute the decoded instruction (e.g., macro-instruction) to perform an operation or operations.

Section 2 below discloses embodiments of CSA architecture. In particular, novel embodiments of integrating memory within the dataflow execution model are disclosed. Section 3 delves into the microarchitectural details of embodiments of a CSA. In one embodiment, the main goal of a CSA is to support compiler produced programs. Section 4 below examines embodiments of a CSA compilation tool chain. The advantages of embodiments of a CSA are compared to other architectures in the execution of compiled codes in Section 5. The performance of embodiments of a CSA microarchitecture is discussed in Section 6, further CSA details are discussed in Section 7, example memory ordering in acceleration hardware (e.g., spatial array of processing elements) is discussed in Section 8, and a summary is provided in Section 9.

2. CSA Architecture

The goal of certain embodiments of a CSA is to rapidly and efficiently execute programs, e.g., programs produced by compilers. Certain embodiments of the CSA architecture provide programming abstractions that support the needs of compiler technologies and programming paradigms. Embodiments of the CSA execute dataflow graphs, e.g., a program manifestation that closely resembles the compiler's own internal representation (IR) of compiled programs. In this model, a program is represented as a dataflow graph comprised of nodes (e.g., vertices) drawn from a set of architecturally-defined dataflow operators (e.g., that encompass both computation and control operations) and edges which represent the transfer of data between dataflow operators. Execution may proceed by injecting dataflow tokens (e.g., that are or represent data values) into the dataflow graph. Tokens may flow between and be transformed at each node (e.g., vertex), for example, forming a complete computation. A sample dataflow graph and its derivation from high-level source code is shown in FIGS. 3A-3C, and FIG. 4 shows an example of the execution of a dataflow graph.

Embodiments of the CSA are configured for dataflow graph execution by providing exactly those dataflow-graph-execution supports required by compilers. In one embodiment, the CSA is an accelerator (e.g., an accelerator in FIG. 2) and it does not seek to provide some of the necessary but infrequently used mechanisms available on general purpose processing cores (e.g., a core in FIG. 2), such as system calls. Therefore, in this embodiment, the CSA can execute many codes, but not all codes. In exchange, the CSA gains significant performance and energy advantages. To enable the acceleration of code written in commonly used sequential languages, embodiments herein also introduce several novel architectural features to assist the compiler. One particular novelty is CSA's treatment of memory, a subject which has been ignored or poorly addressed previously. Embodiments of the CSA are also unique in the use of dataflow operators, e.g., as opposed to lookup tables (LUTs), as their fundamental architectural interface.

Turning back to embodiments of the CSA, dataflow operators are discussed next.

2.1 Dataflow Operators

The key architectural interface of embodiments of the accelerator (e.g., CSA) is the dataflow operator, e.g., as a direct representation of a node in a dataflow graph. From an operational perspective, dataflow operators behave in a streaming or data-driven fashion. Dataflow operators may execute as soon as their incoming operands become available. CSA dataflow execution may depend (e.g., only) on highly localized status, for example, resulting in a highly scalable architecture with a distributed, asynchronous execution model. Dataflow operators may include arithmetic dataflow operators, for example, one or more of floating point addition and multiplication, integer addition, subtraction, and multiplication, various forms of comparison, logical operators, and shift. However, embodiments of the CSA may also include a rich set of control operators which assist in the management of dataflow tokens in the program graph. Examples of these include a "pick" operator, e.g., which multiplexes two or more logical input channels into a single output channel, and a "switch" operator, e.g., which operates as a channel demultiplexor (e.g., outputting a single channel from two or more logical input channels). These operators may enable a compiler to implement control paradigms such as conditional expressions and loops. Certain embodiments of a CSA may include a limited dataflow operator set (e.g., to a relatively small number of operations) to yield dense and energy efficient PE microarchitectures. Certain embodiments may include dataflow operators for complex operations that are common in HPC code. One example of a dataflow operator is a sequencer dataflow operator, e.g., to implement the control of for-style loops (e.g., loop constructs) in an efficient manner. One embodiment of a sequencer dataflow operator to implement a loop introduces a feedback path between the condition and post-condition update portions of the loop, for example, the for-loop terms are often dependent, e.g., the exit condition term (e.g., "M<i<N" or "i<N") may often be followed by a decrement or increment term (e.g., "i++" or similar, where i is the loop counter variable). In certain embodiments, this may form a bottleneck in performance of the sequencer dataflow operator implementation which is resolved by introducing the compound sequencer operation, e.g., which is able to perform the condition and update of a for-loop pattern in a single operation (e.g., single cycle). In one embodiment, a for-loop includes one or more (e.g., all) of the following parts: the initialization, the condition, and the afterthought. In one embodiment, the initialization declares (e.g., and assigns value(s) to) any variables required. The type of a variable may be the same, e.g., if you are using multiple variables in initialization part. In one embodiment, the condition checks a condition, and quits the loop if false. In one embodiment, the afterthought is performed exactly once every time the loop ends and then repeats. The CSA dataflow operator architecture is highly amenable to deployment-specific extensions. For example, more complex mathematical dataflow operators, e.g., trigonometry functions, may be included in certain embodiments to accelerate certain mathematics-intensive HPC workloads. Similarly, a neural-network tuned extension may include dataflow operators for vectorized, low precision arithmetic.

Certain embodiments herein provide a sequencer dataflow operator architecture and sequencer microarchitecture, e.g., so the generation of the (e.g., most common) control signals for a for-loop construct may reach peak performance of one loop iteration per cycle (e.g., cycle of an accelerator including the sequencer. Certain embodiments herein may greatly improving the performance of many high performance computing (HPC) applications. Certain embodiments of a sequencer dataflow operator decouple the generation of such loop control signals from the actual dataflow tokens for the loop construct itself, e.g., so for many HPC applications, memory prefetching and/or data speculation (and the associated energy waste) may be completely eliminated. Certain embodiments of a sequencer dataflow operator may be formed by modifying an integer processing element (PE) or processing elements (PEs) and/or with (e.g., relatively minor) configuration changes and microarchitectural extensions, the instantiated sequencer PEs may still operate as (e.g., basic) integer PEs. Full binary compatibility with an (e.g., basic) integer PE may also be achieved to minimize software engineering cost. Certain embodiments herein may include a sequencer dataflow operator (e.g., circuit) that use a coarse-grained approach to manipulate data (e.g., data tokens) (e.g., in contrast to control tokens) that are 64 bits wide, 32 bits wide, etc. and aim for the highest clock frequency achievable (e.g., 1-1.5 GHz) while still using energy efficient circuit network topologies/designs.

Certain embodiments herein include a sequencer dataflow operator (e.g., circuit) that minimizes the overhead in terms of energy, area, throughput, and latency. Certain embodiments herein include a sequencer dataflow operator (e.g., circuit) that minimizes that hardware resources utilized while achieving the highest performance possible.

Certain embodiments of a sequencer dataflow operator are capable of generating loop control signals at the peak performance of one loop iteration per cycle (e.g., provided there is no output dataflow token backpressure), e.g., up to 2 times (2×) to 3 times (3×) faster and/or at least 50% smaller than without using a sequencer dataflow operator. Certain embodiments of a sequencer dataflow operator are significantly more energy, e.g., because communication between two adjacent PEs will be short and use dedicated wiring between them (e.g., not using interconnect network or its channels). Certain embodiments herein are directed to a sequencer dataflow operator (e.g., circuit) that takes as input a starting value, ending value, and stride (e.g., base, bound, and stride, respectively), and provides output(s). In one embodiment, a sequencer dataflow operator outputs a (e.g., one-bit) control signal (e.g., control token), for example, outputs a first indicator value (e.g., a logical one) for every time it sends an output (e.g., having a value different that the indicator value) and a second indicator value (e.g., logical) zero when it is finished with the operation (e.g., for-loop). In one embodiment, a compare dataflow operator (e.g., less than, greater than, less than or equal, or greater than or equal) (e.g., a compare dataflow operator of a sequencer) is to indicate when the operation (e.g., for-loop) is to stop (e.g., based on the stride). In one embodiment (e.g., as in FIG. 22), sequencer dataflow operator is formed from two processing elements, e.g., one processing element to perform the stride (e.g., add) operation and another processing element to perform the compare operation, e.g., such that two PEs are merged (e.g., along with additional circuitry and/or control signals) to form a sequencer dataflow operator.

Figure 7A:
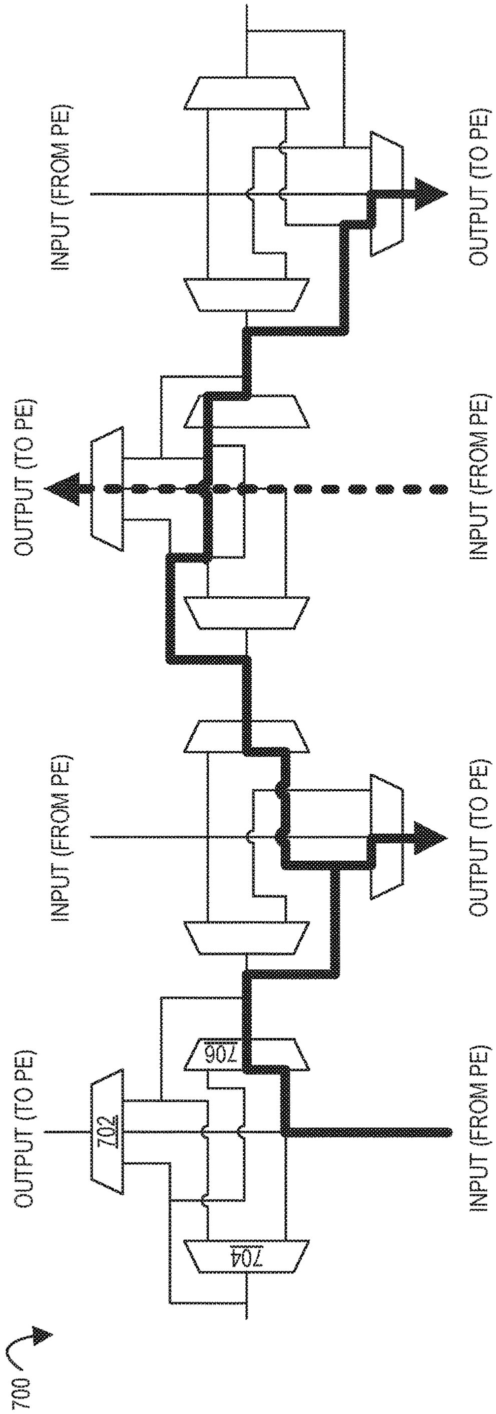
FIG. 7A illustrates a configurable data path network according to embodiments of the disclosure.
Figure 7B:
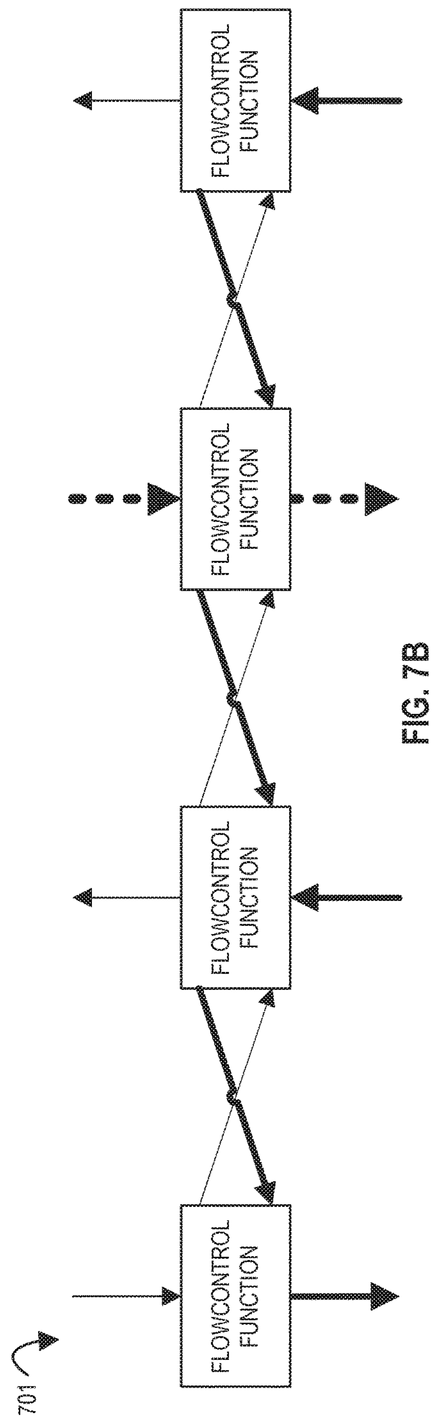
FIG. 7B illustrates a configurable flow control path network according to embodiments of the disclosure.

FIG. 3A illustrates a program source according to embodiments of the disclosure. Program source code includes a multiplication function (powY, e.g., where Y is the power to which a value is raised). FIG. 3B illustrates a dataflow graph 300 for the program source of FIG. 3A according to embodiments of the disclosure. Dataflow graph 300 includes a pick node 304, switch node 306, multiplication node 308, and sequencer node 310. Although sequencer node 310 is shown as a single sequencer providing control signals (e.g., control tokens) to multiple nodes (e.g., pick node 304 and switch node 306), a plurality of sequencer nodes may be utilized (e.g., one sequencer node for each node that is being sent control signal(s)). Input "A of sequencer node 310 may be the number of iterations "n" or a value (e.g., bit pattern) that causes sequencer node 310 to perform the number of iterations "n". A buffer may optionally be included along one or more of the communication paths. Depicted dataflow graph 300 may perform an operation of selecting input X with pick node 304, multiplying X by Y (e.g., multiplication node 308) "n" number of times, accumulating each iteration, and then outputting the result from the left output of the switch node 306. Sequencer node may provide the control signals to cause these operations (e.g., the pick and switch operations) to occur. FIG. 3C illustrates an accelerator (e.g., CSA) with a plurality of processing elements 301 configured to execute the dataflow graph of FIG. 3B according to embodiments of the disclosure. More particularly, the dataflow graph 300 is overlaid into the array of processing elements 301 (e.g., and the (e.g., interconnect) network(s) therebetween), for example, such that each node of the dataflow graph 300 is represented as a dataflow operator in the array of processing elements 301. For example, certain dataflow operations may be achieved with a processing element and/or certain dataflow operations may be achieved with a communications network. In one embodiment, each coupling (e.g., channel) (for example, for control data (e.g., a control token) and/or (e.g., separately) for input/output (e.g., payload) data (e.g., dataflow token)) includes two paths, e.g., as illustrated in FIGS. 7A-7B. Coupling may be as discussed below in reference to FIG. 9. The forward path may carry data (e.g., control data or input/output data) from a producer to a consumer. Multiplexors may be configured to steer data and valid bits from the producer to the consumer, e.g., as in FIG. 7A. In the case of multicast, the data will be steered to multiple consumer endpoints. The second portion of this embodiment of a network is the flow control or backpressure path, which flows in reverse of the forward data path, e.g., as in FIG. 7B, and is to stall the forward flow of data on the flow control or backpressure path until that data is to be used or there is room to store that data. In one embodiment, a signal includes one or more of a control signal (e.g., control token) from sequencer dataflow operator and/or input/output data signal (e.g., dataflow token) from other dataflow operators (e.g., pick operator and switch operator). For example, each of the lines in FIG. 3C may allow forward flow of data (e.g., control signals from sequencer operator 310A (also referred to as a "sequencer dataflow operator") or input/output data signals to and/or from other operators) when the flow control or backpressure path (which flows in reverse of the forward data path, e.g., as in FIG. 7B) ceases stalling the forward flow of data, e.g., when that forward data is to be used or there is room to store that data. Thus, in some embodiments, each communication path may be stalled by a backpressure signal.

In one embodiment, one or more of the processing elements in the array of processing elements 301 is to access memory through memory interface 302. In one embodiment, pick node 304 of dataflow graph 300 thus corresponds (e.g., is represented by) to pick operator 304A, switch node 306 of dataflow graph 300 thus corresponds (e.g., is represented by) to switch operator 306A, multiplier node 308 of dataflow graph 300 thus corresponds (e.g., is represented by) to multiplier operator 308A, and sequencer node 310 of dataflow graph 300 thus corresponds (e.g., is represented by) to sequencer operator 310A (e.g., sequencer dataflow operator). Another processing element and/or a flow control path network may provide the control signals (e.g., control tokens) to the pick operator 304A and switch operator 306A to perform the operation in FIG. 3A. In the depicted embodiment, sequencer operator 310A provide the control signals (e.g., control tokens) to the pick operator 304A and switch operator 306A to perform the operation in FIG. 3A. For example, if Y=2, then the variable X will be raised to the power of two for "n" number of times, e.g., if X=1 this will provide the powers-of-two. In the depicted embodiment, a path is configured (e.g., provided) from the right output of switch operator 306A to the right input of pick operator 304A, e.g., to iteratively receive the output from the multiplier operator 308A.

In one embodiment, array of processing elements 301 (e.g., sequencer operator 310A) is configured to execute the dataflow graph 300 of FIG. 3B before execution begins. In one embodiment, compiler performs the conversion from FIG. 3A-3B. In one embodiment, the input of the dataflow graph nodes into the array of processing elements logically embeds the dataflow graph into the array of processing elements, e.g., as discussed further below, such that the input/output paths are configured to produce the desired result.

2.2 Latency Insensitive Channels

Communications arcs are the second major component of the dataflow graph. Certain embodiments of a CSA describes these arcs as latency insensitive channels, for example, in-order, back-pressured (e.g., not producing or sending output until there is a place to store the output), point-to-point communications channels. As with dataflow operators, latency insensitive channels are fundamentally asynchronous, giving the freedom to compose many types of networks to implement the channels of a particular graph. Latency insensitive channels may have arbitrarily long latencies and still faithfully implement the CSA architecture. However, in certain embodiments there is strong incentive in terms of performance and energy to make latencies as small as possible. Section 3.2 herein discloses a network microarchitecture in which dataflow graph channels are implemented in a pipelined fashion with no more than one cycle of latency. Embodiments of latency-insensitive channels provide a critical abstraction layer which may be leveraged with the CSA architecture to provide a number of runtime services to the applications programmer. For example, a CSA may leverage latency-insensitive channels in the implementation of the CSA configuration (the loading of a program onto the CSA array).

Figure 4:
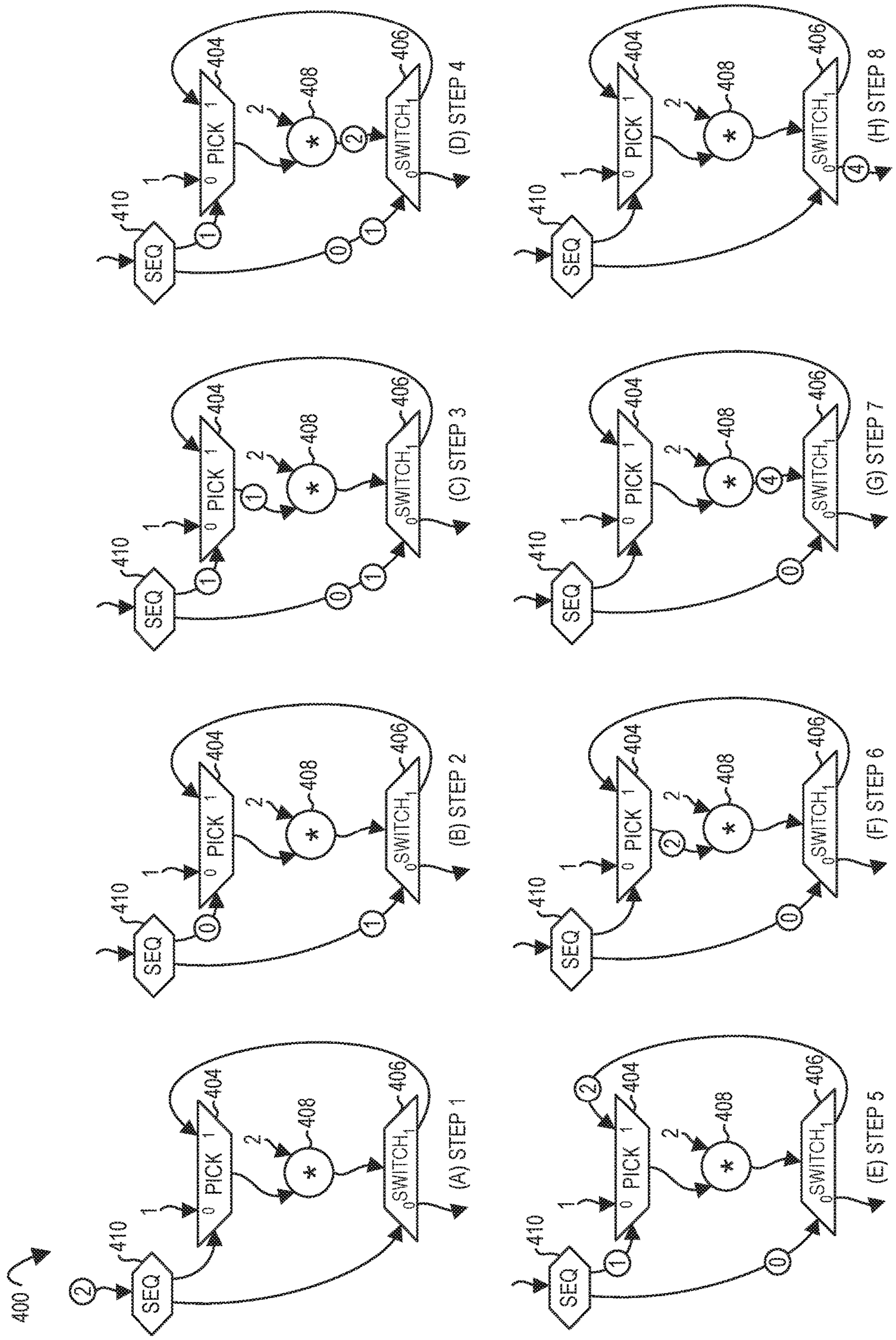
FIG. 4 illustrates an example execution of a dataflow graph according to embodiments of the disclosure.

FIG. 4 illustrates an example execution of a dataflow graph 400 according to embodiments of the disclosure. Dataflow graph 400 may be overlaid into a plurality of processing elements (e.g., and an interconnect network) such that each node (e.g., switch node, pick node, multiplier node, etc.) is represented as a dataflow operator. At step 1, input values (e.g., 1 for X in FIGS. 3B-3C and 2 for Y in FIGS. 3B-3C) may be loaded in dataflow graph 400 to perform a 1*2 multiplication operation "n" numbers of time (e.g., as controlled by the sequencer node 410). One or more of the data input values may be static (e.g., constant) in the operation (e.g., 1 for X and 2 for Y in reference to FIGS. 3B-3C) or updated during the operation. At step 1, sequencer node 410 is loaded with a 2, e.g., which may indicate two iterations (e.g., n=2 for FIG. 3A) of the multiplication are to be performed. Sequencer node 410 may provide the (e.g., preloaded) control signals that corresponding to causing the circuitry (for example, pick operator for pick node 404 and switch operator for switch node 406) to perform the multiplication, e.g., with multiplier operator for multiplication node 408 outputting its resultant on receipt of the inputs. At step 2, sequencer node 410 outputs a zero to control input (e.g., mux control signal) of pick node 404 (e.g., to source a one from port "0" to its output) and outputs a zero to control input (e.g., mux control signal) of switch node 406 (e.g., to provide its input out of port "0" to a destination (e.g., a downstream processing element). At step 3, the data value of 1 is output from pick node 404 (e.g., and consumes its control signal "0" at the pick node 404) to multiplier node 408 to be multiplied with the data value of 2 at step 4. At step 4, the output of multiplier node 408 arrives at switch node 406, e.g., which causes switch node 406 to consume a control signal "1" to output the value of 2 from port "1" of switch node 406 at step 5. At step 5, the output of multiplier node 408 arrives back at pick node 404 (e.g., because 2 iterations (n=2) are to be performed here), e.g., which causes pick node 404 to consume a control signal "1" to output the value of 2 from port "1" of pick node 404 at step 6. At step 6, the data value of 2 is output from pick node 404 (e.g., and consumes its control signal "1" at the pick node 404) to multiplier node 408 to be multiplied with the data value of 2 at step 7. At step 7, the output of multiplier node 408 arrives at switch node 406, e.g., which causes switch node 406 to consume a control signal "0" to output the value of 4 from port "0" of switch node 406 at step 8. At step 8, the output of multiplier node 408 arrives at switch node 406 (e.g., because 2 iterations (n=2) are to be performed here, n is now zero, so the operation is done), e.g., which causes switch node 406 to consume a control signal "0" to output the value of 4 from port "0" of switch node 406. The operation is then complete. A CSA may thus be programmed accordingly such that a corresponding dataflow operator for each node performs the operations in FIG. 4. Although execution is serialized in this example, in principle all dataflow operations may execute in parallel. Steps are used in FIG. 4 to differentiate dataflow execution from any physical microarchitectural manifestation. In certain embodiments, a downstream processing element is to send a signal (or not send a ready signal) (for example, on a flow control path network) to the switch operator for switch node 406 to stall the output (e.g., of the value of 4) from the switch node 406, e.g., until the downstream processing element is ready (e.g., has storage room) for the output. In certain embodiments, pick operator for pick node 404 is to send a signal (or not send a ready signal) (for example, on a flow control path network) to an upstream downstream processing element to stall the input (e.g., of the value of 1) into the pick node 404, e.g., until the processing element is ready (e.g., has storage room) for the input. In certain embodiments, sequencer operator for sequencer node 410 is to send a signal (or not send a ready signal) (for example, on a flow control path network) to an upstream downstream processing element to stall the input (e.g., of the value of 2) into the sequencer node 410, e.g., until the processing element is ready (e.g., has storage room) for the input. A spatial array (e.g., CSA) (e.g., a PE of a spatial array), processor, or system may include any of the disclosure herein, for example, one or more PEs of a spatial array according to any of the architecture disclosed herein.

2.3 Memory

Dataflow architectures generally focus on communication and data manipulation with less attention paid to state. However, enabling real software, especially programs written in legacy sequential languages, requires significant attention to interfacing with memory. Certain embodiments of a CSA use architectural memory operations as their primary interface to (e.g., large) stateful storage. From the perspective of the dataflow graph, memory operations are similar to other dataflow operations, except that they have the side effect of updating a shared store. In particular, memory operations of certain embodiments herein have the same semantics as every other dataflow operator, for example, they "execute" when their operands, e.g., an address, are available and, after some latency, a response is produced. Certain embodiments herein explicitly decouple the operand input and result output such that memory operators are naturally pipelined and have the potential to produce many simultaneous outstanding requests, e.g., making them exceptionally well suited to the latency and bandwidth characteristics of a memory subsystem. Embodiments of a CSA provide basic memory operations such as load, which takes an address channel and populates a response channel with the values corresponding to the addresses, and a store. Embodiments of a CSA may also provide more advanced operations such as in-memory atomics and consistency operators. These operations may have similar semantics to their von Neumann counterparts. Embodiments of a CSA may accelerate existing programs described using sequential languages such as C and Fortran. A consequence of supporting these language models is addressing program memory order, e.g., the serial ordering of memory operations typically prescribed by these languages.

FIG. 5A illustrates a program source (e.g., C code) 500 according to embodiments of the disclosure. According to the memory semantics of the C programming language, memory copy (memcpy) should be serialized. However, memcpy may be parallelized with an embodiment of the CSA if arrays A and B are known to be disjoint. FIG. 5A further illustrates the problem of program order. In general, compilers cannot prove that array A is different from array B, e.g., either for the same value of index or different values of index across loop bodies. This is known as pointer or memory aliasing. Since compilers are to generate statically correct code, they are usually forced to serialize memory accesses. Typically, compilers targeting sequential von Neumann architectures use instruction ordering as a natural means of enforcing program order. However, embodiments of the CSA have no notion of instruction or instruction-based program ordering as defined by a program counter. In certain embodiments, incoming dependency tokens, e.g., which contain no architecturally visible information, are like all other dataflow tokens and memory operations may not execute until they have received a dependency token. In certain embodiments, memory operations produce an outgoing dependency token once their operation is visible to all logically subsequent, dependent memory operations. In certain embodiments, dependency tokens are similar to other dataflow tokens in a dataflow graph. For example, since memory operations occur in conditional contexts, dependency tokens may also be manipulated using control operators described in Section 2.1, e.g., like any other tokens. Dependency tokens may have the effect of serializing memory accesses, e.g., providing the compiler a means of architecturally defining the order of memory accesses. FIG. 5B illustrates a program source (e.g., C code) 501 according to embodiments of the disclosure. Program source 501 may be a for-loop construct of a memory copy operation to copy the data from vector "a" of "N" number of elements to vector "b" of "N" number of elements.

2.4 Runtime Services

A primary architectural considerations of embodiments of the CSA involve the actual execution of user-level programs, but it may also be desirable to provide several support mechanisms which underpin this execution. Chief among these are configuration (in which a dataflow graph is loaded into the CSA), extraction (in which the state of an executing graph is moved to memory), and exceptions (in which mathematical, soft, and other types of errors in the fabric are detected and handled, possibly by an external entity). Section 3.6 below discusses the properties of a latency-insensitive dataflow architecture of an embodiment of a CSA to yield efficient, largely pipelined implementations of these functions. Conceptually, configuration may load the state of a dataflow graph into the interconnect (and/or communications network) and processing elements (e.g., fabric), e.g., generally from memory. During this step, all structures in the CSA may be loaded with a new dataflow graph and any dataflow tokens live in that graph, for example, as a consequence of a context switch. The latency-insensitive semantics of a CSA may permit a distributed, asynchronous initialization of the fabric, e.g., as soon as PEs are configured, they may begin execution immediately. Unconfigured PEs may backpressure their channels until they are configured, e.g., preventing communications between configured and unconfigured elements. The CSA configuration may be partitioned into privileged and user-level state. Such a two-level partitioning may enable primary configuration of the fabric to occur without invoking the operating system. During one embodiment of extraction, a logical view of the dataflow graph is captured and committed into memory, e.g., including all live control and dataflow tokens and state in the graph.

Extraction may also play a role in providing reliability guarantees through the creation of fabric checkpoints. Exceptions in a CSA may generally be caused by the same events that cause exceptions in processors, such as illegal operator arguments or reliability, availability, and serviceability (RAS) events. In certain embodiments, exceptions are detected at the level of dataflow operators, for example, checking argument values or through modular arithmetic schemes. Upon detecting an exception, a dataflow operator (e.g., circuit) may halt and emit an exception message, e.g., which contains both an operation identifier and some details of the nature of the problem that has occurred. In one embodiment, the dataflow operator will remain halted until it has been reconfigured. The exception message may then be communicated to an associated processor (e.g., core) for service, e.g., which may include extracting the graph for software analysis.

2.5 Tile-Level Architecture

Figure 6:
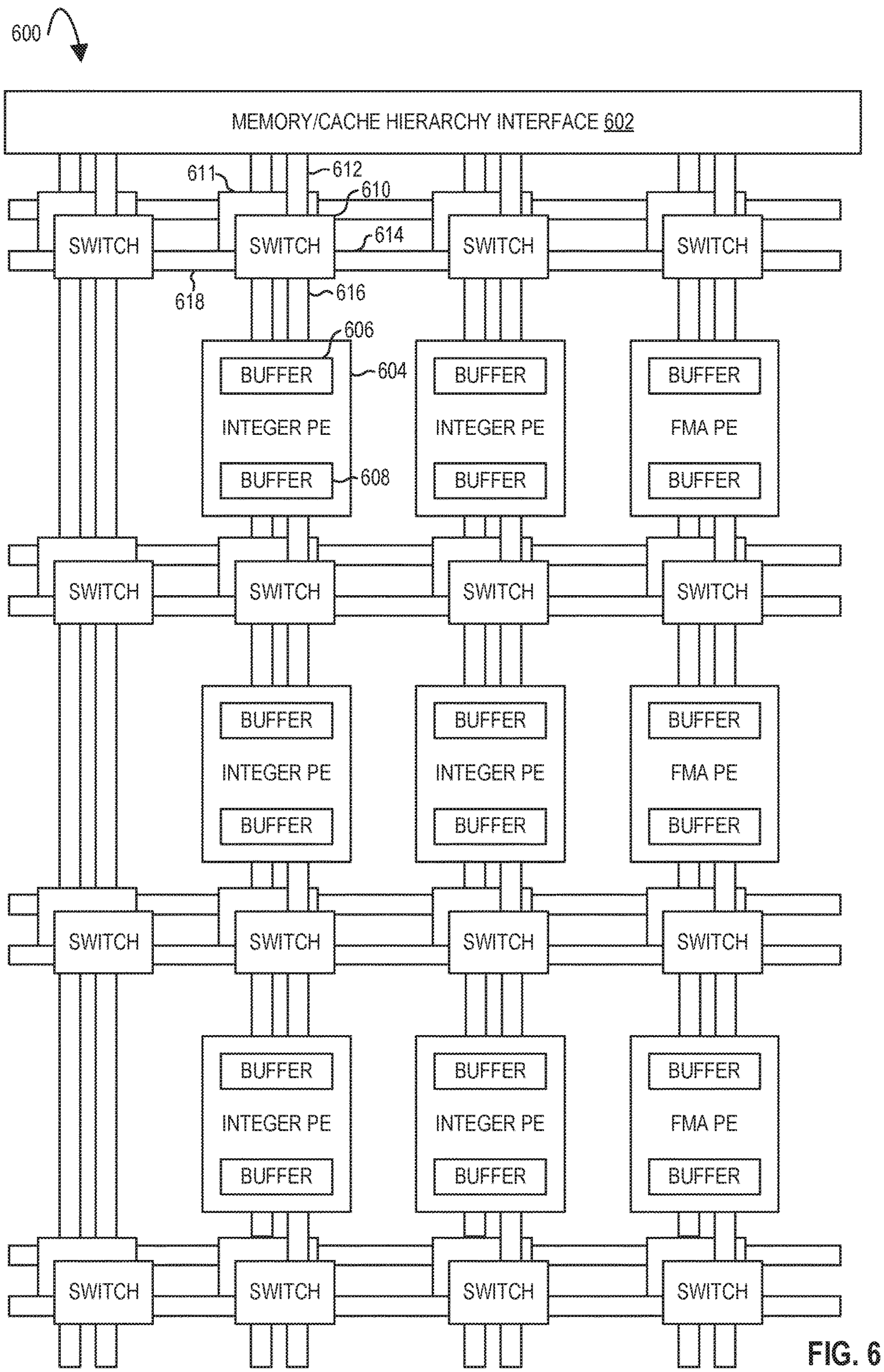
FIG. 6 illustrates an accelerator tile comprising an array of processing elements according to embodiments of the disclosure.
Figure 8:
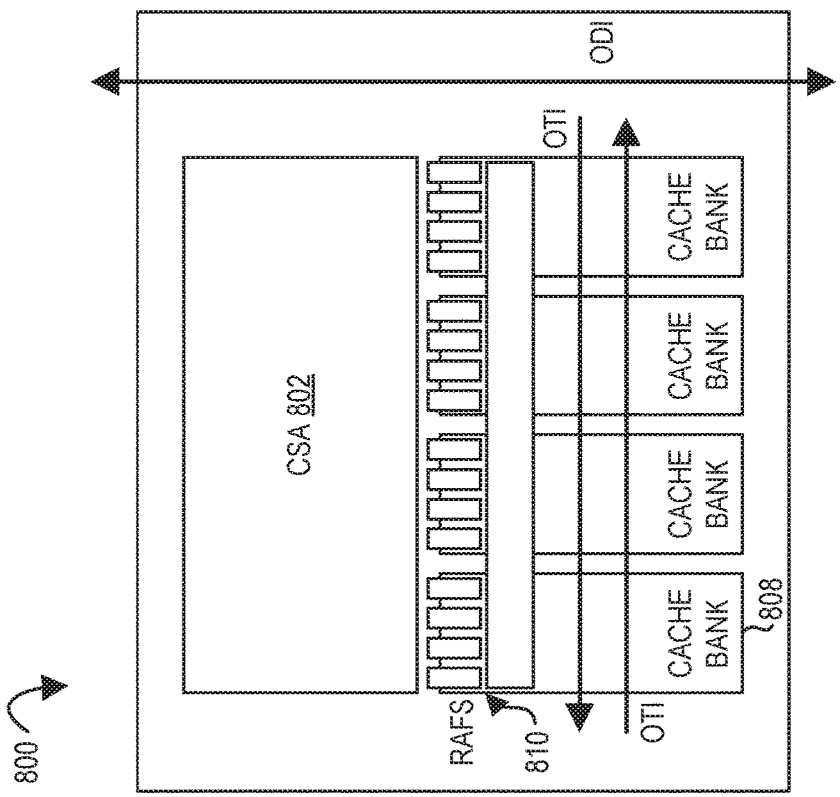
FIG. 8 illustrates a hardware processor tile comprising an accelerator according to embodiments of the disclosure.

Embodiments of the CSA computer architectures (e.g., targeting HPC and datacenter uses) are tiled. FIGS. 6 and 8 show tile-level deployments of a CSA. FIG. 8 shows a full-tile implementation of a CSA, e.g., which may be an accelerator of a processor with a core. A main advantage of this architecture is may be reduced design risk, e.g., such that the CSA and core are completely decoupled in manufacturing. In addition to allowing better component reuse, this may allow the design of components like the CSA Cache to consider only the CSA, e.g., rather than needing to incorporate the stricter latency requirements of the core. Finally, separate tiles may allow for the integration of CSA with small or large cores. One embodiment of the CSA captures most vector-parallel workloads such that most vector-style workloads run directly on the CSA, but in certain embodiments vector-style instructions in the core may be included, e.g., to support legacy binaries.

3. Microarchitecture

In one embodiment, the goal of the CSA microarchitecture is to provide a high quality implementation of each dataflow operator specified by the CSA architecture. Embodiments of the CSA microarchitecture provide that each processing element (and/or communications network) of the microarchitecture corresponds to approximately one node (e.g., entity) in the architectural dataflow graph. In one embodiment, a node in the dataflow graph is distributed in multiple network dataflow endpoint circuits. In certain embodiments, this results in microarchitectural elements that are not only compact, resulting in a dense computation array, but also energy efficient, for example, where processing elements (PEs) are both simple and largely unmultiplexed, e.g., executing a single dataflow operator for a configuration (e.g., programming) of the CSA. To further reduce energy and implementation area, a CSA may include a configurable, heterogeneous fabric style in which each PE thereof implements only a subset of dataflow operators (e.g., with a separate subset of dataflow operators implemented with network dataflow endpoint circuit(s)). Peripheral and support subsystems, such as the CSA cache, may be provisioned to support the distributed parallelism incumbent in the main CSA processing fabric itself. Implementation of CSA microarchitectures may utilize dataflow and latency-insensitive communications abstractions present in the architecture. In certain embodiments, there is (e.g., substantially) a one-to-one correspondence between nodes in the compiler generated graph and the dataflow operators (e.g., dataflow operator compute elements) in a CSA.

Below is a discussion of an example CSA, followed by a more detailed discussion of the microarchitecture. Certain embodiments herein provide a CSA that allows for easy compilation, e.g., in contrast to an existing FPGA compilers that handle a small subset of a programming language (e.g., C or C++) and require many hours to compile even small programs.

Certain embodiments of a CSA architecture admits of heterogeneous coarse-grained operations, like double precision floating point. Programs may be expressed in fewer coarse grained operations, e.g., such that the disclosed compiler runs faster than traditional spatial compilers. Certain embodiments include a fabric with new processing elements to support sequential concepts like program ordered memory accesses. Certain embodiments implement hardware to support coarse-grained dataflow-style communication channels. This communication model is abstract, and very close to the control-dataflow representation used by the compiler. Certain embodiments herein include a network implementation that supports single-cycle latency communications, e.g., utilizing (e.g., small) PEs which support single control-dataflow operations. In certain embodiments, not only does this improve energy efficiency and performance, it simplifies compilation because the compiler makes a one-to-one mapping between high-level dataflow constructs and the fabric. Certain embodiments herein thus simplify the task of compiling existing (e.g., C, C++, or Fortran) programs to a CSA (e.g., fabric).

Energy efficiency may be a first order concern in modern computer systems. Certain embodiments herein provide a new schema of energy-efficient spatial architectures. In certain embodiments, these architectures form a fabric with a unique composition of a heterogeneous mix of small, energy-efficient, dataflow oriented processing elements (PEs) (and/or a packet switched communications network) with a lightweight circuit switched communications network (e.g., interconnect), e.g., with hardened support for flow control. Due to the energy advantages of each, the combination of these components may form a spatial accelerator (e.g., as part of a computer) suitable for executing compiler-generated parallel programs in an extremely energy efficient manner. Since this fabric is heterogeneous, certain embodiments may be customized for different application domains by introducing new domain-specific PEs. For example, a fabric for high-performance computing might include some customization for double-precision, fused multiply-add, while a fabric targeting deep neural networks might include low-precision floating point operations.

An embodiment of a spatial architecture schema, e.g., as exemplified in FIG. 6, is the composition of light-weight processing elements (PE) connected by an inter-PE network. Generally, PEs may comprise dataflow operators, e.g., where once (e.g., all) input operands arrive at the dataflow operator, some operation (e.g., micro-instruction or set of micro-instructions) is executed, and the results are forwarded to downstream operators. Control, scheduling, and data storage may therefore be distributed amongst the PEs, e.g., removing the overhead of the centralized structures that dominate classical processors.

Programs may be converted to dataflow graphs that are mapped onto the architecture by configuring PEs and the network to express the control-dataflow graph of the program. Communication channels may be flow-controlled and fully back-pressured, e.g., such that PEs will stall if either source communication channels (e.g., a source or sources) have no data or destination communication channels (e.g., a destination or destinations) are full. In one embodiment, at runtime, data flow through the PEs and channels that have been configured to implement the operation (e.g., an accelerated algorithm). For example, data may be streamed in from memory, through the fabric, and then back out to memory.

Embodiments of such an architecture may achieve remarkable performance efficiency relative to traditional multicore processors: compute (e.g., in the form of PEs) may be simpler, more energy efficient, and more plentiful than in larger cores, and communications may be direct and mostly short-haul, e.g., as opposed to occurring over a wide, full-chip network as in typical multicore processors. Moreover, because embodiments of the architecture are extremely parallel, a number of powerful circuit and device level optimizations are possible without seriously impacting throughput, e.g., low leakage devices and low operating voltage. These lower-level optimizations may enable even greater performance advantages relative to traditional cores. The combination of efficiency at the architectural, circuit, and device levels yields of these embodiments are compelling. Embodiments of this architecture may enable larger active areas as transistor density continues to increase.

Embodiments herein offer a unique combination of dataflow support and circuit switching to enable the fabric to be smaller, more energy-efficient, and provide higher aggregate performance as compared to previous architectures. FPGAs are generally tuned towards fine-grained bit manipulation, whereas embodiments herein are tuned toward the double-precision floating point operations found in HPC applications. Certain embodiments herein may include a FPGA in addition to a CSA according to this disclosure.

Certain embodiments herein combine a light-weight network with energy efficient dataflow processing elements (and/or communications network) to form a high-throughput, low-latency, energy-efficient HPC fabric. This low-latency network may enable the building of processing elements (and/or communications network) with fewer functionalities, for example, only one or two instructions and perhaps one architecturally visible register, since it is efficient to gang multiple PEs together to form a complete program.

Relative to a processor core, CSA embodiments herein may provide for more computational density and energy efficiency. For example, when PEs are very small (e.g., compared to a core), the CSA may perform many more operations and have much more computational parallelism than a core, e.g., perhaps as many as 16 times the number of FMAs as a vector processing unit (VPU). To utilize all of these computational elements, the energy per operation is very low in certain embodiments.

The energy advantages our embodiments of this dataflow architecture are many. Parallelism is explicit in dataflow graphs and embodiments of the CSA architecture spend no or minimal energy to extract it, e.g., unlike out-of-order processors which must re-discover parallelism each time an instruction is executed. Since each PE is responsible for a single operation in one embodiment, the register files and ports counts may be small, e.g., often only one, and therefore use less energy than their counterparts in core. Certain CSAs include many PEs, each of which holds live program values, giving the aggregate effect of a huge register file in a traditional architecture, which dramatically reduces memory accesses. In embodiments where the memory is multi-ported and distributed, a CSA may sustain many more outstanding memory requests and utilize more bandwidth than a core. These advantages may combine to yield an energy level per watt that is only a small percentage over the cost of the bare arithmetic circuitry. For example, in the case of an integer multiply, a CSA may consume no more than 25% more energy than the underlying multiplication circuit. Relative to one embodiment of a core, an integer operation in that CSA fabric consumes less than 1/30th of the energy per integer operation.

From a programming perspective, the application-specific malleability of embodiments of the CSA architecture yields significant advantages over a vector processing unit (VPU). In traditional, inflexible architectures, the number of functional units, like floating divide or the various transcendental mathematical functions, must be chosen at design time based on some expected use case. In embodiments of the CSA architecture, such functions may be configured (e.g., by a user and not a manufacturer) into the fabric based on the requirement of each application. Application throughput may thereby be further increased. Simultaneously, the compute density of embodiments of the CSA improves by avoiding hardening such functions, and instead provision more instances of primitive functions like floating multiplication. These advantages may be significant in HPC workloads, some of which spend 75% of floating execution time in transcendental functions.

Certain embodiments of the CSA represents a significant advance as a dataflow-oriented spatial architectures, e.g., the PEs of this disclosure may be smaller, but also more energy-efficient. These improvements may directly result from the combination of dataflow-oriented PEs with a lightweight, circuit switched interconnect, for example, which has single-cycle latency, e.g., in contrast to a packet switched network (e.g., with, at a minimum, a 300% higher latency). Certain embodiments of PEs support 32-bit or 64-bit operation. Certain embodiments herein permit the introduction of new application-specific PEs, for example, for machine learning or security, and not merely a homogeneous combination. Certain embodiments herein combine lightweight dataflow-oriented processing elements with a lightweight, low-latency network to form an energy efficient computational fabric.

In order for certain spatial architectures to be successful, programmers are to configure them with relatively little effort, e.g., while obtaining significant power and performance superiority over sequential cores. Certain embodiments herein provide for a CSA (e.g., spatial fabric) that is easily programmed (e.g., by a compiler), power efficient, and highly parallel. Certain embodiments herein provide for a (e.g., interconnect) network that achieves these three goals. From a programmability perspective, certain embodiments of the network provide flow controlled channels, e.g., which correspond to the control-dataflow graph (CDFG) model of execution used in compilers. Certain network embodiments utilize dedicated, circuit switched links, such that program performance is easier to reason about, both by a human and a compiler, because performance is predictable. Certain network embodiments offer both high bandwidth and low latency. Certain network embodiments (e.g., static, circuit switching) provides a latency of 0 to 1 cycle (e.g., depending on the transmission distance.) Certain network embodiments provide for a high bandwidth by laying out several networks in parallel, e.g., and in low-level metals. Certain network embodiments communicate in low-level metals and over short distances, and thus are very power efficient.

Certain embodiments of networks include architectural support for flow control. For example, in spatial accelerators composed of small processing elements (PEs), communications latency and bandwidth may be critical to overall program performance. Certain embodiments herein provide for a light-weight, circuit switched network which facilitates communication between PEs in spatial processing arrays, such as the spatial array shown in FIG. 6, and the micro-architectural control features necessary to support this network. Certain embodiments of a network enable the construction of point-to-point, flow controlled communications channels which support the communications of the dataflow oriented processing elements (PEs). In addition to point-to-point communications, certain networks herein also support multicast communications. Communications channels may be formed by statically configuring the network to from virtual circuits between PEs. Circuit switching techniques herein may decrease communications latency and commensurately minimize network buffering, e.g., resulting in both high performance and high energy efficiency. In certain embodiments of a network, inter-PE latency may be as low as a zero cycles, meaning that the downstream PE may operate on data in the cycle after it is produced. To obtain even higher bandwidth, and to admit more programs, multiple networks may be laid out in parallel, e.g., as shown in FIG. 6.

Spatial architectures, such as the one shown in FIG. 6, may be the composition of lightweight processing elements connected by an inter-PE network (and/or communications network). Programs, viewed as dataflow graphs, may be mapped onto the architecture by configuring PEs and the network. Generally, PEs may be configured as dataflow operators, and once (e.g., all) input operands arrive at the PE, some operation may then occur, and the result are forwarded to the desired downstream PEs. PEs may communicate over dedicated virtual circuits which are formed by statically configuring a circuit switched communications network. These virtual circuits may be flow controlled and fully back-pressured, e.g., such that PEs will stall if either the source has no data or the destination is full. At runtime, data may flow through the PEs implementing the mapped algorithm. For example, data may be streamed in from memory, through the fabric, and then back out to memory. Embodiments of this architecture may achieve remarkable performance efficiency relative to traditional multicore processors: for example, where compute, in the form of PEs, is simpler and more numerous than larger cores and communication are direct, e.g., as opposed to an extension of the memory system.

FIG. 6 illustrates an accelerator tile 600 comprising an array of processing elements (PEs) according to embodiments of the disclosure. The interconnect network is depicted as circuit switched, statically configured communications channels. For example, a set of channels coupled together by a switch (e.g., switch 610 in a first network and switch 611 in a second network). The first network and second network may be separate or coupled together. For example, switch 610 may couple one or more of the four data paths (612, 614, 616, 618) together, e.g., as configured to perform an operation according to a dataflow graph. In one embodiment, the number of data paths is any plurality. Processing element (e.g., processing element 604) may be as disclosed herein, for example, as in FIG. 9. Accelerator tile 600 includes a memory/cache hierarchy interface 602, e.g., to interface the accelerator tile 600 with a memory and/or cache. A data path (e.g., 618) may extend to another tile or terminate, e.g., at the edge of a tile. A processing element may include an input buffer (e.g., buffer 606) and an output buffer (e.g., buffer 608).

Figure 9:
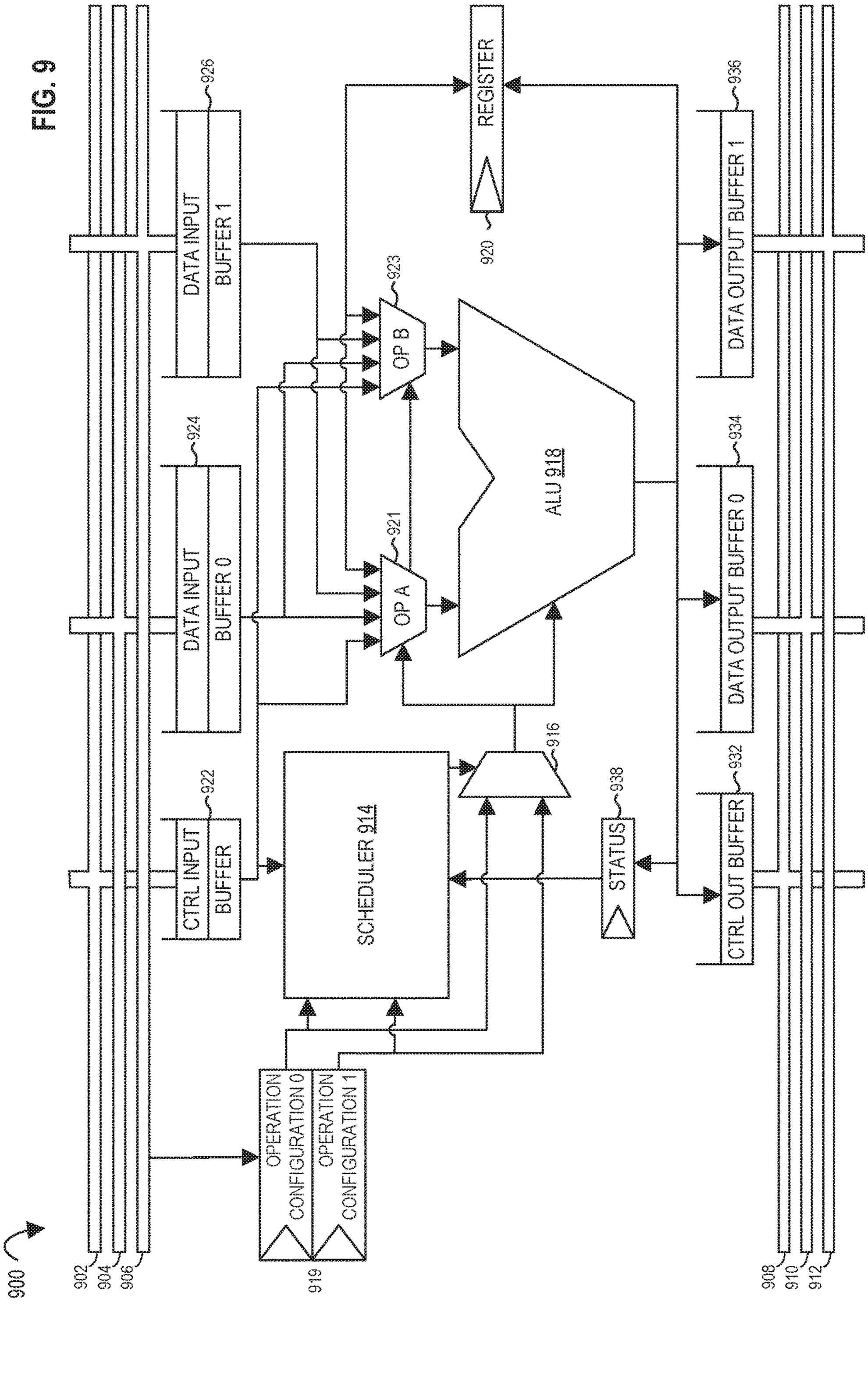
FIG. 9 illustrates a processing element according to embodiments of the disclosure.

Operations may be executed based on the availability of their inputs and the status of the PE. A PE may obtain operands from input channels and write results to output channels, although internal register state may also be used. Certain embodiments herein include a configurable dataflow-friendly PE. FIG. 9 shows a detailed block diagram of one such PE: the integer PE. This PE consists of several I/O buffers, an ALU, a storage register, some instruction registers, and a scheduler. Each cycle, the scheduler may select an instruction for execution based on the availability of the input and output buffers and the status of the PE. The result of the operation may then be written to either an output buffer or to a (e.g., local to the PE) register. Data written to an output buffer may be transported to a downstream PE for further processing. This style of PE may be extremely energy efficient, for example, rather than reading data from a complex, multi-ported register file, a PE reads the data from a register. Similarly, instructions may be stored directly in a register, rather than in a virtualized instruction cache.

Instruction registers may be set during a special configuration step. During this step, auxiliary control wires and state, in addition to the inter-PE network, may be used to stream in configuration across the several PEs comprising the fabric. As result of parallelism, certain embodiments of such a network may provide for rapid reconfiguration, e.g., a tile sized fabric may be configured in less than about 10 microseconds.

FIG. 9 represents one example configuration of a processing element, e.g., in which all architectural elements are minimally sized. In other embodiments, each of the components of a processing element is independently scaled to produce new PEs. For example, to handle more complicated programs, a larger number of instructions that are executable by a PE may be introduced. A second dimension of configurability is in the function of the PE arithmetic logic unit (ALU). In FIG. 9, an integer PE is depicted which may support addition, subtraction, and various logic operations. Other kinds of PEs may be created by substituting different kinds of functional units into the PE. An integer multiplication PE, for example, might have no registers, a single instruction, and a single output buffer. Certain embodiments of a PE decompose a fused multiply add (FMA) into separate, but tightly coupled floating multiply and floating add units to improve support for multiply-add-heavy workloads. PEs are discussed further below.

FIG. 7A illustrates a configurable data path network 700 (e.g., of network one or network two discussed in reference to FIG. 6) according to embodiments of the disclosure. Network 700 includes a plurality of multiplexers (e.g., multiplexers 702, 704, 706) that may be configured (e.g., via their respective control signals) to connect one or more data paths (e.g., from PEs) together. FIG. 7B illustrates a configurable flow control path network 701 (e.g., network one or network two discussed in reference to FIG. 6) according to embodiments of the disclosure. A network may be a light-weight PE-to-PE network. Certain embodiments of a network may be thought of as a set of composable primitives for the construction of distributed, point-to-point data channels. FIG. 7A shows a network that has two channels enabled, the bold black line and the dotted black line. The bold black line channel is multicast, e.g., a single input is sent to two outputs. Note that channels may cross at some points within a single network, even though dedicated circuit switched paths are formed between channel endpoints. Furthermore, this crossing may not introduce a structural hazard between the two channels, so that each operates independently and at full bandwidth.

Implementing distributed data channels may include two paths, illustrated in FIGS. 7A-7B. The forward, or data path, carries data from a producer to a consumer. Multiplexors may be configured to steer data and valid bits from the producer to the consumer, e.g., as in FIG. 7A. In the case of multicast, the data will be steered to multiple consumer endpoints. The second portion of this embodiment of a network is the flow control or backpressure path, which flows in reverse of the forward data path, e.g., as in FIG. 7B. Consumer endpoints may assert when they are ready to accept new data. These signals may then be steered back to the producer using configurable logical conjunctions, labelled as (e.g., backflow) flowcontrol function in FIG. 7B. In one embodiment, each flowcontrol function circuit may be a plurality of switches (e.g., muxes), for example, similar to FIG. 7A. The flow control path may handle returning control data from consumer to producer. Conjunctions may enable multicast, e.g., where each consumer is ready to receive data before the producer assumes that it has been received. In one embodiment, a PE is a PE that has a dataflow operator as its architectural interface. Additionally or alternatively, in one embodiment a PE may be any kind of PE (e.g., in the fabric), for example, but not limited to, a PE that has an instruction pointer, triggered instruction, or state machine based architectural interface.

The network may be statically configured, e.g., in addition to PEs being statically configured. During the configuration step, configuration bits may be set at each network component. These bits control, for example, the mux selections and flow control functions. A network may comprise a plurality of networks, e.g., a data path network and a flow control path network. A network or plurality of networks may utilize paths of different widths (e.g., a first width, and a narrower or wider width). In one embodiment, a data path network has a wider (e.g., bit transport) width than the width of a flow control path network. In one embodiment, each of a first network and a second network includes their own data path network and flow control path network, e.g., data path network A and flow control path network A and wider data path network B and flow control path network B.

Certain embodiments of a network are bufferless, and data is to move between producer and consumer in a single cycle. Certain embodiments of a network are also boundless, that is, the network spans the entire fabric. In one embodiment, one PE is to communicate with any other PE in a single cycle. In one embodiment, to improve routing bandwidth, several networks may be laid out in parallel between rows of PEs.

Relative to FPGAs, certain embodiments of networks herein have three advantages: area, frequency, and program expression. Certain embodiments of networks herein operate at a coarse grain, e.g., which reduces the number configuration bits, and thereby the area of the network. Certain embodiments of networks also obtain area reduction by implementing flow control logic directly in circuitry (e.g., silicon). Certain embodiments of hardened network implementations also enjoys a frequency advantage over FPGA. Because of an area and frequency advantage, a power advantage may exist where a lower voltage is used at throughput parity. Finally, certain embodiments of networks provide better high-level semantics than FPGA wires, especially with respect to variable timing, and thus those certain embodiments are more easily targeted by compilers. Certain embodiments of networks herein may be thought of as a set of composable primitives for the construction of distributed, point-to-point data channels.

In certain embodiments, a multicast source may not assert its data valid unless it receives a ready signal from each sink. Therefore, an extra conjunction and control bit may be utilized in the multicast case.

Like certain PEs, the network may be statically configured. During this step, configuration bits are set at each network component. These bits control, for example, the mux selection and flow control function. The forward path of our network requires some bits to swing its muxes. In the example shown in FIG. 7A, four bits per hop are required: the east and west muxes utilize one bit each, while the southbound mux utilize two bits. In this embodiment, four bits may be utilized for the data path, but 7 bits may be utilized for the flow control function (e.g., in the flow control path network). Other embodiments may utilize more bits, for example, if a CSA further utilizes a north-south direction. The flow control function may utilize a control bit for each direction from which flow control can come. This may enables the setting of the sensitivity of the flow control function statically. The table 1 below summarizes the Boolean algebraic implementation of the flow control function for the network in FIG. 7B, with configuration bits capitalized. In this example, seven bits are utilized.

TABLE 1

| Flow Implementation | |
|---|---|
| readyToEast | (EAST_WEST_SENSITIVE + readyFromWest) * (EAST_SOUTH_SENSITIVE + readyFromSouth) |
| readyToWest | (WEST_EAST_SENSITIVE + readyFromEast) * (WEST_SOUTH_SENSITIVE + readyFromSouth) |
| readyToNorth | (NORTH_WEST_SENSITIVE + readyFromWest) * (NORTH_EAST_SENSITIVE + readyFromEast) * (NORTH_SOUTH_SENSITIVE + readyFromSouth) |

For the third flow control box from the left in FIG. 7B, EAST_WEST_SENSITIVE and NORTH_SOUTH_SENSITIVE are depicted as set to implement the flow control for the bold line and dotted line channels, respectively.

FIG. 8 illustrates a hardware processor tile 800 comprising an accelerator 802 according to embodiments of the disclosure. Accelerator 802 may be a CSA according to this disclosure. Tile 800 includes a plurality of cache banks (e.g., cache bank 808). Request address file (RAF) circuits 810 may be included, e.g., as discussed below in Section 3.2. ODI may refer to an On Die Interconnect, e.g., an interconnect stretching across an entire die connecting up all the tiles. OTI may refer to an On Tile Interconnect, for example, stretching across a tile, e.g., connecting cache banks on the tile together.

3.1 Processing Elements

In certain embodiments, a CSA includes an array of heterogeneous PEs, in which the fabric is composed of several types of PEs each of which implement only a subset of the dataflow operators. By way of example, FIG. 9 shows a provisional implementation of a PE capable of implementing a broad set of the integer and control operations. Other PEs, including those supporting floating point addition, floating point multiplication, buffering, and certain control operations may have a similar implementation style, e.g., with the appropriate (dataflow operator) circuitry substituted for the ALU. PEs (e.g., dataflow operators) of a CSA may be configured (e.g., programmed) before the beginning of execution to implement a particular dataflow operation from among the set that the PE supports. A configuration may include one or two control words which specify an opcode controlling the ALU, steer the various multiplexors within the PE, and actuate dataflow into and out of the PE channels. Dataflow operators may be implemented by microcoding these configurations bits. The depicted integer PE 900 in FIG. 9 is organized as a single-stage logical pipeline flowing from top to bottom. Data enters PE 900 from one of set of local networks, where it is registered in an input buffer for subsequent operation. Each PE may support a number of wide, data-oriented and narrow, control-oriented channels. The number of provisioned channels may vary based on PE functionality, but one embodiment of an integer-oriented PE has 2 wide and 1-2 narrow input and output channels. Although the integer PE is implemented as a single-cycle pipeline, other pipelining choices may be utilized. For example, multiplication PEs may have multiple pipeline stages.

PE execution may proceed in a dataflow style. Based on the configuration microcode, the scheduler may examine the status of the PE ingress and egress buffers, and, when all the inputs for the configured operation have arrived and the egress buffer of the operation is available, orchestrates the actual execution of the operation by a dataflow operator (e.g., on the ALU). The resulting value may be placed in the configured egress buffer. Transfers between the egress buffer of one PE and the ingress buffer of another PE may occur asynchronously as buffering becomes available. In certain embodiments, PEs are provisioned such that at least one dataflow operation completes per cycle. Section 2 discussed dataflow operator encompassing primitive operations, such as add, xor, or pick. In certain embodiments, a PE microarchitecture implements more than one dataflow operator (e.g., a fused operator) within a single PE. This possibility arises because different operators (for example, arithmetic and control) may involve different data paths within the PE. For example, the PE shown in FIG. 9 may fuse an arbitrary arithmetic operation with the switch control operator, e.g., in addition to several other useful fusion combinations. The energy, area, performance, and latency advantages of such a capability are immediately apparent. With minor extensions to PE control paths many more fused combinations can be enabled in certain embodiments. To handle some of the more complex dataflow operators (e.g., floating-point fused multiply-add (FMA) and/or a loop-control sequencer dataflow operator) multiple PEs may be combined, e.g., rather than to provision a more complex single PE. In certain embodiments, additional function-specific circuitry (e.g., communications paths) are added between the combinable PEs. In one embodiment, a sequencer data flow operator that is to implement for-loop control, combinational paths may be added between adjacent PEs to carry control information related to the loop. Such PE combinations may maintain fully-pipelined behavior while preserving the utility of the basic PEs, e.g., in the case that the combined behavior is not utilized for a particular dataflow graph. Certain embodiments may provide advantages in energy, area, performance, and latency. In one embodiment, with an extension to a PE control path, more fused combinations may be enabled. In one embodiment, the width of the processing elements is 64 bits, e.g., for the heavy utilization of double-precision floating point computation in HPC and to support 64-bit memory addressing.

3.2 Communications Networks

Embodiments of the CSA microarchitecture provide a hierarchy of networks which together provide an implementation of the architectural abstraction of latency-insensitive channels across multiple communications scales. The lowest level of CSA communications hierarchy may be the local network. The local network may be statically circuit switched, e.g., using configuration registers to swing multiplexor(s) in the local network data-path to form fixed electrical paths between communicating PEs. In one embodiment, the configuration of the local network is set once per dataflow graph, e.g., at the same time as the PE configuration. In one embodiment, static, circuit switching optimizes for energy, e.g., where a large majority (perhaps greater than 95%) of CSA communications traffic will cross the local network. A program may include terms which are used in multiple expressions. To optimize for this case, embodiments herein provide for hardware support for multicast within the local network. Several local networks may be ganged together to form routing channels, e.g., which are interspersed (as a grid) between rows and columns of PEs. As an optimization, several local networks may be included to carry control tokens. In comparison to a FPGA interconnect, a CSA local network may be routed at the granularity of the data-path, and another difference may be a CSA's treatment of control. One embodiment of a CSA local network is explicitly flow controlled (e.g., back-pressured). For example, for each forward data-path and multiplexor set, a CSA is to provide a backward-flowing flow control path that is physically paired with the forward data-path. The combination of the two microarchitectural paths may provide a low-latency, low-energy, low-area, point-to-point implementation of the latency-insensitive channel abstraction. In one embodiment, a CSA's flow control lines are not visible to the user program, but they may be manipulated by the architecture in service of the user program. For example, the exception handling mechanisms described in Section 2.2 may be achieved by pulling flow control lines to a "not present" state upon the detection of an exceptional condition. This action may not only gracefully stalls those parts of the pipeline which are involved in the offending computation, but may also preserve the machine state leading up the exception, e.g., for diagnostic analysis. The second network layer, e.g., the mezzanine network, may be a shared, packet switched network. Mezzanine network may include a plurality of distributed network controllers, network dataflow endpoint circuits. The mezzanine network (e.g., the network schematically indicated by the dotted box in FIG. 39) may provide more general, long range communications, e.g., at the cost of latency, bandwidth, and energy. In some programs, most communications may occur on the local network, and thus mezzanine network provisioning will be considerably reduced in comparison, for example, each PE may connects to multiple local networks, but the CSA will provision only one mezzanine endpoint per logical neighborhood of PEs. Since the mezzanine is effectively a shared network, each mezzanine network may carry multiple logically independent channels, e.g., and be provisioned with multiple virtual channels. In one embodiment, the main function of the mezzanine network is to provide wide-range communications in-between PEs and between PEs and memory. In addition to this capability, the mezzanine may also include network dataflow endpoint circuit(s), for example, to perform certain dataflow operations. In addition to this capability, the mezzanine may also operate as a runtime support network, e.g., by which various services may access the complete fabric in a user-program-transparent manner. In this capacity, the mezzanine endpoint may function as a controller for its local neighborhood, for example, during CSA configuration. To form channels spanning a CSA tile, three subchannels and two local network channels (which carry traffic to and from a single channel in the mezzanine network) may be utilized. In one embodiment, one mezzanine channel is utilized, e.g., one mezzanine and two local=3 total network hops.

The composability of channels across network layers may be extended to higher level network layers at the inter-tile, inter-die, and fabric granularities.

FIG. 9 illustrates a processing element 900 according to embodiments of the disclosure. In one embodiment, operation configuration register 919 is loaded during configuration (e.g., mapping) and specifies the particular operation (or operations) this processing (e.g., compute) element is to perform. Register 920 activity may be controlled by that operation (an output of mux 916, e.g., controlled by the scheduler 914). Scheduler 914 may schedule an operation or operations of processing element 900, for example, when input data and control input arrives. Control input buffer 922 is connected to local network 902 (e.g., and local network 902 may include a data path network as in FIG. 7A and a flow control path network as in FIG. 7B) and is loaded with a value when it arrives (e.g., the network has a data bit(s) and valid bit(s)). Control output buffer 932, data output buffer 934, and/or data output buffer 936 may receive an output of processing element 900, e.g., as controlled by the operation (an output of mux 916). Status register 938 may be loaded whenever the ALU 918 executes (also controlled by output of mux 916). Data in control input buffer 922 and control output buffer 932 may be a single bit. Mux 921 (e.g., operand A) and mux 923 (e.g., operand B) may source inputs.

For example, suppose the operation of this processing (e.g., compute) element is (or includes) what is called call a pick in FIG. 3B. The processing element 900 then is to select data from either data input buffer 924 or data input buffer 926, e.g., to go to data output buffer 934 (e.g., default) or data output buffer 936. The control bit in 922 may thus indicate a 0 if selecting from data input buffer 924 or a 1 if selecting from data input buffer 926.

For example, suppose the operation of this processing (e.g., compute) element is (or includes) what is called call a switch in FIG. 3B. The processing element 900 is to output data to data output buffer 934 or data output buffer 936, e.g., from data input buffer 924 (e.g., default) or data input buffer 926. The control bit in 922 may thus indicate a 0 if outputting to data output buffer 934 or a 1 if outputting to data output buffer 936.

Multiple networks (e.g., interconnects) may be connected to a processing element, e.g., (input) networks 902, 904, 906 and (output) networks 908, 910, 912. The connections may be switches, e.g., as discussed in reference to FIGS. 7A and 7B. In one embodiment, each network includes two subnetworks (or two channels on the network), e.g., one for the data path network in FIG. 7A and one for the flow control (e.g., backpressure) path network in FIG. 7B. As one example, local network 902 (e.g., set up as a control interconnect) is depicted as being switched (e.g., connected) to control input buffer 922. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input buffer 922, e.g., to indicate to the upstream producer (e.g., PE) that a new control input value is not to be loaded into (e.g., sent to) control input buffer 922 until the backpressure signal indicates there is room in the control input buffer 922 for the new control input value (e.g., from a control output buffer of the upstream producer). In one embodiment, the new control input value may not enter control input buffer 922 until both (i) the upstream producer receives the "space available" backpressure signal from "control input" buffer 922 and (ii) the new control input value is sent from the upstream producer, e.g., and this may stall the processing element 900 until that happens (and space in the target, output buffer(s) is available).

Data input buffer 924 and data input buffer 926 may perform similarly, e.g., local network 904 (e.g., set up as a data (as opposed to control) interconnect) is depicted as being switched (e.g., connected) to data input buffer 924. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input buffer 924, e.g., to indicate to the upstream producer (e.g., PE) that a new data input value is not to be loaded into (e.g., sent to) data input buffer 924 until the backpressure signal indicates there is room in the data input buffer 924 for the new data input value (e.g., from a data output buffer of the upstream producer). In one embodiment, the new data input value may not enter data input buffer 924 until both (i) the upstream producer receives the "space available" backpressure signal from "data input" buffer 924 and (ii) the new data input value is sent from the upstream producer, e.g., and this may stall the processing element 900 until that happens (and space in the target, output buffer(s) is available). A control output value and/or data output value may be stalled in their respective output buffers (e.g., 932, 934, 936) until a backpressure signal indicates there is available space in the input buffer for the downstream processing element(s).

A processing element 900 may be stalled from execution until its operands (e.g., a control input value and its corresponding data input value or values) are received and/or until there is room in the output buffer(s) of the processing element 900 for the data that is to be produced by the execution of the operation on those operands.

3.3 Memory Interface

Figure 10:
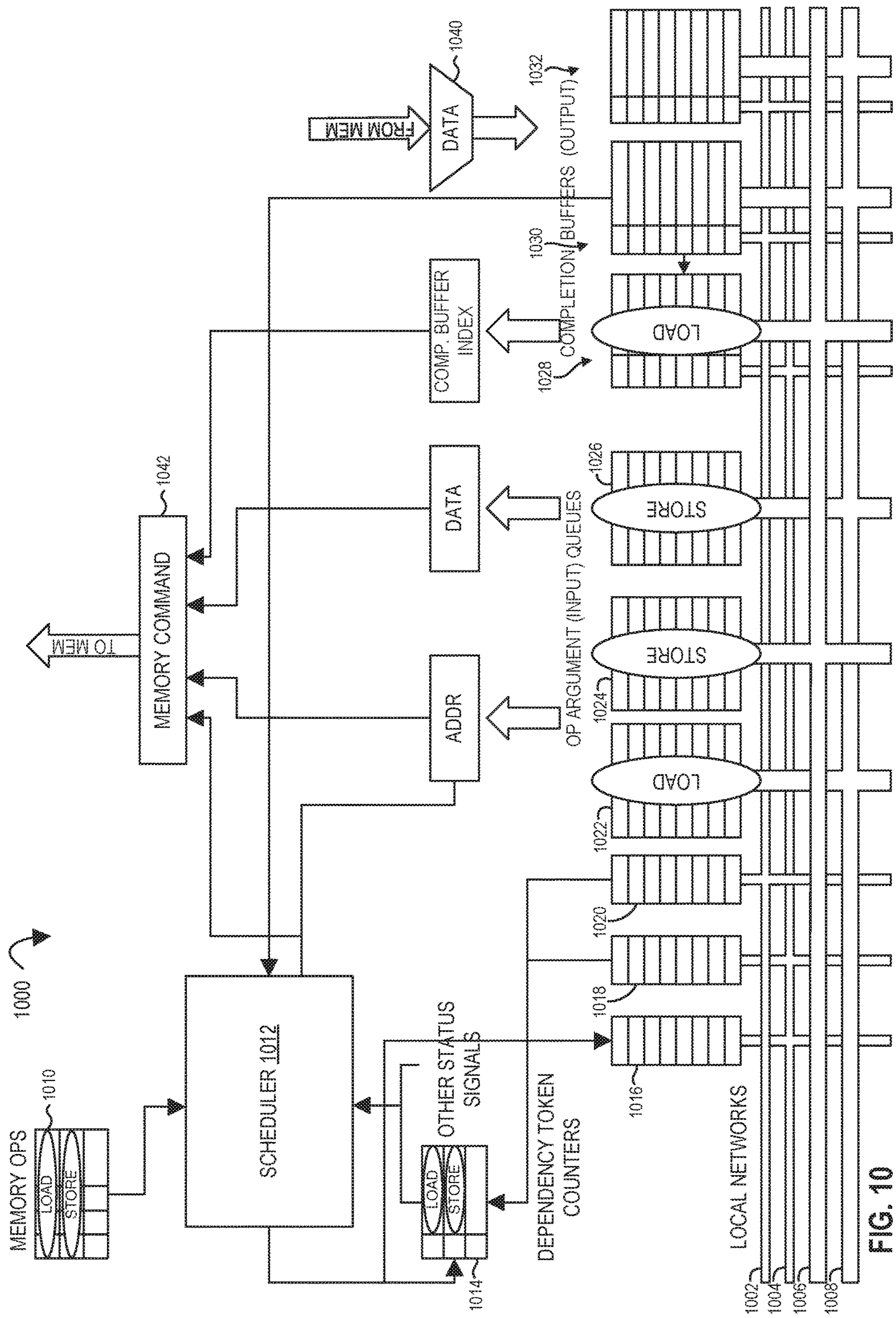
FIG. 10 illustrates a request address file (RAF) circuit according to embodiments of the disclosure.

The request address file (RAF) circuit, a simplified version of which is shown in FIG. 10, may be responsible for executing memory operations and serves as an intermediary between the CSA fabric and the memory hierarchy. As such, the main microarchitectural task of the RAF may be to rationalize the out-of-order memory subsystem with the in-order semantics of CSA fabric. In this capacity, the RAF circuit may be provisioned with completion buffers, e.g., queue-like structures that re-order memory responses and return them to the fabric in the request order. The second major functionality of the RAF circuit may be to provide support in the form of address translation and a page walker. Incoming virtual addresses may be translated to physical addresses using a channel-associative translation lookaside buffer (TLB). To provide ample memory bandwidth, each CSA tile may include multiple RAF circuits. Like the various PEs of the fabric, the RAF circuits may operate in a dataflow-style by checking for the availability of input arguments and output buffering, if required, before selecting a memory operation to execute. Unlike some PEs, however, the RAF circuit is multiplexed among several co-located memory operations. A multiplexed RAF circuit may be used to minimize the area overhead of its various subcomponents, e.g., to share the Accelerator Cache Interface (ACI) port (described in more detail in Section 3.4), shared virtual memory (SVM) support hardware, mezzanine network interface, and other hardware management facilities. However, there are some program characteristics that may also motivate this choice. In one embodiment, a (e.g., valid) dataflow graph is to poll memory in a shared virtual memory system. Memory-latency-bound programs, like graph traversals, may utilize many separate memory operations to saturate memory bandwidth due to memory-dependent control flow. Although each RAF may be multiplexed, a CSA may include multiple (e.g., between 8 and 32) RAFs at a tile granularity to ensure adequate cache bandwidth. RAFs may communicate with the rest of the fabric via both the local network and the mezzanine network. Where RAFs are multiplexed, each RAF may be provisioned with several ports into the local network. These ports may serve as a minimum-latency, highly-deterministic path to memory for use by latency-sensitive or high-bandwidth memory operations. In addition, a RAF may be provisioned with a mezzanine network endpoint, e.g., which provides memory access to runtime services and distant user-level memory accessors.

FIG. 10 illustrates a request address file (RAF) circuit 1000 according to embodiments of the disclosure. In one embodiment, at configuration time, the memory load and store operations that were in a dataflow graph are specified in registers 1010. The arcs to those memory operations in the dataflow graphs may then be connected to the input queues 1022, 1024, and 1026. The arcs from those memory operations are thus to leave completion buffers 1028, 1030, or 1032. Dependency tokens (which may be single bits) arrive into queues 1018 and 1020. Dependency tokens are to leave from queue 1016. Dependency token counter 1014 may be a compact representation of a queue and track a number of dependency tokens used for any given input queue. If the dependency token counters 1014 saturate, no additional dependency tokens may be generated for new memory operations. Accordingly, a memory ordering circuit (e.g., a RAF in FIG. 11) may stall scheduling new memory operations until the dependency token counters 1014 becomes unsaturated.

As an example for a load, an address arrives into queue 1022 which the scheduler 1012 matches up with a load in 1010. A completion buffer slot for this load is assigned in the order the address arrived. Assuming this particular load in the graph has no dependencies specified, the address and completion buffer slot are sent off to the memory system by the scheduler (e.g., via memory command 1042). When the result returns to mux 1040 (shown schematically), it is stored into the completion buffer slot it specifies (e.g., as it carried the target slot all along though the memory system). The completion buffer sends results back into local network (e.g., local network 1002, 1004, 1006, or 1008) in the order the addresses arrived.

Stores may be similar except both address and data have to arrive before any operation is sent off to the memory system.

3.4 Cache

Figure 11:
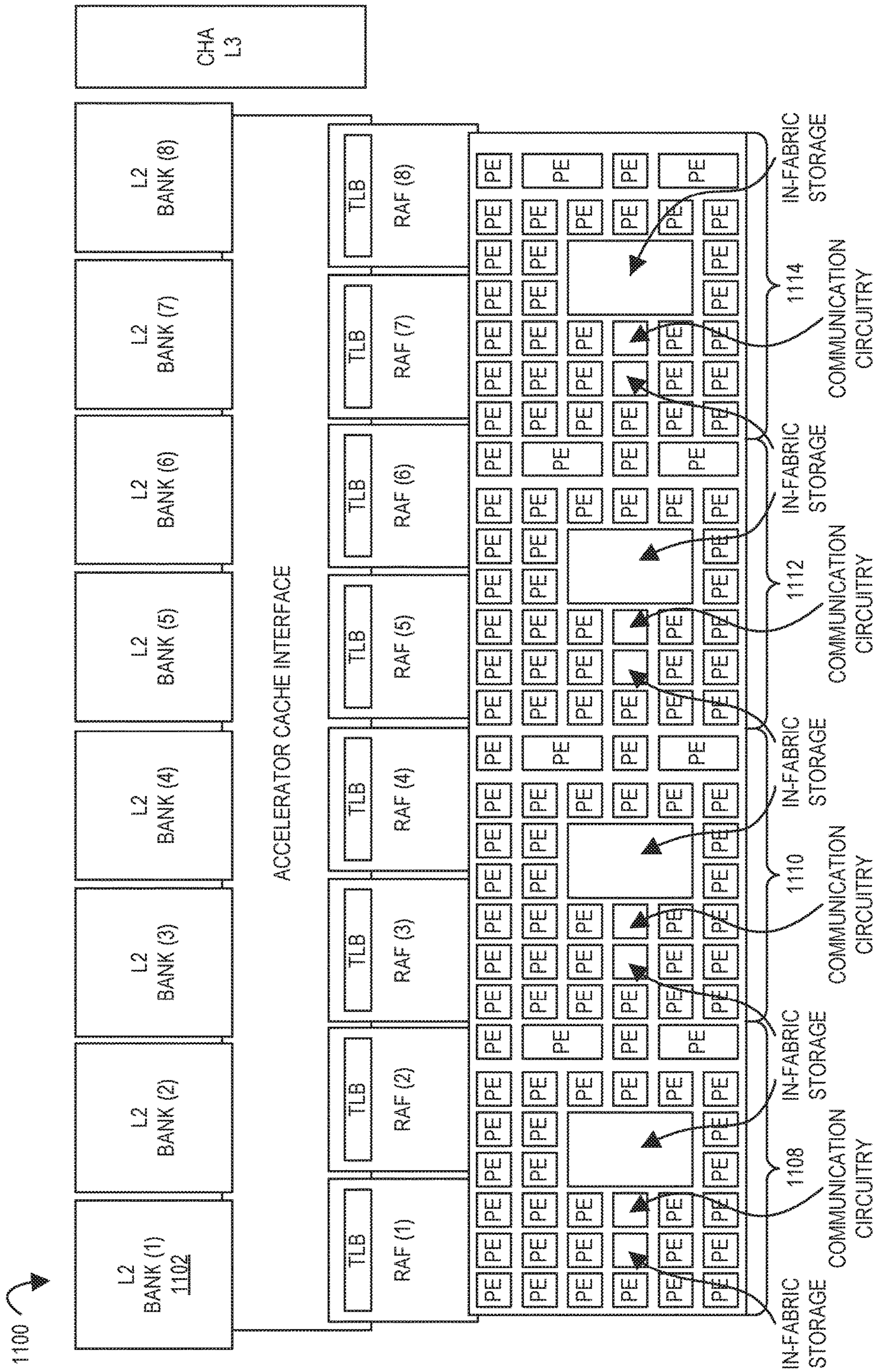
FIG. 11 illustrates a plurality of request address file (RAF) circuits coupled between a plurality of accelerator tiles and a plurality of cache banks according to embodiments of the disclosure.

Dataflow graphs may be capable of generating a profusion of (e.g., word granularity) requests in parallel. Thus, certain embodiments of the CSA provide a cache subsystem with sufficient bandwidth to service the CSA. A heavily banked cache microarchitecture, e.g., as shown in FIG. 11 may be utilized. FIG. 11 illustrates a circuit 1100 with a plurality of request address file (RAF) circuits (e.g., RAF circuit (1)) coupled between a plurality of accelerator tiles (1108, 1110, 1112, 1114) and a plurality of cache banks (e.g., cache bank 1102) according to embodiments of the disclosure. In one embodiment, the number of RAFs and cache banks may be in a ratio of either 1:1 or 1:2. Cache banks may contain full cache lines (e.g., as opposed to sharding by word), with each line having exactly one home in the cache. Cache lines may be mapped to cache banks via a pseudo-random function. The CSA may adopts the SVM model to integrate with other tiled architectures. Certain embodiments include an Accelerator Cache Interface (Interconnect) (ACI) network connecting the RAFs to the cache banks. This network may carry address and data between the RAFs and the cache. The topology of the ACI may be a cascaded crossbar, e.g., as a compromise between latency and implementation complexity.

3.5 Floating Point Support

Figure 12:
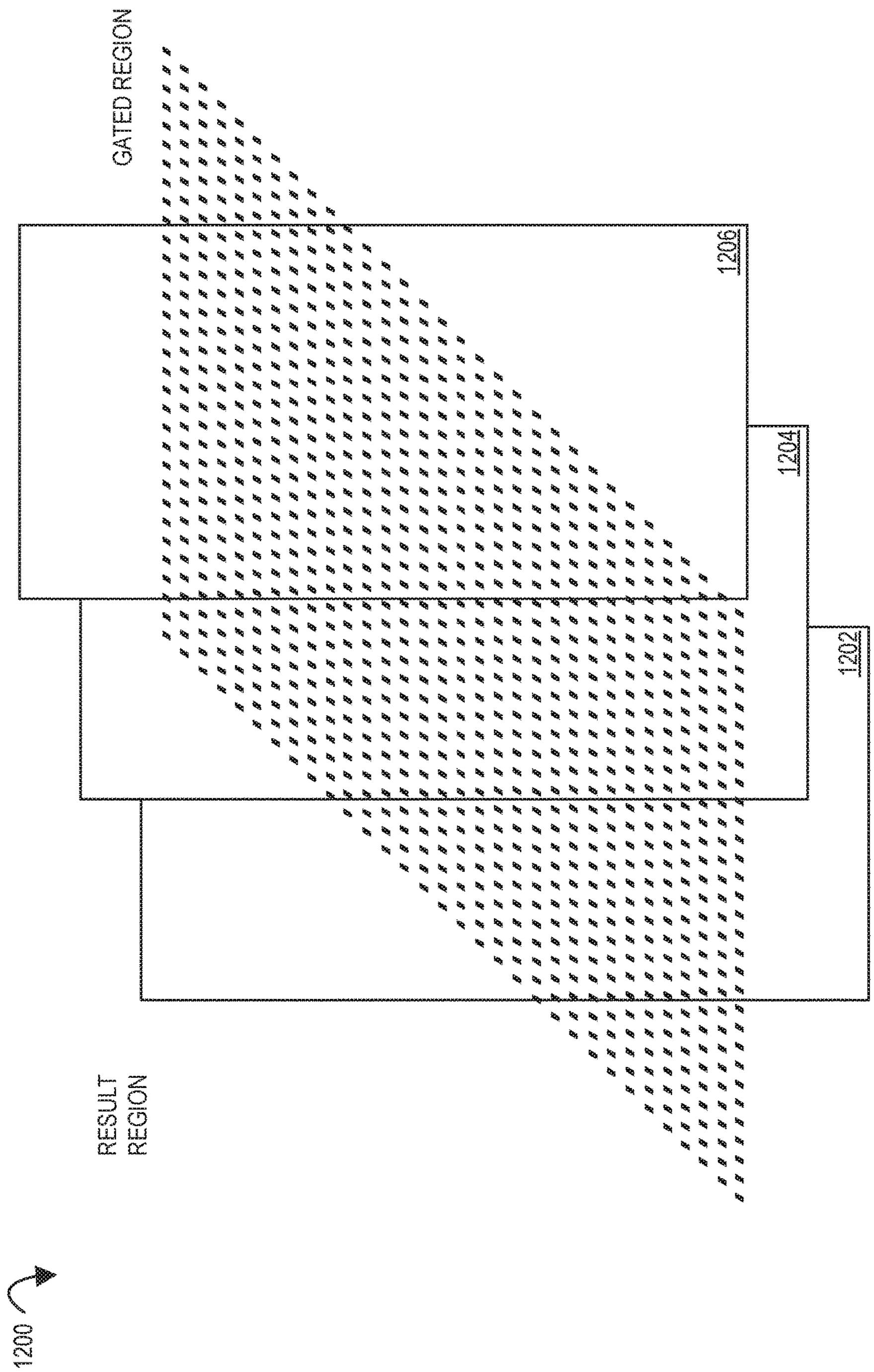
FIG. 12 illustrates a floating point multiplier partitioned into three regions (the result region, three potential carry regions, and the gated region) according to embodiments of the disclosure.

Certain HPC applications are characterized by their need for significant floating point bandwidth. To meet this need, embodiments of a CSA may be provisioned with multiple (e.g., between 128 and 256 each) of floating add and multiplication PEs, e.g., depending on tile configuration. A CSA may provide a few other extended precision modes, e.g., to simplify math library implementation. CSA floating point PEs may support both single and double precision, but lower precision PEs may support machine learning workloads. A CSA may provide an order of magnitude more floating point performance than a processor core. In one embodiment, in addition to increasing floating point bandwidth, in order to power all of the floating point units, the energy consumed in floating point operations is reduced. For example, to reduce energy, a CSA may selectively gate the low-order bits of the floating point multiplier array. In examining the behavior of floating point arithmetic, the low order bits of the multiplication array may often not influence the final, rounded product. FIG. 12 illustrates a floating point multiplier 1200 partitioned into three regions (the result region, three potential carry regions (1202, 1204, 1206), and the gated region) according to embodiments of the disclosure. In certain embodiments, the carry region is likely to influence the result region and the gated region is unlikely to influence the result region. Considering a gated region of g bits, the maximum carry may be:

$$\text{carry}_g \le \frac{1}{2^g}\sum_{1}^{g} i2^{i-1}$$

-continued $$\le \sum_{1}^{g} \frac{i}{2^g} - \sum_{1}^{g} \frac{1}{2^g} + 1$$

$$\le g - 1$$

Given this maximum carry, if the result of the carry region is less than $2^c$-g, where the carry region is c bits wide, then the gated region may be ignored since it does not influence the result region. Increasing g means that it is more likely the gated region will be needed, while increasing c means that, under random assumption, the gated region will be unused and may be disabled to avoid energy consumption. In embodiments of a CSA floating multiplication PE, a two stage pipelined approach is utilized in which first the carry region is determined and then the gated region is determined if it is found to influence the result. If more information about the context of the multiplication is known, a CSA more aggressively tune the size of the gated region. In FMA, the multiplication result may be added to an accumulator, which is often much larger than either of the multiplicands. In this case, the addend exponent may be observed in advance of multiplication and the CSDA may adjust the gated region accordingly. One embodiment of the CSA includes a scheme in which a context value, which bounds the minimum result of a computation, is provided to related multipliers, in order to select minimum energy gating configurations.

3.6 Runtime Services

Figure 13:
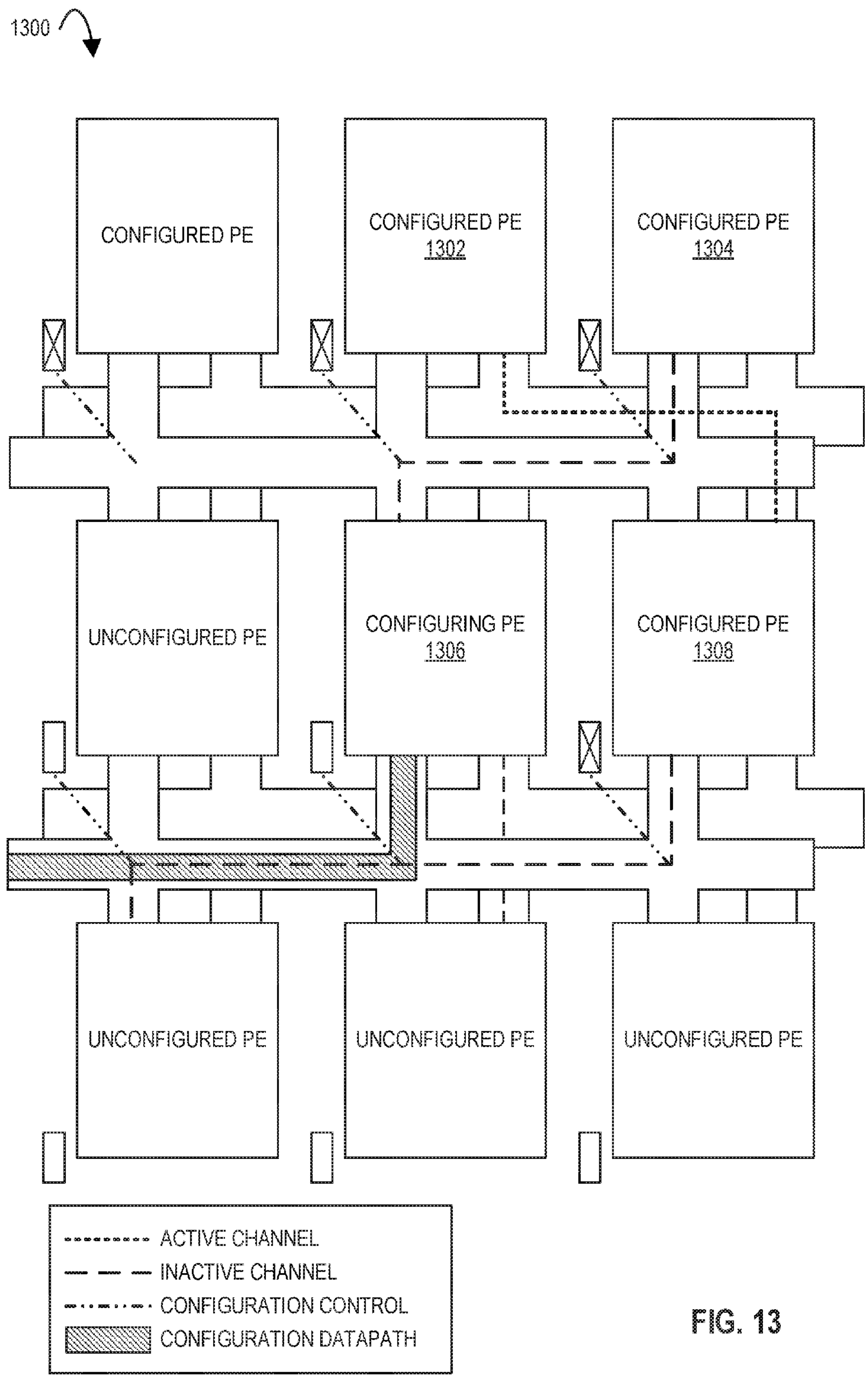
FIG. 13 illustrates an in-flight configuration of an accelerator with a plurality of processing elements according to embodiments of the disclosure.

In certain embodiment, a CSA includes a heterogeneous and distributed fabric, and consequently, runtime service implementations are to accommodate several kinds of PEs in a parallel and distributed fashion. Although runtime services in a CSA may be critical, they may be infrequent relative to user-level computation. Certain implementations, therefore, focus on overlaying services on hardware resources. To meet these goals, CSA runtime services may be cast as a hierarchy, e.g., with each layer corresponding to a CSA network. At the tile level, a single external-facing controller may accepts or sends service commands to an associated core with the CSA tile. A tile-level controller may serve to coordinate regional controllers at the RAFs, e.g., using the ACI network. In turn, regional controllers may coordinate local controllers at certain mezzanine network stops (e.g., network dataflow endpoint circuits). At the lowest level, service specific micro-protocols may execute over the local network, e.g., during a special mode controlled through the mezzanine controllers. The micro-protocols may permit each PE (e.g., PE class by type) to interact with the runtime service according to its own needs. Parallelism is thus implicit in this hierarchical organization, and operations at the lowest levels may occur simultaneously. This parallelism may enables the configuration of a CSA tile in between hundreds of nanoseconds to a few microseconds, e.g., depending on the configuration size and its location in the memory hierarchy. Embodiments of the CSA thus leverage properties of dataflow graphs to improve implementation of each runtime service. One key observation is that runtime services may need only to preserve a legal logical view of the dataflow graph, e.g., a state that can be produced through some ordering of dataflow operator executions. Services may generally not need to guarantee a temporal view of the dataflow graph, e.g., the state of a dataflow graph in a CSA at a specific point in time. This may permit the CSA to conduct most runtime services in a distributed, pipelined, and parallel fashion, e.g., provided that the service is orchestrated to preserve the logical view of the dataflow graph. The local configuration micro-protocol may be a packet-based protocol overlaid on the local network. Configuration targets may be organized into a configuration chain, e.g., which is fixed in the microarchitecture. Fabric (e.g., PE) targets may be configured one at a time, e.g., using a single extra register per target to achieve distributed coordination. To start configuration, a controller may drive an out-of-band signal which places all fabric targets in its neighborhood into an unconfigured, paused state and swings multiplexors in the local network to a pre-defined conformation. As the fabric (e.g., PE) targets are configured, that is they completely receive their configuration packet, they may set their configuration microprotocol registers, notifying the immediately succeeding target (e.g., PE) that it may proceed to configure using the subsequent packet. There is no limitation to the size of a configuration packet, and packets may have dynamically variable length. For example, PEs configuring constant operands may have a configuration packet that is lengthened to include the constant field (e.g., X and Y in FIGS. 3B-3C). FIG. 13 illustrates an in-flight configuration of an accelerator 1300 with a plurality of processing elements (e.g., PEs 1302, 1304, 1306, 1308) according to embodiments of the disclosure. Once configured, PEs may execute subject to dataflow constraints. However, channels involving unconfigured PEs may be disabled by the microarchitecture, e.g., preventing any undefined operations from occurring. These properties allow embodiments of a CSA to initialize and execute in a distributed fashion with no centralized control whatsoever. From an unconfigured state, configuration may occur completely in parallel, e.g., in perhaps as few as 200 nanoseconds. However, due to the distributed initialization of embodiments of a CSA, PEs may become active, for example sending requests to memory, well before the entire fabric is configured. Extraction may proceed in much the same way as configuration. The local network may be conformed to extract data from one target at a time, and state bits used to achieve distributed coordination. A CSA may orchestrate extraction to be non-destructive, that is, at the completion of extraction each extractable target has returned to its starting state. In this implementation, all state in the target may be circulated to an egress register tied to the local network in a scan-like fashion. Although in-place extraction may be achieved by introducing new paths at the register-transfer level (RTL), or using existing lines to provide the same functionalities with lower overhead. Like configuration, hierarchical extraction is achieved in parallel.

Figure 14:
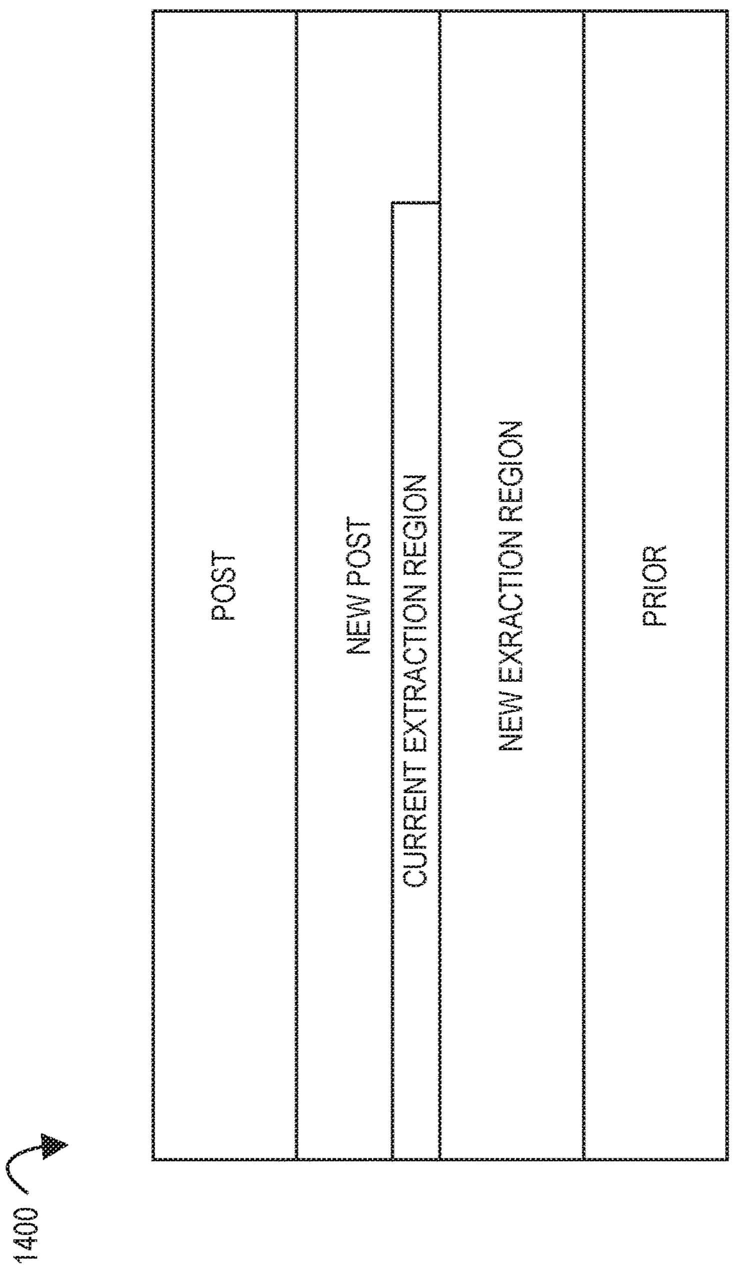
FIG. 14 illustrates a snapshot of an in-flight, pipelined extraction according to embodiments of the disclosure.

FIG. 14 illustrates a snapshot 1400 of an in-flight, pipelined extraction according to embodiments of the disclosure. In some use cases of extraction, such as checkpointing, latency may not be a concern so long as fabric throughput is maintained. In these cases, extraction may be orchestrated in a pipelined fashion. This arrangement, shown in FIG. 14, permits most of the fabric to continue executing, while a narrow region is disabled for extraction. Configuration and extraction may be coordinated and composed to achieve a pipelined context switch. Exceptions may differ qualitatively from configuration and extraction in that, rather than occurring at a specified time, they arise anywhere in the fabric at any point during runtime. Thus, in one embodiment, the exception micro-protocol may not be overlaid on the local network, which is occupied by the user program at runtime, and utilizes its own network. However, by nature, exceptions are rare and insensitive to latency and bandwidth. Thus certain embodiments of CSA utilize a packet switched network to carry exceptions to the local mezzanine stop, e.g., where they are forwarded up the service hierarchy (e.g., as in FIG. 46). Packets in the local exception network may be extremely small. In many cases, a PE identification (ID) of only two to eight bits suffices as a complete packet, e.g., since the CSA may create a unique exception identifier as the packet traverses the exception service hierarchy. Such a scheme may be desirable because it also reduces the area overhead of producing exceptions at each PE.

4. Compilation

The ability to compile programs written in high-level languages onto a CSA may be essential for industry adoption. This section gives a high-level overview of compilation strategies for embodiments of a CSA. First is a proposal for a CSA software framework that illustrates the desired properties of an ideal production-quality toolchain. Next, a prototype compiler framework is discussed. A "control-to-dataflow conversion" is then discussed, e.g., to converts ordinary sequential control-flow code into CSA dataflow assembly code.

4.1 Example Production Framework

Figure 15:
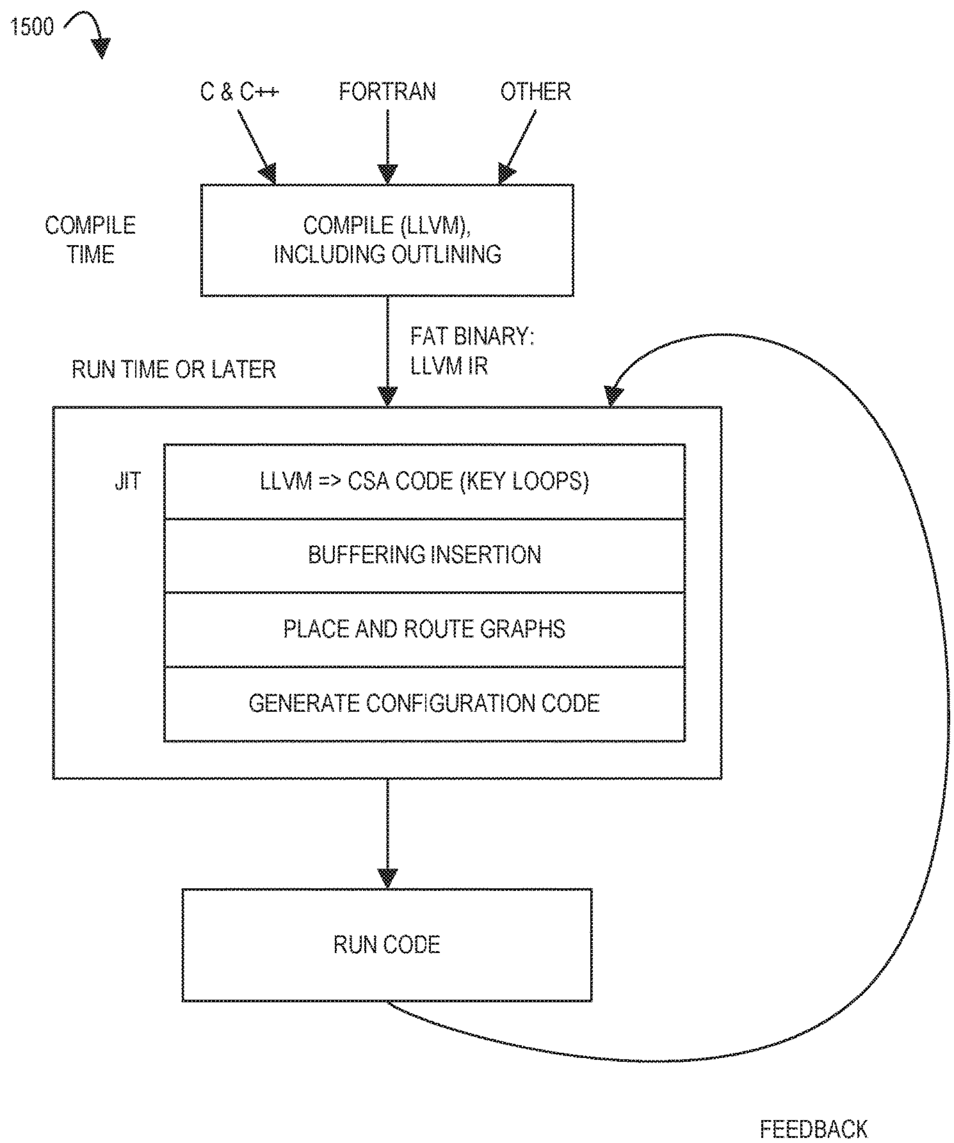
FIG. 15 illustrates a compilation toolchain for an accelerator according to embodiments of the disclosure.

FIG. 15 illustrates a compilation toolchain 1500 for an accelerator according to embodiments of the disclosure. This toolchain compiles high-level languages (such as C, C++, and Fortran) into a combination of host code (LLVM) intermediate representation (IR) for the specific regions to be accelerated. The CSA-specific portion of this compilation toolchain takes LLVM IR as its input, optimizes and compiles this IR into a CSA assembly, e.g., adding appropriate buffering on latency-insensitive channels for performance. It then places and routes the CSA assembly on the hardware fabric, and configures the PEs and network for execution. In one embodiment, the toolchain supports the CSA-specific compilation as a just-in-time (JIT), incorporating potential runtime feedback from actual executions. One of the key design characteristics of the framework is compilation of (LLVM) IR for the CSA, rather than using a higher-level language as input. While a program written in a high-level programming language designed specifically for the CSA might achieve maximal performance and/or energy efficiency, the adoption of new high-level languages or programming frameworks may be slow and limited in practice because of the difficulty of converting existing code bases. Using (LLVM) IR as input enables a wide range of existing programs to potentially execute on a CSA, e.g., without the need to create a new language or significantly modify the front-end of new languages that want to run on the CSA.

4.2 Prototype Compiler

Figure 16:
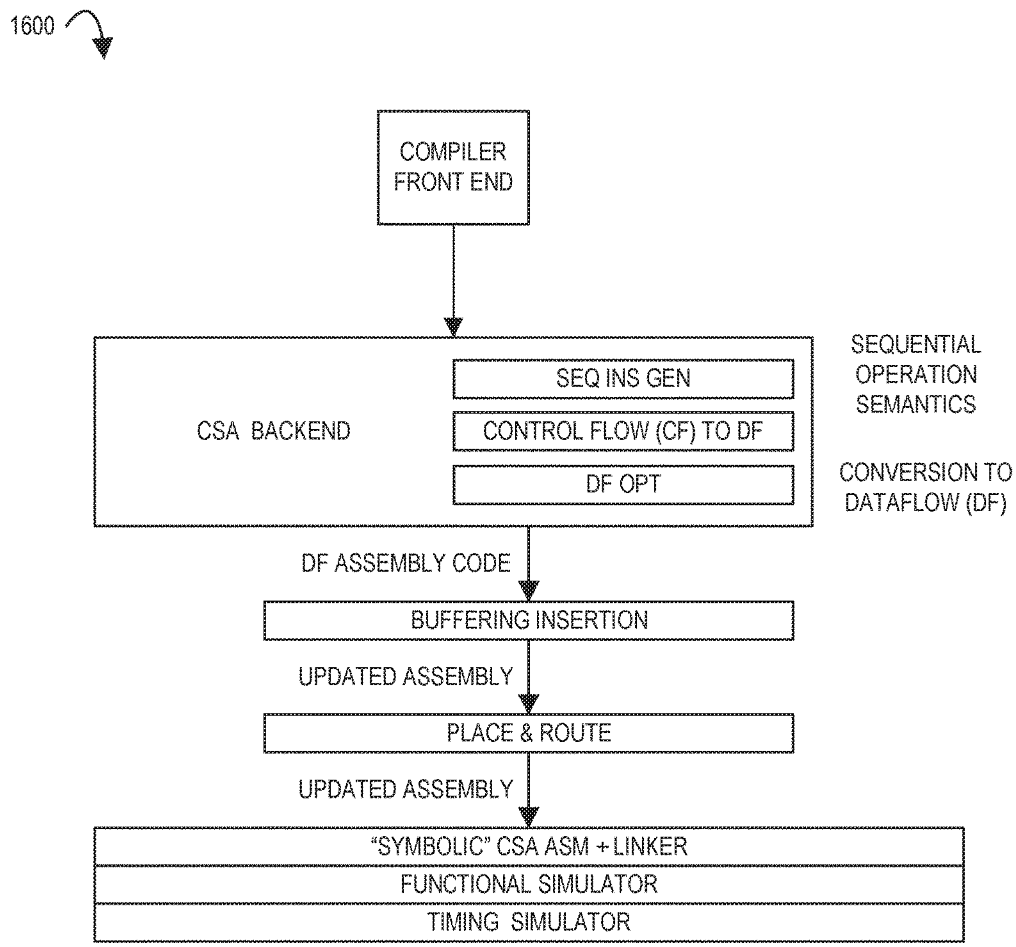
FIG. 16 illustrates a compiler for an accelerator according to embodiments of the disclosure.

FIG. 16 illustrates a compiler 1600 for an accelerator according to embodiments of the disclosure. Compiler 1600 initially focuses on ahead-of-time compilation of C and C++ through the (e.g., Clang) front-end. To compile (LLVM) IR, the compiler implements a CSA back-end target within LLVM with three main stages. First, the CSA back-end lowers LLVM IR into a target-specific machine instructions for the sequential unit, which implements most CSA operations combined with a traditional RISC-like control-flow architecture (e.g., with branches and a program counter). The sequential unit in the toolchain may serve as a useful aid for both compiler and application developers, since it enables an incremental transformation of a program from control flow (CF) to dataflow (DF), e.g., converting one section of code at a time from control-flow to dataflow and validating program correctness. The sequential unit may also provide a model for handling code that does not fit in the spatial array. Next, the compiler converts these control-flow instructions into dataflow operators (e.g., code) for the CSA. This phase is described later in Section 4.3. The dataflow operators (e.g., code) may have its sequences optimized, an example of this is described later in Section 4.4. Then, the CSA back-end may run its own optimization passes on the dataflow instructions. Finally, the compiler may dump the instructions in a CSA assembly format. This assembly format is taken as input to late-stage tools which place and route the dataflow instructions on the actual CSA hardware.

4.3 Control to Dataflow Conversion

A key portion of the compiler may be implemented in the control-to-dataflow conversion pass, or dataflow conversion pass for short. This pass takes in a function represented in control flow form, e.g., a control-flow graph (CFG) with sequential machine instructions operating on virtual registers, and converts it into a dataflow function that is conceptually a graph of dataflow operations (instructions) connected by latency-insensitive channels (LICs). This section gives a high-level description of this pass, describing how it conceptually deals with memory operations, branches, and loops in certain embodiments.

Straight-Line Code

Figure 17C:
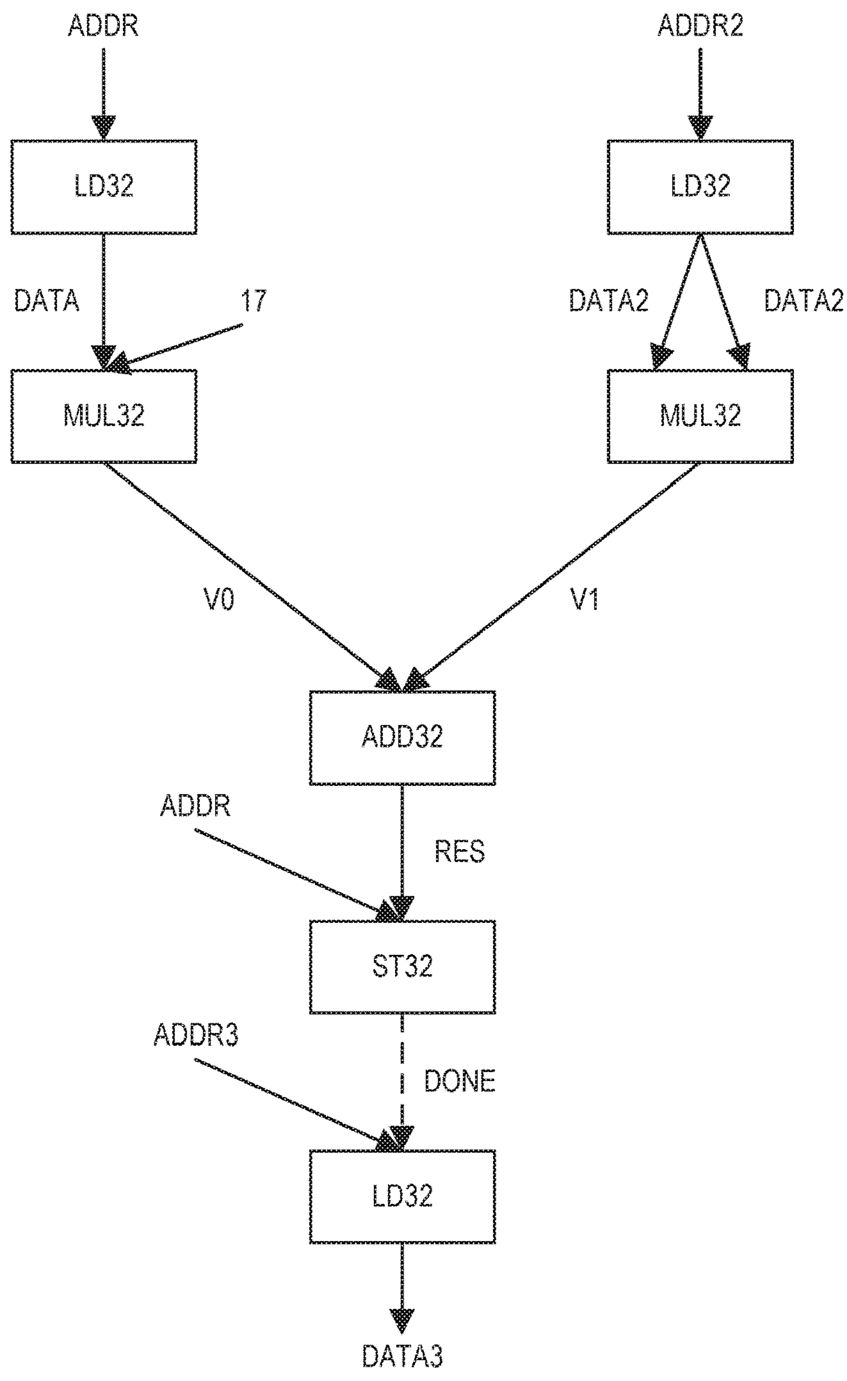
FIG. 17C illustrates a dataflow graph for the dataflow assembly code of FIG. 17B for an accelerator according to embodiments of the disclosure.

FIG. 17A illustrates sequential assembly code 1702 according to embodiments of the disclosure. FIG. 17B illustrates dataflow assembly code 1704 for the sequential assembly code 1702 of FIG. 17A according to embodiments of the disclosure. FIG. 17C illustrates a dataflow graph 1706 for the dataflow assembly code 1704 of FIG. 17B for an accelerator according to embodiments of the disclosure.

First, consider the simple case of converting straight-line sequential code to dataflow. The dataflow conversion pass may convert a basic block of sequential code, such as the code shown in FIG. 17A into CSA assembly code, shown in FIG. 17B. Conceptually, the CSA assembly in FIG. 17B represents the dataflow graph shown in FIG. 17C. In this example, each sequential instruction is translated into a matching CSA assembly. The .lic statements (e.g., for data) declare latency-insensitive channels which correspond to the virtual registers in the sequential code (e.g., Rdata). In practice, the input to the dataflow conversion pass may be in numbered virtual registers. For clarity, however, this section uses descriptive register names. Note that load and store operations are supported in the CSA architecture in this embodiment, allowing for many more programs to run than an architecture supporting only pure dataflow. Since the sequential code input to the compiler is in SSA (singlestatic assignment) form, for a simple basic block, the control-to-dataflow pass may convert each virtual register definition into the production of a single value on a latency-insensitive channel. The SSA form allows multiple uses of a single definition of a virtual register, such as in Rdata2). To support this model, the CSA assembly code supports multiple uses of the same LIC (e.g., data2), with the simulator implicitly creating the necessary copies of the LICs. One key difference between sequential code and dataflow code is in the treatment of memory operations. The code in FIG. 17A is conceptually serial, which means that the load32 (ld32) of addr3 should appear to happen after the st32 of addr, in case that addr and addr3 addresses overlap.

Branches

To convert programs with multiple basic blocks and conditionals to dataflow, the compiler generates special dataflow operators to replace the branches. More specifically, the compiler uses switch operators to steer outgoing data at the end of a basic block in the original CFG, and pick operators to select values from the appropriate incoming channel at the beginning of a basic block. As a concrete example, consider the code and corresponding dataflow graph in FIGS. 18A-18C, which conditionally computes a value of y based on several inputs: a i, x, and n. After computing the branch condition test, the dataflow code uses a switch operator (e.g., see FIGS. 3B-3C) steers the value in channel x to channel xF if test is 0, or channel xT if test is 1. Similarly, a pick operator (e.g., see FIGS. 3B-3C) is used to send channel yF to y if test is 0, or send channel yT to y if test is 1. In this example, it turns out that even though the value of a is only used in the true branch of the conditional, the CSA is to include a switch operator which steers it to channel aT when test is 1, and consumes (eats) the value when test is 0. This latter case is expressed by setting the false output of the switch to % ign. It may not be correct to simply connect channel a directly to the true path, because in the cases where execution actually takes the false path, this value of "a" will be left over in the graph, leading to incorrect value of a for the next execution of the function. This example highlights the property of control equivalence, a key property in embodiments of correct dataflow conversion.

Control Equivalence: Consider a single-entry-single-exit control flow graph G with two basic blocks A and B. A and B are control-equivalent if all complete control flow paths through G visit A and B the same number of times.

Figure 18C:
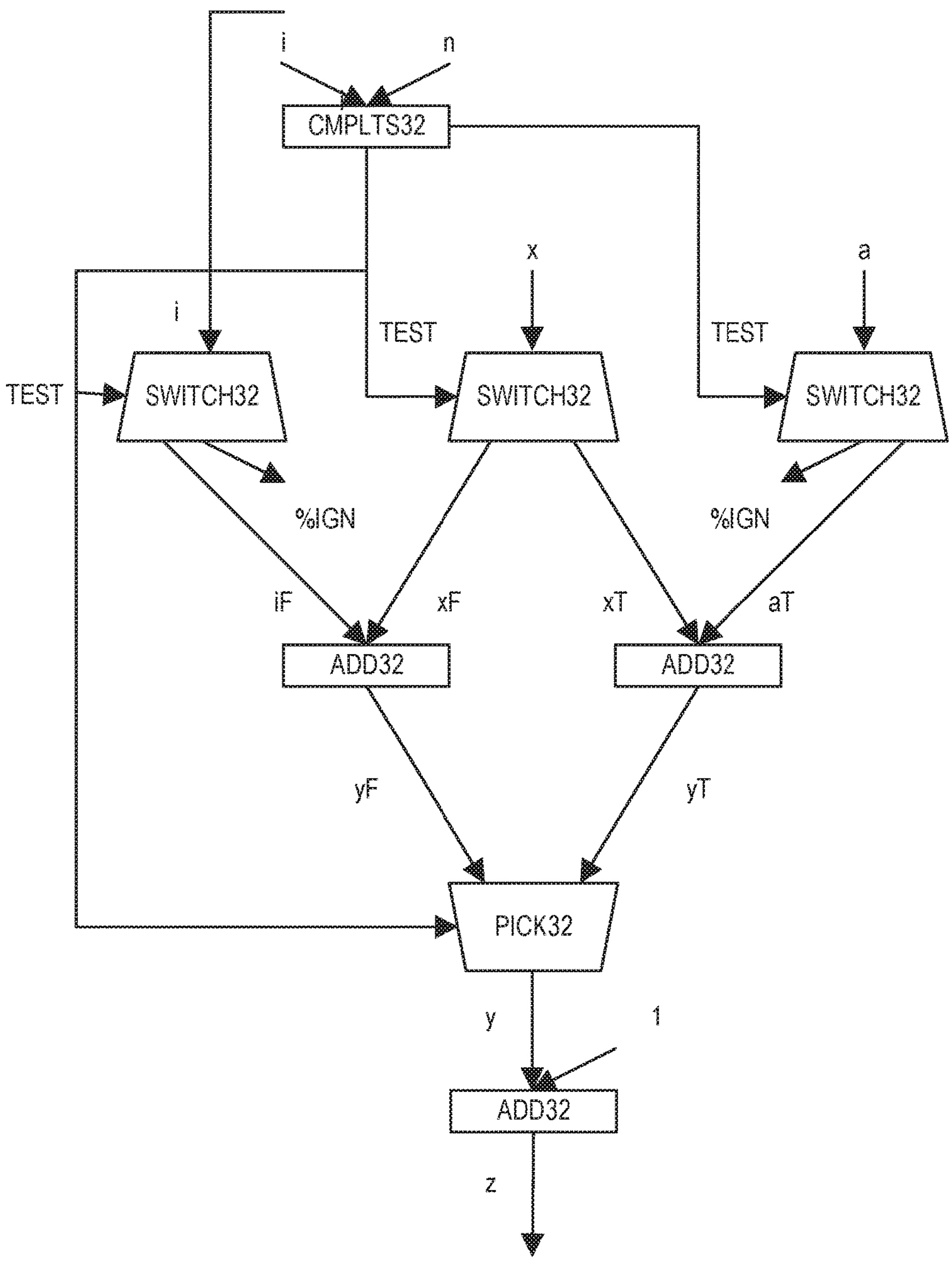
FIG. 18C illustrates a dataflow graph for the dataflow assembly code of FIG. 18B for an accelerator according to embodiments of the disclosure.

LIC Replacement: In a control flow graph G, suppose an operation in basic block A defines a virtual register x, and an operation in basic block B that uses x. Then a correct control-to-dataflow transformation can replace x with a latency-insensitive channel only if A and B are control equivalent. The control-equivalence relation partitions the basic blocks of a CFG into strong control-dependence regions. FIG. 18A illustrates C source code 1802 according to embodiments of the disclosure. FIG. 18B illustrates dataflow assembly code 1804 for the C source code 1802 of FIG. 18A according to embodiments of the disclosure. FIG. 18C illustrates a dataflow graph 1806 for the dataflow assembly code 1804 of FIG. 18B for an accelerator according to embodiments of the disclosure. In the example in FIGS. 18A-18C, the basic block before and after the conditionals are control-equivalent to each other, but the basic blocks in the true and false paths are each in their own control dependence region. One correct algorithm for converting a CFG to dataflow is to have the compiler insert (1) switches to compensate for the mismatch in execution frequency for any values that flow between basic blocks which are not control equivalent, and (2) picks at the beginning of basic blocks to choose correctly from any incoming values to a basic block. Generating the appropriate control signals for these picks and switches may be the key part of dataflow conversion.

Loops

Figure 19C:
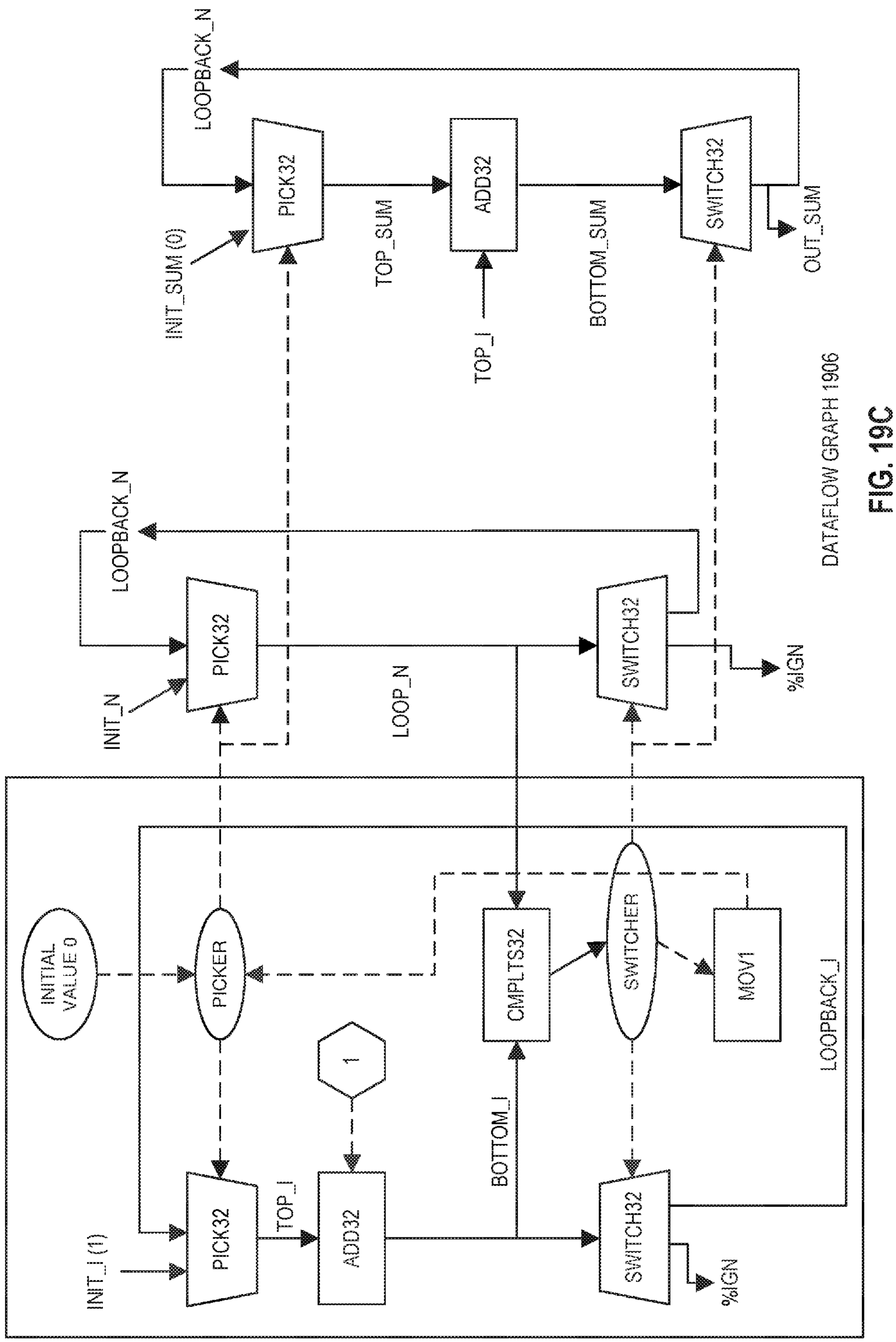
FIG. 19C illustrates a dataflow graph for the dataflow assembly code of FIG. 19B for an accelerator according to embodiments of the disclosure.

Another important class of CFGs in dataflow conversion are CFGs for single-entry-single-exit loops, a common form of loop generated in (LLVM) IR. These loops may be almost acyclic, except for a single back edge from the end of the loop back to a loop header block. The dataflow conversion pass may use same high-level strategy to convert loops as for branches, e.g., it inserts switches at the end of the loop to direct values out of the loop (either out the loop exit or around the back-edge to the beginning of the loop), and inserts picks at the beginning of the loop to choose between initial values entering the loop and values coming through the back edge. FIG. 19A illustrates C source code 1902 according to embodiments of the disclosure. FIG. 19B illustrates dataflow assembly code 1904 for the C source code 1902 of FIG. 19A according to embodiments of the disclosure. FIG. 19C illustrates a dataflow graph 1906 for the dataflow assembly code 1904 of FIG. 19B for an accelerator according to embodiments of the disclosure. FIGS. 19A-19C shows C and CSA assembly code for an example do-while loop that adds up values of a loop induction variable i, as well as the corresponding dataflow graph. For each variable that conceptually cycles around the loop (i and sum), this graph has a corresponding pick/switch pair that controls the flow of these values. Note that this example also uses a pick/switch pair to cycle the value of n around the loop, even though n is loop-invariant. This repetition of n enables conversion of n's virtual register into a LIC, since it matches the execution frequencies between a conceptual definition of n outside the loop and the one or more uses of n inside the loop. In general, for a correct dataflow conversion, registers that are live-in into a loop are to be repeated once for each iteration inside the loop body when the register is converted into a LIC. Similarly, registers that are updated inside a loop and are live-out from the loop are to be consumed, e.g., with a single final value sent out of the loop. Loops introduce a wrinkle into the dataflow conversion process, namely that the control for a pick at the top of the loop and the switch for the bottom of the loop are offset. For example, if the loop in FIG. 18A executes three iterations and exits, the control to picker should be 0, 1, 1, while the control to switcher should be 1, 1, 0. This control is implemented by starting the picker channel with an initial extra 0 when the function begins on cycle 0 (which is specified in the assembly by the directives .value 0 and .avail 0), and then copying the output switcher into picker. Note that the last 0 in switcher restores a final 0 into picker, ensuring that the final state of the dataflow graph matches its initial state. In one embodiment, control signals may come from a sequencer dataflow operator.

4.4 Sequence Optimization

Although the transformation of the code in FIG. 19A to the configuration of the plurality of processing elements to execute that dataflow graph in FIG. 19C is correct, it may not be an optimal transformation for some loops (e.g., for-loop), for example, because values such as the loop induction variable are flowing in pick, add, compare, and switch dataflow operator cycles around the loop. In certain embodiments herein, these kinds of cycles may be optimized using sequence units, for example, which are capable of producing new sequence values, e.g., at a rate of 1 per cycle. To utilize sequencer dataflow operators in the hardware, a compiler runs an optimization pass after dataflow conversion to replace certain (e.g., pick and/or switch) dataflow operator cycles with special sequence operations, e.g., in CSA assembly. CSA dataflow assembly may include one or more of the five following operations in the sequence family:

1. Sequence: an embodiment of a sequence operation takes as input a triple of base, bound, and stride value, and produces a stream of values as a (e.g., equivalent to a) for-loop using those inputs. For example, if base is 10, bound is 15, and stride is 2, then a seqlts32 operation produces a stream of three output values, i.e., 10; 12; 14. It also produces a stream of 1; 1; 1; 0 as control signals, e.g., which may be used to control other types of operations in the sequence family. The field in the operand of 32 may operate on 32-bits of data, e.g., at once. In another embodiment, the field is another number, for example, a field in the operand of 64 instead of 32 may operate on 64-bits of data, e.g., at once.

2. Stride: an embodiment of a stride operation takes as input a base, stride, and input control stream of control signals (ctl), and generates a corresponding linear sequence to match ctl. For example, for a stride32 operation, if base is 10, stride is 1, and ctl is 1; 1; 1; 0, then the output is 10; 11; 12. Embodiments of a stride operation may be thought of as a dependent sequence instruction which relies on a control stream of a sequence operation to determine when to step instead of doing a comparison with a bound.

3. Reduction: an embodiment of a reduction operation takes as inputs an initial value (init), a value stream in, and a stream of control signals (ctl), and outputs the sum of the initial value and value stream. For example, a redadd32 with init of 10, in of 3; 4; 2, and ctl of 1; 1; 1; 0 produces an output of 19.

4. Repeat: an embodiment of a repeat operation repeats an input value according to an input control stream. For example, a repeat32 operation with input value 42 and control stream 1; 1; 1; 0 will output three instances of 42.

5. Onend: an embodiment of an onend operation conceptually matches up input values on an input stream in to signals on a stream of control signals (ctl), returning a signal when all matches are done. For example, an onend operation with ctl input of 1; 1; 1; 0, will match any three inputs on a value stream in, and output a done signal when it reaches the 0 in ctl. In certain embodiments, the sequence transformation pass in the compiler that runs after the dataflow conversion searches for sequence candidates, e.g., pick and switch dataflow operators (e.g., pairs) that correspond to values cycling around a loop, converts the candidates matching a loop induction variable into a sequence instruction, and converts any remaining compatible candidates into dependent stride, repeat, or reduction operation(s).

Figure 20C:
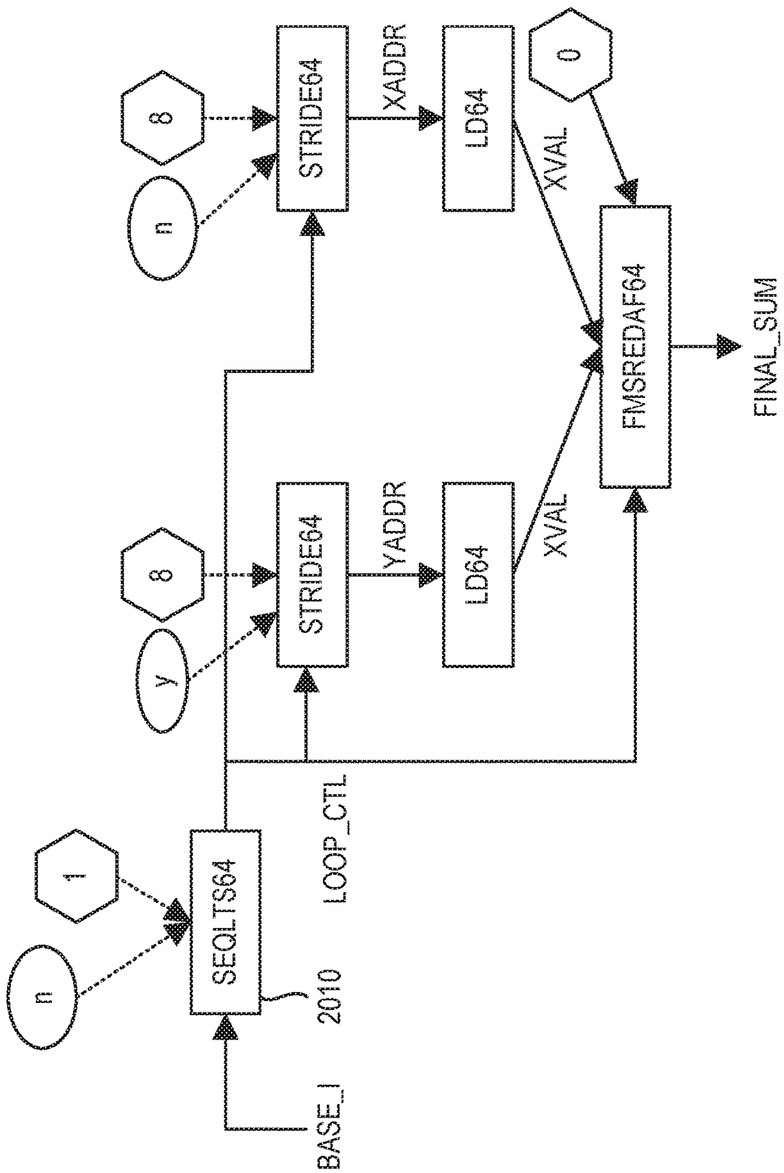
FIG. 20C illustrates a dataflow graph for the dataflow assembly code of FIG. 20B for an accelerator according to embodiments of the disclosure.

FIG. 20A illustrates C source code 2002 according to embodiments of the disclosure. FIG. 20B illustrates dataflow assembly code 2004 for the C source code 2002 of FIG. 20A according to embodiments of the disclosure. FIG. 20C illustrates a dataflow graph 2006 for the dataflow assembly code 2004 of FIG. 20B for an accelerator according to embodiments of the disclosure. FIGS. 20A-20C show an example of sequence optimization applied to a loop computing a dot-product. The seqlts64 operation may produce an output control stream of n number of 1's, followed by a 0. Note that this example does not actually use the value of the induction variable i output by the sequence. Instead, this code uses stride64 operations to stride through the addresses of x and y. The seqlts64 operation shown in FIG. 20A also produces two other control signal stream outputs which are unused in this example (e.g., represented by % ign). The inputs to the depicted assembly code are n, x, and y, and the output is final_sum. The dataflow graph 2006 may be overlaid into an array of processing elements (e.g., and the (e.g., interconnect) network(s) therebetween), for example, such that each node of the dataflow graph 2006 is represented as a dataflow operator in an array of processing elements (e.g., including a sequencer operator representing sequencer node 2010).

Figure 21:
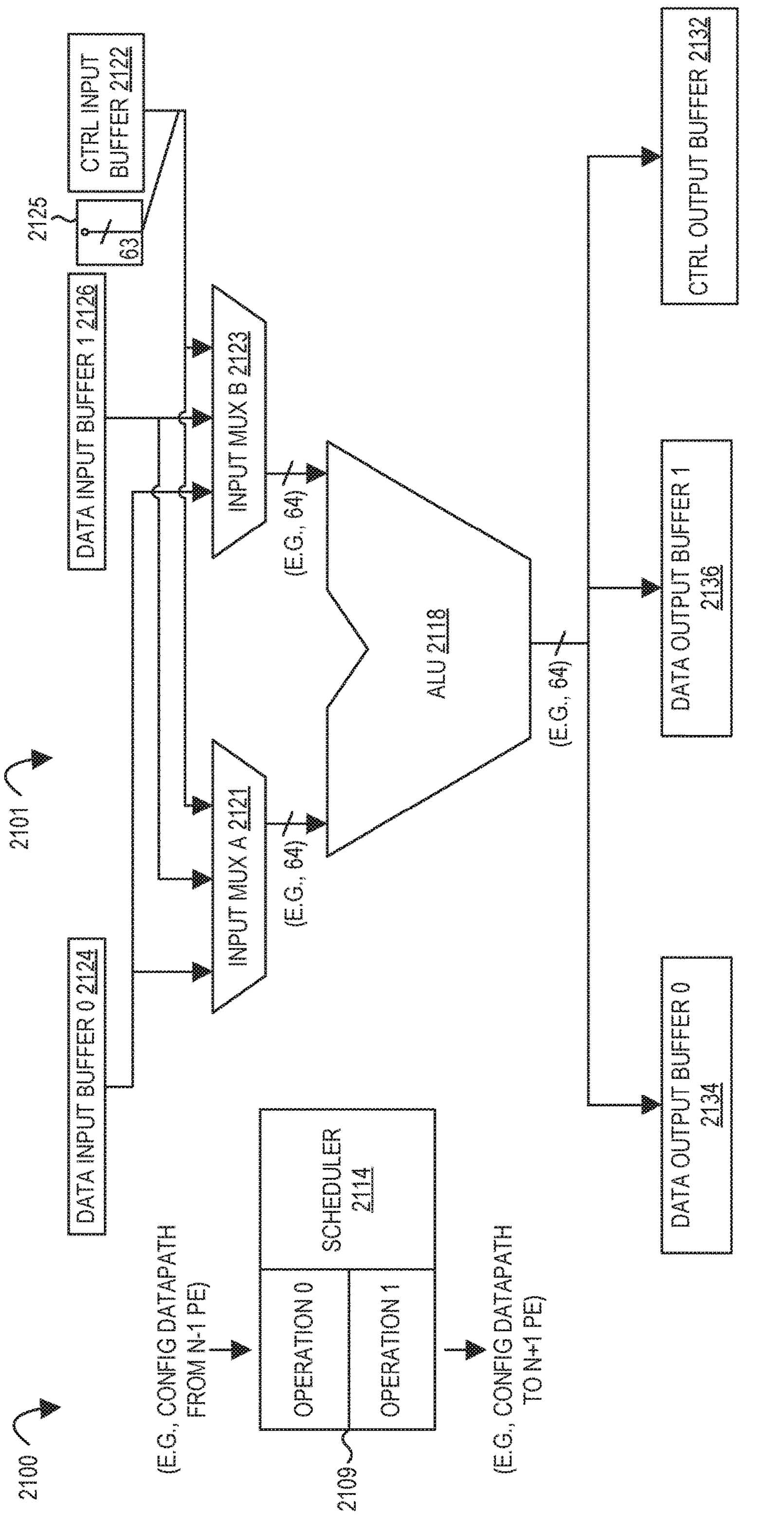
FIG. 21 illustrates an integer arithmetic/logic dataflow operator implementation on a processing element according to embodiments of the disclosure.

FIG. 21 illustrates an integer arithmetic/logic dataflow operator 2101 implementation on a processing element 2100 according to embodiments of the disclosure. In one embodiment, integer arithmetic/logic dataflow operator 2101 is an integer processing element, e.g., integer processing element 900 in FIG. 9 or other PEs. Operation selector may be a scheduler 2114, e.g., scheduler 914 in FIG. 9 or other PEs. In one embodiment, operation configuration register 2109 is loaded during configuration (e.g., mapping) and specifies the particular operation (or operations) this processing (e.g., compute) element is to perform (e.g., performed with ALU 2118). Scheduler 2114 (e.g., operations selector) may schedule an operation or operations of processing element 2100, for example, when input data and control input arrives. Input and outputs (e.g., via buffer(s)) may be sent via a network, e.g., any network discussed herein. Control input buffer 2122 may be connected to local network (e.g., and local network may include a data path network as in FIG. 7A and a flow control path network as in FIG. 7B) and is loaded with a value when it arrives (e.g., the network has a data bit(s) and valid bit(s)). Control input buffer 2122 may be coupled to zero generator 2125, e.g., to add leading or trailing zeros to the value from control input buffer 2122 to form a desired width of data item (e.g., 64 bits). Control output buffer 2132, data output buffer 2134, and/or data output buffer 2136 may receive an output of processing element 2100, e.g., as controlled by the operation (an output of scheduler 2114). Data in control input buffer 2122 and control output buffer 2132 may be a single bit. Mux 2121 (e.g., operand A) and mux 2123 (e.g., operand B) may source inputs.

For example, suppose the operation of this processing (e.g., compute) element is (or includes) what is called call a pick in FIG. 3B. The processing element 2100 then is to select data from either data input buffer 2124 or data input buffer 2126, e.g., to go to data output buffer 2134 (e.g., default) or data output buffer 2136. The control bit in 2122 may thus indicate a 0 if selecting from data input buffer 2124 or a 1 if selecting from data input buffer 2126.

For example, suppose the operation of this processing (e.g., compute) element is (or includes) what is called call a switch in FIG. 3B. The processing element 2100 is to output data to data output buffer 2134 or data output buffer 2136, e.g., from data input buffer 2124 (e.g., default) or data input buffer 2126. The control bit in 2122 may thus indicate a 0 if outputting to data output buffer 2134 or a 1 if outputting to data output buffer 2136.

Multiple networks (e.g., interconnects) may be connected to a processing element, e.g., (input) networks *(e.g., networks 902, 904, 906 and (output) networks 908, 910, 912 in FIG. 9). The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network may be (e.g., set up as a control interconnect) switched (e.g., connected) to couple to control input buffer 2122. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input buffer 2122, e.g., to indicate to the upstream producer (e.g., PE) that a new control input value is not to be loaded into (e.g., sent to) control input buffer 2122 until the backpressure signal indicates there is room in the control input buffer 2122 for the new control input value (e.g., from a control output buffer of the upstream producer). In one embodiment, the new control input value may not enter control input buffer 2122 until both (i) the upstream producer receives the "space available" backpressure signal from "control input" buffer 2122 and (ii) the new control input value is sent from the upstream producer, e.g., and this may stall the processing element 2100 until that happens (and space in the target, output buffer(s) is available).

Data input buffer 2124 and data input buffer 2126 may perform similarly, e.g., local network (e.g., set up as a data (as opposed to control) interconnect) may be switched (e.g., connected) to couple to data input buffer 2124. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input buffer 2124, e.g., to indicate to the upstream producer (e.g., PE) that a new data input value is not to be loaded into (e.g., sent to) data input buffer 2124 until the backpressure signal indicates there is room in the data input buffer 2124 for the new data input value (e.g., from a data output buffer of the upstream producer). In one embodiment, the new data input value may not enter data input buffer 2124 until both (i) the upstream producer receives the "space available" backpressure signal from "data input" buffer 2124 and (ii) the new data input value is sent from the upstream producer, e.g., and this may stall the processing element 2100 until that happens (and space in the target, output buffer(s) is available). A control output value and/or data output value may be stalled in their respective output buffers (e.g., 2132, 2134, 2136) until a backpressure signal indicates there is available space in the input buffer for the downstream processing element(s).

A processing element 2100 may be stalled from execution until its operands (e.g., a control input value and its corresponding data input value or values) are received and/or until there is room in the output buffer(s) of the processing element 2100 for the data that is to be produced by the execution of the operation on those operands. Certain couplings (e.g., lines) have not been shown in detail in order not to obscure the understanding of certain descriptions.

While a heterogeneous CSA computing fabric (e.g., different types of PEs) may be utilized (e.g., to optimize area/energy efficiency), (e.g., dark) circuitry of the silicon that exists but is not being currently used (e.g., dark) (for example, if the processing elements become too specialized) may be detrimental to manufacturing cost and area/energy efficiency goals. In one embodiment, a sequencer dataflow operator utilizes two integer PEs with a (e.g., small) set of dedicated data/control wires connecting them, (e.g., a small amount of) additional control logic circuitry, and/or storage to support sequence generation efficiently. In one embodiment, each processing element forming a sequencer dataflow operator is to operate in a first mode (e.g., as a stand-alone (e.g., integer) PE) and a second mode (e.g., as a sequencer), e.g., in the first mode when it is not operated in the second mode.

A PE may communicate using dedicated virtual circuits which are formed by statically configuring a circuit switched communications network. Embodiments of these virtual circuits may be flow controlled and fully back pressured, e.g., such that a PE will stall if either its source has no data or its destination is full.

Sequencer Dataflow Operator

Figure 22:
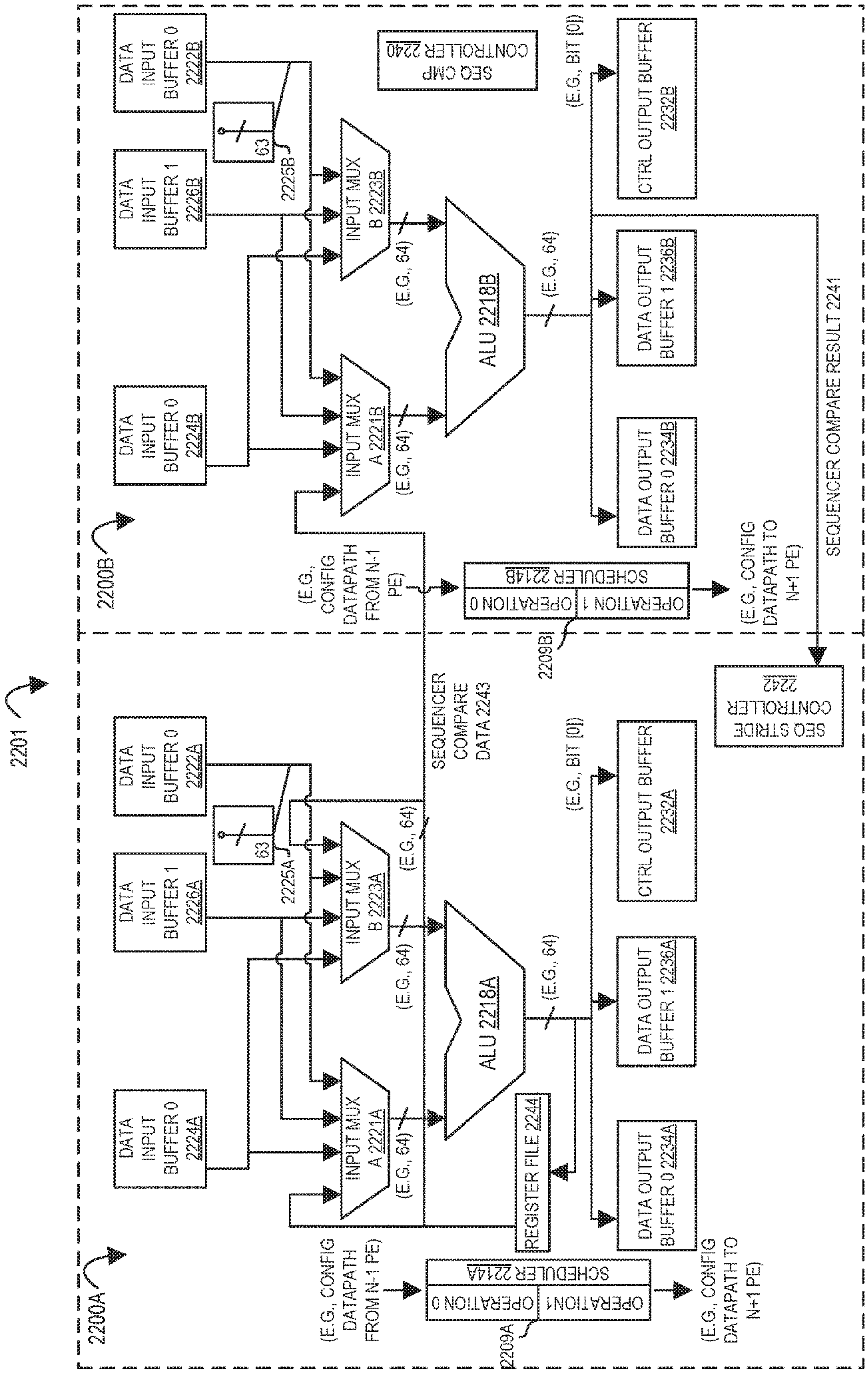
FIG. 22 illustrates a sequencer dataflow operator implementation on processing elements according to embodiments of the disclosure.

FIG. 22 illustrates a sequencer dataflow operator 2201 implementation on processing elements (2200A, 2200B) according to embodiments of the disclosure. In one embodiment, processing element 2200A is to perform an arithmetic operation such as an add or a subtract and processing element 2220B is to perform a compare operation (e.g., in order to determine whether or not an additional arithmetic operation should be triggered). This may be used in loop processing where the number of iterations is determined by repeatedly incrementing and/or decrementing a base data value by a certain stride data value till a particular threshold value is reached or crossed. The left part (e.g., left half) (e.g., processing element 2200A) of the sequencer dataflow operator 2201 has a (e.g., single) (e.g., 64 bit) register(s) 2244, for example, which is used to accumulate the stride data (e.g., stride data token) repeatedly into the base data (e.g., base data token). This may be referred to as the sequencer stride PE (seqstr). The right part (e.g., right half) (e.g., processing element 2200B) of the sequencer dataflow operator 2201 has an ALU 2218B, which is used to do comparison operations. This may be referred to as the sequencer compare PE (seqcmp). The compare result may be passed back (e.g., on datapath 2241) from sequencer compare PE (seqcmp) (e.g., processing element 2200B) to the sequencer stride PE (seqstr) (e.g., processing element 2200A), for example, so both PEs together decide when the sequence generation is done (e.g., the sequencer compare PE (seqcmp) (e.g., processing element 2200B) updates the sequencer stride PE (seqstr) (e.g., processing element 2200A) when the end (e.g., limit or bound) is reached).

In one embodiment, data passed into the sequencer dataflow operator 2201 includes a new strided length, e.g., where processing element 2200A is performing the add (or subtract) of the strided length to the total number of strides (e.g., iterations) thus far and processing element 2200B is performing the compare of that total number of strides (e.g., iterations) thus far to the total number of strides (e.g., iterations) to be performed (e.g., "n" or "A" in FIGS. 3A-3C). In one embodiment, sequencer dataflow operator 2201 (e.g., processing element 2200A) includes a sequencer stride controller 2242, e.g., to track the arrival of the base value data token and the stride value data token. As soon as the base value data token has arrived, sequencer stride controller 2242 may send a signal to the sequencer compare PE (seqcmp) (e.g., processing element 2200B) so that the compare operation may then begin. The sequencer compare controller 2240 may monitor the arrival of a bound value data token in addition to monitoring the base value data token arrival signal from the sequencer stride controller 2242 in order to determine when a valid compare result may be generated. The sequencer stride controller 2242 may then determine if an additional arithmetic operation (e.g., incrementing or decrementing) should be triggered based on the actual value of a valid compare result (e.g., the value one indicating an additional arithmetic operation should be triggered and the value zero indicating this particular sequence generation is finished). In addition, the sequencer stride controller 2242 may decide the input operand(s) for the additional arithmetic operation. For the first iteration, the base value data token may be the input operand. For all subsequent iterations, the register file 2244 output may be the input operand. The second input operand for the arithmetic operation may always be the stride data token in one embodiment. The combination of sequencer stride controller 2242 and sequencer compare controller 2240 may generate up to three control streams (or predicate streams) used in loop processing. One is called the first stream. The beginning data token of the first stream may always be one, e.g., indicating that the $1^{st}$ iteration of the loop may commence. All subsequent data tokens until the Nth iteration of the loop may have the value zero. As shown in FIG. 3C, the pick operator 304A may be controlled by the "first" stream generated by the sequencer dataflow operator 310A. In the first iteration of the loop, the initial value of "res" in FIG. 3A, e.g., X in FIG. 3C, will be the output of the pick operator 304A that is fed to the multiplier 308A. (e.g., in reference to FIG. 4, one can see that the inverse of first stream is applied to the pick operator 404. In the first loop iteration, the value of one is passed to the multiplier 408 in step 3. In the second loop iteration, the loop-back value of two is passed to the multiplier 408 in step 6.)

The next control stream (or predicate stream) that a sequencer data flow operator may generate is called the last stream. For a loop with N iterations, the control data token associated with the Nth iteration may have the value one. The control data token associated with all prior iterations may have the value zero. As shown in FIG. 3C, the switch operator 306A may be controlled by the last stream generated by the sequencer dataflow operator 310A (e.g., in reference to FIG. 4, the inverse of the last stream is applied to the switch operator 406. In the first loop iteration, the output value of two is looped back to the pick operator 404 in step 5, which will become the data input for the second loop iteration. In the second and final loop iteration, the final output value of four is sent downstream for further processing in step 8)

The final control stream (or predicate stream) that a sequencer data flow operator may generate is called the predicate stream. For every iteration of the loop, a data token value of one may be generated. When the loop is finished, a data token value of zero may be generated. To accumulate an incremental value for each iteration of the loop and store the final accumulated value at loop exit, a processing element may use a control stream like this. In one embodiment, it is incorrect to use the last stream for this use case when it is not desired to skip the final accumulation during the final iteration of the loop.

Sequencer compare controller 2240 may cause the processing element 2200B to perform the compare of that total number of strides (e.g., iterations) thus far (e.g., stored in register(s) 2244) to the total number of strides (e.g., iterations) to be performed (e.g., stored in register(s) 2244) (e.g., "n" or "A" in FIGS. 3A-3C). Sequencer dataflow operator 2201 (e.g., processing element 2200A) may include a sequencer stride controller 2242. Sequencer stride controller 2242 may cause the processing element 2200A to perform the add (or subtract) of the strided length (e.g., increment for each iteration) (e.g., in one embodiment, the strided length is one unit (e.g., a numerical one)) to the total number of strides (e.g., iterations) thus far (e.g., "res" in FIG. 3A). For each iteration of the operation (e.g., for-loop), sequencer dataflow operator 2201 may output the appropriate control signals (e.g., to a pick operator (e.g., implemented on its own PE and/or switch operator (e.g., implemented on its own PE)) (for example, the control signals depicted inside the circles in FIG. 8 (steps 1-8) to cause each iteration of the total number of iterations to be performed. In one embodiment, the control signals are carried on a (e.g., narrower than the payload data) control data channel (e.g., using control input buffer 922 and/or control output buffer 932 in FIG. 9). Another possible implementation of a sequencer dataflow operator is to use a single integer PE that contains two ALUs (e.g., one is used for accumulation and the other is used for comparison). The two ALUs may be pipelined (e.g., with additional pipeline hazard control circuitry) to maximize circuit frequency and/or the two ALUs may be put in series in a single clock cycle, e.g., to simplify the controller. In one embodiment, data passed into the sequencer dataflow operator 2201 includes a new strided length, e.g., where processing element 2200A is performing the add (or subtract) of the strided length to the total number of strides (e.g., iterations) thus far and processing element 2200B is performing the compare of that total number of strides (e.g., iterations) thus far to the total number of strides (e.g., iterations) to be performed (e.g., "n" or "A" in FIGS. 3A-3C).

Additionally or alternatively to forming a sequencer dataflow operator, each of processing elements 2200A and 2200B may perform as an integer PE.

In one embodiment, operation configuration register 2109A is loaded during configuration (e.g., mapping) and specifies the particular operation (or operations) this processing (e.g., compute) element is to perform. Scheduler 2114A (e.g., operations selector) may schedule an operation or operations of processing element 2100A, for example, when input data and control input arrives. Input and outputs (e.g., via buffer(s)) may be sent via a network, e.g., any network discussed herein. Control input buffer 2122A may be connected to local network (e.g., and local network may include a data path network as in FIG. 7A and a flow control path network as in FIG. 7B) and is loaded with a value when it arrives (e.g., the network has a data bit(s) and valid bit(s)). Control input buffer 2222A may be coupled to zero generator 2225A, e.g., to add leading or trailing zeros to the value from control input buffer 2222A to form a desired width of data item (e.g., 64 bits). Control output buffer 2232A, data output buffer 2234A, and/or data output buffer 2236A may receive an output of processing element 2200A, e.g., as controlled by the operation (an output of scheduler 2214A). In one embodiment, operation configuration register 2209A is loaded during configuration (e.g., mapping) and specifies the particular operation (or operations) this processing (e.g., compute) element is to perform (e.g., and if adjacent PE 2200B is to be used for a joint operation, e.g., a sequence operation). Data in control input buffer 2222A and control output buffer 2232A may be a single bit. Mux 2221A (e.g., operand A) and mux 2223A (e.g., operand B) may source inputs.

For example, suppose the operation of this processing (e.g., compute) element is (or includes) what is called call a pick in FIG. 3B. The processing element 2200A then is to select data from either data input buffer 2224A or data input buffer 2226A, e.g., to go to data output buffer 2234A (e.g., default) or data output buffer 2236A. The control bit in 2222A may thus indicate a 0 if selecting from data input buffer 2224A or a 1 if selecting from data input buffer 2226A.

For example, suppose the operation of this processing (e.g., compute) element is (or includes) what is called call a switch in FIG. 3B. The processing element 2200A is to output data to data output buffer 2234A or data output buffer 2236A, e.g., from data input buffer 2224A (e.g., default) or data input buffer 2226A. The control bit in 2222A may thus indicate a 0 if outputting to data output buffer 2234A or a 1 if outputting to data output buffer 2236A.

Multiple networks (e.g., interconnects) may be connected to a processing element, e.g., (input) networks (e.g., networks 902, 904, 906 and (output) networks 908, 910, 912 in FIG. 9). The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network may be (e.g., set up as a control interconnect) switched (e.g., connected) to couple to control input buffer 2222A. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input buffer 2222A, e.g., to indicate to the upstream producer (e.g., PE) that a new control input value is not to be loaded into (e.g., sent to) control input buffer 2222A until the backpressure signal indicates there is room in the control input buffer 2222A for the new control input value (e.g., from a control output buffer of the upstream producer). In one embodiment, the new control input value may not enter control input buffer 2222A until both (i) the upstream producer receives the "space available" backpressure signal from "control input" buffer 2222A and (ii) the new control input value is sent from the upstream producer, e.g., and this may stall the processing element 2200A until that happens (and space in the target, output buffer(s) is available).

Data input buffer 2224A and data input buffer 2226A may perform similarly, e.g., local network (e.g., set up as a data (as opposed to control) interconnect) may be switched (e.g., connected) to couple to data input buffer 2224A. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input buffer 2224A, e.g., to indicate to the upstream producer (e.g., PE) that a new data input value is not to be loaded into (e.g., sent to) data input buffer 2224A until the backpressure signal indicates there is room in the data input buffer 2224A for the new data input value (e.g., from a data output buffer of the upstream producer). In one embodiment, the new data input value may not enter data input buffer 2224A until both (i) the upstream producer receives the "space available" backpressure signal from "data input" buffer 2224A and (ii) the new data input value is sent from the upstream producer, e.g., and this may stall the processing element 2200A until that happens (and space in the target, output buffer(s) is available). A control output value and/or data output value may be stalled in their respective output buffers (e.g., 2232A, 2234A, 2236A) until a backpressure signal indicates there is available space in the input buffer for the downstream processing element(s).

A processing element 2200A may be stalled from execution until its operands (e.g., a control input value and its corresponding data input value or values) are received and/or until there is room in the output buffer(s) of the processing element 2200A for the data that is to be produced by the execution of the operation on those operands.

In one embodiment, operation configuration register 2209B is loaded during configuration (e.g., mapping) and specifies the particular operation (or operations) this processing (e.g., compute) element is to perform. Scheduler 2214B (e.g., operations selector) may schedule an operation or operations of processing element 2200A, for example, when input data and control input arrives. Input and outputs (e.g., via buffer(s)) may be sent via a network, e.g., any network discussed herein. Control input buffer 2222B may be connected to local network (e.g., and local network may include a data path network as in FIG. 7A and a flow control path network as in FIG. 7B) and is loaded with a value when it arrives (e.g., the network has a data bit(s) and valid bit(s)). Control input buffer 2222B may be coupled to zero generator 2225B, e.g., to add leading or trailing zeros to the value from control input buffer 2222B to form a desired width of data item (e.g., 64 bits). Control output buffer 2232B, data output buffer 2234B, and/or data output buffer 2236B may receive an output of processing element 2200B, e.g., as controlled by the operation (an output of scheduler 2214B). In one embodiment, operation configuration register 2209B is loaded during configuration (e.g., mapping) and specifies the particular operation (or operations) this processing (e.g., compute) element is to perform (e.g., and if adjacent PE 2200A is to be used for a joint operation, e.g., a sequence operation). In one embodiment, operation configuration register 2209A and operation configuration register 2209B are loaded with data according to the formats discussed herein (e.g., in FIGS. 23-26). Data in control input buffer 2222B and control output buffer 2232B may be a single bit. Mux 2221B (e.g., operand A) and mux 2223B (e.g., operand B) may source inputs.

For example, suppose the operation of this processing (e.g., compute) element is (or includes) what is called call a pick in FIG. 3B. The processing element 2200B then is to select data from either data input buffer 2224B or data input buffer 2226B, e.g., to go to data output buffer 2234B (e.g., default) or data output buffer 2236B. The control bit in 2222B may thus indicate a 0 if selecting from data input buffer 2224B or a 1 if selecting from data input buffer 2226B.

For example, suppose the operation of this processing (e.g., compute) element is (or includes) what is called call a switch in FIG. 3B. The processing element 2200B is to output data to data output buffer 2234B or data output buffer 2236B, e.g., from data input buffer 2224B (e.g., default) or data input buffer 2226B. The control bit in 2222B may thus indicate a 0 if outputting to data output buffer 2234B or a 1 if outputting to data output buffer 2236B.

Multiple networks (e.g., interconnects) may be connected to a processing element, e.g., (input) networks (e.g., networks 902, 904, 906 and (output) networks 908, 910, 912 in FIG. 9). The connections may be switches, e.g., as discussed in reference to FIGS. 7A and 7B. In one embodiment, each network includes two sub-networks (or two channels on the network), e.g., one for the data path network in FIG. 7A and one for the flow control (e.g., backpressure) path network in FIG. 7B. As one example, local network may be (e.g., set up as a control interconnect) switched (e.g., connected) to couple to control input buffer 2222B. In this embodiment, a data path (e.g., network as in FIG. 7A) may carry the control input value (e.g., bit or bits) (e.g., a control token) and the flow control path (e.g., network) may carry the backpressure signal (e.g., backpressure or no-backpressure token) from control input buffer 2222B, e.g., to indicate to the upstream producer (e.g., PE) that a new control input value is not to be loaded into (e.g., sent to) control input buffer 2222B until the backpressure signal indicates there is room in the control input buffer 2222B for the new control input value (e.g., from a control output buffer of the upstream producer). In one embodiment, the new control input value may not enter control input buffer 2222B until both (i) the upstream producer receives the "space available" backpressure signal from "control input" buffer 2222B and (ii) the new control input value is sent from the upstream producer, e.g., and this may stall the processing element 2200B until that happens (and space in the target, output buffer(s) is available).

Data input buffer 2224B and data input buffer 2226B may perform similarly, e.g., local network (e.g., set up as a data (as opposed to control) interconnect) may be switched (e.g., connected) to couple to data input buffer 2224B. In this embodiment, a data path (e.g., network as in FIG. 7A) may carry the data input value (e.g., bit or bits) (e.g., a dataflow token) and the flow control path (e.g., network) may carry the backpressure signal (e.g., backpressure or no-backpressure token) from data input buffer 2224B, e.g., to indicate to the upstream producer (e.g., PE) that a new data input value is not to be loaded into (e.g., sent to) data input buffer 2224B until the backpressure signal indicates there is room in the data input buffer 2224B for the new data input value (e.g., from a data output buffer of the upstream producer). In one embodiment, the new data input value may not enter data input buffer 2224B until both (i) the upstream producer receives the "space available" backpressure signal from "data input" buffer 2224B and (ii) the new data input value is sent from the upstream producer, e.g., and this may stall the processing element 2200B until that happens (and space in the target, output buffer(s) is available). A control output value and/or data output value may be stalled in their respective output buffers (e.g., 2232B, 2234B, 2236B) until a backpressure signal indicates there is available space in the input buffer for the downstream processing element(s).

A processing element 2200B may be stalled from execution until its operands (e.g., a control input value and its corresponding data input value or values) are received and/or until there is room in the output buffer(s) of the processing element 2200B for the data that is to be produced by the execution of the operation on those operands.

In certain embodiments, a processing element (PE_ has one or a plurality of (e.g., two or three) operations that it may perform, e.g., the PE may be configured based on the input of the operation (e.g., operation value) into a PE.

Figure 23:
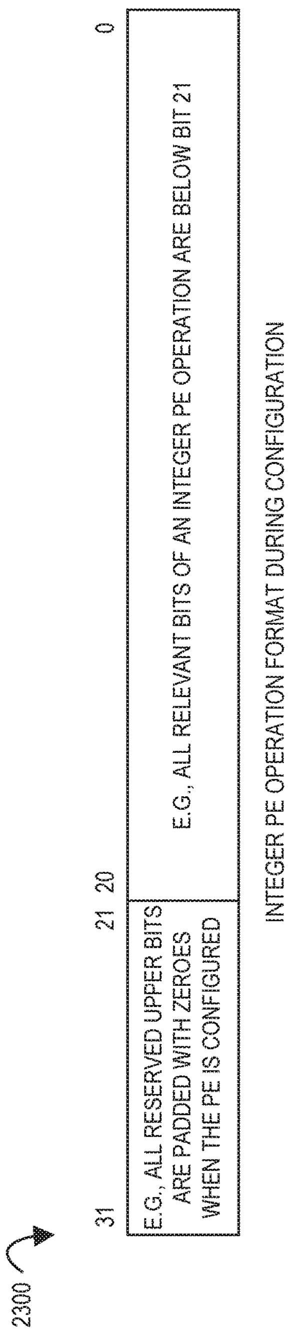
FIG. 23 illustrates an example operation format for an integer arithmetic/logic dataflow operator implementation on a processing element according to embodiments of the disclosure.

FIG. 23 illustrates an example operation format 2300 for an integer arithmetic/logic dataflow operator implementation on a processing element according to embodiments of the disclosure. Although 32-bits width for an operation value is shown, other bit widths are possible (e.g., 64-bits). In the depicted format, (e.g., low) bits 20-0 (e.g., those 21-bits) are used to instruct a processing element (e.g., a scheduler and/or controller) on the particular operation to perform (e.g., and on which input(s) to use and/or which output(s) to send the resultant to). The other bits (e.g., bits 31-21) may be reserved for other use, e.g., padded with zeros when the PE is configured.

Figure 24:
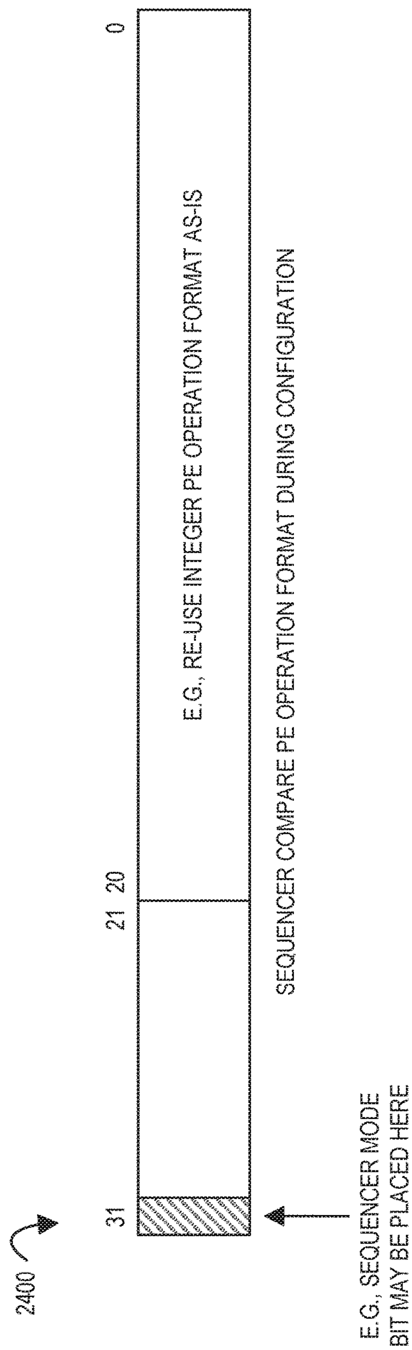
FIG. 24 illustrates an example operation format for a sequencer dataflow operator implementation on processing elements according to embodiments of the disclosure.

FIG. 24 illustrates an example operation format 2400 for a sequencer dataflow operator implementation on processing elements according to embodiments of the disclosure. Although 32-bits width for an operation value is shown, other bit widths are possible (e.g., 64-bits). In the depicted format, (e.g., low) bits 20-0 (e.g., those 21-bits) are used to instruct a processing element (e.g., a scheduler and/or controller) on the particular operation to perform (e.g., and on which input(s) to use and/or which output(s) to send the resultant to). Another bit or bit (e.g., the other bits (e.g., bits 31-21) that were reserved for other use in format 2300 of FIG. 23, e.g., that were padded with zeros when the PE is configured) may be used switch between a first mode (e.g., as a stand-alone (e.g., integer) PE) and a second mode (e.g., as a sequencer), e.g., where sequencer mode is a one in the end bit. In one embodiment, by populating the "sequencer mode" bit in one of the (e.g., upper) bits of the configuration operation field, sequencer functionality is binary compatible with an integer PE, for example, to save software engineering cost (e.g., based on the assumption that a configuration operation value is sent in, it utilizes the (e.g., normal) data width of a CSA network (for example, 32-bits or 64-bits) and the integer PE configuration uses less than the full data width (for example, a configuration instruction for the basic integer PE may be only 21 bits wide). In one embodiment, an operation configuration register (e.g., operation configuration register 2109 in FIG. 21, operation configuration register 2209A, and/or operation configuration register 2209B in FIG. 22) is loaded during configuration (e.g., mapping) and specifies the particular operation (or operations) this processing (e.g., compute) element is to perform, e.g., and couples together two PEs into a single, sequencer dataflow operator implementation. For example, two adjacent PEs may have their circuitry therebetween (e.g., sequencer compare datapath 2243) enabled when both of the adjacent PEs have their sequencer mode bit(s) set, e.g., logically high (e.g., logical 1) for to cause them to work together on a sequence operation. The size of the fields given is merely an example (e.g., a field of 21 bits for an integer PE operation) and other sizes may be utilized in certain embodiments. In one embodiment, only a subset of all of the PEs in an array may include sequencer functionality.

Figure 25:
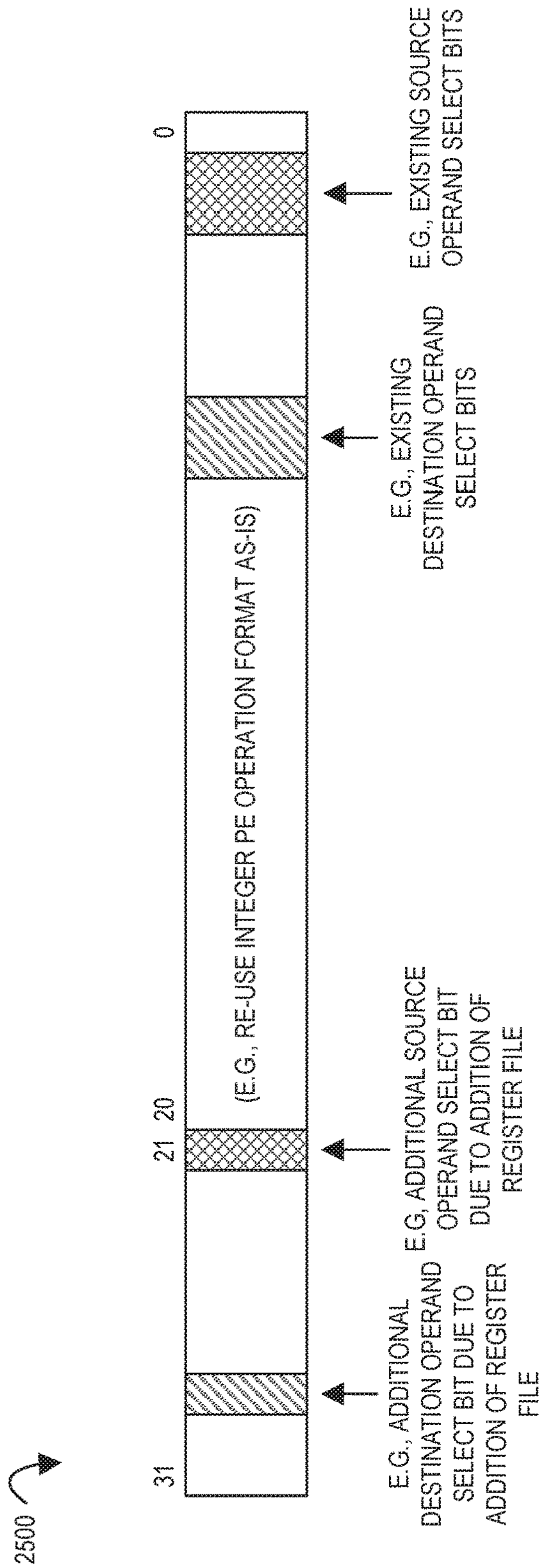
FIG. 25 illustrates an example operation format for a sequencer dataflow operator implementation on processing elements according to embodiments of the disclosure.

FIG. 25 illustrates an example operation format 2500 for a sequencer dataflow operator implementation on processing elements according to embodiments of the disclosure. In one embodiment, operation format 2500 is used with a sequencer stride PE (seqstr) (e.g., processing element 2200A in FIG. 22). Format 2500 includes using an (e.g., as existing in format 2300 or format 2400) destination operand select bit (e.g., to route data to an output buffer) and/or a source operand select bit (e.g., to route data from an input buffer), for example, allowing a PE to source data from and/or save data to buffers/PEs. Another bit or bit (e.g., the other bits (e.g., bits 30-21) that were reserved for other use in format 2400 in FIG. 24, e.g., that were padded with zeros when the PE is configured) may be used to store an additional destination operand select bit (e.g., due to the addition of register(s) 2244) and/or an additional source operand select bit (e.g., due to the addition of register(s) 2244), for example, allowing a PE to source data from and/or save data to register(s) 2244. In one embodiment, format 2500 includes having similar types of fields (e.g., destination and source operand identification bits) grouped together (such as all the input bits, all the output bits, etc.) split apart, e.g., to keep the "integer PE configuration operation" format intact.

Figure 26:
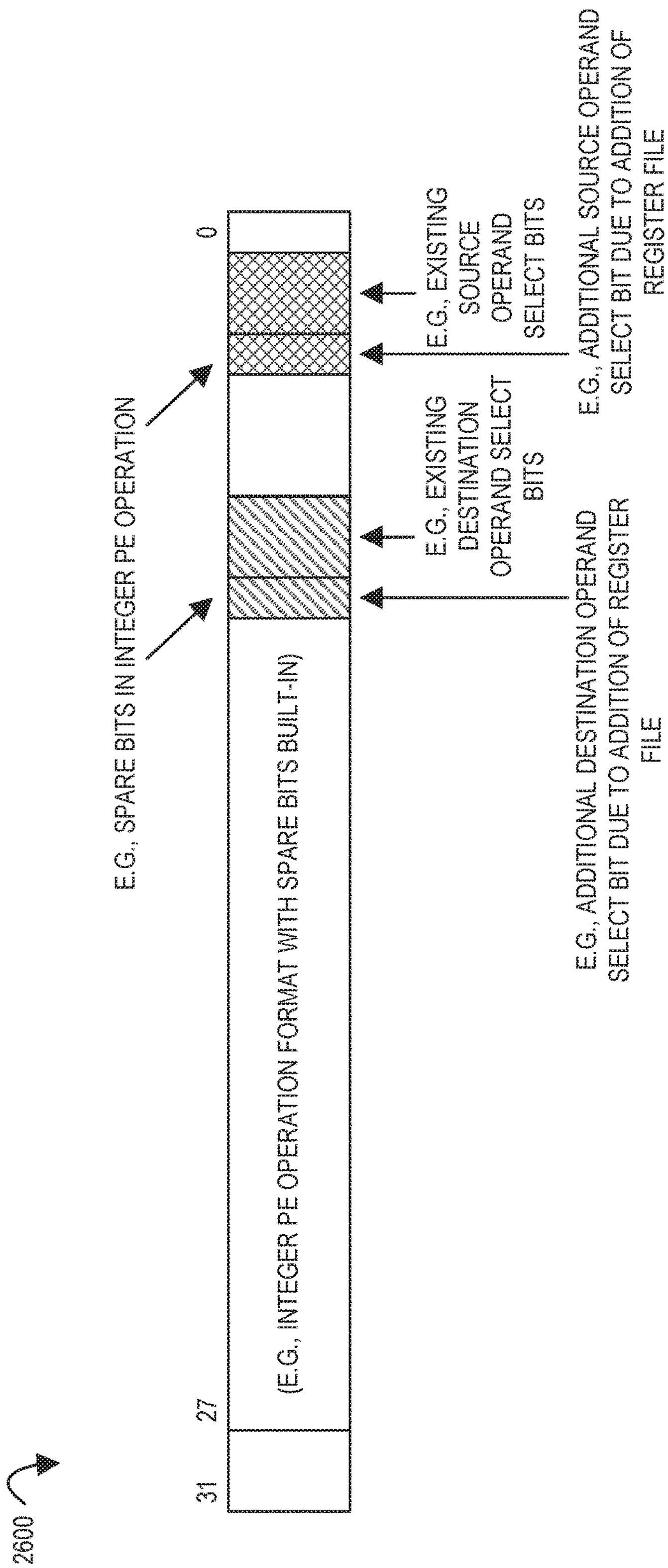
FIG. 26 illustrates an example operation format for a sequencer dataflow operator implementation on processing elements according to embodiments of the disclosure.

FIG. 26 illustrates an example operation format 2600 for a sequencer dataflow operator implementation on processing elements according to embodiments of the disclosure. Another possible alternative is to have reserved (e.g., spare) bits in the configuration bits (e.g., in bits 27-0). This may have the advantage of lowering software engineering cost to achieve binary compatibility. Referring to the sequencer dataflow operator 2201 in FIG. 22 (e.g., one of the possible sequencer dataflow operator implementations), in order to achieve a reasonable cycle time, the two ALUs used by the sequencer dataflow operator 2201 may not be in series in the same clock cycle (e.g., the output of ALU 2218A in sequencer stride (seqstr) processing element 2200A is first latched in the (e.g., 64-bit) register 2244 before being passed to sequencer compare (seqcmp) processing element 2200B, e.g., and input to ALU 2218B) on the sequencer compare datapath 2243. Therefore, in certain embodiments it is possible to make a CSA that achieves the same frequency of a processor core (e.g., about 4-5 GHz.). This may include programming the CSA to avoid pipeline hazards in order to have the correct functional behavior, e.g., when backpressure occurs or input arrival time is delayed arbitrarily, caused by pipelining the two ALUs. A processing element may include a multiplier, a shifter, and/or some other special purpose ALU (e.g., in sequencer stride (seqstr) processing element 2200A) if a particular application can utilize such a sequence generation algorithm. Similarly, a sequencer design may be extended to floating point arithmetic/comparison or any other logic/arithmetic expressions if such a sequence generation algorithm becomes desirable for use in a CSA. In one embodiment, by carefully aligning its control and internal reset signals to various controllers (e.g., finite-state machines (FSMs) and triggered control circuitry, a sequencer may be self cleaning. In other words, when a full sequence is generated based on the current set of 3 data input tokens (e.g., base, stride, and bound), all 3 data inputs (e.g., data tokens) may be dequeued cleanly so the sequencer may accept a new set of data tokens to generate a new sequence. This may be useful for nested loop without requiring reconfiguring the CSA (e.g., PEs and/or the interconnect of the CSA).

Control Paradigm

At an individual processing element level, dataflow architecture used inside a CSA may be very energy efficient when the circuit is only switching and doing useful computation/data transport when input data (e.g., data token(s)) are available and there is no backpressure for the corresponding output data (e.g., data token(s)). However, a sequencer dataflow operator may use more data input operands and may generate more output data operands (e.g., token streams), for example, where the corresponding dataflow architectural controller/scheduler may be significantly more expensive in terms of its area/energy cost. Supporting more modes/functionalities to satisfy the semantics of high level programming constructs may further exacerbate this area/energy issue in certain embodiments. While it is possible to expand dataflow architecture programmable state at the dataflow operator level to implement all the required functionalities, certain embodiments herein include a new control paradigm that augments dataflow PEs with the ability to have (e.g., small) embedded finite state machine(s) (FSM) to implement the same set of functionalities at lower energy/area cost and greater flexibility. To simplify the implementation, certain embodiments herein allow a PE to partially exit dataflow mode and instead use one or more of the embedded state machines, and return to full dataflow style later. This allows certain embodiments to implement the (e.g., a subset of) stateful functions without being punished by the overhead of a fully general scheme. An additional advantage in certain embodiments is that those embedded state machines may be largely decoupled from the main dataflow architecture and allow the sequencer dataflow operator to still operate as (e.g., an integer) PE, e.g., to maximize active silicon area utilization. As discussed below, shall the flexibility of this hybrid dataflow/embedded state machine approach may also allow us to easily extend the microarchitecture for additional modes/functionalities when desired. Certain embodiments herein augment a dataflow architecture with embedded state machines, e.g., to allow a more complex dataflow operator (e.g., such as the sequencer) to transition among the various control paradigms seamlessly with greater flexibility and lower area/energy cost to achieve the same set of functionalities.

Certain embodiments herein utilize a single PE with embedded state machines to distributes control where it is needed and since each of the embedded state machine may be (e.g., very) smaller (e.g., in silicon area) than including a separate operation for each of the state machines functions, it allows greater flexibility, lower energy/area cost, and better scalability for certain (e.g., more complex) dataflow operators.

Figure 27:
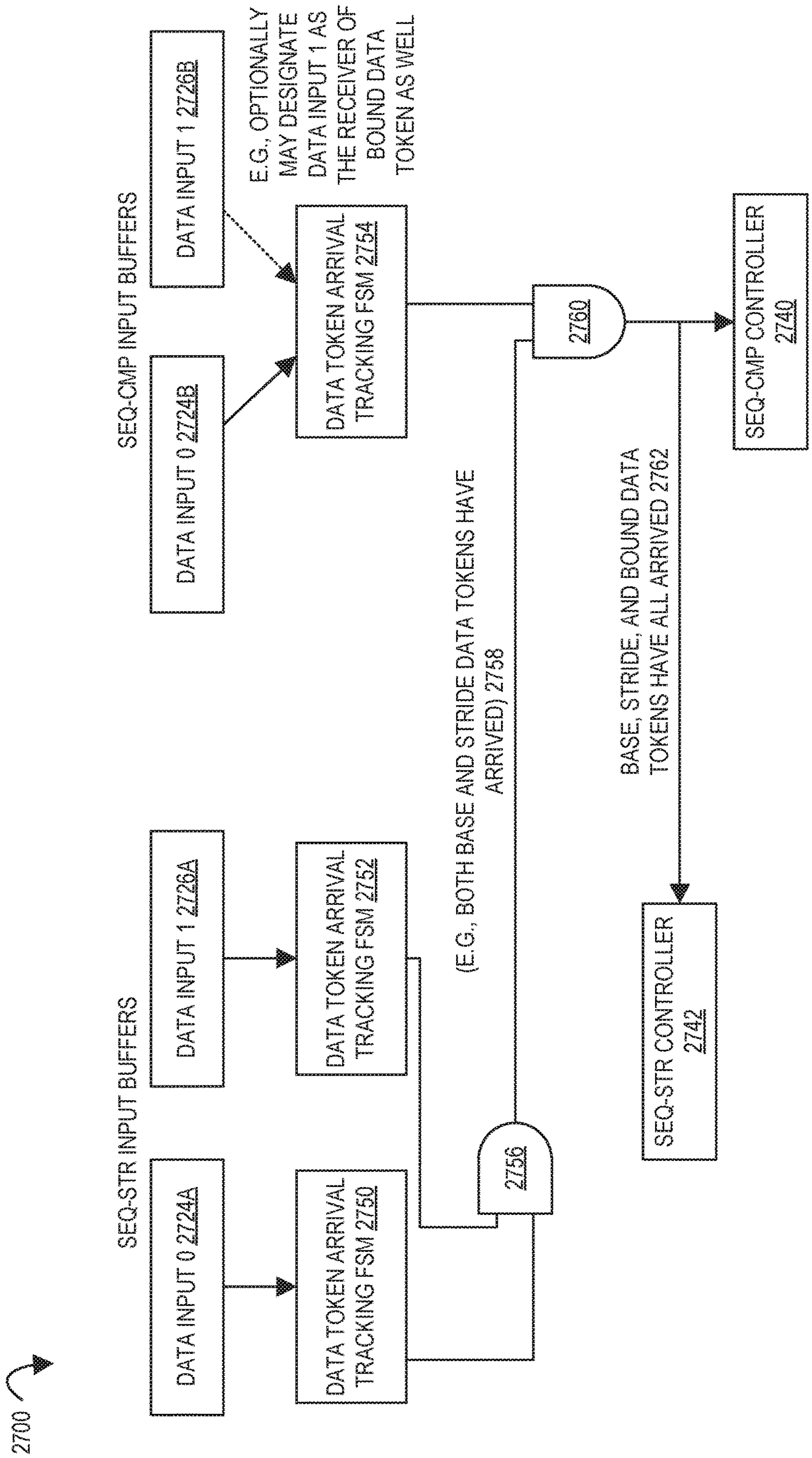
FIG. 27 illustrates circuitry 2700 for a sequencer dataflow operator implementation on a single processing element according to embodiments of the disclosure.

FIG. 27 illustrates circuitry 2700 for a sequencer dataflow operator implementation on a plurality of processing elements according to embodiments of the disclosure. As shown in FIG. 27 (for example, showing portions of the sequencer stride (seqstr) processing element 2200A of FIG. 22 and portions of the sequencer compare (seqcmp) processing element 2200B of FIG. 22, e.g., that share the last two numbers in their reference numbers), the circuitry 2700 is to accommodate that due the LICs (latency insensitive channels), the base (e.g., starting value) data token and stride data token may arrive at arbitrary times and/or in arbitrary order. Two (e.g., small and/or identical) finite state machines (FSMs) (2750, 2752) (e.g., of sequencer stride (seqstr) processing element 2200A of FIG. 22) are used to track the arrival of those two data tokens (for example, at input buffer 2724A and input buffer 2726A, respectively, e.g., corresponding to input buffer 2224A and input buffer 2226A in FIG. 22). In one implementation, FSM 2750 and 2752 may both have only two states. One state is in_reset/invalid/ data_token_has_not_arrived. The other state is out_of_reset/valid/data_token_has_arrived. Implementations with more states are possible in certain embodiments. For example, if the arithmetic operation used for the sequencer is power-hungry and/or is deemed to be infrequent, power savings may be obtained by including states such as sleep state, wake-up state, fully-powered/active state, etc. to provide the option to power-gate and/or clock-gate the (e.g., arithmetic) circuitry used inside the sequencer. An AND logic gate 2756 may receive an input (e.g., logical one) from each of the FSMs (2750, 2752) indicate when each received their respective data token (e.g., base value (e.g., base token) in one buffer of (2724A, 2726A) and the stride value (e.g., data token) in the other buffer of (2724A, 2726A), e.g., indicating that that both the base and stride data tokens have arrived. Datapath 2758 (e.g., single wire) may couple the output of first AND logic gate 2756 to a second AND logic gate 2760. Second AND logic gate 2760 may also take, as input, an output from FSM 2754 (e.g., of sequencer compare (seqcmp) processing element 2200B of FIG. 22). FSM 2754 may receive an input and indicate when a bound data token (e.g., bound value (e.g., bound token) is in one (e.g., either) of buffers (2724B, 2726B) In one implementation, FSM 2754 may have only two states. One state is in_reset/invalid/data_token_has_not_arrived. The other state is out_of_reset/valid/data_token_has_arrived. Implementations with more states are possible in certain embodiments. For example, states may be included such that the bound data token may arrive from either input buffer 2724B or 2726B to increase network routing flexibility. For example, states may be included that restrict the bound data token to only arrive from one or a particular subset of input buffers. If the dynamic reconfiguration time for changing that restriction allows, certain embodiments may have multiple loops sharing one sequencer for loop control stream generation. By combining the output from FSM 2750 and FSM 2752, this scheme may have the benefit of reducing wire count (e.g., using 1 wire (e.g., datapath 2758) instead of 2 wires between the two adjacent PEs to signal the arrival of both data tokens. FSM 2754 may keep track of whether the "bound" data_token_has_arrived (e.g., in either of input buffer 2724B or input buffer 2726B) or not and a single "valid" signal (e.g., on datapath 2762) may be used to signal the seqstr controller 2742 and/or the seccmp controller 2740 that the valid comparison result can be generated (e.g., since the "base" token, "stride" token, and the "bound" token have arrived already). This may also create the flexibility to designate one or both (e.g., wide data) input buffers (e.g., the corresponding channels) as possible receivers of the "bound" data token in seqcmp PE's, and seqstr PE's complexity does not increase in certain embodiments by adding that functionality in the seqcmp PE. Similarly, network channel binding may have different options on the seqstr PE side (e.g., for base and stride data tokens) and not increase seqcmp PE complexity.

Figure 28:
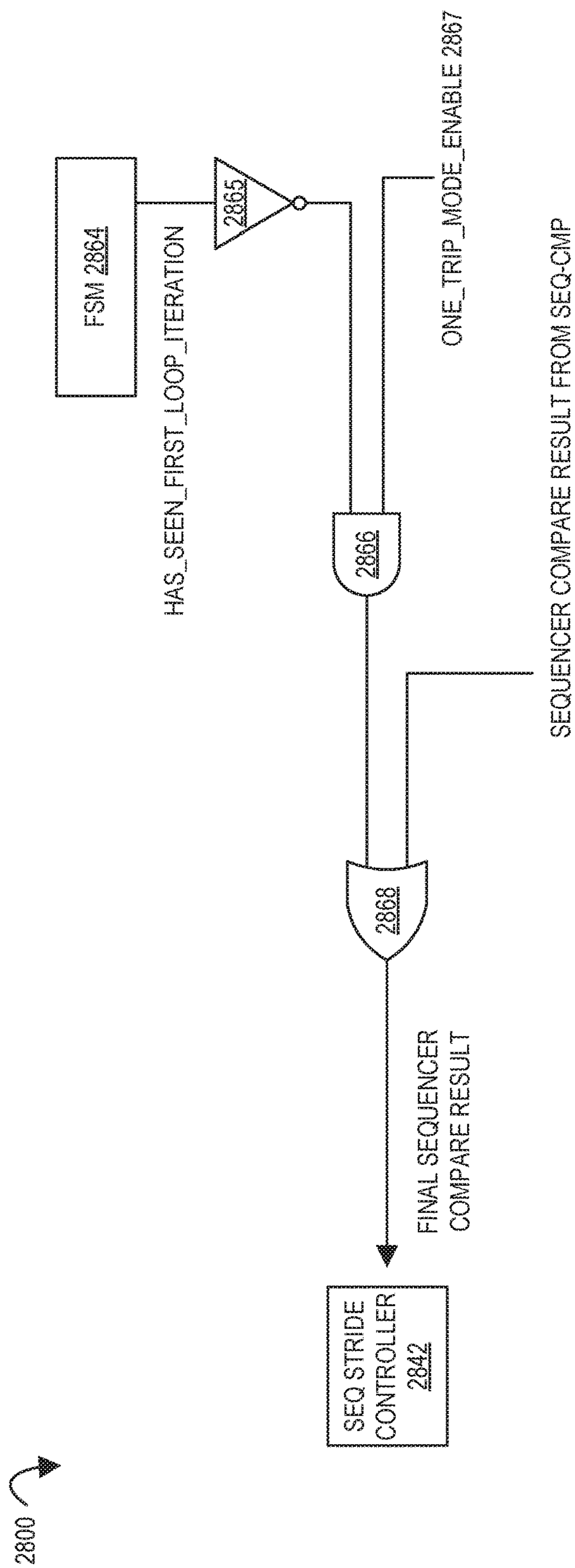
FIG. 28 illustrates circuitry to support one trip mode for a sequencer dataflow operator implementation on a single processing element according to embodiments of the disclosure.

FIG. 28 illustrates circuitry 2800 to support one trip mode for a sequencer dataflow operator implementation on a single processing element according to embodiments of the disclosure. As shown in FIG. 28 (for example, showing portions of the sequencer stride (seqstr) processing element 2200A of FIG. 22, e.g., that share the last two numbers in their reference numbers), in order to support the semantics of (e.g., C programming language) do-while loop construct (e.g., where the do-while loop will execute at least one iteration of the loop regardless of whether the first comparison succeeds or fails), the sequencer dataflow operator supports a special mode called one trip mode (one_trip_mode). A (e.g., small) FSM 2864 forces a comparison "success" value just for the first iteration of the loop to support this functionality without touching the existing dataflow architecture and/or the default mode sequencer controller. In one embodiment, FSM 2864 has two states. One state is in_reset/first_iteration_not_seen_yet and the other state is out_of_reset_and_first_iteration_is_done. In one embodiment, FSM 2864 outputs a logical one (e.g., voltage signal corresponding to logical one) until the FSM 2864 has seen the first loop iteration. That logical one hits inverter (e.g. NOT) logic gate 2865, so that when the inverter logic gate 2868 receives a zero from the FSM 2864 to indicate that the first loop iteration is incoming, the invertor logic gate 2865 outputs a logical one. If the one trip mode is enabled (e.g., a one on signal input 2867) here, then the AND logic gate 2866 will output a one initially, which will be output from OR logic gate 2868 to cause an (e.g., the first) iteration of the loop to be performed, e.g., by seqstr controller 2842 (e.g., corresponding to seqstr controller 2242 of FIG. 22). Once the first iteration of the loop is complete, the combination of invertor 2865 and logic gate 2866 may ensure additional loop iterations are not forced by the FSM 2864 (e.g., one trip mode circuitry). Additionally, a signal (e.g., logical one) may be output from sequencer compare (seqcmp) processing element (e.g., on datapath 2241 of processing element 2200B in FIG. 22) to OR logic gate 2868 to cause other iterations of the loop to be performed, e.g., by seqstr controller 2842 (e.g., corresponding to seqstr controller 2242 of FIG. 22). Although logical ones and zeros have been discussed, other signals may be utilized, e.g., the inverse of the discussed ones and zeros.

Figure 29:
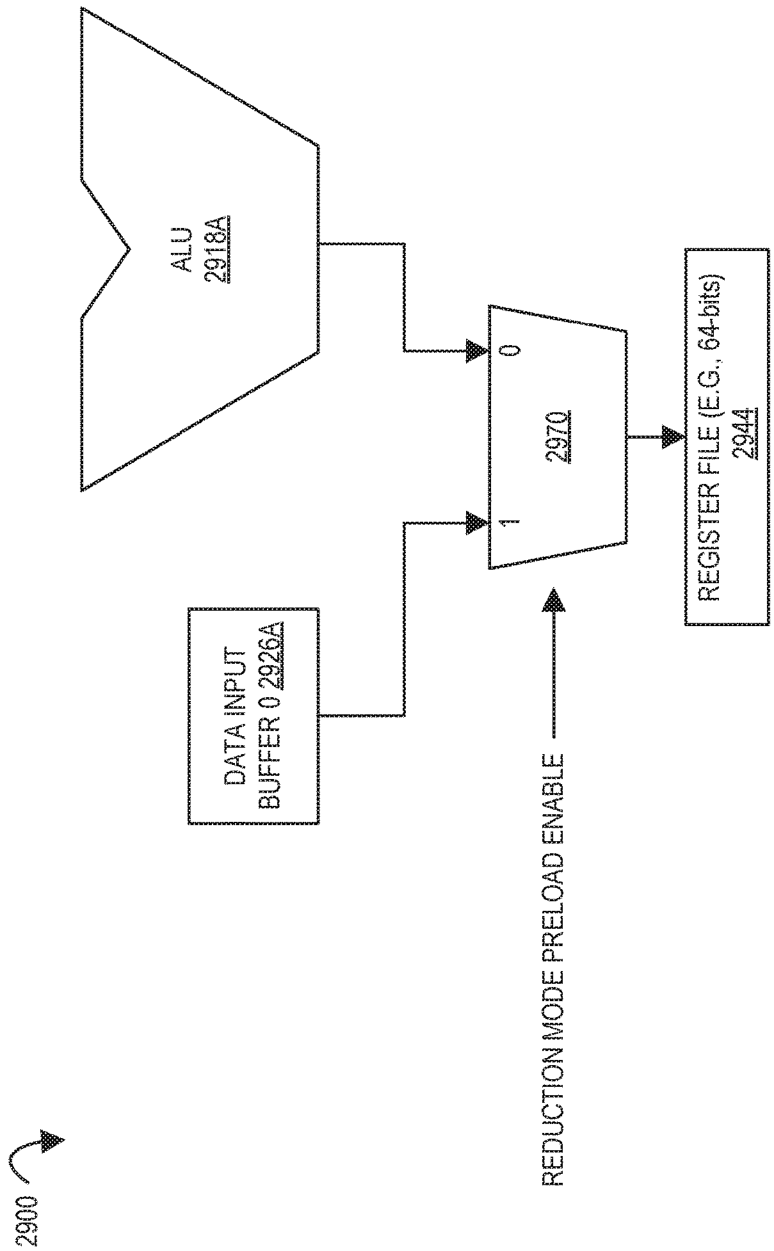
FIG. 29 illustrates circuitry to support reduction mode for a sequencer dataflow operator implementation on a single processing element according to embodiments of the disclosure.

FIG. 29 illustrates circuitry 2900 to support reduction mode for a sequencer dataflow operator implementation on a single processing element according to embodiments of the disclosure. As shown in FIG. 29 (for example, showing portions of the sequencer stride (seqstr) processing element 2200A of FIG. 22, e.g., that share the last two numbers in their reference numbers), the circuitry 2900 is to include a reduction mode, e.g., to reconfigure the sequencer stride (seqstr) processing element as a reduction operator. Given the semantics of reduction operation (e.g., the very first one in the control channel causes the accumulation to occur) so the (e.g., 64-bit) register file 2944 (e.g., register file 2244 in FIG. 22) is the source operand for the ALU 2918A (e.g., ALU 2218A in FIG. 22) from the very beginning so the "base" value is preloaded into the register file 2944. For loop constructs, on the other hand, there may be no need to preload the (e.g., 64-bit) register file 2944 since the first value stream data output token will be sourced from the input data buffer 2926A (e.g., channel) directly. Input data buffer 2926A may be input data buffer 2224A or input data buffer 2226A in FIG. 22. In certain embodiments herein, a CSA does not require dedicated hardware for reduction operators and may reuse a sequencer stride PE instead. Multiplexer 2970 may receive input signal to switch between sequencer stride mode (e.g., logical zero) and reduction mode (e.g., logical zero). In the reduction mode, data (e.g., base value) may be loaded from input data buffer 2926A to register file 2944 through multiplexer 2970. In the sequencer stride mode, the ALU 2918A may send data to register file 2944 (e.g., as ALU 2218A sends data to register file 2244 in FIG. 22) through multiplexer 2970.

Figure 30:
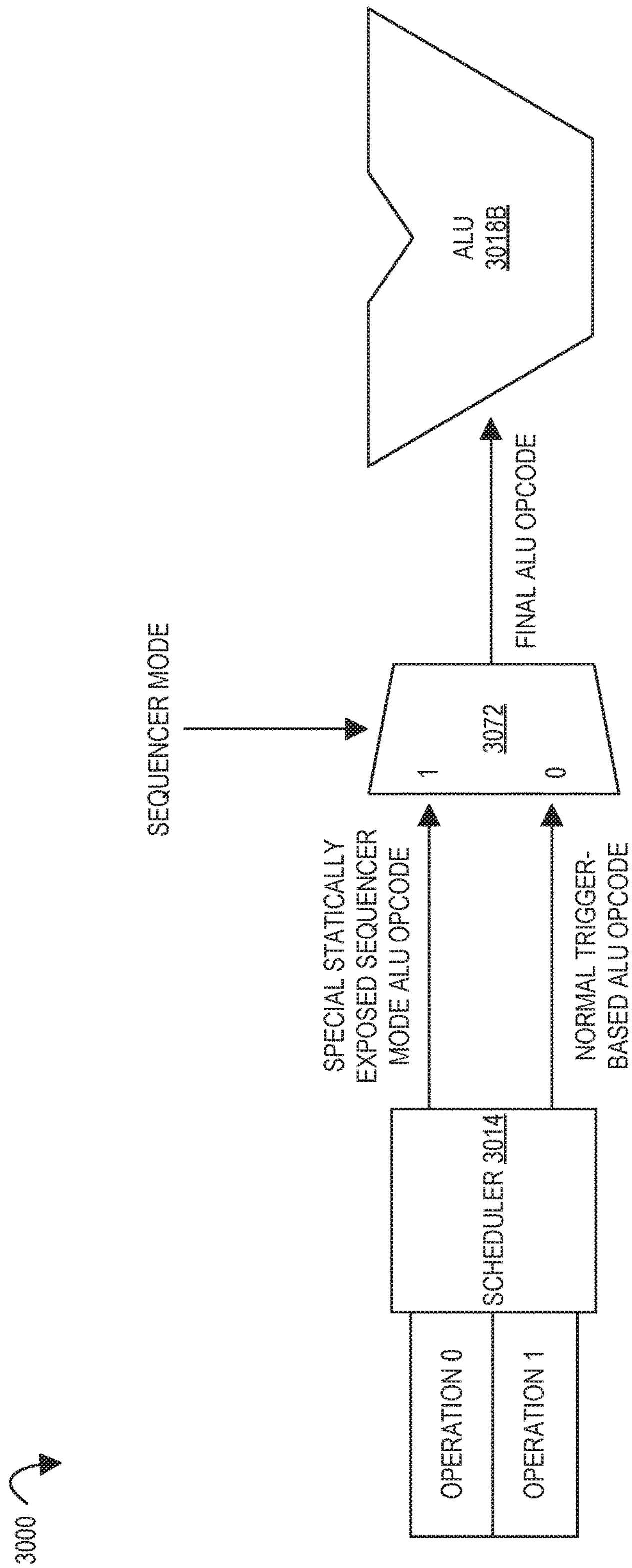
FIG. 30 illustrates circuitry to switch to sequencer mode for a sequencer dataflow operator implementation on a single processing element according to embodiments of the disclosure.

FIG. 30 illustrates circuitry 3000 to switch to sequencer mode for a sequencer dataflow operator implementation on a single processing element according to embodiments of the disclosure. As shown in FIG. 30 (for example, showing portions of the sequencer compare (seqcmp) processing element 2200B, e.g., that share the last two numbers in their reference numbers), the circuitry 3000 is to save energy cost (and a departure from dataflow architecture) in that once the seqcmp PE is configured, the comparison opcode (e.g., from the scheduler 3014) that feeds the ALU 3018B is statically exposed to that ALU 3018B (e.g., via multiplexer 3072 switching). In one embodiment, the sequencer mode signal comes from a PE configuration register and/or scheduler (e.g., as in FIG. 9, 21, or 22). In one embodiment where multiple operations are possible in a single processing element, the MUX 3072 may be used when it is not possible to statically expose multiple ALU opcodes to a single ALU. In one embodiment, this has an energy advantage over dataflow architecture because the only input that toggles is the "value" stream (e.g., which is base, base+stride, base+ 2*stride, etc.) so the data change entropy is low since only certain (e.g., low order bits in a (e.g. 32-bit or 64-bit) value are expected to change during each loop iteration). In a dataflow architecture, the ALU opcode transitions from 0 to its right value in the same cycle when the data tokens are supplied to the ALU (e.g., a CSA operation is triggered), but this may waste energy (due to extra bit toggling) and may also impact cycle time.

Figure 31:
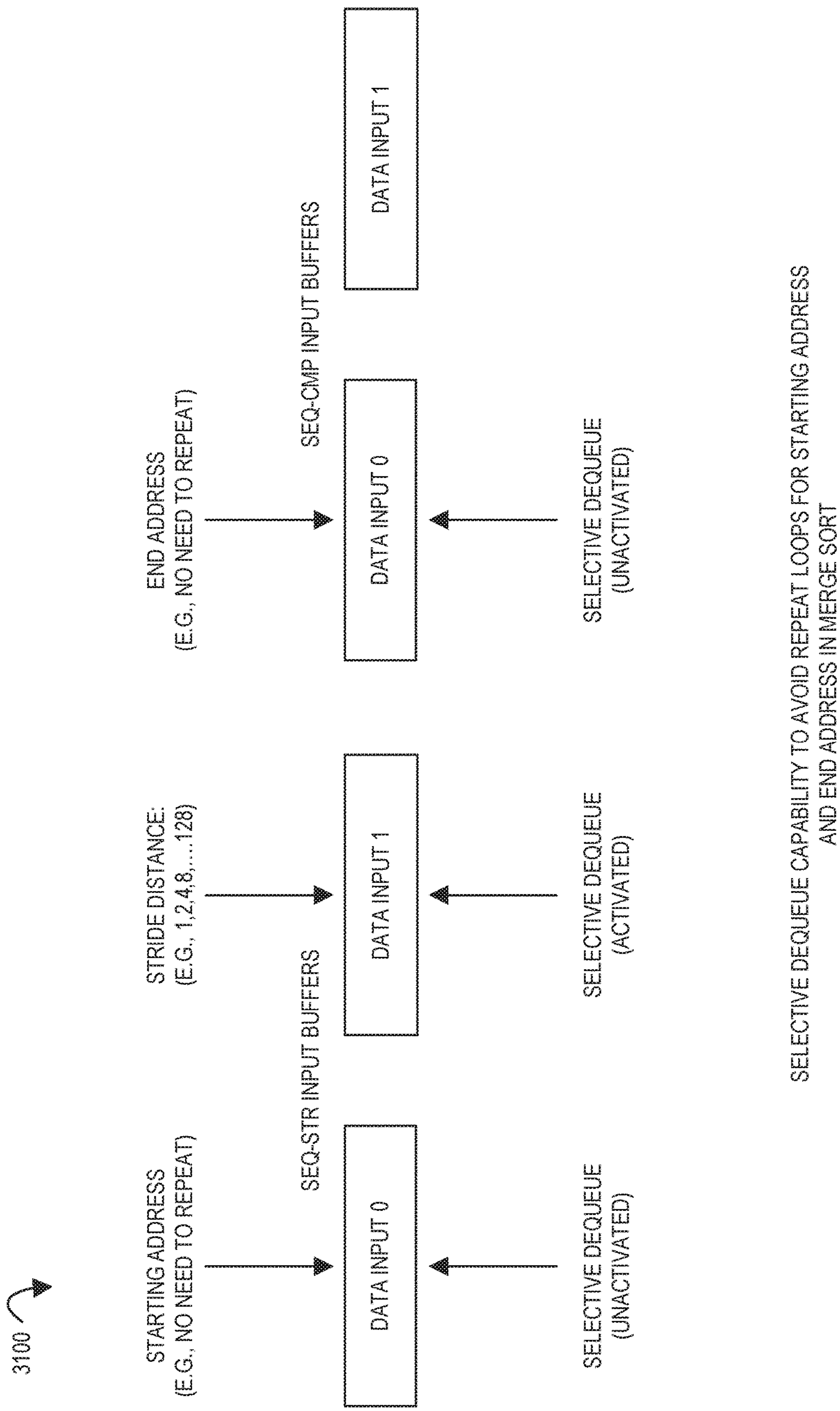
FIG. 31 illustrates circuitry to switch between activation mode and deactivation mode for selective deque for a sequencer dataflow operator implementation on a single processing element according to embodiments of the disclosure.

FIG. 31 illustrates circuitry 3100 to switch between activation mode and deactivation mode for selective dequeue for a sequencer dataflow operator implementation on a single processing element according to embodiments of the disclosure. By using the underlying mechanisms of dataflow architecture and circuitry to enqueue/dequeue data tokens, the dequeueing of the three input data tokens may be fully user programmable. This has the added benefit of reducing area/energy cost. For example, for an algorithm like merged sort for 256 elements, one initially may have the stride to be 128 to divide the lists into two, and then want the stride to be 64 to divide the lists into 4, and then wants the stride to be 32 to divide the lists into 8, etc. In all of those recursive operations, the only new data token to be supplied is the stride token. The base and bound token may stay in place so to avoid wasting processing elements to create repeat loops to generate those tokens over and over while the merge sort is executing. Another example is a bubble-sort, e.g., for each loop iteration where the highest value is "bubbled" to the top of the memory array, the upper bound address is changed for the next loop iteration (e.g., the base address and stride data tokens for the bubble-sort address sweep do not change in the next iteration).

Sequencer Stride PE with Single PE Mode

In some embodiments, a plurality of (e.g., two) processing elements (e.g., sequencer stride (seqstr) processing element 2200A and a sequencer compare (seqcmp) processing element 2200B working in tandem) are utilized to form a sequencer dataflow operator, e.g., for generating loop construct related data tokens (e.g., "value" stream, "first" stream, "last" stream, and "predicate" stream). In certain embodiments, generating "first" stream, "last" stream, and "predicate" stream from the two PE sequencer dataflow operator may be redundant. Certain embodiments herein provide an extension to the stride PE (e.g., sequencer stride (seqstr) processing element 2200A in FIG. 22) which allows the PE to operate in single PE mode. This may provide for even greater efficiency while retaining the flexibility to support a plurality of (e.g., three) fundamental dataflow operator modes (e.g., basic integer PE mode, reduction operator mode, and sequencer mode). This extension may reduce the fabric area and energy necessary to implement a routine (e.g., the memcpy code (routine) in FIG. 5A or 5B) by about 20%. Certain embodiments herein provide for a sequencer stride PE in single PE mode to be used, e.g., wherever the (e.g., loop) control predicate stream may be shared between two or more sequence generation algorithms, thus significantly reducing energy usage and freeing up valuable real estate for other CSA dataflow operators. Certain embodiments herein allow re-use a companion sequencer compare (seqcmp) processing element (e.g., processing element 2200B, which is companion with sequencer stride (seqstr) processing element 2200A) in integer PE mode. In some embodiments (e.g., in contrast to using a two PE sequencer dataflow operator to generate any loop construct sequence, a sequencer stride PE in single PE mode may be used for sequencing operations. In certain embodiments, the sequencer compare (seqcmp) processing element of the sequencer dataflow operator may be freed up and reused, e.g., in integer PE mode or clockgated and/or powergated to save energy.

In single PE mode, a sequencer stride (seqstr) processing element (e.g., seqstr PE 2200A of FIG. 22) may be used without its companion sequencer compare (seqcmp) processing element (e.g., seqcmp 2200B of FIG. 22) to generate additional "value" streams when another full sequencer (e.g., seqstr PE and seqcmp PE pair) may supply the correct "predicate" stream. For example, when a dot product is calculated, at least 2 arrays of the same size will be iterated through. When you go through a memory copy loop, every source address should have a corresponding destination address in certain embodiments. Please consider the following matrix multiplication code example.

Figure 33A:
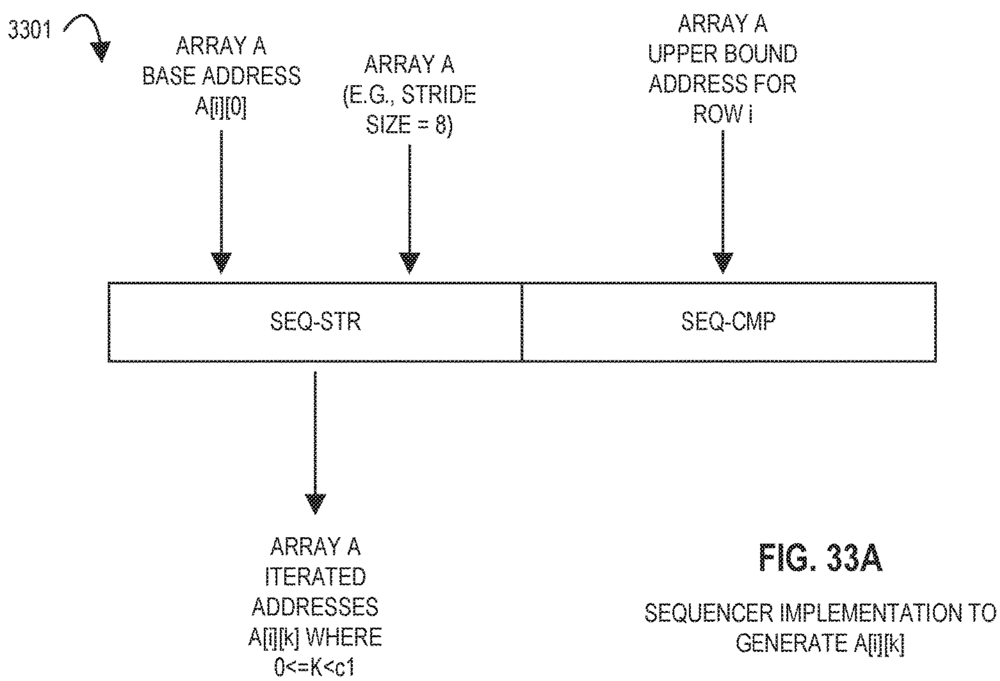
FIGS. 33A-33B illustrate a first sequencer dataflow operator implementation on a plurality of processing elements to generate A[i][k] and B[k][j] of the matrix multiplication of FIG. 32 according to embodiments of the disclosure.
Figure 33B:
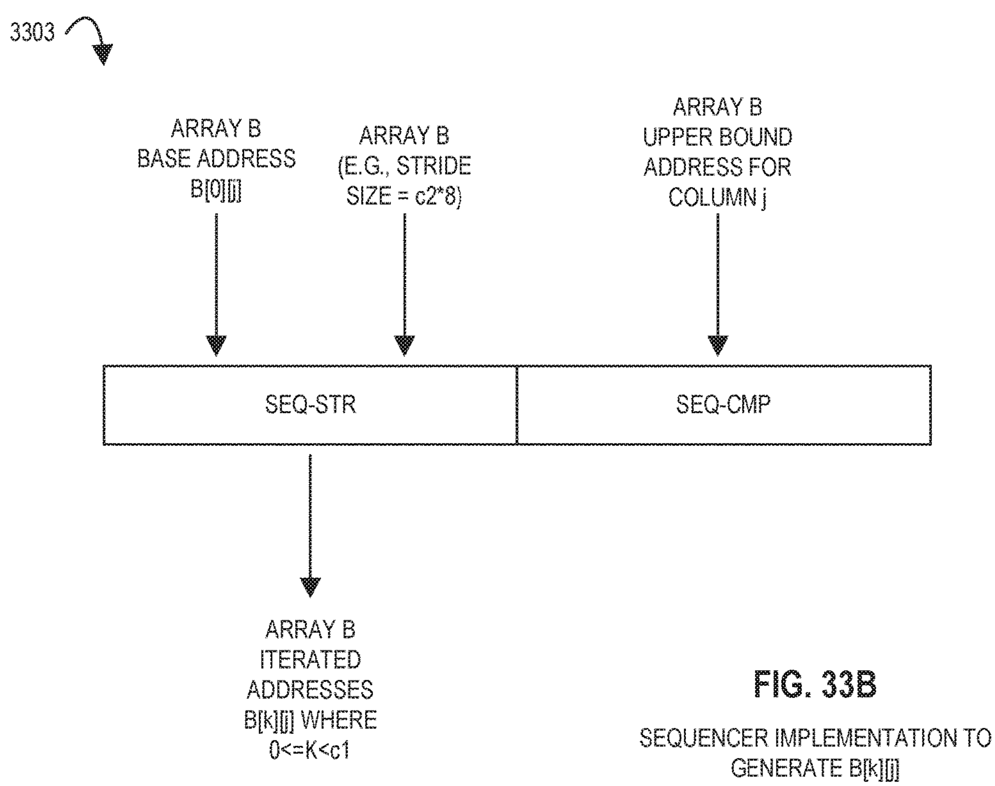

FIG. 32 illustrates a matrix multiplication code 3200 example according to embodiments of the disclosure. FIGS. 33A-33B illustrate a first sequencer dataflow operator implementation on a plurality of processing elements to generate A[i][k] and B[k][j] of the matrix multiplication of FIG. 32 according to embodiments of the disclosure.

As one can see from FIGS. 33A-33B, the depicted sequencer implementation to generate A[i][k] and B[k][j] address sequences utilizes two full sized sequencer dataflow operators (3301, 3303) (e.g., two pairs of sequencer stride (seqstr) processing element with its companion sequencer compare (seqcmp) processing element, that is, four PEs). One may note that the stride size for Array A (stride size=8) and Array B (stride size=c2*8) may be different (e.g., as long as c2>1).

Certain embodiments herein may avoid utilizing two sequencer dataflow operators. In one sequencer, the code running may reuse control terms coming out of the sequencer, but do not want to take up two PEs. A single sequencer compare PE may send its compare signal out on the array to multiple (e.g., seqstr) PEs. So not just one seqstr and seqcmp pair of PEs as depicted in FIG. 22 above, but may have multiple seqstr PEs (e.g., sequencer stride (seqstr) processing element 2200A of FIG. 22) and one seqcmp PE passing a signal to the multiple seqstr PEs.

Figure 34:
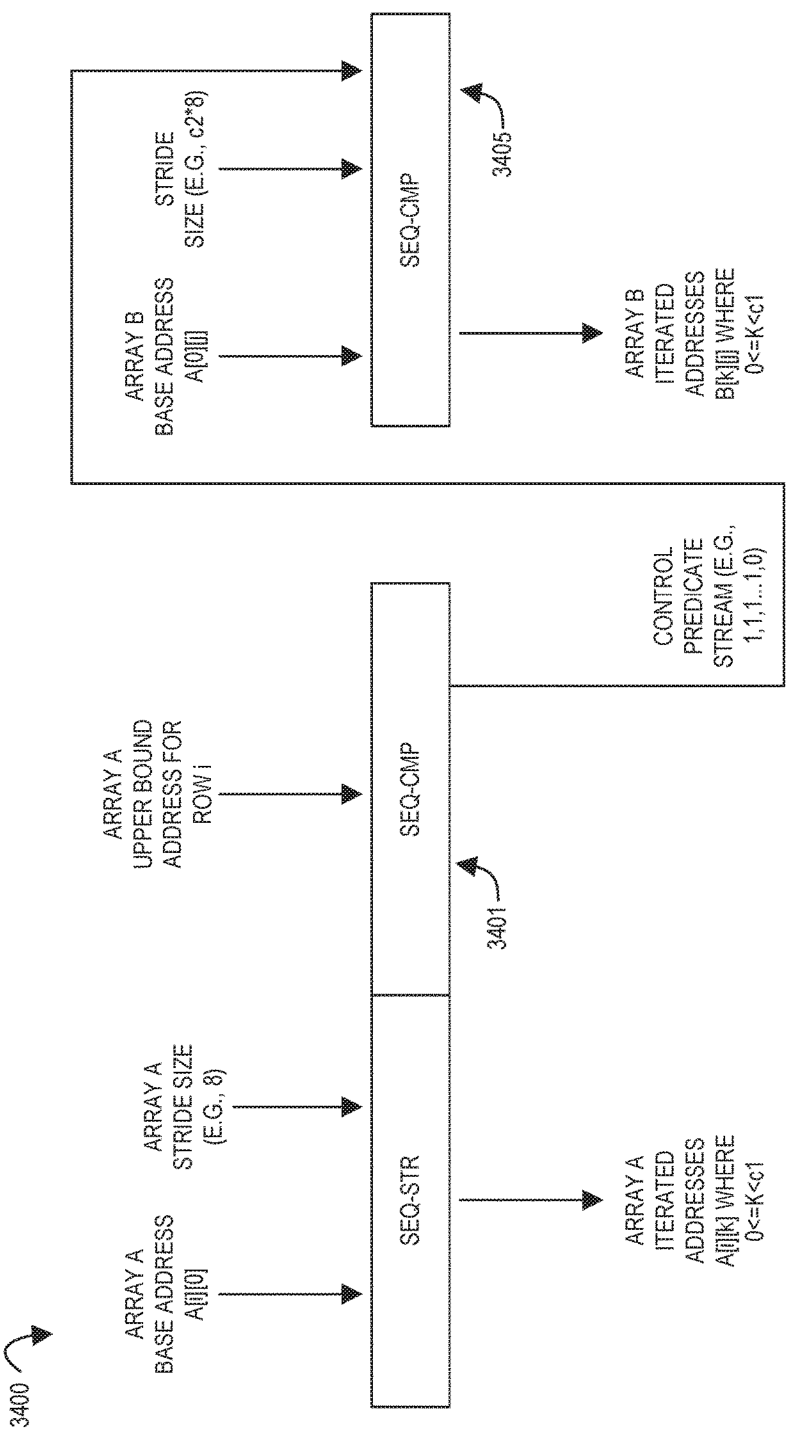
FIG. 34 illustrates a second, optimized sequencer dataflow operator implementation on a plurality of processing elements to generate A[i][k] and B[k][j] of the matrix multiplication of FIG. 32 according to embodiments of the disclosure.

FIG. 34 illustrates a second, optimized sequencer dataflow operator implementation 3400 on a plurality of processing elements (two PEs in 3401, and one PE in 3405) to generate A[i][k] and B[k][j] of the matrix multiplication of FIG. 32 according to embodiments of the disclosure. As seen in FIG. 34, the optimized sequencer implementation to generate A[i][k] and B[k][j] address sequences uses only one fullsized sequencer dataflow operator 34701 and one sequencer stride PE (e.g., that is three PEs).

Figure 35:
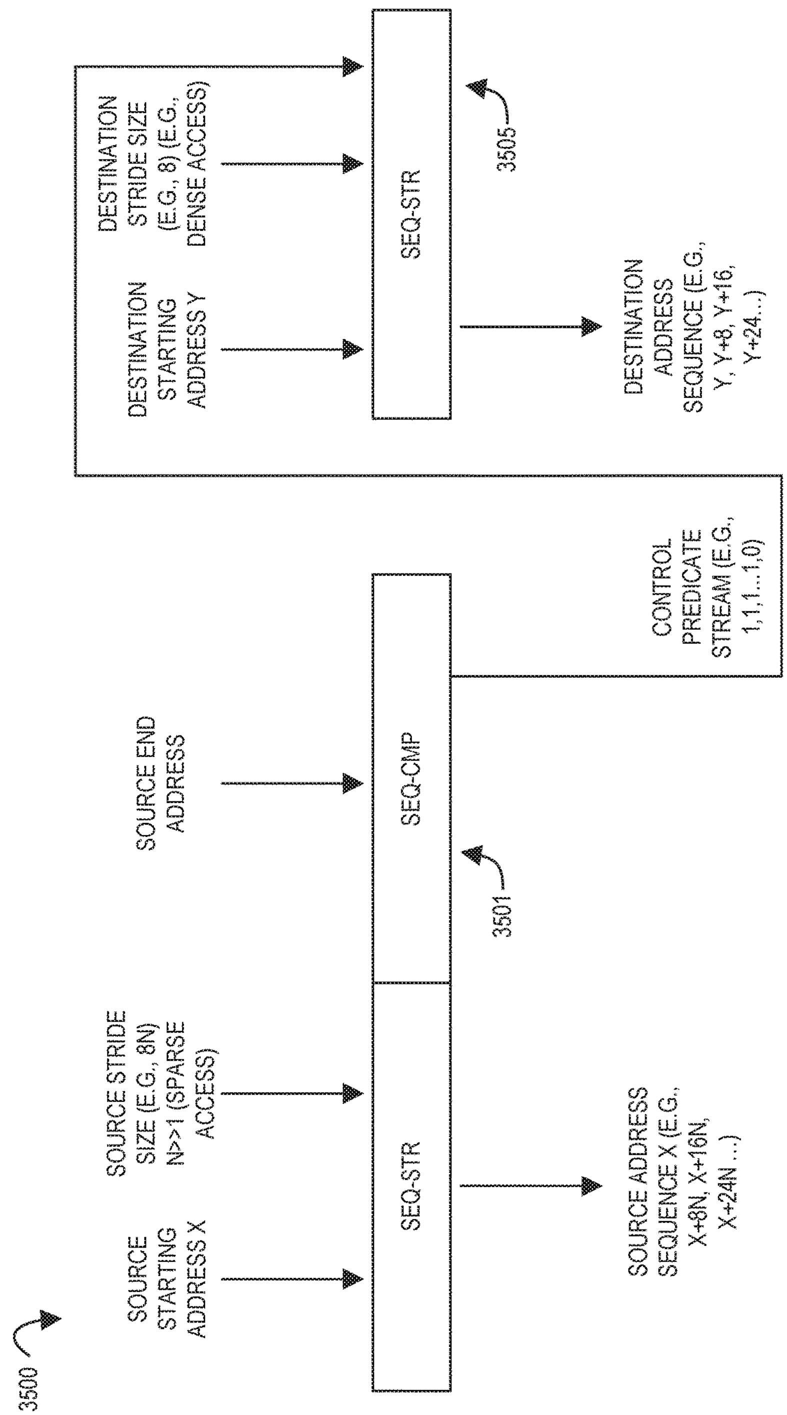
FIG. 35 illustrates a sequencer dataflow operator implementation on a plurality of processing elements to transform a sparse memory access pattern to a dense memory access pattern according to embodiments of the disclosure.

FIG. 35 illustrates a sequencer dataflow operator implementation 3500 on a plurality of processing elements (two PEs in 3501, and one PE in 3505) to transform a sparse memory access pattern to a dense memory access pattern according to embodiments of the disclosure. Please also note that in an embodiment where each seqstr PE accepts its own stride size data token, embodiments herein may include the option of using different stride sizes to achieve the necessary new data layout that is most beneficial from energy/access time point of view for future processing.

Figure 36:
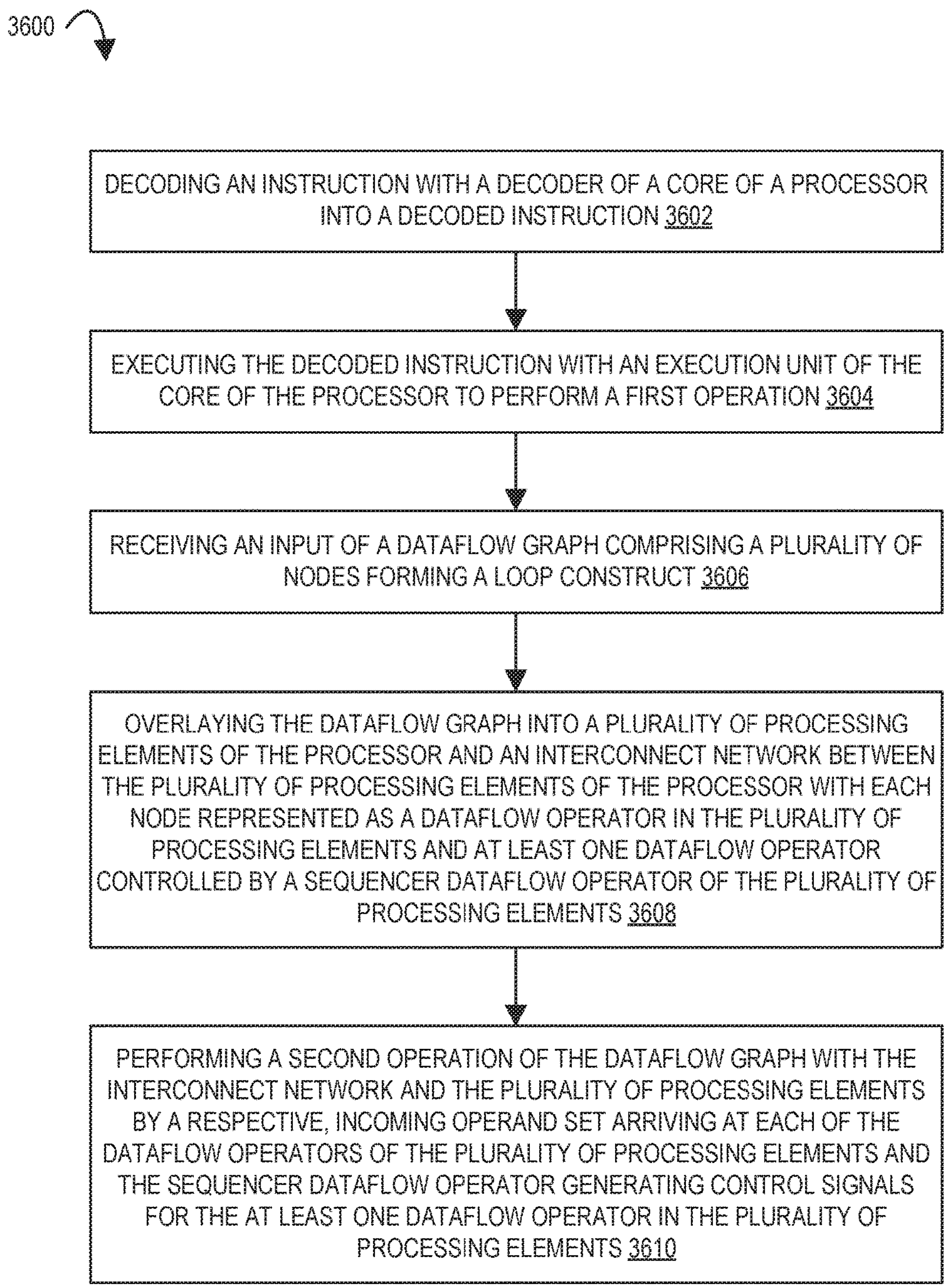
FIG. 36 illustrates a flow diagram according to embodiments of the disclosure.

FIG. 36 illustrates a flow diagram 3600 according to embodiments of the disclosure. Depicted flow 3600 includes decoding an instruction with a decoder of a core of a processor into a decoded instruction 3602; executing the decoded instruction with an execution unit of the core of the processor to perform a first operation 3604; receiving an input of a dataflow graph comprising a plurality of nodes forming a loop construct 3606; overlaying the dataflow graph into a plurality of processing elements of the processor and an interconnect network between the plurality of processing elements of the processor with each node represented as a dataflow operator in the plurality of processing elements controlled by a sequencer dataflow operator of the plurality of processing elements 3608; and performing a second operation of the dataflow graph with the interconnect network and the plurality of processing elements by a respective, incoming operand set arriving at each of the dataflow operators of the plurality of processing elements and the sequencer dataflow operator generating control signals for at least one dataflow operator in the plurality of processing elements 3610.

Figure 37:
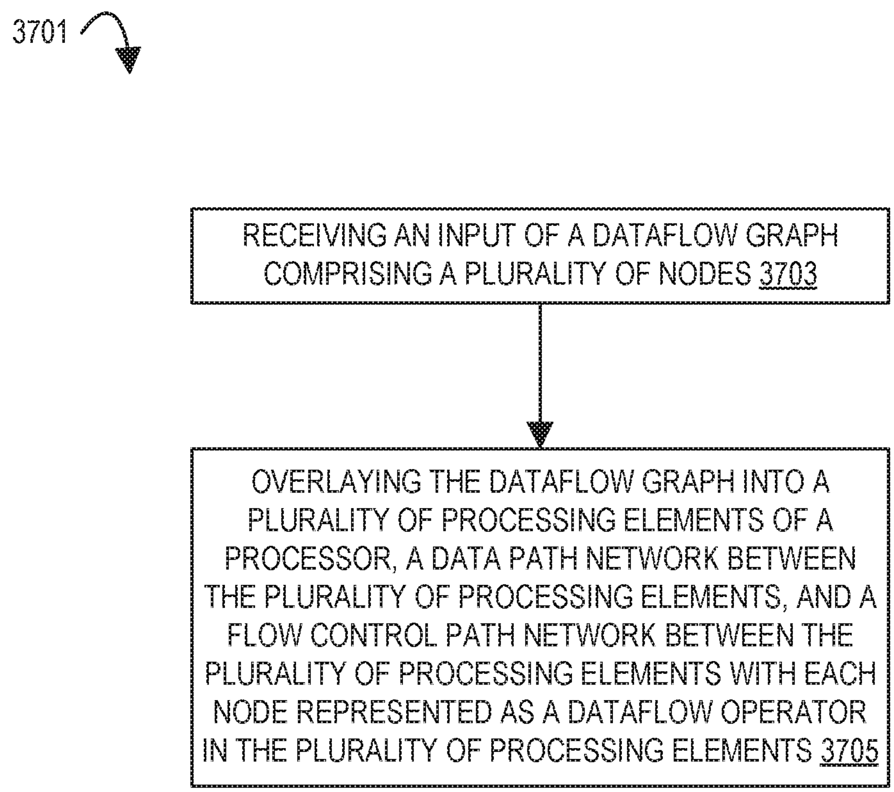
FIG. 37 illustrates a flow diagram according to embodiments of the disclosure.

FIG. 37 illustrates a flow diagram 3701 according to embodiments of the disclosure. Depicted flow 3701 includes receiving an input of a dataflow graph comprising a plurality of nodes 3703; and overlaying the dataflow graph into a plurality of processing elements of a processor, a data path network between the plurality of processing elements, and a flow control path network between the plurality of processing elements with each node represented as a dataflow operator in the plurality of processing elements 3705.

In one embodiment, the core writes a command into a memory queue and a CSA (e.g., the plurality of processing elements) monitors the memory queue and begins executing when the command is read. In one embodiment, the core executes a first part of a program and a CSA (e.g., the plurality of processing elements) executes a second part of the program. In one embodiment, the core does other work while the CSA is executing its operations.

5. CSA Advantages

In certain embodiments, the CSA architecture and microarchitecture provides profound energy, performance, and usability advantages over roadmap processor architectures and FPGAs. In this section, these architectures are compared to embodiments of the CSA and highlights the superiority of CSA in accelerating parallel dataflow graphs relative to each.

5.1 Processors

Figure 38:
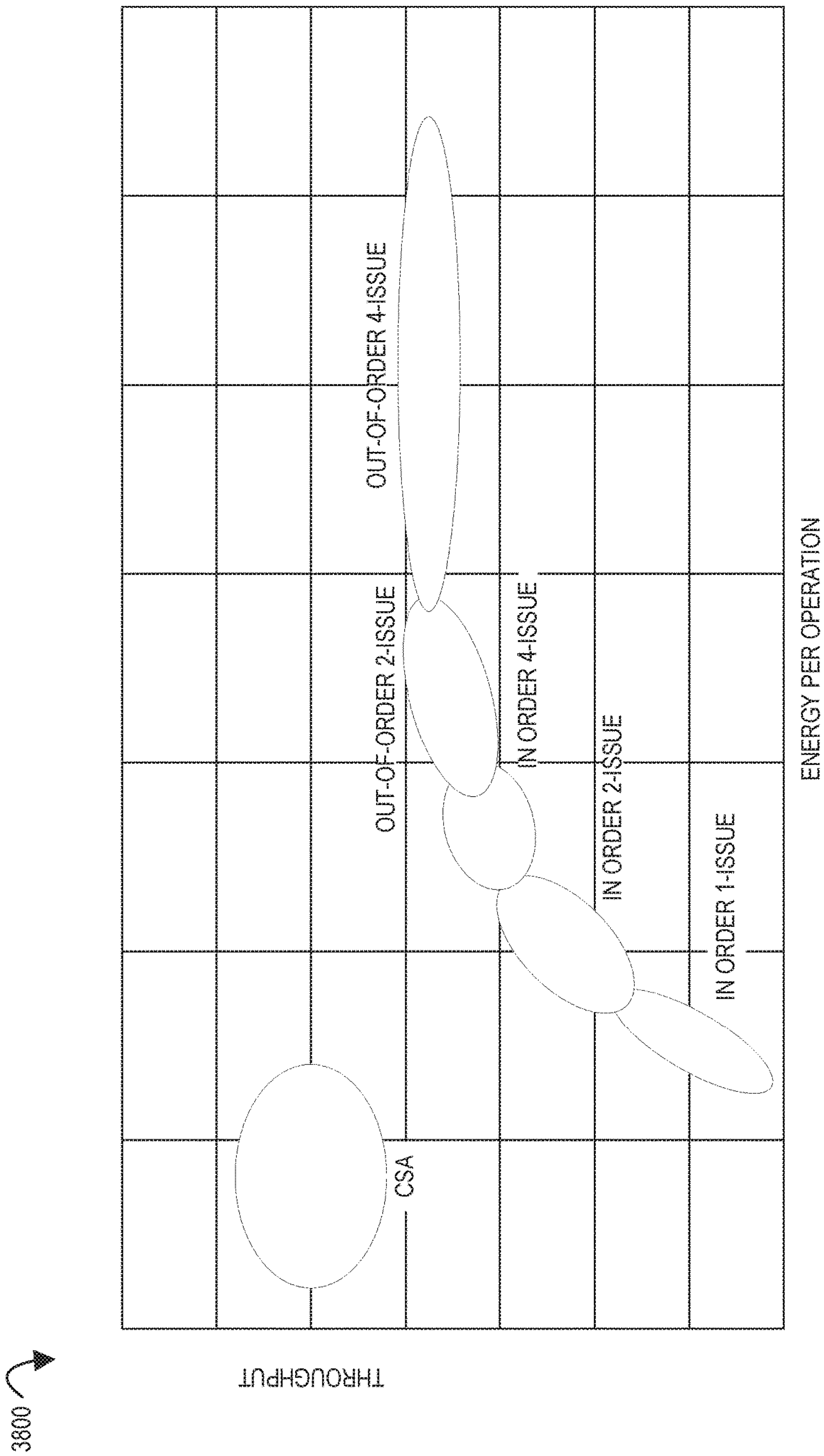
FIG. 38 illustrates a throughput versus energy per operation graph according to embodiments of the disclosure.

FIG. 38 illustrates a throughput versus energy per operation graph 3800 according to embodiments of the disclosure. As shown in FIG. 38, small cores are generally more energy efficient than large cores, and, in some workloads, this advantage may be translated to absolute performance through higher core counts. The CSA microarchitecture follows these observations to their conclusion and removes (e.g., most) energy-hungry control structures associated with von Neumann architectures, including most of the instruction-side microarchitecture. By removing these overheads and implementing simple, single operation PEs, embodiments of a CSA obtains a dense, efficient spatial array. Unlike small cores, which are usually quite serial, a CSA may gang its PEs together, e.g., via the circuit switched local network, to form explicitly parallel aggregate dataflow graphs. The result is performance in not only parallel applications, but also serial applications as well. Unlike cores, which may pay dearly for performance in terms area and energy, a CSA is already parallel in its native execution model. In certain embodiments, a CSA utilizes speculation to increase performance, e.g., and it does not need to repeatedly re-extract parallelism from a sequential program representation, thereby avoiding two of the main energy taxes in von Neumann architectures. Most structures in embodiments of a CSA are distributed, small, and energy efficient, as opposed to the centralized, bulky, energy hungry structures found in cores. Consider the case of registers in the CSA: each PE may have a few (e.g., 10 or less) storage registers. Taken individually, these registers may be more efficient that traditional register files. In aggregate, these registers may provide the effect of a large, in-fabric register file. As a result, embodiments of a CSA avoids most of stack spills and fills incurred by classical architectures, while using much less energy per state access. Of course, applications may still access memory. In embodiments of a CSA, memory access request and response are architecturally decoupled, enabling workloads to sustain many more outstanding memory accesses per unit of area and energy. This property yields substantially higher performance for cache-bound workloads and reduces the area and energy needed to saturate main memory in memory-bound workloads. Embodiments of a CSA expose new forms of energy efficiency which are unique to non-von Neumann architectures. One consequence of executing a single operation (e.g., instruction) at a (e.g., most) PEs is reduced operand entropy. In the case of an increment operation, each execution may result in a handful of circuit-level toggles and little energy consumption, a case examined in detail in Section 6.2. In contrast, von Neumann architectures are multiplexed, resulting in large numbers of bit transitions. The asynchronous style of embodiments of a CSA also enables microarchitectural optimizations, such as the floating point optimizations described in Section 3.5 that are difficult to realize in tightly scheduled core pipelines. Because PEs may be relatively simple and their behavior in a particular dataflow graph be statically known, clock gating and power gating techniques may be applied more effectively than in coarser architectures. The graph-execution style, small size, and malleability of embodiments of CSA PEs and the network together enable the expression many kinds of parallelism: instruction, data, pipeline, vector, memory, thread, and task parallelism may all be implemented. For example, in embodiments of a CSA, one application may use arithmetic units to provide a high degree of address bandwidth, while another application may use those same units for computation. In many cases, multiple kinds of parallelism may be combined to achieve even more performance. Many key HPC operations may be both replicated and pipelined, resulting in orders-of-magnitude performance gains. In contrast, von Neumann-style cores typically optimize for one style of parallelism, carefully chosen by the architects, resulting in a failure to capture all important application kernels. Just as embodiments of a CSA expose and facilitates many forms of parallelism, it does not mandate a particular form of parallelism, or, worse, a particular subroutine be present in an application in order to benefit from the CSA. Many applications, including single-stream applications, may obtain both performance and energy benefits from embodiments of a CSA, e.g., even when compiled without modification. This reverses the long trend of requiring significant programmer effort to obtain a substantial performance gain in singlestream applications. Indeed, in some applications, embodiments of a CSA obtain more performance from functionally equivalent, but less "modern" codes than from their convoluted, contemporary cousins which have been tortured to target vector instructions.

5.2 Comparison of CSA Embodiments and FGPAs

The choice of dataflow operators as the fundamental architecture of embodiments of a CSA differentiates those CSAs from a FGPA, and particularly the CSA is as superior accelerator for HPC dataflow graphs arising from traditional programming languages. Dataflow operators are fundamentally asynchronous. This enables embodiments of a CSA not only to have great freedom of implementation in the microarchitecture, but it also enables them to simply and succinctly accommodate abstract architectural concepts. For example, embodiments of a CSA naturally accommodate many memory microarchitectures, which are essentially asynchronous, with a simple load-store interface. One need only examine an FPGA DRAM controller to appreciate the difference in complexity. Embodiments of a CSA also leverage asynchrony to provide faster and more-fully-featured runtime services like configuration and extraction, which are believed to be four to six orders of magnitude faster than an FPGA. By narrowing the architectural interface, embodiments of a CSA provide control over most timing paths at the microarchitectural level. This allows embodiments of a CSA to operate at a much higher frequency than the more general control mechanism offered in a FPGA. Similarly, clock and reset, which may be architecturally fundamental to FPGAs, are microarchitectural in the CSA, e.g., obviating the need to support them as programmable entities. Dataflow operators may be, for the most part, coarse-grained. By only dealing in coarse operators, embodiments of a CSA improve both the density of the fabric and its energy consumption: CSA executes operations directly rather than emulating them with look-up tables. A second consequence of coarseness is a simplification of the place and route problem. CSA dataflow graphs are many orders of magnitude smaller than FPGA net-lists and place and route time are commensurately reduced in embodiments of a CSA. The significant differences between embodiments of a CSA and a FPGA make the CSA superior as an accelerator, e.g., for dataflow graphs arising from traditional programming languages.

6. Evaluation

The CSA is a novel computer architecture with the potential to provide enormous performance and energy advantages relative to roadmap processors. Consider the case of computing a single strided address for walking across an array. This case may be important in HPC applications, e.g., which spend significant integer effort in computing address offsets. In address computation, and especially strided address computation, one argument is constant and the other varies only slightly per computation. Thus, only a handful of bits per cycle toggle in the majority of cases. Indeed, it may be shown, using a derivation similar to the bound on floating point carry bits described in Section 3.5, that less than two bits of input toggle per computation in average for a stride calculation, reducing energy by 50% over a random toggle distribution. Were a time-multiplexed approach used, much of this energy savings may be lost. In one embodiment, the CSA achieves approximately 3× energy efficiency over a core while delivering an 8× performance gain. The parallelism gains achieved by embodiments of a CSA may result in reduced program run times, yielding a proportionate, substantial reduction in leakage energy. At the PE level, embodiments of a CSA are extremely energy efficient. A second important question for the CSA is whether the CSA consumes a reasonable amount of energy at the tile level. Since embodiments of a CSA are capable of exercising every floating point PE in the fabric at every cycle, it serves as a reasonable upper bound for energy and power consumption, e.g., such that most of the energy goes into floating point multiply and add.

7. Further CSA Details

This section discusses further details for configuration and exception handling.

7.1 Microarchitecture for Configuring a CSA

This section discloses examples of how to configure a CSA (e.g., fabric), how to achieve this configuration quickly, and how to minimize the resource overhead of configuration. Configuring the fabric quickly may be of preeminent importance in accelerating small portions of a larger algorithm, and consequently in broadening the applicability of a CSA. The section further discloses features that allow embodiments of a CSA to be programmed with configurations of different length.

Embodiments of a CSA (e.g., fabric) may differ from traditional cores in that they make use of a configuration step in which (e.g., large) parts of the fabric are loaded with program configuration in advance of program execution. An advantage of static configuration may be that very little energy is spent at runtime on the configuration, e.g., as opposed to sequential cores which spend energy fetching configuration information (an instruction) nearly every cycle. The previous disadvantage of configuration is that it was a coarse-grained step with a potentially large latency, which places an under-bound on the size of program that can be accelerated in the fabric due to the cost of context switching. This disclosure describes a scalable microarchitecture for rapidly configuring a spatial array in a distributed fashion, e.g., that avoids the previous disadvantages.

As discussed above, a CSA may include light-weight processing elements connected by an inter-PE network. Programs, viewed as control-dataflow graphs, are then mapped onto the architecture by configuring the configurable fabric elements (CFEs), for example PEs and the interconnect (fabric) networks. Generally, PEs may be configured as dataflow operators and once all input operands arrive at the PE, some operation occurs, and the results are forwarded to another PE or PEs for consumption or output. PEs may communicate over dedicated virtual circuits which are formed by statically configuring the circuit switched communications network. These virtual circuits may be flow controlled and fully back-pressured, e.g., such that PEs will stall if either the source has no data or destination is full. At runtime, data may flow through the PEs implementing the mapped algorithm. For example, data may be streamed in from memory, through the fabric, and then back out to memory. Such a spatial architecture may achieve remarkable performance efficiency relative to traditional multicore processors: compute, in the form of PEs, may be simpler and more numerous than larger cores and communications may be direct, as opposed to an extension of the memory system.

Embodiments of a CSA may not utilize (e.g., software controlled) packet switching, e.g., packet switching that requires significant software assistance to realize, which slows configuration. Embodiments of a CSA include out-of-band signaling in the network (e.g., of only 2-3 bits, depending on the feature set supported) and a fixed configuration topology to avoid the need for significant software support.

One key difference between embodiments of a CSA and the approach used in FPGAs is that a CSA approach may use a wide data word, is distributed, and includes mechanisms to fetch program data directly from memory. Embodiments of a CSA may not utilize JTAG-style single bit communications in the interest of area efficiency, e.g., as that may require milliseconds to completely configure a large FPGA fabric.

Embodiments of a CSA include a distributed configuration protocol and microarchitecture to support this protocol. Initially, configuration state may reside in memory. Multiple (e.g., distributed) local configuration controllers (boxes) (LCCs) may stream portions of the overall program into their local region of the spatial fabric, e.g., using a combination of a small set of control signals and the fabric-provided network. State elements may be used at each CFE to form configuration chains, e.g., allowing individual CFEs to self-program without global addressing.

Embodiments of a CSA include specific hardware support for the formation of configuration chains, e.g., not software establishing these chains dynamically at the cost of increasing configuration time. Embodiments of a CSA are not purely packet switched and do include extra out-of-band control wires (e.g., control is not sent through the data path requiring extra cycles to strobe this information and reserialize this information). Embodiments of a CSA decreases configuration latency by fixing the configuration ordering and by providing explicit out-of-band control (e.g., by at least a factor of two), while not significantly increasing network complexity.

Embodiments of a CSA do not use a serial mechanism for configuration in which data is streamed bit by bit into the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

Figure 39:
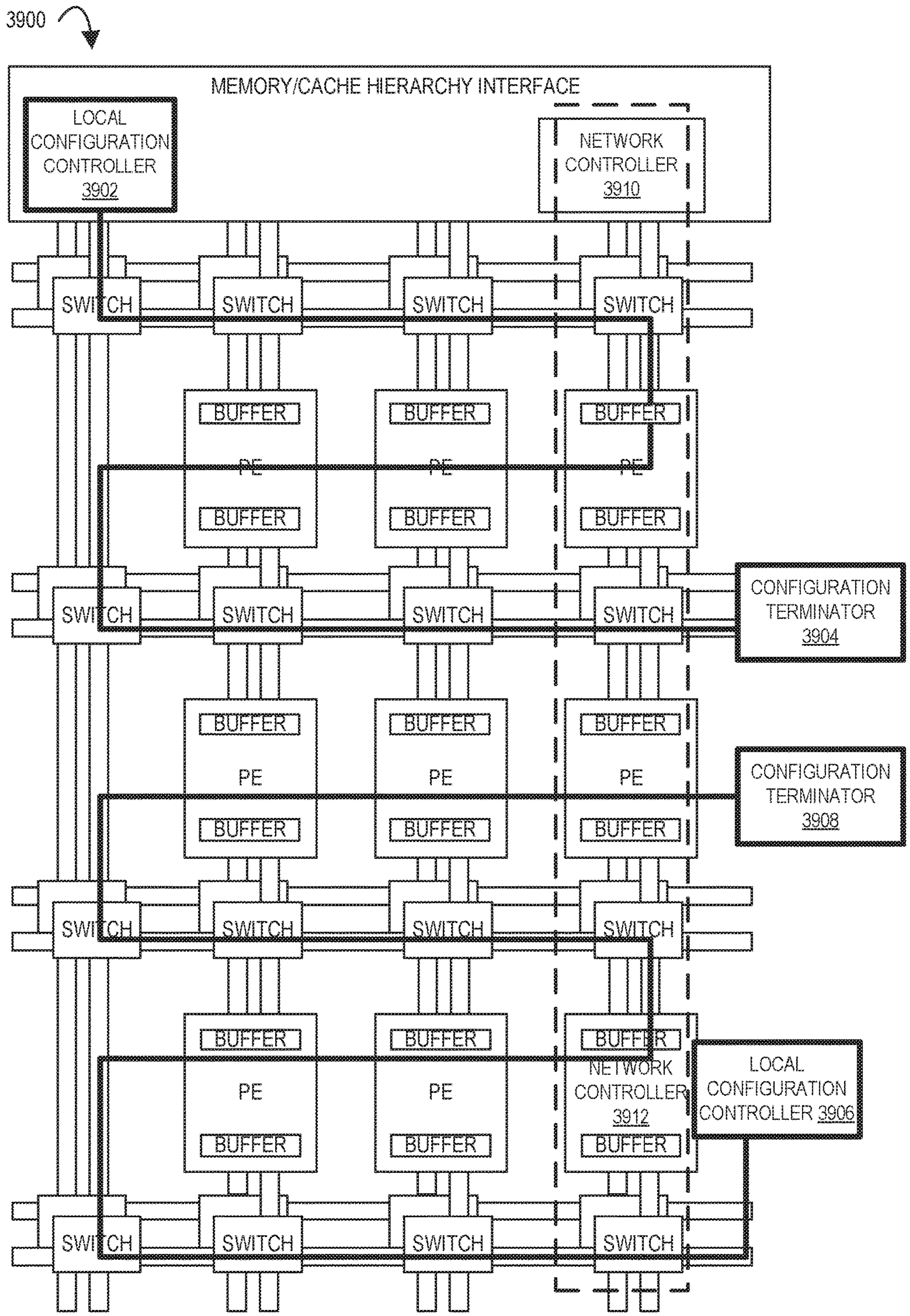
FIG. 39 illustrates an accelerator tile comprising an array of processing elements and a local configuration controller according to embodiments of the disclosure.

FIG. 39 illustrates an accelerator tile 3900 comprising an array of processing elements (PE) and a local configuration controller (3902, 3906) according to embodiments of the disclosure. Each PE, each network controller (e.g., network dataflow endpoint circuit), and each switch may be a configurable fabric elements (CFEs), e.g., which are configured (e.g., programmed) by embodiments of the CSA architecture.

Embodiments of a CSA include hardware that provides for efficient, distributed, low-latency configuration of a heterogeneous spatial fabric. This may be achieved according to four techniques. First, a hardware entity, the local configuration controller (LCC) is utilized, for example, as in FIGS. 39-41. An LCC may fetch a stream of configuration information from (e.g., virtual) memory. Second, a configuration data path may be included, e.g., that is as wide as the native width of the PE fabric and which may be overlaid on top of the PE fabric. Third, new control signals may be received into the PE fabric which orchestrate the configuration process. Fourth, state elements may be located (e.g., in a register) at each configurable endpoint which track the status of adjacent CFEs, allowing each CFE to unambiguously self-configure without extra control signals. These four microarchitectural features may allow a CSA to configure chains of its CFEs. To obtain low configuration latency, the configuration may be partitioned by building many LCCs and CFE chains. At configuration time, these may operate independently to load the fabric in parallel, e.g., dramatically reducing latency. As a result of these combinations, fabrics configured using embodiments of a CSA architecture, may be completely configured (e.g., in hundreds of nanoseconds). In the following, the detailed the operation of the various components of embodiments of a CSA configuration network are disclosed.

Figure 40A:
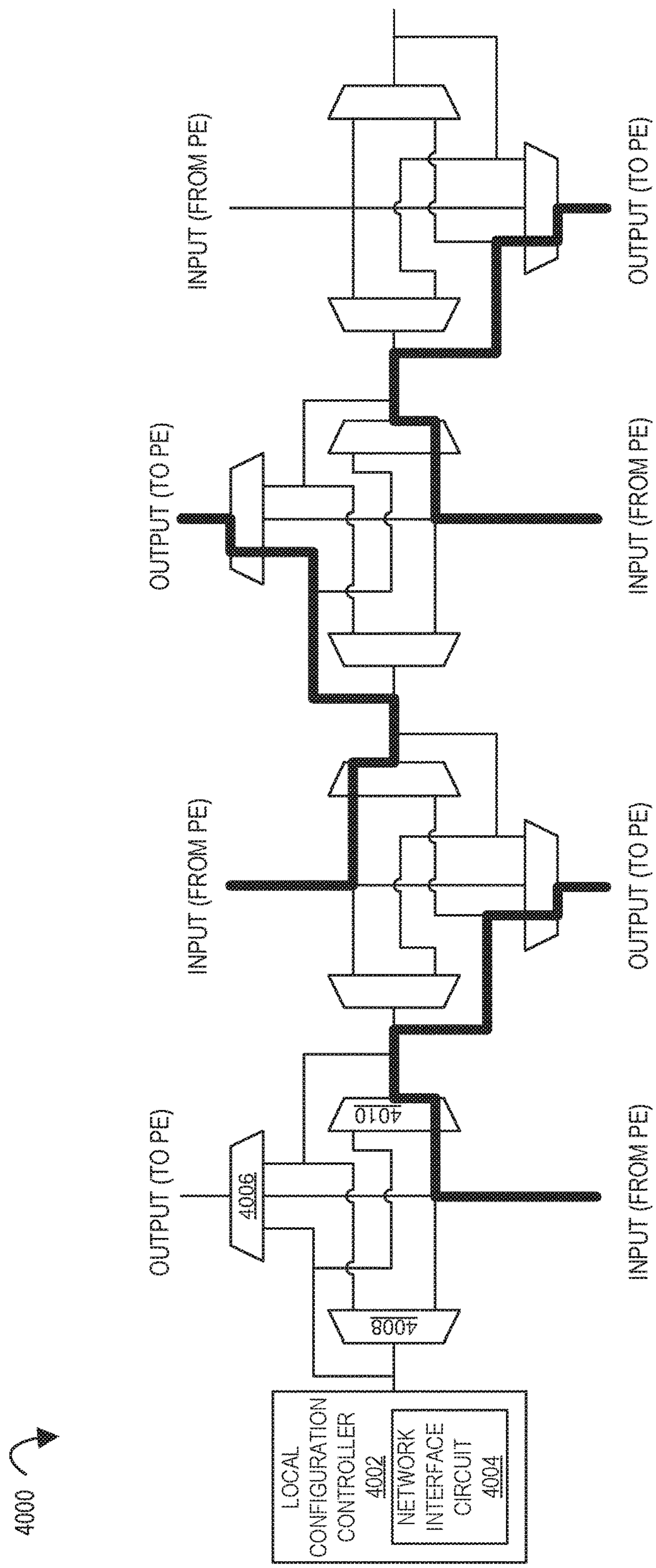
FIGS. 40A-40C illustrate a local configuration controller configuring a data path network according to embodiments of the disclosure.
Figure 40B:
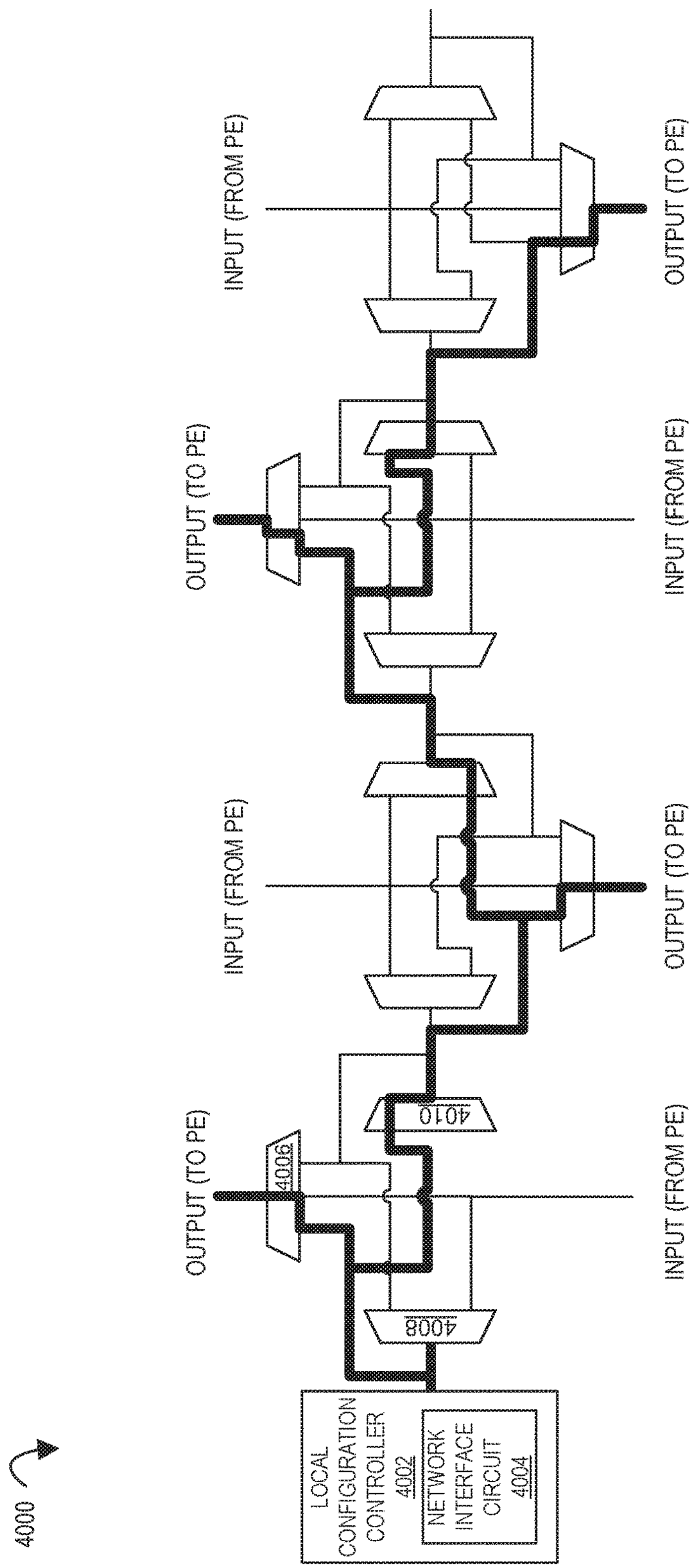
Figure 40C:
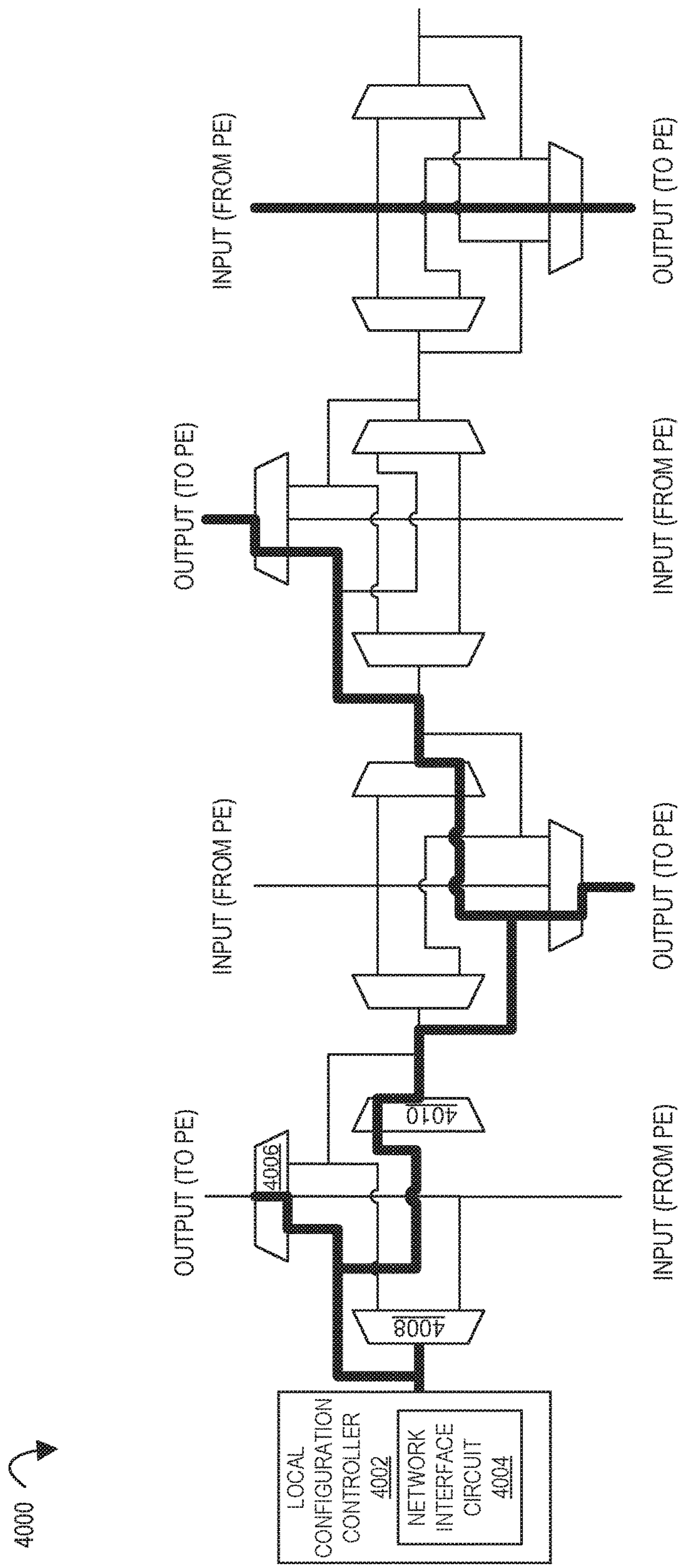

FIGS. 40A-40C illustrate a local configuration controller 4002 configuring a data path network according to embodiments of the disclosure. Depicted network includes a plurality of multiplexers (e.g., multiplexers 4006, 4008, 4010) that may be configured (e.g., via their respective control signals) to connect one or more data paths (e.g., from PEs) together. FIG. 40A illustrates the network 4000 (e.g., fabric) configured (e.g., set) for some previous operation or program. FIG. 40B illustrates the local configuration controller 4002 (e.g., including a network interface circuit 4004 to send and/or receive signals) strobing a configuration signal and the local network is set to a default configuration (e.g., as depicted) that allows the LCC to send configuration data to all configurable fabric elements (CFEs), e.g., muxes. FIG. 40C illustrates the LCC strobing configuration information across the network, configuring CFEs in a predetermined (e.g., silicon-defined) sequence. In one embodiment, when CFEs are configured they may begin operation immediately. In another embodiments, the CFEs wait to begin operation until the fabric has been completely configured (e.g., as signaled by configuration terminator (e.g., configuration terminator 4204 and configuration terminator 4208 in FIG. 42) for each local configuration controller). In one embodiment, the LCC obtains control over the network fabric by sending a special message, or driving a signal. It then strobes configuration data (e.g., over a period of many cycles) to the CFEs in the fabric. In these figures, the multiplexor networks are analogues of the "Switch" shown in certain Figures (e.g., FIG. 6).

Local Configuration Controller

Figure 41:
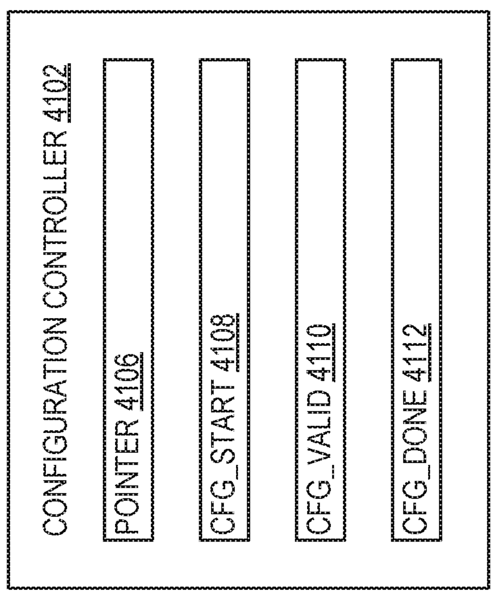
FIG. 41 illustrates a configuration controller according to embodiments of the disclosure.

FIG. 41 illustrates a (e.g., local) configuration controller 4102 according to embodiments of the disclosure. A local configuration controller (LCC) may be the hardware entity which is responsible for loading the local portions (e.g., in a subset of a tile or otherwise) of the fabric program, interpreting these program portions, and then loading these program portions into the fabric by driving the appropriate protocol on the various configuration wires. In this capacity, the LCC may be a special-purpose, sequential microcontroller.

LCC operation may begin when it receives a pointer to a code segment. Depending on the LCB microarchitecture, this pointer (e.g., stored in pointer register 4106) may come either over a network (e.g., from within the CSA (fabric) itself) or through a memory system access to the LCC. When it receives such a pointer, the LCC optionally drains relevant state from its portion of the fabric for context storage, and then proceeds to immediately reconfigure the portion of the fabric for which it is responsible. The program loaded by the LCC may be a combination of configuration data for the fabric and control commands for the LCC, e.g., which are lightly encoded. As the LCC streams in the program portion, it may interprets the program as a command stream and perform the appropriate encoded action to configure (e.g., load) the fabric.

Two different microarchitectures for the LCC are shown in FIG. 39, e.g., with one or both being utilized in a CSA. The first places the LCC 3902 at the memory interface. In this case, the LCC may make direct requests to the memory system to load data. In the second case the LCC 3906 is placed on a memory network, in which it may make requests to the memory only indirectly. In both cases, the logical operation of the LCB is unchanged. In one embodiment, an LCCs is informed of the program to load, for example, by a set of (e.g., OS-visible) control-status-registers which will be used to inform individual LCCs of new program pointers, etc.

Extra Out-of-Band Control Channels (e.g., Wires)

In certain embodiments, configuration relies on 2-8 extra, out-of-band control channels to improve configuration speed, as defined below. For example, configuration controller 4102 may include the following control channels, e.g., CFG_START control channel 4108, CFG_VALID control channel 4110, and CFG_DONE control channel 4112, with examples of each discussed in Table 2 below.

TABLE 2

| Control Channels | |
|---|---|
| CFG_START | Asserted at beginning of configuration. Sets configuration state at each CFE and sets the configuration bus. |
| CFG_VALID | Denotes validity of values on configuration bus. |
| CFG_DONE | Optional. Denotes completion of the configuration of a particular CFE. This allows configuration to be short circuited in case a CFE does not require additional configuration |

Generally, the handling of configuration information may be left to the implementer of a particular CFE. For example, a selectable function CFE may have a provision for setting registers using an existing data path, while a fixed function CFE might simply set a configuration register.

Due to long wire delays when programming a large set of CFEs, the CFG_VALID signal may be treated as a clock/latch enable for CFE components. Since this signal is used as a clock, in one embodiment the duty cycle of the line is at most 50%. As a result, configuration throughput is approximately halved. Optionally, a second CFG_VALID signal may be added to enable continuous programming.

In one embodiment, only CFG_START is strictly communicated on an independent coupling (e.g., wire), for example, CFG_VALID and CFG_DONE may be overlaid on top of other network couplings.

Reuse of Network Resources

To reduce the overhead of configuration, certain embodiments of a CSA make use of existing network infrastructure to communicate configuration data. A LCC may make use of both a chip-level memory hierarchy and a fabric-level communications networks to move data from storage into the fabric. As a result, in certain embodiments of a CSA, the configuration infrastructure adds no more than 2% to the overall fabric area and power.

Reuse of network resources in certain embodiments of a CSA may cause a network to have some hardware support for a configuration mechanism. Circuit switched networks of embodiments of a CSA cause an LCC to set their multiplexors in a specific way for configuration when the 'CFG_START' signal is asserted. Packet switched networks do not require extension, although LCC endpoints (e.g., configuration terminators) use a specific address in the packet switched network. Network reuse is optional, and some embodiments may find dedicated configuration buses to be more convenient.

Per CFE State

Each CFE may maintain a bit denoting whether or not it has been configured (see, e.g., FIG. 13). This bit may be de-asserted when the configuration start signal is driven, and then asserted once the particular CFE has been configured. In one configuration protocol, CFEs are arranged to form chains with the CFE configuration state bit determining the topology of the chain. A CFE may read the configuration state bit of the immediately adjacent CFE. If this adjacent CFE is configured and the current CFE is not configured, the CFE may determine that any current configuration data is targeted at the current CFE. When the 'CFG_DONE' signal is asserted, the CFE may set its configuration bit, e.g., enabling upstream CFEs to configure. As a base case to the configuration process, a configuration terminator (e.g., configuration terminator 3904 for LCC 3902 or configuration terminator 3908 for LCC 3906 in FIG. 39) which asserts that it is configured may be included at the end of a chain.

Internal to the CFE, this bit may be used to drive flow control ready signals. For example, when the configuration bit is de-asserted, network control signals may automatically be clamped to a values that prevent data from flowing, while, within PEs, no operations or other actions will be scheduled.

Dealing with High-Delay Configuration Paths

One embodiment of an LCC may drive a signal over a long distance, e.g., through many multiplexors and with many loads. Thus, it may be difficult for a signal to arrive at a distant CFE within a short clock cycle. In certain embodiments, configuration signals are at some division (e.g., fraction of) of the main (e.g., CSA) clock frequency to ensure digital timing discipline at configuration. Clock division may be utilized in an out-of-band signaling protocol, and does not require any modification of the main clock tree.

Ensuring Consistent Fabric Behavior During Configuration

Since certain configuration schemes are distributed and have non-deterministic timing due to program and memory effects, different portions of the fabric may be configured at different times. As a result, certain embodiments of a CSA provide mechanisms to prevent inconsistent operation among configured and unconfigured CFEs. Generally, consistency is viewed as a property required of and maintained by CFEs themselves, e.g., using the internal CFE state. For example, when a CFE is in an unconfigured state, it may claim that its input buffers are full, and that its output is invalid. When configured, these values will be set to the true state of the buffers. As enough of the fabric comes out of configuration, these techniques may permit it to begin operation. This has the effect of further reducing context switching latency, e.g., if long-latency memory requests are issued early.

Variable-Width Configuration

Different CFEs may have different configuration word widths. For smaller CFE configuration words, implementers may balance delay by equitably assigning CFE configuration loads across the network wires. To balance loading on network wires, one option is to assign configuration bits to different portions of network wires to limit the net delay on any one wire. Wide data words may be handled by using serialization/deserialization techniques. These decisions may be taken on a per-fabric basis to optimize the behavior of a specific CSA (e.g., fabric). Network controller (e.g., one or more of network controller 3910 and network controller 3912 may communicate with each domain (e.g., subset) of the CSA (e.g., fabric), for example, to send configuration information to one or more LCCs. Network controller may be part of a communications network (e.g., separate from circuit switched network). Network controller may include a network dataflow endpoint circuit.

7.2 Microarchitecture for Low Latency Configuration of a CSA and for Timely Fetching of Configuration Data for a CSA Embodiments of a CSA may be an energy-efficient and high-performance means of accelerating user applications. When considering whether a program (e.g., a dataflow graph thereof) may be successfully accelerated by an accelerator, both the time to configure the accelerator and the time to run the program may be considered. If the run time is short, then the configuration time may play a large role in determining successful acceleration. Therefore, to maximize the domain of accelerable programs, in some embodiments the configuration time is made as short as possible. One or more configuration caches may be includes in a CSA, e.g., such that the high bandwidth, low-latency store enables rapid reconfiguration. Next is a description of several embodiments of a configuration cache.

In one embodiment, during configuration, the configuration hardware (e.g., LCC) optionally accesses the configuration cache to obtain new configuration information. The configuration cache may operate either as a traditional address based cache, or in an OS managed mode, in which configurations are stored in the local address space and addressed by reference to that address space. If configuration state is located in the cache, then no requests to the backing store are to be made in certain embodiments. In certain embodiments, this configuration cache is separate from any (e.g., lower level) shared cache in the memory hierarchy.

Figure 42:
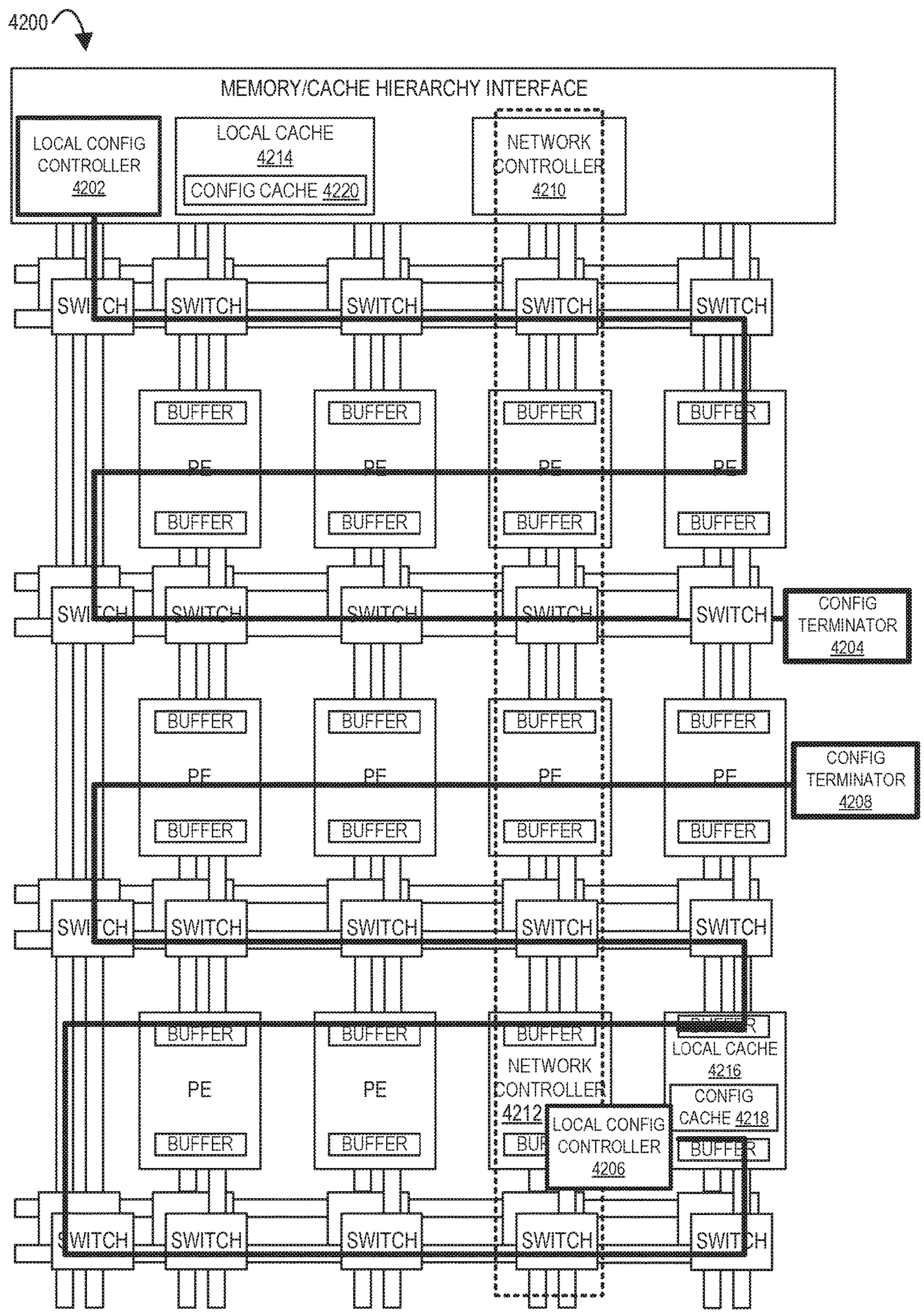
FIG. 42 illustrates an accelerator tile comprising an array of processing elements, a configuration cache, and a local configuration controller according to embodiments of the disclosure.

FIG. 42 illustrates an accelerator tile 4200 comprising an array of processing elements, a configuration cache (e.g., 4218 or 4220), and a local configuration controller (e.g., 4202 or 4206) according to embodiments of the disclosure. In one embodiment, configuration cache 4214 is co-located with local configuration controller 4202. In one embodiment, configuration cache 4218 is located in the configuration domain of local configuration controller 4206, e.g., with a first domain ending at configuration terminator 4204 and a second domain ending at configuration terminator 4208). A configuration cache may allow a local configuration controller may refer to the configuration cache during configuration, e.g., in the hope of obtaining configuration state with lower latency than a reference to memory. A configuration cache (storage) may either be dedicated or may be accessed as a configuration mode of an in-fabric storage element, e.g., local cache 4216.

Caching Modes

1. Demand Caching—In this mode, the configuration cache operates as a true cache. The configuration controller issues address-based requests, which are checked against tags in the cache. Misses are loaded into the cache and then may be re-referenced during future reprogramming.
2. In-Fabric Storage (Scratchpad) Caching—In this mode the configuration cache receives a reference to a configuration sequence in its own, small address space, rather than the larger address space of the host. This may improve memory density since the portion of cache used to store tags may instead be used to store configuration.

In certain embodiments, a configuration cache may have the configuration data pre-loaded into it, e.g., either by external direction or internal direction. This may allow reduction in the latency to load programs. Certain embodiments herein provide for an interface to a configuration cache which permits the loading of new configuration state into the cache, e.g., even if a configuration is running in the fabric already. The initiation of this load may occur from either an internal or external source. Embodiments of a pre-loading mechanism further reduce latency by removing the latency of cache loading from the configuration path.

Pre Fetching Modes

1. Explicit Prefetching—A configuration path is augmented with a new command, ConfigurationCachePrefetch. Instead of programming the fabric, this command simply cause a load of the relevant program configuration into a configuration cache, without programming the fabric. Since this mechanism piggybacks on the existing configuration infrastructure, it is exposed both within the fabric and externally, e.g., to cores and other entities accessing the memory space.

2. Implicit prefetching—A global configuration controller may maintain a prefetch predictor, and use this to initiate the explicit prefetching to a configuration cache, e.g., in an automated fashion.

7.3 Hardware for Rapid Reconfiguration of a CSA in Response to an Exception

Certain embodiments of a CSA (e.g., a spatial fabric) include large amounts of instruction and configuration state, e.g., which is largely static during the operation of the CSA. Thus, the configuration state may be vulnerable to soft errors. Rapid and error-free recovery of these soft errors may be critical to the long-term reliability and performance of spatial systems.

Certain embodiments herein provide for a rapid configuration recovery loop, e.g., in which configuration errors are detected and portions of the fabric immediately reconfigured. Certain embodiments herein include a configuration controller, e.g., with reliability, availability, and serviceability (RAS) reprogramming features. Certain embodiments of CSA include circuitry for high-speed configuration, error reporting, and parity checking within the spatial fabric. Using a combination of these three features, and optionally, a configuration cache, a configuration/exception handling circuit may recover from soft errors in configuration. When detected, soft errors may be conveyed to a configuration cache which initiates an immediate reconfiguration of (e.g., that portion of) the fabric. Certain embodiments provide for a dedicated reconfiguration circuit, e.g., which is faster than any solution that would be indirectly implemented in the fabric. In certain embodiments, co-located exception and configuration circuit cooperates to reload the fabric on configuration error detection.

Figure 43:
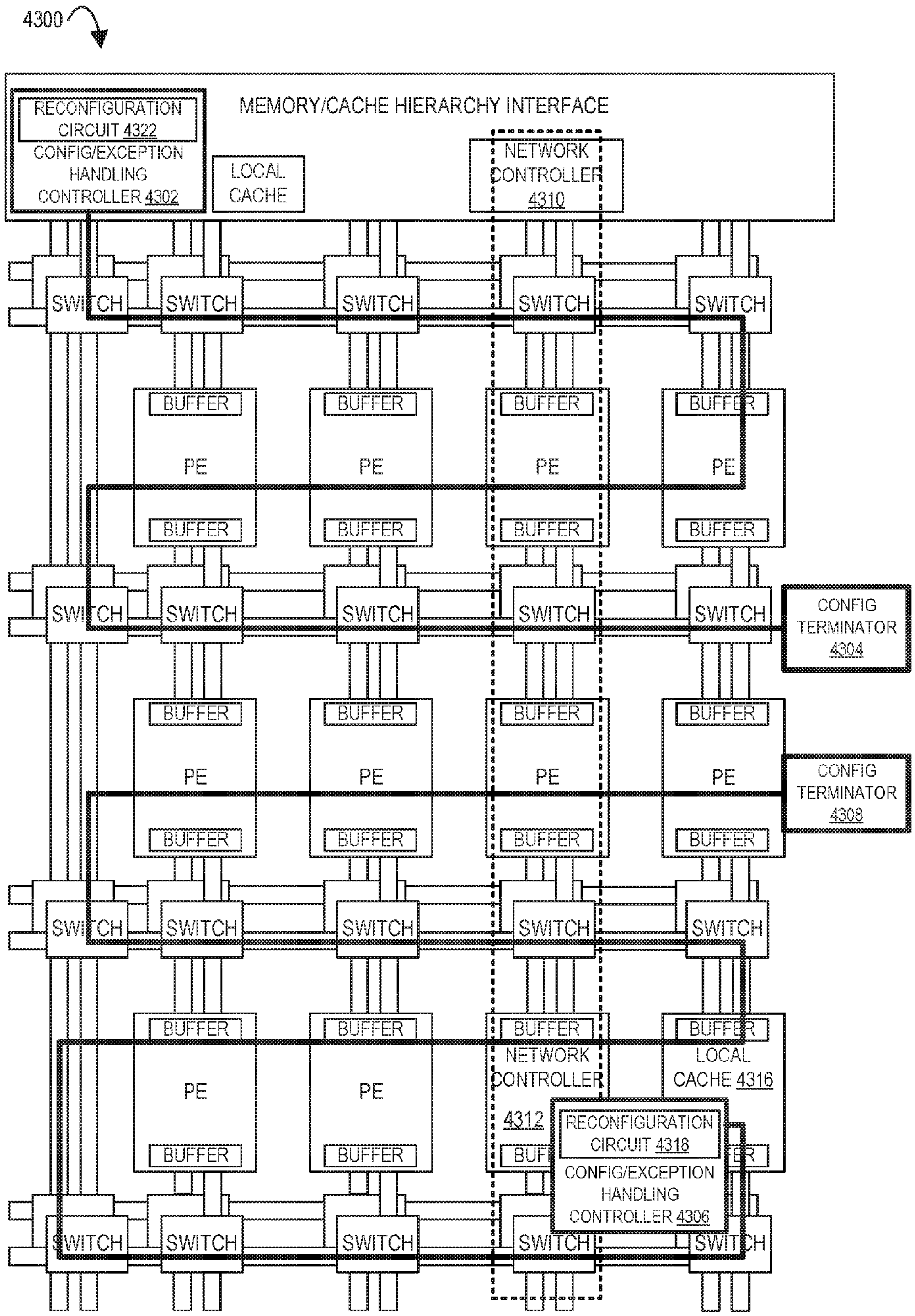
FIG. 43 illustrates an accelerator tile comprising an array of processing elements and a configuration and exception handling controller with a reconfiguration circuit according to embodiments of the disclosure.

FIG. 43 illustrates an accelerator tile 4300 comprising an array of processing elements and a configuration and exception handling controller (4302, 4306) with a reconfiguration circuit (4318, 4322) according to embodiments of the disclosure. In one embodiment, when a PE detects a configuration error through its local RAS features, it sends a (e.g., configuration error or reconfiguration error) message by its exception generator to the configuration and exception handling controller (e.g., 4302 or 4306). On receipt of this message, the configuration and exception handling controller (e.g., 4302 or 4306) initiates the co-located reconfiguration circuit (e.g., 4318 or 4322, respectively) to reload configuration state. The configuration microarchitecture proceeds and reloads (e.g., only) configurations state, and in certain embodiments, only the configuration state for the PE reporting the RAS error. Upon completion of reconfiguration, the fabric may resume normal operation. To decrease latency, the configuration state used by the configuration and exception handling controller (e.g., 4302 or 4306) may be sourced from a configuration cache. As a base case to the configuration or reconfiguration process, a configuration terminator (e.g., configuration terminator 4304 for configuration and exception handling controller 4302 or configuration terminator 4308 for configuration and exception handling controller 4306) in FIG. 43) which asserts that it is configured (or reconfigures) may be included at the end of a chain.

Figure 44:
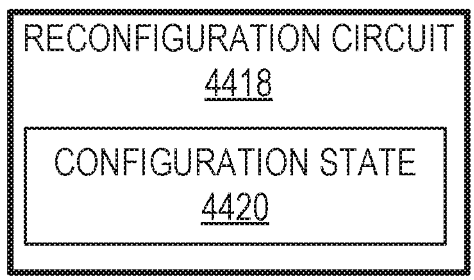
FIG. 44 illustrates a reconfiguration circuit according to embodiments of the disclosure.

FIG. 44 illustrates a reconfiguration circuit 4418 according to embodiments of the disclosure. Reconfiguration circuit 4418 includes a configuration state register 4420 to store the configuration state (or a pointer thereto).

7.4 Hardware for Fabric-Initiated Reconfiguration of a CSA

Some portions of an application targeting a CSA (e.g., spatial array) may be run infrequently or may be mutually exclusive with other parts of the program. To save area, to improve performance, and/or reduce power, it may be useful to time multiplex portions of the spatial fabric among several different parts of the program dataflow graph. Certain embodiments herein include an interface by which a CSA (e.g., via the spatial program) may request that part of the fabric be reprogrammed. This may enable the CSA to dynamically change itself according to dynamic control flow. Certain embodiments herein allow for fabric initiated reconfiguration (e.g., reprogramming). Certain embodiments herein provide for a set of interfaces for triggering configuration from within the fabric. In some embodiments, a PE issues a reconfiguration request based on some decision in the program dataflow graph. This request may travel a network to our new configuration interface, where it triggers reconfiguration. Once reconfiguration is completed, a message may optionally be returned notifying of the completion. Certain embodiments of a CSA thus provide for a program (e.g., dataflow graph) directed reconfiguration capability.

Figure 45:
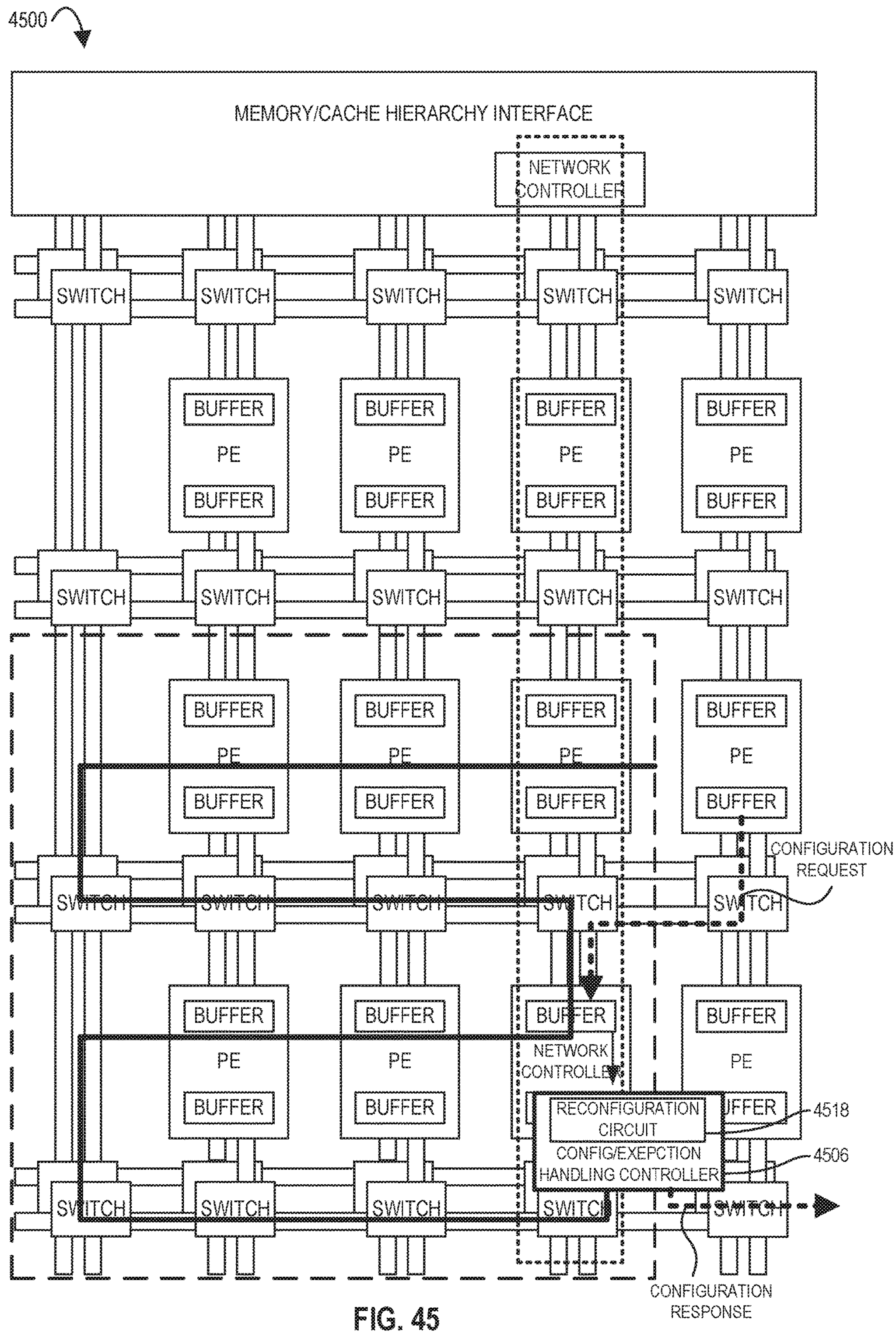
FIG. 45 illustrates an accelerator tile comprising an array of processing elements and a configuration and exception handling controller with a reconfiguration circuit according to embodiments of the disclosure.

FIG. 45 illustrates an accelerator tile 4500 comprising an array of processing elements and a configuration and exception handling controller 4506 with a reconfiguration circuit 4518 according to embodiments of the disclosure. Here, a portion of the fabric issues a request for (re)configuration to a configuration domain, e.g., of configuration and exception handling controller 4506 and/or reconfiguration circuit 4518. The domain (re)configures itself, and when the request has been satisfied, the configuration and exception handling controller 4506 and/or reconfiguration circuit 4518 issues a response to the fabric, to notify the fabric that (re)configuration is complete. In one embodiment, configuration and exception handling controller 4506 and/or reconfiguration circuit 4518 disables communication during the time that (re)configuration is ongoing, so the program has no consistency issues during operation.

Configuration Modes

Configure-by-address—In this mode, the fabric makes a direct request to load configuration data from a particular address.

Configure-by-reference—In this mode the fabric makes a request to load a new configuration, e.g., by a pre-determined reference ID. This may simplify the determination of the code to load, since the location of the code has been abstracted.

Configuring Multiple Domains

A CSA may include a higher level configuration controller to support a multicast mechanism to cast (e.g., via network indicated by the dotted box) configuration requests to multiple (e.g., distributed or local) configuration controllers. This may enable a single configuration request to be replicated across larger portions of the fabric, e.g., triggering a broad reconfiguration.

7.5 Exception Aggregators

Certain embodiments of a CSA may also experience an exception (e.g., exceptional condition), for example, floating point underflow. When these conditions occur, a special handlers may be invoked to either correct the program or to terminate it. Certain embodiments herein provide for a system-level architecture for handling exceptions in spatial fabrics. Since certain spatial fabrics emphasize area efficiency, embodiments herein minimize total area while providing a general exception mechanism. Certain embodiments herein provides a low area means of signaling exceptional conditions occurring in within a CSA (e.g., a spatial array). Certain embodiments herein provide an interface and signaling protocol for conveying such exceptions, as well as a PE-level exception semantics. Certain embodiments herein are dedicated exception handling capabilities, e.g., and do not require explicit handling by the programmer.

Figure 46:
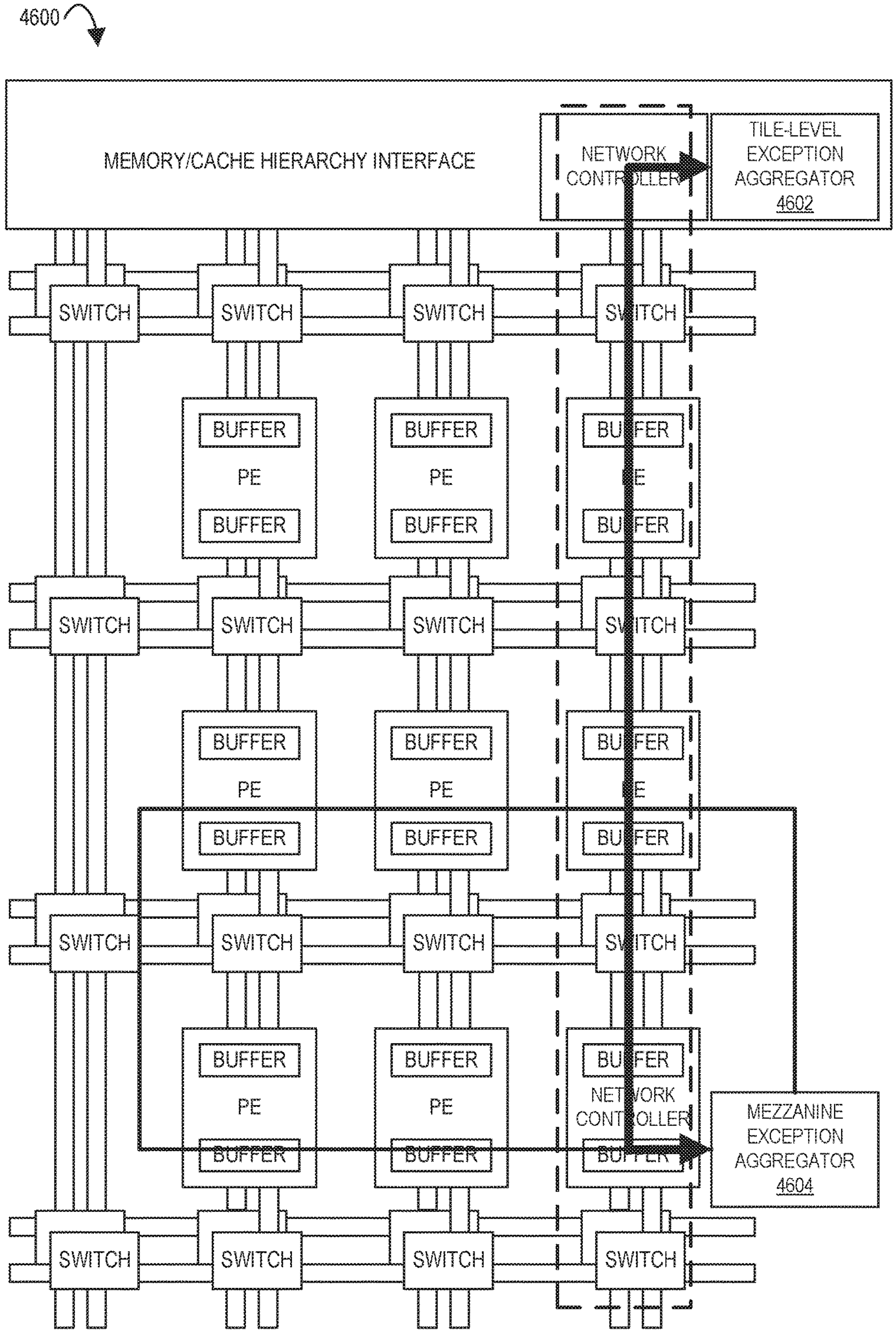
FIG. 46 illustrates an accelerator tile comprising an array of processing elements and a mezzanine exception aggregator coupled to a tile-level exception aggregator according to embodiments of the disclosure.
Figure 47:
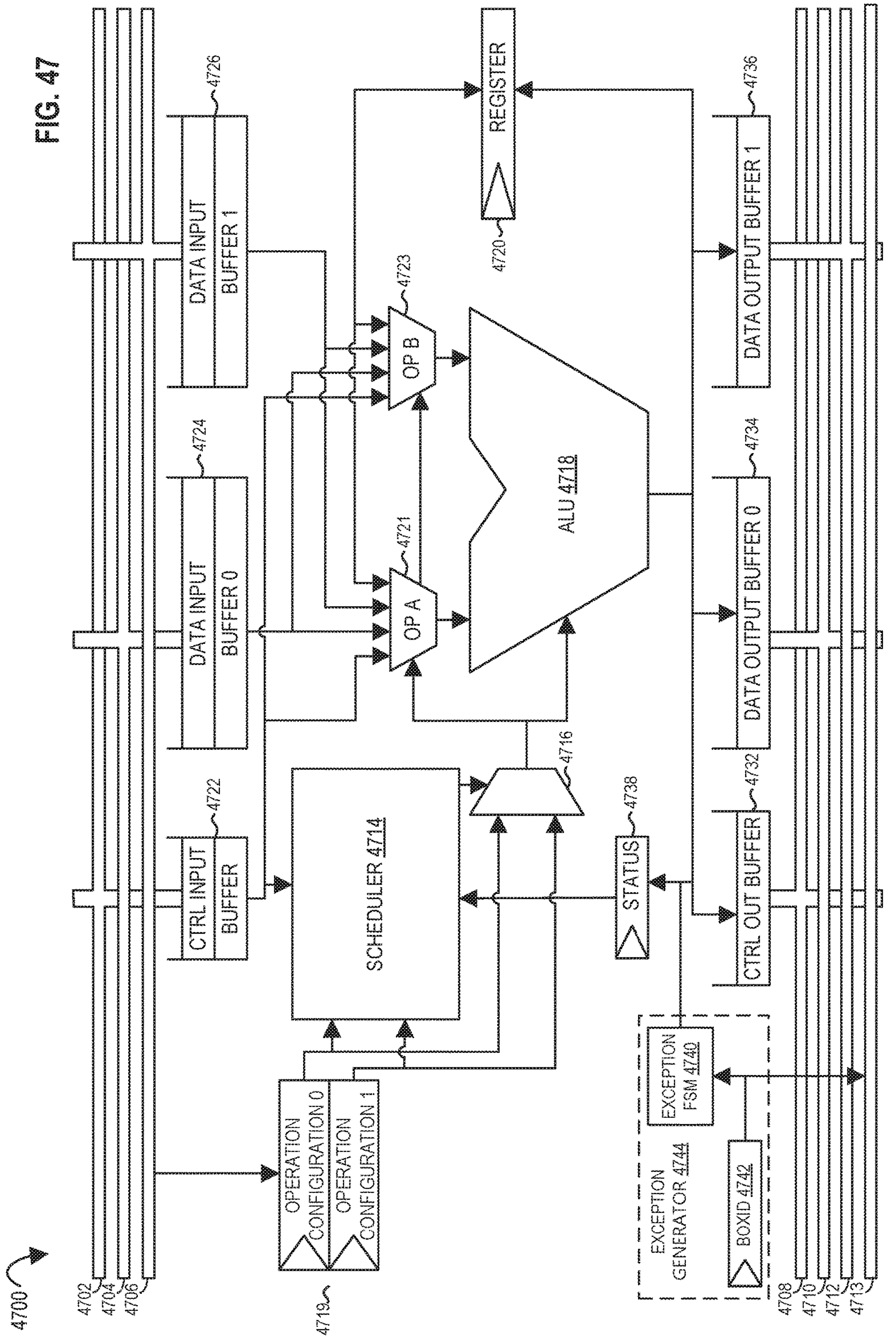
FIG. 47 illustrates a processing element with an exception generator according to embodiments of the disclosure.

One embodiments of a CSA exception architecture consists of four portions, e.g., shown in FIGS. 46-47. These portions may be arranged in a hierarchy, in which exceptions flow from the producer, and eventually up to the tile-level exception aggregator (e.g., handler), which may rendezvous with an exception servicer, e.g., of a core. The four portions may be:

1. PE Exception Generator
2. Local Exception Network
3. Mezzanine Exception Aggregator
4. Tile-Level Exception Aggregator FIG. 46 illustrates an accelerator tile 4600 comprising an array of processing elements and a mezzanine exception aggregator 4602 coupled to a tile-level exception aggregator 4604 according to embodiments of the disclosure. FIG. 47 illustrates a processing element 4700 with an exception generator 4744 according to embodiments of the disclosure.

PE Exception Generator

Processing element 4700 may include processing element 900 from FIG. 9, for example, with similar numbers being similar components, e.g., local network 902 and local network 4702. Additional network 4713 (e.g., channel) may be an exception network. A PE may implement an interface to an exception network (e.g., exception network 4713 (e.g., channel) on FIG. 47). For example, FIG. 47 shows the microarchitecture of such an interface, wherein the PE has an exception generator 4744 (e.g., initiate an exception finite state machine (FSM) 4740 to strobe an exception packet (e.g., BOXID 4742) out on to the exception network. BOXID 4742 may be a unique identifier for an exception producing entity (e.g., a PE or box) within a local exception network. When an exception is detected, exception generator 4744 senses the exception network and strobes out the BOXID when the network is found to be free. Exceptions may be caused by many conditions, for example, but not limited to, arithmetic error, failed ECC check on state, etc. however, it may also be that an exception dataflow operation is introduced, with the idea of support constructs like breakpoints.

The initiation of the exception may either occur explicitly, by the execution of a programmer supplied instruction, or implicitly when a hardened error condition (e.g., a floating point underflow) is detected. Upon an exception, the PE 4700 may enter a waiting state, in which it waits to be serviced by the eventual exception handler, e.g., external to the PE 4700. The contents of the exception packet depend on the implementation of the particular PE, as described below.

Local Exception Network

A (e.g., local) exception network steers exception packets from PE 4700 to the mezzanine exception network. Exception network (e.g., 4713) may be a serial, packet switched network consisting of a (e.g., single) control wire and one or more data wires, e.g., organized in a ring or tree topology, e.g., for a subset of PEs. Each PE may have a (e.g., ring) stop in the (e.g., local) exception network, e.g., where it can arbitrate to inject messages into the exception network.

PE endpoints needing to inject an exception packet may observe their local exception network egress point. If the control signal indicates busy, the PE is to wait to commence inject its packet. If the network is not busy, that is, the downstream stop has no packet to forward, then the PE will proceed commence injection.

Network packets may be of variable or fixed length. Each packet may begin with a fixed length header field identifying the source PE of the packet. This may be followed by a variable number of PE-specific field containing information, for example, including error codes, data values, or other useful status information.

Mezzanine Exception Aggregator

The mezzanine exception aggregator 4604 is responsible for assembling local exception network into larger packets and sending them to the tile-level exception aggregator 4602. The mezzanine exception aggregator 4604 may prepend the local exception packet with its own unique ID, e.g., ensuring that exception messages are unambiguous. The mezzanine exception aggregator 4604 may interface to a special exception-only virtual channel in the mezzanine network, e.g., ensuring the deadlock-freedom of exceptions.

The mezzanine exception aggregator 4604 may also be able to directly service certain classes of exception. For example, a configuration request from the fabric may be served out of the mezzanine network using caches local to the mezzanine network stop.

Tile-Level Exception Aggregator

The final stage of the exception system is the tile-level exception aggregator 4602. The tile-level exception aggregator 4602 is responsible for collecting exceptions from the various mezzanine-level exception aggregators (e.g., 4604) and forwarding them to the appropriate servicing hardware (e.g., core). As such, the tile-level exception aggregator 4602 may include some internal tables and controller to associate particular messages with handler routines. These tables may be indexed either directly or with a small state machine in order to steer particular exceptions.

Like the mezzanine exception aggregator, the tile-level exception aggregator may service some exception requests. For example, it may initiate the reprogramming of a large portion of the PE fabric in response to a specific exception.

7.6 Extraction Controllers

Certain embodiments of a CSA include an extraction controller(s) to extract data from the fabric. The below discusses embodiments of how to achieve this extraction quickly and how to minimize the resource overhead of data extraction. Data extraction may be utilized for such critical tasks as exception handling and context switching. Certain embodiments herein extract data from a heterogeneous spatial fabric by introducing features that allow extractable fabric elements (EFEs) (for example, PEs, network controllers, and/or switches) with variable and dynamically variable amounts of state to be extracted.

Embodiments of a CSA include a distributed data extraction protocol and microarchitecture to support this protocol. Certain embodiments of a CSA include multiple local extraction controllers (LECs) which stream program data out of their local region of the spatial fabric using a combination of a (e.g., small) set of control signals and the fabric-provided network. State elements may be used at each extractable fabric element (EFE) to form extraction chains, e.g., allowing individual EFEs to self-extract without global addressing.

Embodiments of a CSA do not use a local network to extract program data. Embodiments of a CSA include specific hardware support (e.g., an extraction controller) for the formation of extraction chains, for example, and do not rely on software to establish these chains dynamically, e.g., at the cost of increasing extraction time. Embodiments of a CSA are not purely packet switched and do include extra out-of-band control wires (e.g., control is not sent through the data path requiring extra cycles to strobe and reserialize this information). Embodiments of a CSA decrease extraction latency by fixing the extraction ordering and by providing explicit out-of-band control (e.g., by at least a factor of two), while not significantly increasing network complexity.

Embodiments of a CSA do not use a serial mechanism for data extraction, in which data is streamed bit by bit from the fabric using a JTAG-like protocol. Embodiments of a CSA utilize a coarse-grained fabric approach. In certain embodiments, adding a few control wires or state elements to a 64 or 32-bit-oriented CSA fabric has a lower cost relative to adding those same control mechanisms to a 4 or 6 bit fabric.

Figure 48:
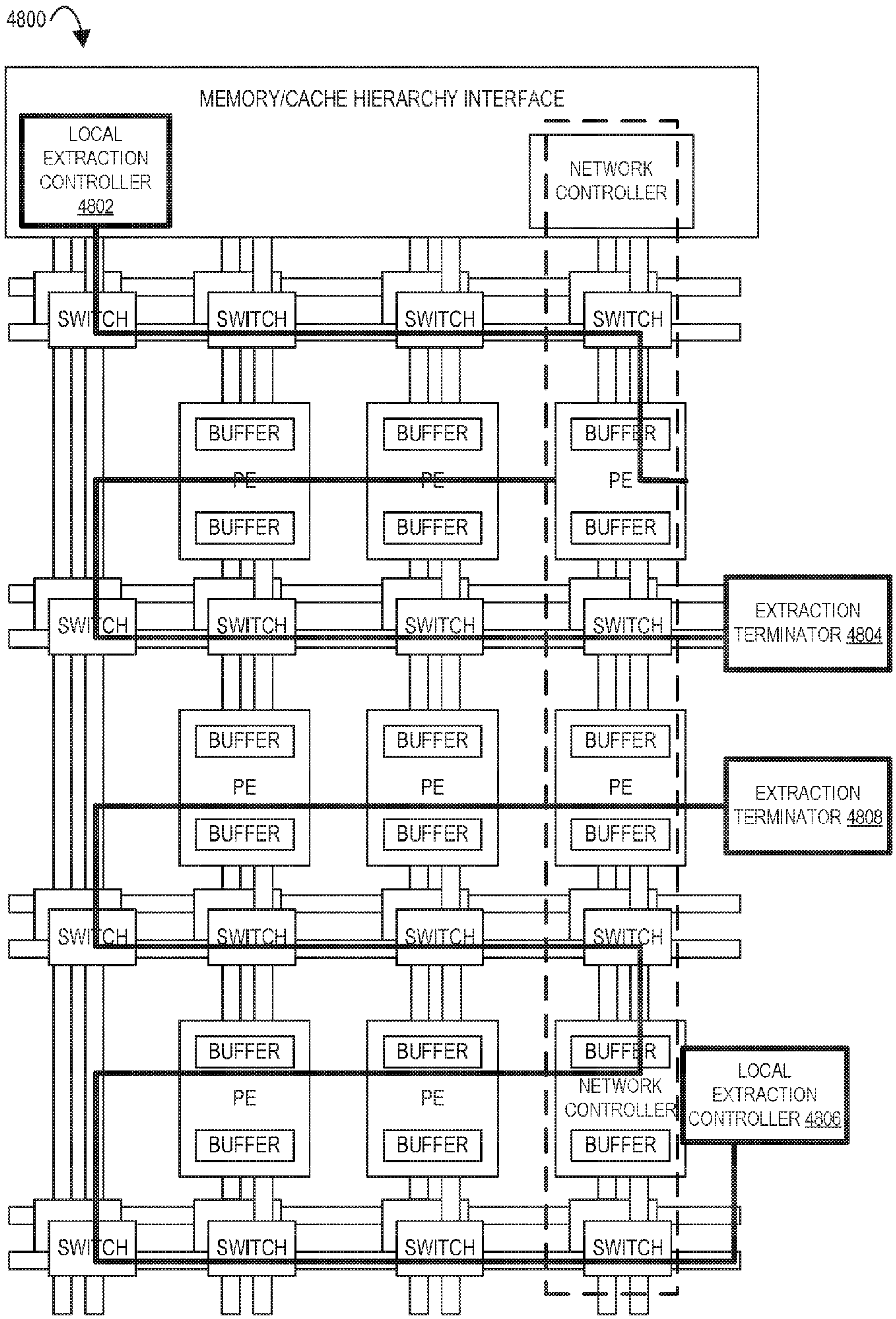
FIG. 48 illustrates an accelerator tile comprising an array of processing elements and a local extraction controller according to embodiments of the disclosure.

FIG. 48 illustrates an accelerator tile 4800 comprising an array of processing elements and a local extraction controller (4802, 4806) according to embodiments of the disclosure. Each PE, each network controller, and each switch may be an extractable fabric elements (EFEs), e.g., which are configured (e.g., programmed) by embodiments of the CSA architecture.

Embodiments of a CSA include hardware that provides for efficient, distributed, low-latency extraction from a heterogeneous spatial fabric. This may be achieved according to four techniques. First, a hardware entity, the local extraction controller (LEC) is utilized, for example, as in FIGS. 48-50. A LEC may accept commands from a host (for example, a processor core), e.g., extracting a stream of data from the spatial array, and writing this data back to virtual memory for inspection by the host. Second, a extraction data path may be included, e.g., that is as wide as the native width of the PE fabric and which may be overlaid on top of the PE fabric. Third, new control signals may be received into the PE fabric which orchestrate the extraction process. Fourth, state elements may be located (e.g., in a register) at each configurable endpoint which track the status of adjacent EFEs, allowing each EFE to unambiguously export its state without extra control signals. These four microarchitectural features may allow a CSA to extract data from chains of EFEs. To obtain low data extraction latency, certain embodiments may partition the extraction problem by including multiple (e.g., many) LECs and EFE chains in the fabric. At extraction time, these chains may operate independently to extract data from the fabric in parallel, e.g., dramatically reducing latency. As a result of these combinations, a CSA may perform a complete state dump (e.g., in hundreds of nanoseconds).

Figure 49A:
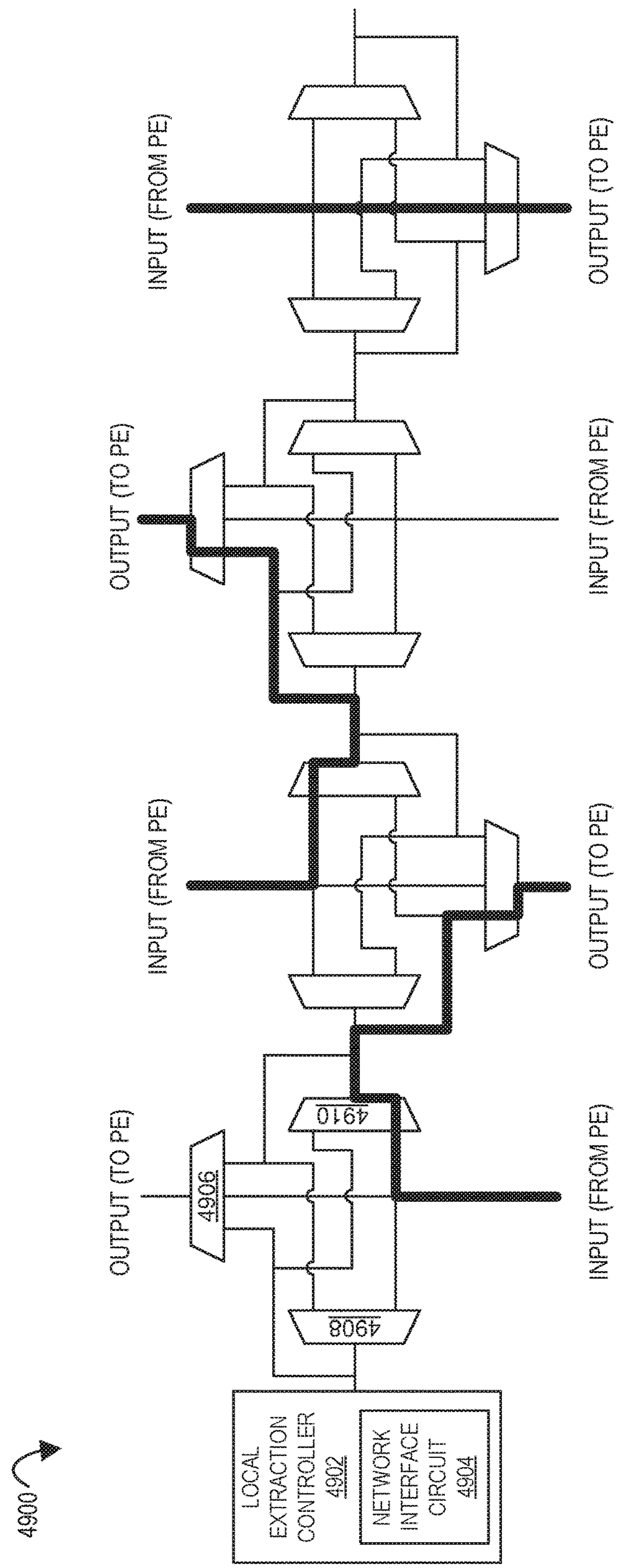
FIGS. 49A-49C illustrate a local extraction controller configuring a data path network according to embodiments of the disclosure.
Figure 49B:
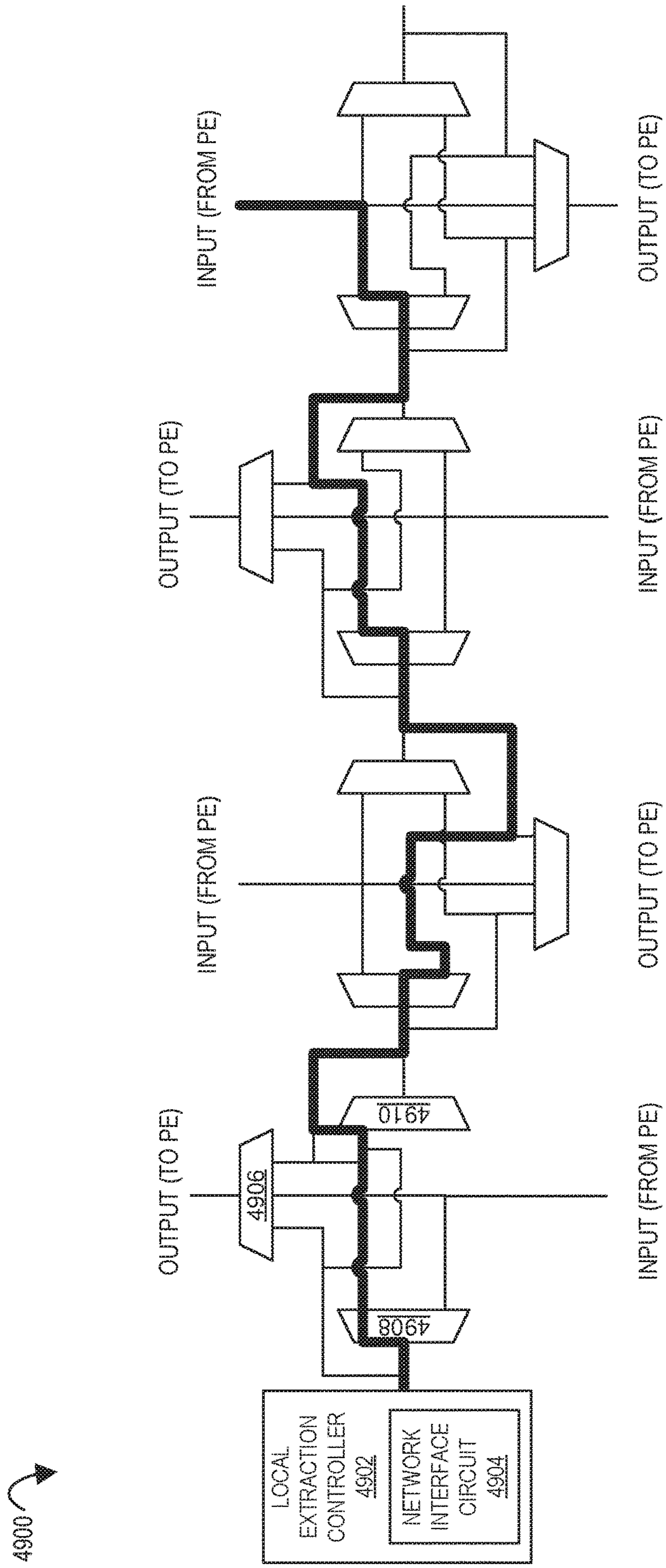
Figure 49C:
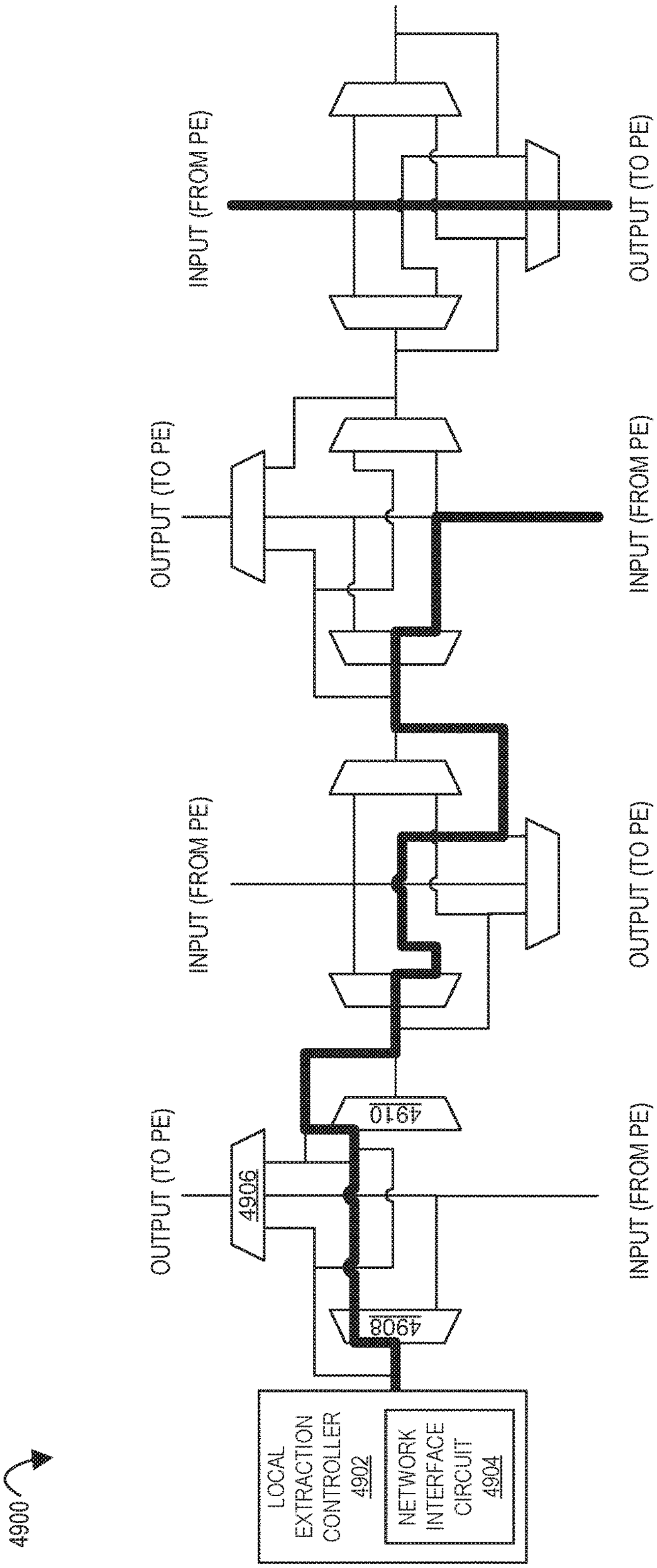

FIGS. 49A-49C illustrate a local extraction controller 4902 configuring a data path network according to embodiments of the disclosure. Depicted network includes a plurality of multiplexers (e.g., multiplexers 4906, 4908, 4910) that may be configured (e.g., via their respective control signals) to connect one or more data paths (e.g., from PEs) together. FIG. 49A illustrates the network 4900 (e.g., fabric) configured (e.g., set) for some previous operation or program. FIG. 49B illustrates the local extraction controller 4902 (e.g., including a network interface circuit 4904 to send and/or receive signals) strobing an extraction signal and all PEs controlled by the LEC enter into extraction mode. The last PE in the extraction chain (or an extraction terminator) may master the extraction channels (e.g., bus) and being sending data according to either (1) signals from the LEC or (2) internally produced signals (e.g., from a PE). Once completed, a PE may set its completion flag, e.g., enabling the next PE to extract its data. FIG. 49C illustrates the most distant PE has completed the extraction process and as a result it has set its extraction state bit or bits, e.g., which swing the muxes into the adjacent network to enable the next PE to begin the extraction process. The extracted PE may resume normal operation. In some embodiments, the PE may remain disabled until other action is taken. In these figures, the multiplexor networks are analogues of the "Switch" shown in certain Figures (e.g., FIG. 6).

The following sections describe the operation of the various components of embodiments of an extraction network.

Local Extraction Controller

Figure 50:
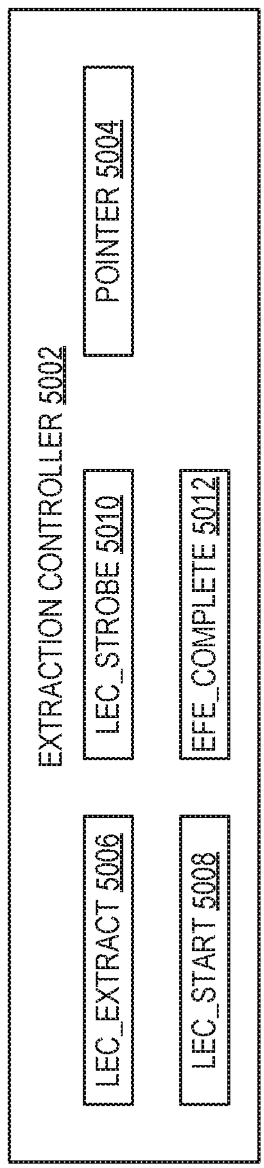
FIG. 50 illustrates an extraction controller according to embodiments of the disclosure.

FIG. 50 illustrates an extraction controller 5002 according to embodiments of the disclosure. A local extraction controller (LEC) may be the hardware entity which is responsible for accepting extraction commands, coordinating the extraction process with the EFEs, and/or storing extracted data, e.g., to virtual memory. In this capacity, the LEC may be a special-purpose, sequential microcontroller.

LEC operation may begin when it receives a pointer to a buffer (e.g., in virtual memory) where fabric state will be written, and, optionally, a command controlling how much of the fabric will be extracted. Depending on the LEC microarchitecture, this pointer (e.g., stored in pointer register 5004) may come either over a network or through a memory system access to the LEC. When it receives such a pointer (e.g., command), the LEC proceeds to extract state from the portion of the fabric for which it is responsible. The LEC may stream this extracted data out of the fabric into the buffer provided by the external caller.

Two different microarchitectures for the LEC are shown in FIG. 48. The first places the LEC 4802 at the memory interface. In this case, the LEC may make direct requests to the memory system to write extracted data. In the second case the LEC 4806 is placed on a memory network, in which it may make requests to the memory only indirectly. In both cases, the logical operation of the LEC may be unchanged. In one embodiment, LECs are informed of the desire to extract data from the fabric, for example, by a set of (e.g., OS-visible) control-status-registers which will be used to inform individual LECs of new commands.

Extra Out-of-Band Control Channels (e.g., Wires)

In certain embodiments, extraction relies on 2-8 extra, out-of-band signals to improve configuration speed, as defined below. Signals driven by the LEC may be labelled LEC. Signals driven by the EFE (e.g., PE) may be labelled EFE. Configuration controller 5002 may include the following control channels, e.g., LEC_EXTRACT control channel 5106, LEC_START control channel 5008, LEC_STROBE control channel 5010, and EFE_COMPLETE control channel 5012, with examples of each discussed in Table 3 below.

TABLE 3

| Extraction Channels | |
|---|---|
| LEC_EXTRACT | Optional signal asserted by the LEC during extraction process. Lowering this signal causes normal operation to resume. |
| LEC_START | Signal denoting start of extraction, allowing setup of local EFE state |
| LEC_STROBE | Optional strobe signal for controlling extraction related state machines at EFEs. EFEs may generate this signal internally in some implementations. |
| EFE_COMPLETE | Optional signal strobed when EFE has completed dumping state. This helps LEC identify the completion of individual EFE dumps. |

Generally, the handling of extraction may be left to the implementer of a particular EFE. For example, selectable function EFE may have a provision for dumping registers using an existing data path, while a fixed function EFE might simply have a multiplexor.

Due to long wire delays when programming a large set of EFEs, the LEC_STROBE signal may be treated as a clock/latch enable for EFE components. Since this signal is used as a clock, in one embodiment the duty cycle of the line is at most 50%. As a result, extraction throughput is approximately halved. Optionally, a second LEC_STROBE signal may be added to enable continuous extraction.

In one embodiment, only LEC_START is strictly communicated on an independent coupling (e.g., wire), for example, other control channels may be overlayed on existing network (e.g., wires).

Reuse of Network Resources

To reduce the overhead of data extraction, certain embodiments of a CSA make use of existing network infrastructure to communicate extraction data. A LEC may make use of both a chip-level memory hierarchy and a fabric-level communications networks to move data from the fabric into storage. As a result, in certain embodiments of a CSA, the extraction infrastructure adds no more than 2% to the overall fabric area and power.

Reuse of network resources in certain embodiments of a CSA may cause a network to have some hardware support for an extraction protocol. Circuit switched networks require of certain embodiments of a CSA cause a LEC to set their multiplexors in a specific way for configuration when the 'LEC_START' signal is asserted. Packet switched networks do not require extension, although LEC endpoints (e.g., extraction terminators) use a specific address in the packet switched network. Network reuse is optional, and some embodiments may find dedicated configuration buses to be more convenient.

Per EFE State

Each EFE may maintain a bit denoting whether or not it has exported its state. This bit may de-asserted when the extraction start signal is driven, and then asserted once the particular EFE finished extraction. In one extraction protocol, EFEs are arranged to form chains with the EFE extraction state bit determining the topology of the chain. A EFE may read the extraction state bit of the immediately adjacent EFE. If this adjacent EFE has its extraction bit set and the current EFE does not, the EFE may determine that it owns the extraction bus. When an EFE dumps its last data value, it may drives the 'EFE_DONE' signal and sets its extraction bit, e.g., enabling upstream EFEs to configure for extraction. The network adjacent to the EFE may observe this signal and also adjust its state to handle the transition. As a base case to the extraction process, an extraction terminator (e.g., extraction terminator 4804 for LEC 4802 or extraction terminator 4808 for LEC 4806 in FIG. 39) which asserts that extraction is complete may be included at the end of a chain.

Internal to the EFE, this bit may be used to drive flow control ready signals. For example, when the extraction bit is de-asserted, network control signals may automatically be clamped to a values that prevent data from flowing, while, within PEs, no operations or actions will be scheduled.

Dealing with High-Delay Paths

One embodiment of a LEC may drive a signal over a long distance, e.g., through many multiplexors and with many loads. Thus, it may be difficult for a signal to arrive at a distant EFE within a short clock cycle. In certain embodiments, extraction signals are at some division (e.g., fraction of) of the main (e.g., CSA) clock frequency to ensure digital timing discipline at extraction. Clock division may be utilized in an out-of-band signaling protocol, and does not require any modification of the main clock tree.

Ensuring Consistent Fabric Behavior During Extraction

Since certain extraction scheme are distributed and have non-deterministic timing due to program and memory effects, different members of the fabric may be under extraction at different times. While LEC_EXTRACT is driven, all network flow control signals may be driven logically low, e.g., thus freezing the operation of a particular segment of the fabric.

An extraction process may be non-destructive. Therefore a set of PEs may be considered operational once extraction has completed. An extension to an extraction protocol may allow PEs to optionally be disabled post extraction. Alternatively, beginning configuration during the extraction process will have similar effect in embodiments.

Single PE Extraction

In some cases, it may be expedient to extract a single PE. In this case, an optional address signal may be driven as part of the commencement of the extraction process. This may enable the PE targeted for extraction to be directly enabled. Once this PE has been extracted, the extraction process may cease with the lowering of the LEC_EXTRACT signal. In this way, a single PE may be selectively extracted, e.g., by the local extraction controller.

Handling Extraction Backpressure

In an embodiment where the LEC writes extracted data to memory (for example, for post-processing, e.g., in software), it may be subject to limited memory bandwidth. In the case that the LEC exhausts its buffering capacity, or expects that it will exhaust its buffering capacity, it may stops strobing the LEC_STROBE signal until the buffering issue has resolved.

Note that in certain figures (e.g., FIGS. 39, 42, 43, 45, 46, and 48) communications are shown schematically. In certain embodiments, those communications may occur over the (e.g., interconnect) network.

7.7 Flow Diagrams

Figure 51:
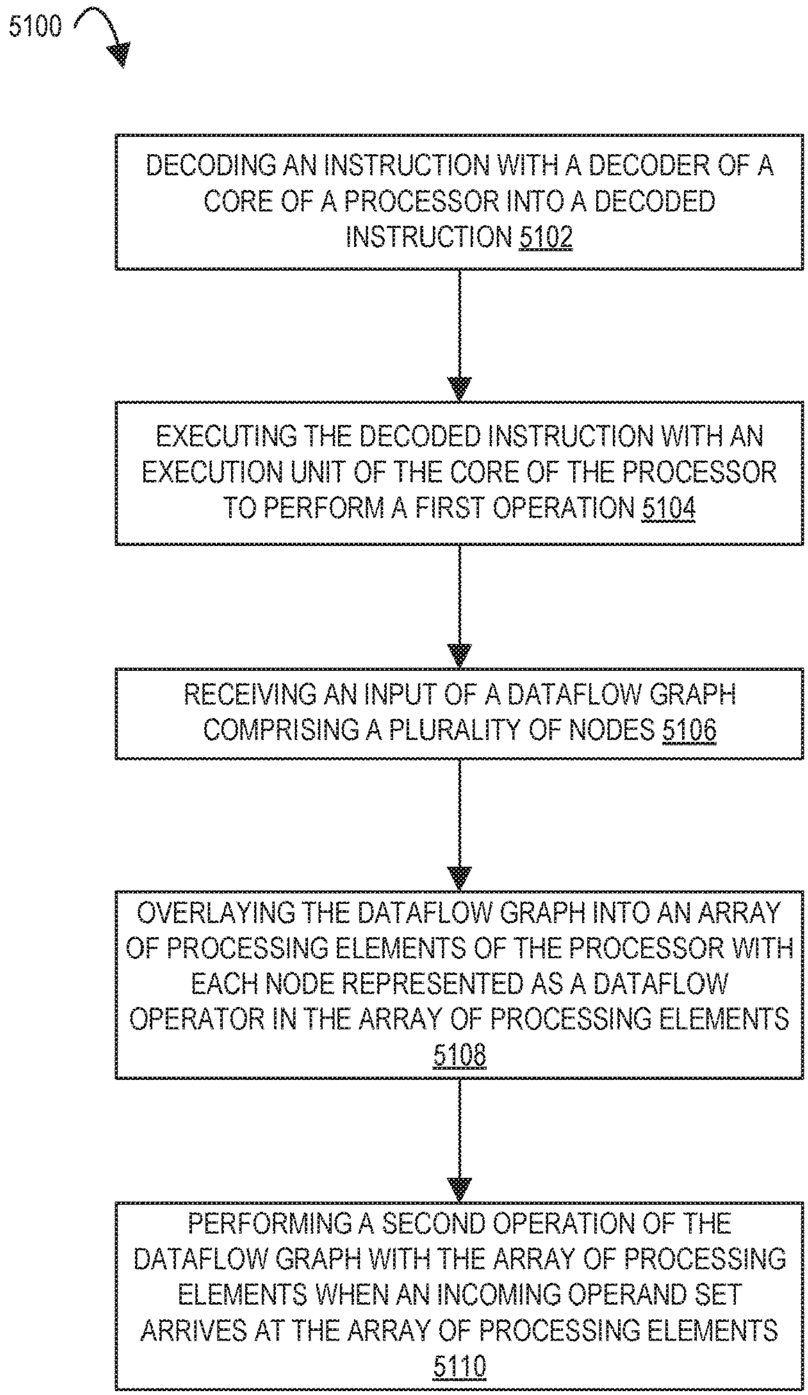
FIG. 51 illustrates a flow diagram according to embodiments of the disclosure.

FIG. 51 illustrates a flow diagram 5100 according to embodiments of the disclosure. Depicted flow 5100 includes decoding an instruction with a decoder of a core of a processor into a decoded instruction 5102; executing the decoded instruction with an execution unit of the core of the processor to perform a first operation 5104; receiving an input of a dataflow graph comprising a plurality of nodes 5106; overlaying the dataflow graph into an array of processing elements of the processor with each node represented as a dataflow operator in the array of processing elements 5108; and performing a second operation of the dataflow graph with the array of processing elements when an incoming operand set arrives at the array of processing elements 5110.

Figure 52:
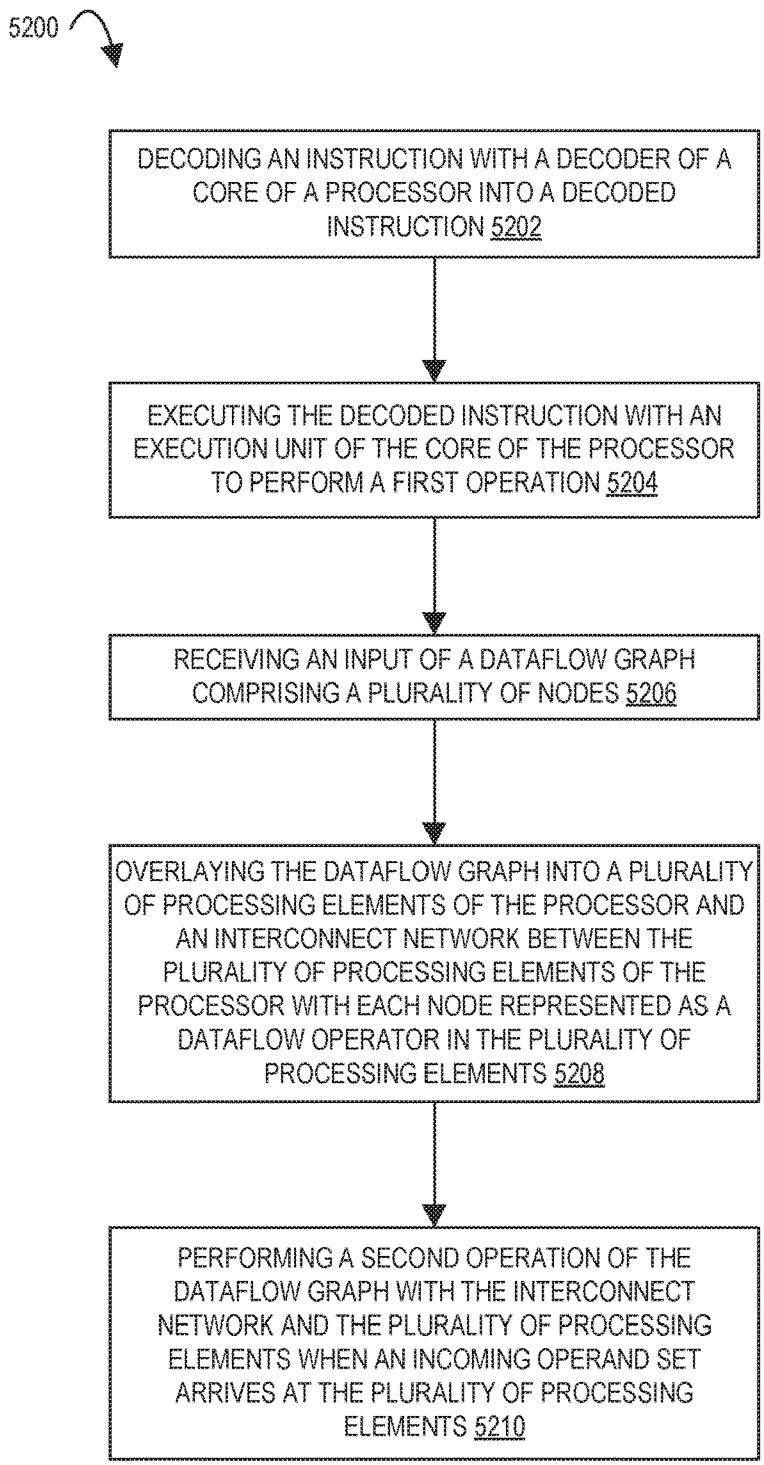
FIG. 52 illustrates a flow diagram according to embodiments of the disclosure.

FIG. 52 illustrates a flow diagram 5200 according to embodiments of the disclosure. Depicted flow 5200 includes decoding an instruction with a decoder of a core of a processor into a decoded instruction 5202; executing the decoded instruction with an execution unit of the core of the processor to perform a first operation 5204; receiving an input of a dataflow graph comprising a plurality of nodes 5206; overlaying the dataflow graph into a plurality of processing elements of the processor and an interconnect network between the plurality of processing elements of the processor with each node represented as a dataflow operator in the plurality of processing elements 5208; and performing a second operation of the dataflow graph with the interconnect network and the plurality of processing elements when an incoming operand set arrives at the plurality of processing elements 5210.

8. Example Memory Ordering in Acceleration Hardware (e.g., in A Spatial Array of Processing Elements)

Figure 53A:
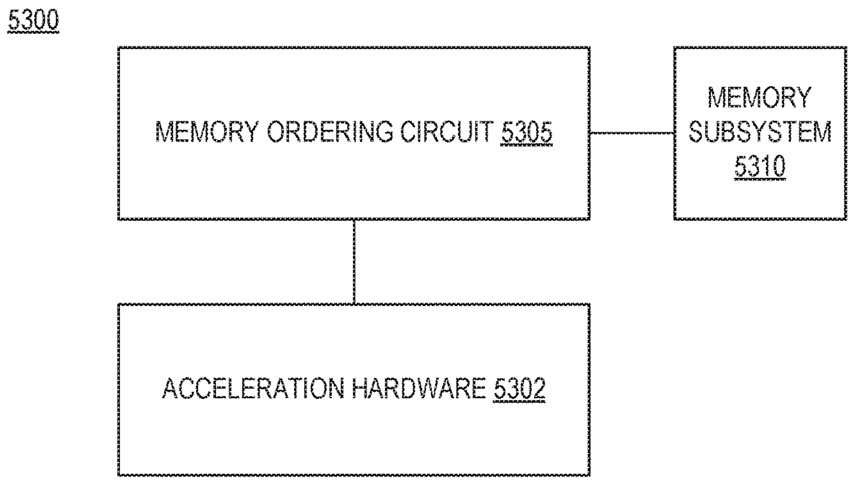
FIG. 53A is a block diagram of a system that employs a memory ordering circuit interposed between a memory subsystem and acceleration hardware according to embodiments of the disclosure.

FIG. 53A is a block diagram of a system 5300 that employs a memory ordering circuit 5305 interposed between a memory subsystem 5310 and acceleration hardware 5302, according to an embodiment of the present disclosure. The memory subsystem 5310 may include known memory components, including cache, memory, and one or more memory controller(s) associated with a processor-based architecture. The acceleration hardware 5302 may be coarse-grained spatial architecture made up of lightweight processing elements (or other types of processing components) connected by an inter-processing element (PE) network or another type of inter-component network.

In one embodiment, programs, viewed as control data flow graphs, are mapped onto the spatial architecture by configuring PEs and a communications network. Generally, PEs are configured as dataflow operators, similar to functional units in a processor: once the input operands arrive at the PE, some operation occurs, and results are forwarded to downstream PEs in a pipelined fashion. Dataflow operators (or other types of operators) may choose to consume incoming data on a per-operator basis. Simple operators, like those handling the unconditional evaluation of arithmetic expressions often consume all incoming data. It is sometimes useful, however, for operators to maintain state, for example, in accumulation.

The PEs communicate using dedicated virtual circuits, which are formed by statically configuring a circuit-switched communications network. These virtual circuits are flow controlled and fully back pressured, such that PEs will stall if either the source has no data or the destination is full. At runtime, data flows through the PEs implementing a mapped algorithm according to a dataflow graph, also referred to as a subprogram herein. For example, data may be streamed in from memory, through the acceleration hardware 5302, and then back out to memory. Such an architecture can achieve remarkable performance efficiency relative to traditional multicore processors: compute, in the form of PEs, is simpler and more numerous than larger cores and communication is direct, as opposed to an extension of the memory subsystem 5310. Memory system parallelism, however, helps to support parallel PE computation. If memory accesses are serialized, high parallelism is likely unachievable. To facilitate parallelism of memory accesses, the disclosed memory ordering circuit 5305 includes memory ordering architecture and microarchitecture, as will be explained in detail. In one embodiment, the memory ordering circuit 5305 is a request address file circuit (or "RAF") or other memory request circuitry.

Figure 53B:
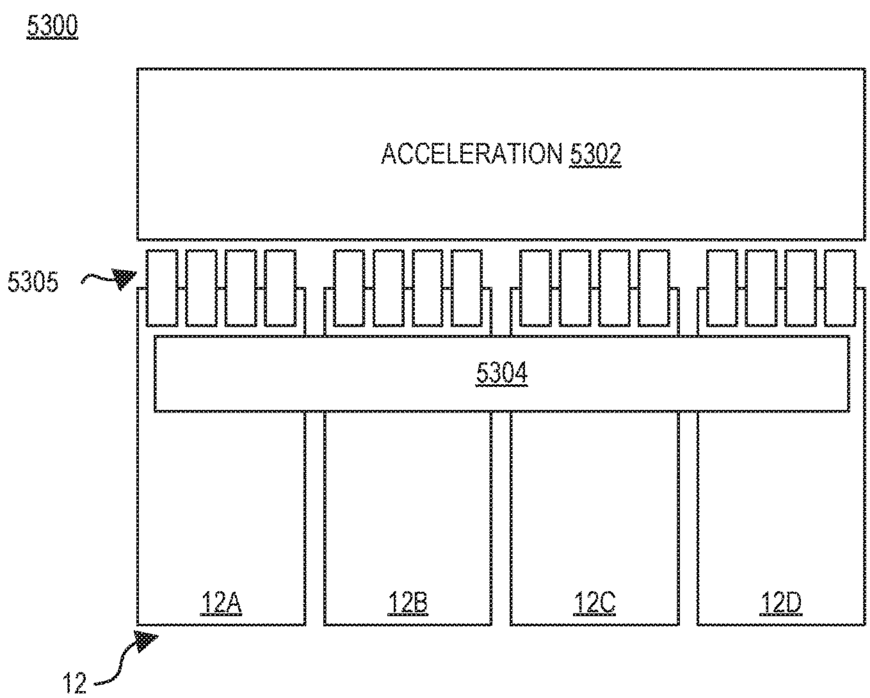
FIG. 53B is a block diagram of the system of FIG. 53A, but which employs multiple memory ordering circuits according to embodiments of the disclosure.

FIG. 53B is a block diagram of the system 5300 of FIG. 53A but which employs multiple memory ordering circuits 5305, according to an embodiment of the present disclosure. Each memory ordering circuit 5305 may function as an interface between the memory subsystem 5310 and a portion of the acceleration hardware 5302 (e.g., spatial array of processing elements or tile). The memory subsystem 5310 may include a plurality of cache slices 12 (e.g., cache slices 12A, 12B, 12C, and 12D in the embodiment of FIG. 53B), and a certain number of memory ordering circuits 5305 (four in this embodiment) may be used for each cache slice 12. A crossbar 5304 (e.g., RAF circuit) may connect the memory ordering circuits 5305 to banks of cache that make up each cache slice 12A, 12B, 12C, and 12D. For example, there may be eight banks of memory in each cache slice in one embodiment. The system 5300 may be instantiated on a single die, for example, as a system on a chip (SoC). In one embodiment, the SoC includes the acceleration hardware 5302. In an alternative embodiment, the acceleration hardware 5302 is an external programmable chip such as an FPGA or CGRA, and the memory ordering circuits 5305 interface with the acceleration hardware 5302 through an input/output hub or the like.

Each memory ordering circuit 5305 may accept read and write requests to the memory subsystem 5310. The requests from the acceleration hardware 5302 arrive at the memory ordering circuit 5305 in a separate channel for each node of the dataflow graph that initiates read or write accesses, also referred to as load or store accesses herein. Buffering is provided so that the processing of loads will return the requested data to the acceleration hardware 5302 in the order it was requested. In other words, iteration six data is returned before iteration seven data, and so forth. Furthermore, note that the request channel from a memory ordering circuit 5305 to a particular cache bank may be implemented as an ordered channel and any first request that leaves before a second request will arrive at the cache bank before the second request.

Figure 54:
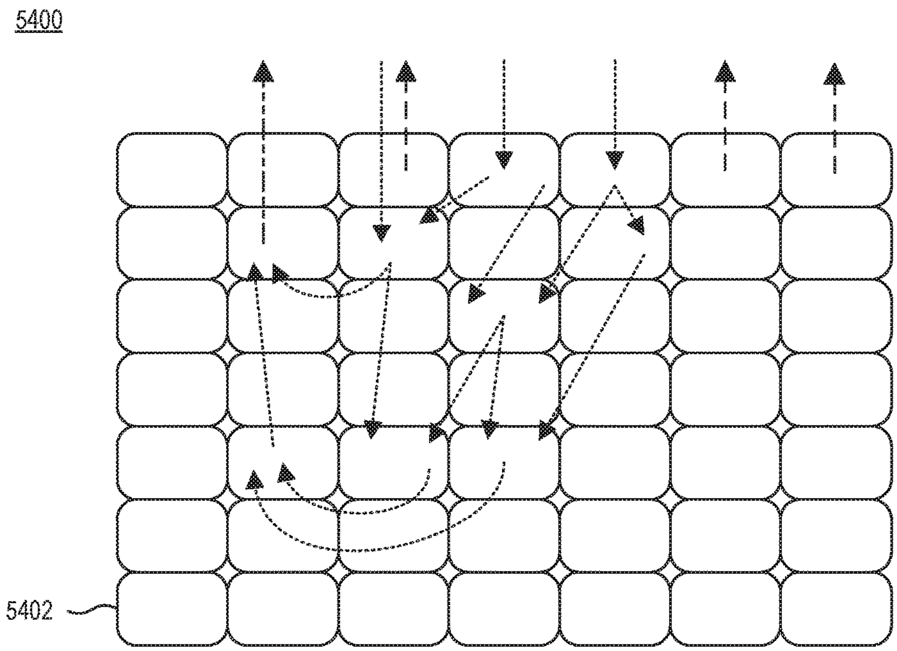
FIG. 54 is a block diagram illustrating general functioning of memory operations into and out of acceleration hardware according to embodiments of the disclosure.

FIG. 54 is a block diagram 5400 illustrating general functioning of memory operations into and out of the acceleration hardware 5302, according to an embodiment of the present disclosure. The operations occurring out the top of the acceleration hardware 5302 are understood to be made to and from a memory of the memory subsystem 5310. Note that two load requests are made, followed by corresponding load responses. While the acceleration hardware 5302 performs processing on data from the load responses, a third load request and response occur, which trigger additional acceleration hardware processing. The results of the acceleration hardware processing for these three load operations are then passed into a store operation, and thus a final result is stored back to memory.

By considering this sequence of operations, it may be evident that spatial arrays more naturally map to channels. Furthermore, the acceleration hardware 5302 is latency-insensitive in terms of the request and response channels, and inherent parallel processing that may occur. The acceleration hardware may also decouple execution of a program from implementation of the memory subsystem 5310 (FIG. 53A), as interfacing with the memory occurs at discrete moments separate from multiple processing steps taken by the acceleration hardware 5302. For example, a load request to and a load response from memory are separate actions, and may be scheduled differently in different circumstances depending on dependency flow of memory operations. The use of spatial fabric, for example, for processing instructions facilitates spatial separation and distribution of such a load request and a load response.

Figure 55:
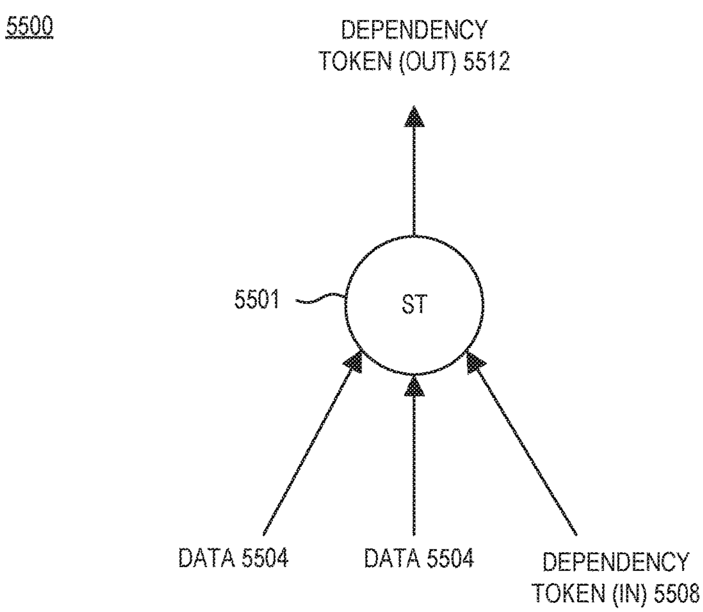
FIG. 55 is a block diagram illustrating a spatial dependency flow for a store operation according to embodiments of the disclosure.

FIG. 55 is a block diagram 5500 illustrating a spatial dependency flow for a store operation 5501, according to an embodiment of the present disclosure. Reference to a store operation is exemplary, as the same flow may apply to a load operation (but without incoming data), or to other operators such as a fence. A fence is an ordering operation for memory subsystems that ensures that all prior memory operations of a type (such as all stores or all loads) have completed. The store operation 5501 may receive an address 5502 (of memory) and data 5504 received from the acceleration hardware 5302. The store operation 5501 may also receive an incoming dependency token 5508, and in response to the availability of these three items, the store operation 5501 may generate an outgoing dependency token 5512. The incoming dependency token, which may, for example, be an initial dependency token of a program, may be provided in a compiler-supplied configuration for the program, or may be provided by execution of memory-mapped input/output (I/O). Alternatively, if the program has already been running, the incoming dependency token 5508 may be received from the acceleration hardware 5302, e.g., in association with a preceding memory operation from which the store operation 5501 depends. The outgoing dependency token 5512 may be generated based on the address 5502 and data 5504 being required by a program-subsequent memory operation.

Figure 56:
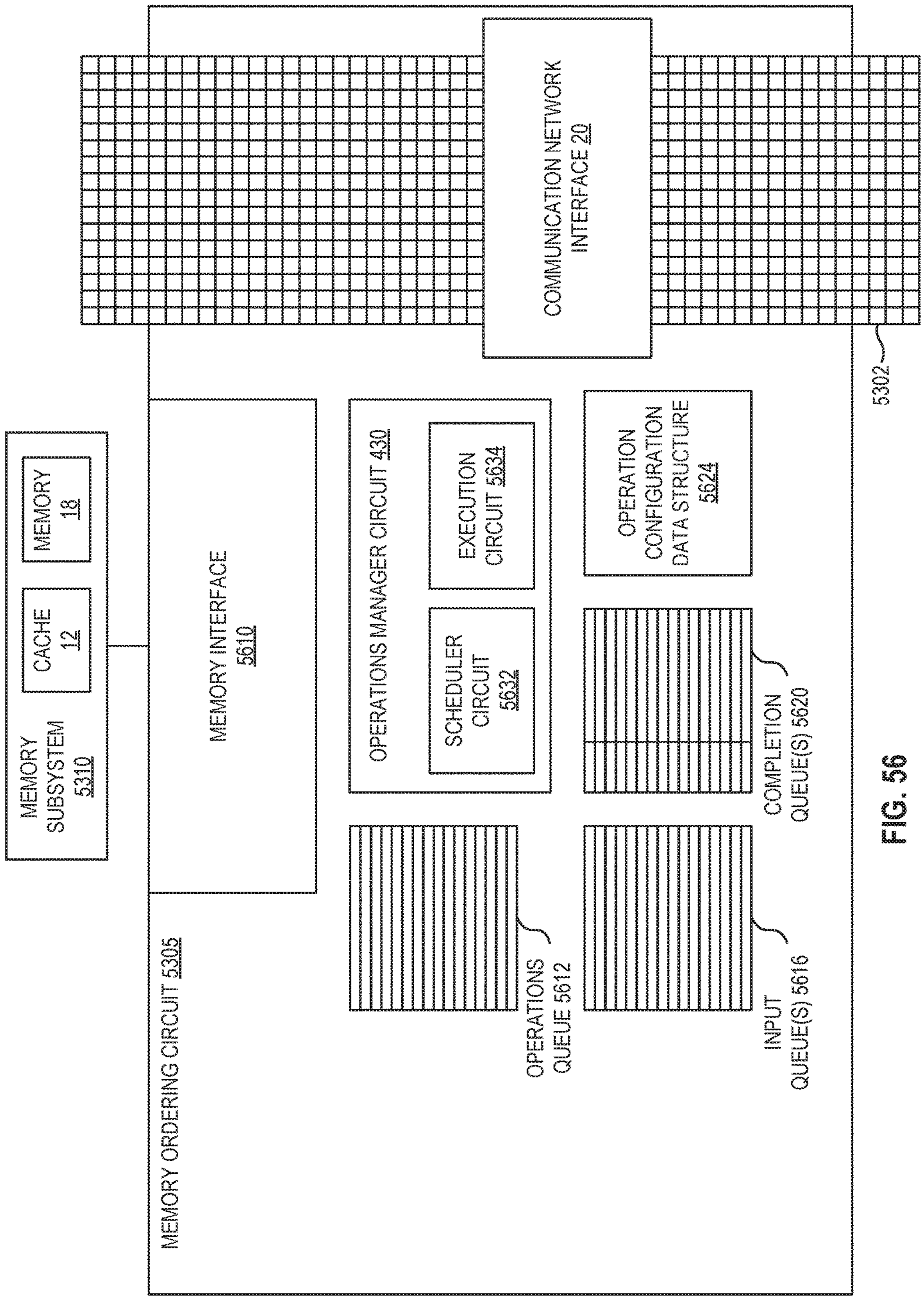
FIG. 56 is a detailed block diagram of the memory ordering circuit of FIG. 53 according to embodiments of the disclosure.

FIG. 56 is a detailed block diagram of the memory ordering circuit 5305 of FIG. 53A, according to an embodiment of the present disclosure. The memory ordering circuit 5305 may be coupled to an out-of-order memory subsystem 5310, which as discussed, may include cache 12 and memory 18, and associated out-of-order memory controller(s). The memory ordering circuit 5305 may include, or be coupled to, a communications network interface 20 that may be either an inter-tile or an intra-tile network interface, and may be a circuit switched network interface (as illustrated), and thus include circuit-switched interconnects. Alternatively, or additionally, the communications network interface 20 may include packet-switched interconnects.

The memory ordering circuit 5305 may further include, but not be limited to, a memory interface 5610, an operations queue 5612, input queue(s) 5616, a completion queue 5620, an operation configuration data structure 5624, and an operations manager circuit 5630 that may further include a scheduler circuit 5632 and an execution circuit 5634. In one embodiment, the memory interface 5610 may be circuit-switched, and in another embodiment, the memory interface 5610 may be packet-switched, or both may exist simultaneously. The operations queue 5612 may buffer memory operations (with corresponding arguments) that are being processed for request, and may, therefore, correspond to addresses and data coming into the input queues 5616.

More specifically, the input queues 5616 may be an aggregation of at least the following: a load address queue, a store address queue, a store data queue, and a dependency queue. When implementing the input queue 5616 as aggregated, the memory ordering circuit 5305 may provide for sharing of logical queues, with additional control logic to logically separate the queues, which are individual channels with the memory ordering circuit. This may maximize input queue usage, but may also require additional complexity and space for the logic circuitry to manage the logical separation of the aggregated queue. Alternatively, as will be discussed with reference to FIG. 57, the input queues 5616 may be implemented in a segregated fashion, with a separate hardware queue for each. Whether aggregated (FIG. 56) or disaggregated (FIG. 57), implementation for purposes of this disclosure is substantially the same, with the former using additional logic to logically separate the queues within a single, shared hardware queue.

When shared, the input queues 5616 and the completion queue 5620 may be implemented as ring buffers of a fixed size. A ring buffer is an efficient implementation of a circular queue that has a first-in-first-out (FIFO) data characteristic. These queues may, therefore, enforce a semantical order of a program for which the memory operations are being requested. In one embodiment, a ring buffer (such as for the store address queue) may have entries corresponding to entries flowing through an associated queue (such as the store data queue or the dependency queue) at the same rate. In this way, a store address may remain associated with corresponding store data.

More specifically, the load address queue may buffer an incoming address of the memory 18 from which to retrieve data. The store address queue may buffer an incoming address of the memory 18 to which to write data, which is buffered in the store data queue. The dependency queue may buffer dependency tokens in association with the addresses of the load address queue and the store address queue. Each queue, representing a separate channel, may be implemented with a fixed or dynamic number of entries. When fixed, the more entries that are available, the more efficient complicated loop processing may be made. But, having too many entries costs more area and energy to implement. In some cases, e.g., with the aggregated architecture, the disclosed input queue 5616 may share queue slots. Use of the slots in a queue may be statically allocated.

The completion queue 5620 may be a separate set of queues to buffer data received from memory in response to memory commands issued by load operations. The completion queue 5620 may be used to hold a load operation that has been scheduled but for which data has not yet been received (and thus has not yet completed). The completion queue 5620, may therefore, be used to reorder data and operation flow.

The operations manager circuit 5630, which will be explained in more detail with reference to FIGS. 57 through 13, may provide logic for scheduling and executing queued memory operations when taking into account dependency tokens used to provide correct ordering of the memory operations. The operation manager 5630 may access the operation configuration data structure 5624 to determine which queues are grouped together to form a given memory operation. For example, the operation configuration data structure 5624 may include that a specific dependency counter (or queue), input queue, output queue, and completion queue are all grouped together for a particular memory operation. As each successive memory operation may be assigned a different group of queues, access to varying queues may be interleaved across a sub-program of memory operations. Knowing all of these queues, the operations manager circuit 5630 may interface with the operations queue 5612, the input queue(s) 5616, the completion queue(s) 5620, and the memory subsystem 5310 to initially issue memory operations to the memory subsystem 5310 when successive memory operations become "executable," and to next complete the memory operation with some acknowledgement from the memory subsystem. This acknowledgement may be, for example, data in response to a load operation command or an acknowledgement of data being stored in the memory in response to a store operation command.

Figure 57:
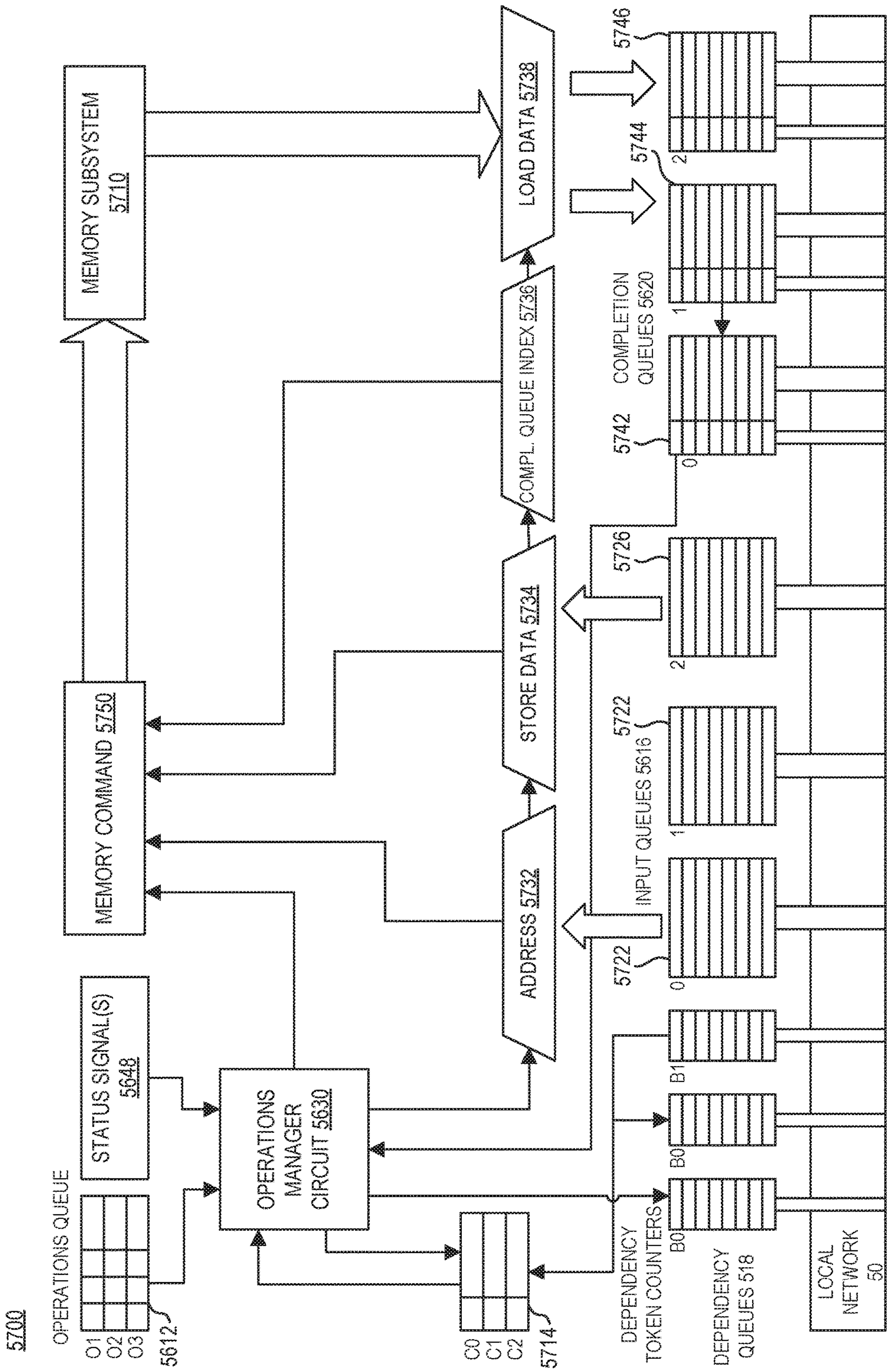
FIG. 57 is a flow diagram of a microarchitecture of the memory ordering circuit of FIG. 53 according to embodiments of the disclosure.

FIG. 57 is a flow diagram of a microarchitecture 5700 of the memory ordering circuit 5305 of FIG. 53A, according to an embodiment of the present disclosure. The memory subsystem 5310 may allow illegal execution of a program in which ordering of memory operations is wrong, due to the semantics of C language (and other object-oriented program languages). The microarchitecture 5700 may enforce the ordering of the memory operations (sequences of loads from and stores to memory) so that results of instructions that the acceleration hardware 5302 executes are properly ordered. A number of local networks 50 are illustrated to represent a portion of the acceleration hardware 5302 coupled to the microarchitecture 5700.

From an architectural perspective, there are at least two goals: first, to run general sequential codes correctly, and second, to obtain high performance in the memory operations performed by the microarchitecture 5700. To ensure program correctness, the compiler expresses the dependency between the store operation and the load operation to an array, p, in some fashion, which are expressed via dependency tokens as will be explained. To improve performance, the microarchitecture 5700 finds and issues as many load commands of an array in parallel as is legal with respect to program order.

In one embodiment, the microarchitecture 5700 may include the operations queue 5612, the input queues 5616, the completion queues 5620, and the operations manager circuit 5630 discussed with reference to FIG. 56, above, where individual queues may be referred to as channels. The microarchitecture 5700 may further include a plurality of dependency token counters 5714 (e.g., one per input queue), a set of dependency queues 5718 (e.g., one each per input queue), an address multiplexer 5732, a store data multiplexer 5734, a completion queue index multiplexer 5736, and a load data multiplexer 5738. The operations manager circuit 5630, in one embodiment, may direct these various multiplexers in generating a memory command 5750 (to be sent to the memory subsystem 5310) and in receipt of responses of load commands back from the memory subsystem 5310, as will be explained.

The input queues 5616, as mentioned, may include a load address queue 5722, a store address queue 5724, and a store data queue 5726. (The small numbers 0, 1, 2 are channel labels and will be referred to later in FIG. 60 and FIG. 63A.) In various embodiments, these input queues may be multiplied to contain additional channels, to handle additional parallelization of memory operation processing. Each dependency queue 5718 may be associated with one of the input queues 5616. More specifically, the dependency queue 5718 labeled B0 may be associated with the load address queue 5722 and the dependency queue labeled B1 may be associated with the store address queue 5724. If additional channels of the input queues 5616 are provided, the dependency queues 5718 may include additional, corresponding channels.

In one embodiment, the completion queues 5620 may include a set of output buffers 5744 and 5746 for receipt of load data from the memory subsystem 5310 and a completion queue 5742 to buffer addresses and data for load operations according to an index maintained by the operations manager circuit 5630. The operations manager circuit 5630 can manage the index to ensure in-order execution of the load operations, and to identify data received into the output buffers 5744 and 5746 that may be moved to scheduled load operations in the completion queue 5742.

More specifically, because the memory subsystem 5310 is out of order, but the acceleration hardware 5302 completes operations in order, the microarchitecture 5700 may re-order memory operations with use of the completion queue 5742. Three different sub-operations may be performed in relation to the completion queue 5742, namely to allocate, enqueue, and dequeue. For allocation, the operations manager circuit 5630 may allocate an index into the completion queue 5742 in an in-order next slot of the completion queue. The operations manager circuit may provide this index to the memory subsystem 5310, which may then know the slot to which to write data for a load operation. To enqueue, the memory subsystem 5310 may write data as an entry to the indexed, in-order next slot in the completion queue 5742 like random access memory (RAM), setting a status bit of the entry to valid. To dequeue, the operations manager circuit 5630 may present the data stored in this in-order next slot to complete the load operation, setting the status bit of the entry to invalid. Invalid entries may then be available for a new allocation.

In one embodiment, the status signals 5648 may refer to statuses of the input queues 5616, the completion queues 5620, the dependency queues 5718, and the dependency token counters 5714. These statuses, for example, may include an input status, an output status, and a control status, which may refer to the presence or absence of a dependency token in association with an input or an output. The input status may include the presence or absence of addresses and the output status may include the presence or absence of store values and available completion buffer slots. The dependency token counters 5714 may be a compact representation of a queue and track a number of dependency tokens used for any given input queue. If the dependency token counters 5714 saturate, no additional dependency tokens may be generated for new memory operations. Accordingly, the memory ordering circuit 5305 may stall scheduling new memory operations until the dependency token counters 5714 becomes unsaturated.

Figure 58:
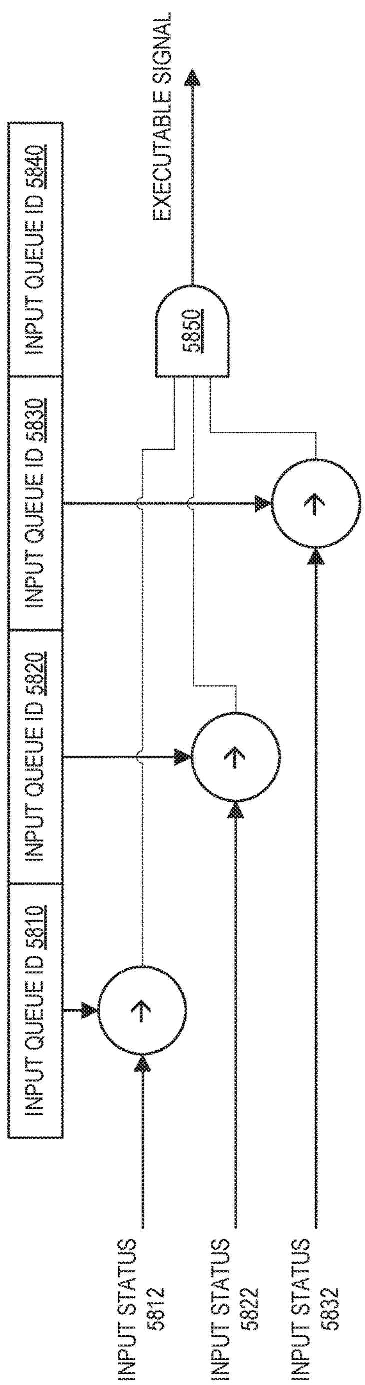
FIG. 58 is a block diagram of an executable determiner circuit according to embodiments of the disclosure.

With additional reference to FIG. 58, FIG. 58 is a block diagram of an executable determiner circuit 5800, according to an embodiment of the present disclosure. The memory ordering circuit 5305 may be set up with several different kinds of memory operations, for example a load and a store:

ldNo[d,x] result.outN, addr.in64, order.in0, order.out0 stNo[d,x] addr.in64, data.inN, order.in0, order.out0

The executable determiner circuit 5800 may be integrated as a part of the scheduler circuit 5632 and which may perform a logical operation to determine whether a given memory operation is executable, and thus ready to be issued to memory. A memory operation may be executed when the queues corresponding to its memory arguments have data and an associated dependency token is present. These memory arguments may include, for example, an input queue identifier 5810 (indicative of a channel of the input queue 5616), an output queue identifier 5820 (indicative of a channel of the completion queues 5620), a dependency queue identifier 5830 (e.g., what dependency queue or counter should be referenced), and an operation type indicator 5840 (e.g., load operation or store operation). A field (e.g., of a memory request) may be included, e.g., in the above format, that stores a bit or bits to indicate to use the hazard checking hardware.

These memory arguments may be queued within the operations queue 5612, and used to schedule issuance of memory operations in association with incoming addresses and data from memory and the acceleration hardware 5302. (See FIG. 59.) Incoming status signals 5648 may be logically combined with these identifiers and then the results may be added (e.g., through an AND gate 5850) to output an executable signal, e.g., which is asserted when the memory operation is executable. The incoming status signals 5648 may include an input status 5812 for the input queue identifier 5810, an output status 5822 for the output queue identifier 5820, and a control status 5832 (related to dependency tokens) for the dependency queue identifier 5830.

For a load operation, and by way of example, the memory ordering circuit 5305 may issue a load command when the load operation has an address (input status) and room to buffer the load result in the completion queue 5742 (output status). Similarly, the memory ordering circuit 5305 may issue a store command for a store operation when the store operation has both an address and data value (input status). Accordingly, the status signals 5648 may communicate a level of emptiness (or fullness) of the queues to which the status signals pertain. The operation type may then dictate whether the logic results in an executable signal depending on what address and data should be available.

To implement dependency ordering, the scheduler circuit 5632 may extend memory operations to include dependency tokens as underlined above in the example load and store operations. The control status 5832 may indicate whether a dependency token is available within the dependency queue identified by the dependency queue identifier 5830, which could be one of the dependency queues 5718 (for an incoming memory operation) or a dependency token counter 5714 (for a completed memory operation). Under this formulation, a dependent memory operation requires an additional ordering token to execute and generates an additional ordering token upon completion of the memory operation, where completion means that data from the result of the memory operation has become available to program-subsequent memory operations.

In one embodiment, with further reference to FIG. 57, the operations manager circuit 5630 may direct the address multiplexer 5732 to select an address argument that is buffered within either the load address queue 5722 or the store address queue 5724, depending on whether a load operation or a store operation is currently being scheduled for execution. If it is a store operation, the operations manager circuit 5630 may also direct the store data multiplexer 5734 to select corresponding data from the store data queue 5726. The operations manager circuit 5630 may also direct the completion queue index multiplexer 5736 to retrieve a load operation entry, indexed according to queue status and/or program order, within the completion queues 5620, to complete a load operation. The operations manager circuit 5630 may also direct the load data multiplexer 5738 to select data received from the memory subsystem 5310 into the completion queues 5620 for a load operation that is awaiting completion. In this way, the operations manager circuit 5630 may direct selection of inputs that go into forming the memory command 5750, e.g., a load command or a store command, or that the execution circuit 5634 is waiting for to complete a memory operation.

Figure 59:
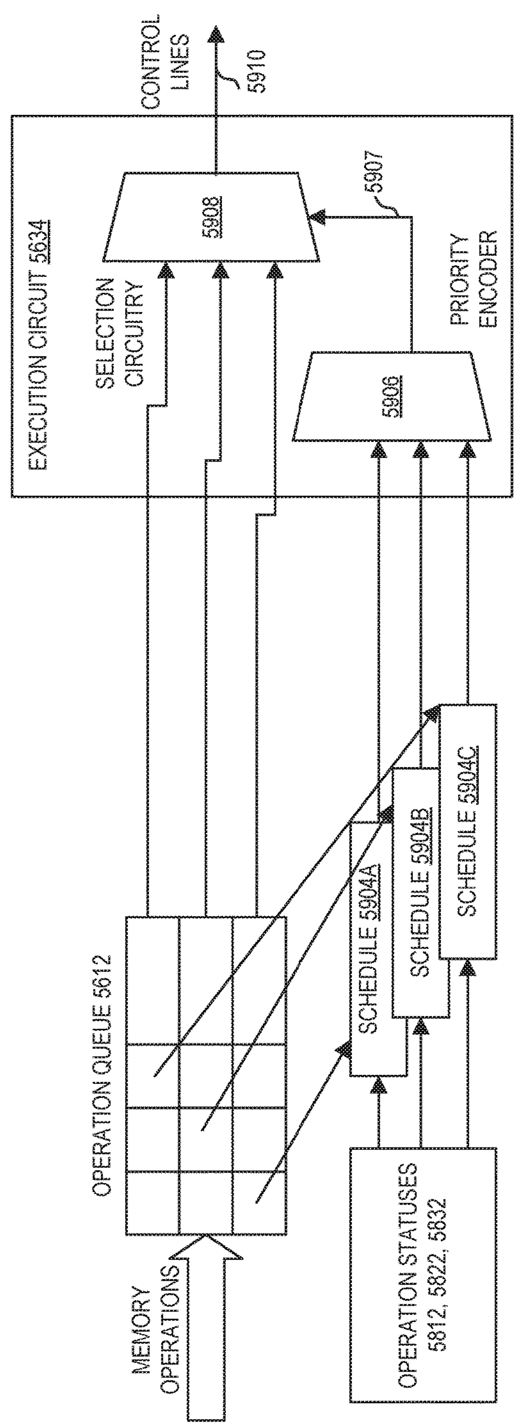
FIG. 59 is a block diagram of a priority encoder according to embodiments of the disclosure.

FIG. 59 is a block diagram the execution circuit 5634 that may include a priority encoder 5906 and selection circuitry 5908 and which generates output control line(s) 5910, according to one embodiment of the present disclosure. In one embodiment, the execution circuit 5634 may access queued memory operations (in the operations queue 5612) that have been determined to be executable (FIG. 58). The execution circuit 5634 may also receive the schedules 5904A, 5904B, 5904C for multiple of the queued memory operations that have been queued and also indicated as ready to issue to memory. The priority encoder 5906 may thus receive an identity of the executable memory operations that have been scheduled and execute certain rules (or follow particular logic) to select the memory operation from those coming in that has priority to be executed first. The priority encoder 5906 may output a selector signal 5907 that identifies the scheduled memory operation that has a highest priority, and has thus been selected.

The priority encoder 5906 for example, may be a circuit (such as a state machine or a simpler converter) that compresses multiple binary inputs into a smaller number of outputs, including possibly just one output. The output of a priority encoder is the binary representation of the original number starting from zero of the most significant input bit. So, in one example, when memory operation 0 ("zero"), memory operation one ("1"), and memory operation two ("2") are executable and scheduled, corresponding to 5904A, 5904B, and 5904C, respectively. The priority encoder 5906 may be configured to output the selector signal 5907 to the selection circuitry 5908 indicating the memory operation zero as the memory operation that has highest priority. The selection circuitry 5908 may be a multiplexer in one embodiment, and be configured to output its selection (e.g., of memory operation zero) onto the control lines 5910, as a control signal, in response to the selector signal from the priority encoder 5906 (and indicative of selection of memory operation of highest priority). This control signal may go to the multiplexers 5732, 5734, 5736, and/or 5738, as discussed with reference to FIG. 57, to populate the memory command 5750 that is next to issue (be sent) to the memory subsystem 5310. The transmittal of the memory command may be understood to be issuance of a memory operation to the memory subsystem 5310.

FIG. 60 is a block diagram of an exemplary load operation 6000, both logical and in binary form, according to an embodiment of the present disclosure. Referring back to FIG. 58, the logical representation of the load operation 6000 may include channel zero ("0") (corresponding to the load address queue 5722) as the input queue identifier 5810 and completion channel one ("1") (corresponding to the output buffer 5744) as the output queue identifier 5820. The dependency queue identifier 5830 may include two identifiers, channel B0 (corresponding to the first of the dependency queues 5718) for incoming dependency tokens and counter C0 for outgoing dependency tokens. The operation type 5840 has an indication of "Load," which could be a numerical indicator as well, to indicate the memory operation is a load operation. Below the logical representation of the logical memory operation is a binary representation for exemplary purposes, e.g., where a load is indicated by "00." The load operation of FIG. 60 may be extended to include other configurations such as a store operation (FIG. 62A) or other type of memory operations, such as a fence.

An example of memory ordering by the memory ordering circuit 5305 will be illustrated with a simplified example for purposes of explanation with relation to FIGS. 61A-61B, 62A-62B, and 63A-63G. For this example, the following code includes an array, p, which is accessed by indices i and i+2:

```
for (i) {
temp=p[i];
p[i+2]=temp;
}
```

Figure 61A:
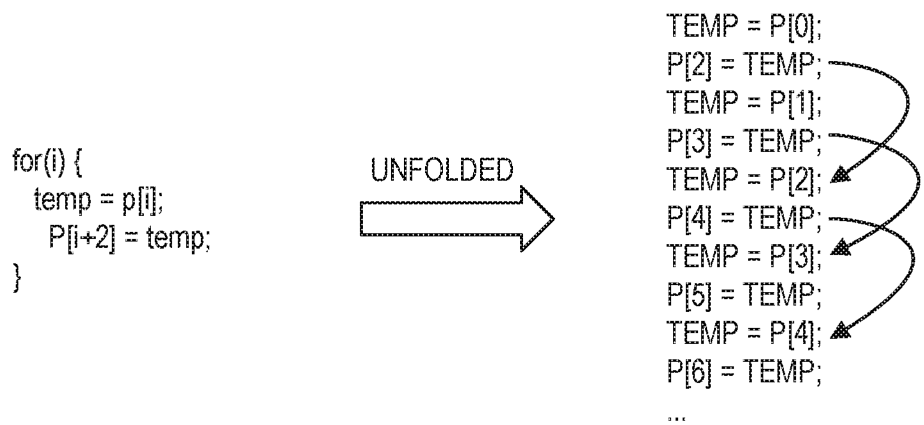
FIG. 61A is flow diagram illustrating logical execution of an example code according to embodiments of the disclosure.
Figure 61B:
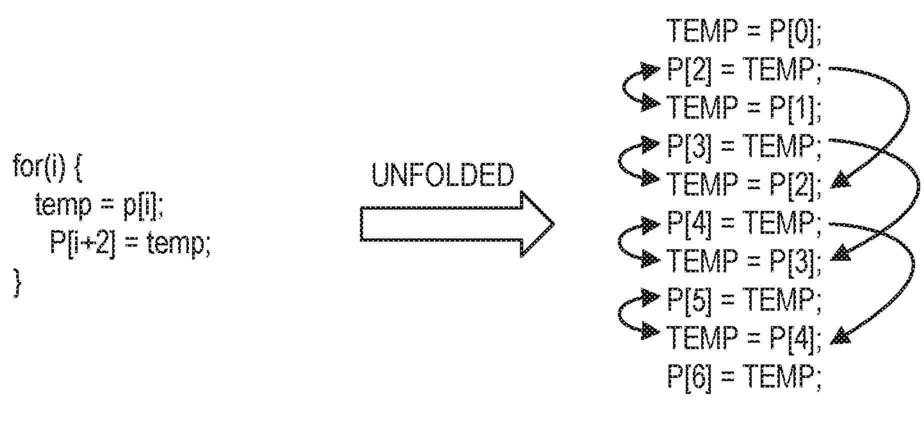
FIG. 61B is the flow diagram of FIG. 61A, illustrating memory-level parallelism in an unfolded version of the example code according to embodiments of the disclosure.

Assume, for this example, that array p contains 0,1,2,3, 4,5,6, and at the end of loop execution, array p will contain 0,1,0,1,0,1,0. This code may be transformed by unrolling the loop, as illustrated in FIGS. 61A and 61B. True address dependencies are annotated by arrows in FIG. 61A, which in each case, a load operation is dependent on a store operation to the same address. For example, for the first of such dependencies, a store (e.g., a write) to p[2] needs to occur before a load (e.g., a read) from p[2], and second of such dependencies, a store to p[3] needs to occur before a load from p[3], and so forth. As a compiler is to be pessimistic, the compiler annotates dependencies between two memory operations, load p[i] and store p[i+2]. Note that only sometimes do reads and writes conflict. The microarchitecture 5700 is designed to extract memory-level parallelism where memory operations may move forward at the same time when there are no conflicts to the same address. This is especially the case for load operations, which expose latency in code execution due to waiting for preceding dependent store operations to complete. In the example code in FIG. 61B, safe reorderings are noted by the arrows on the left of the unfolded code.

The way the microarchitecture may perform this reordering is discussed with reference to FIGS. 62A-62B and 63A-63G. Note that this approach is not as optimal as possible because the microarchitecture 5700 may not send a memory command to memory every cycle. However, with minimal hardware, the microarchitecture supports dependency flows by executing memory operations when operands (e.g., address and data, for a store, or address for a load) and dependency tokens are available.

FIG. 62A is a block diagram of exemplary memory arguments for a load operation 6202 and for a store operation 6204, according to an embodiment of the present disclosure. These, or similar, memory arguments were discussed with relation to FIG. 60 and will not be repeated here. Note, however, that the store operation 6204 has no indicator for the output queue identifier because no data is being output to the acceleration hardware 5302. Instead, the store address in channel 1 and the data in channel 2 of the input queues 5616, as identified in the input queue identifier memory argument, are to be scheduled for transmission to the memory subsystem 5310 in a memory command to complete the store operation 6204. Furthermore, the input channels and output channels of the dependency queues are both implemented with counters. Because the load operations and the store operations as displayed in FIGS. 61A and 61B are interdependent, the counters may be cycled between the load operations and the store operations within the flow of the code.

Figure 62B:
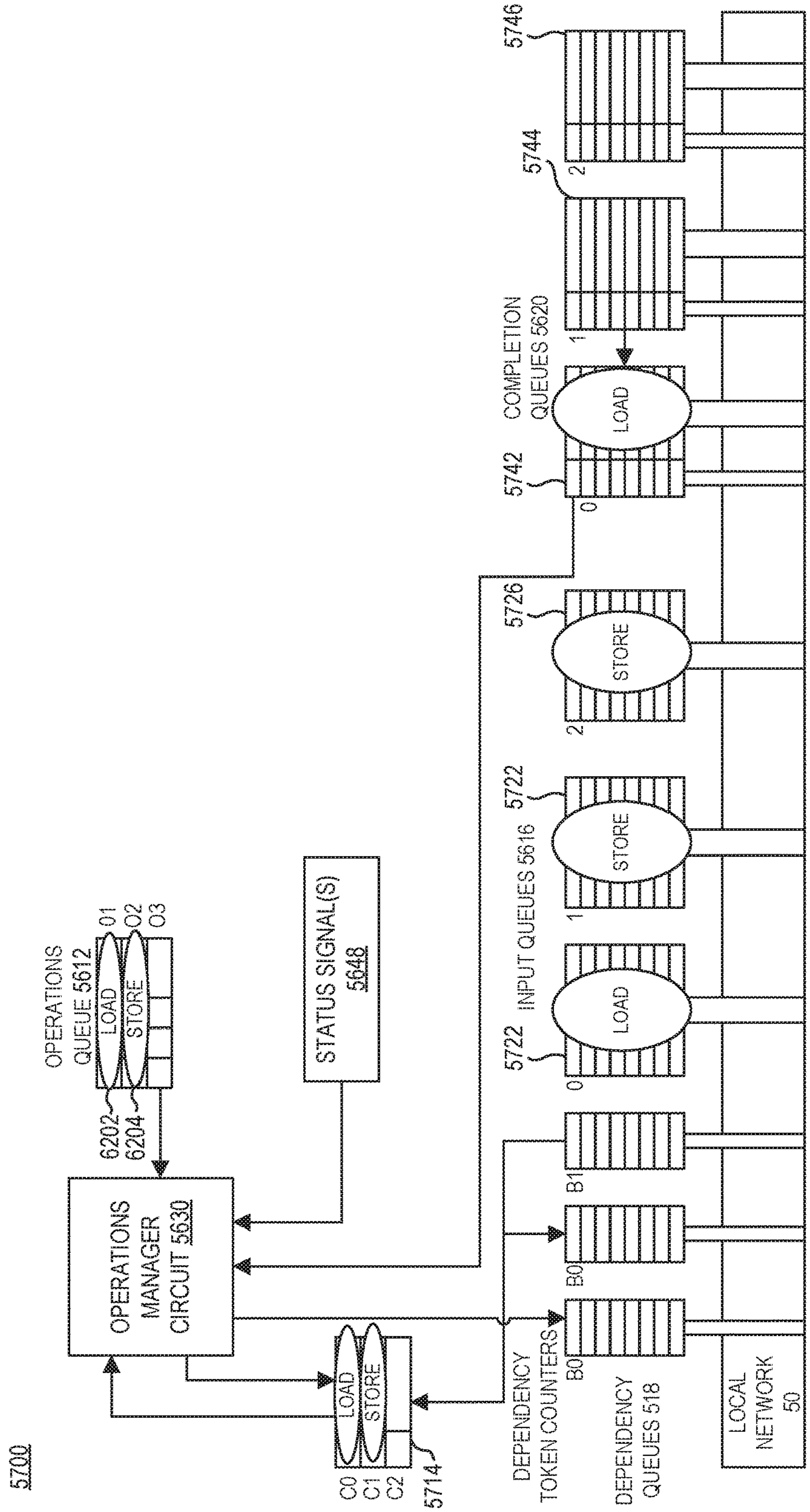
FIG. 62B is a block diagram illustrating flow of load operations and the store operations, such as those of FIG. 62A, through the microarchitecture of the memory ordering circuit of FIG. 57 according to embodiments of the disclosure.

FIG. 62B is a block diagram illustrating flow of the load operations and store operations, such as the load operation 6202 and the store 6204 operation of FIG. 61A, through the microarchitecture 5700 of the memory ordering circuit of FIG. 57, according to an embodiment of the present disclosure. For simplicity of explanation, not all of the components are displayed, but reference may be made back to the additional components displayed in FIG. 57. Various ovals indicating "Load" for the load operation 6202 and "Store" for the store operation 6204 are overlaid on some of the components of the microarchitecture 5700 as indication of how various channels of the queues are being used as the memory operations are queued and ordered through the microarchitecture 5700.

FIGS. 63A, 63B, 63C, 63D, 63E, 63F, 63G, and 63H are block diagrams illustrating functional flow of load operations and store operations for the exemplary program of FIGS. 61A and 61B through queues of the microarchitecture of FIG. 62B, according to an embodiment of the present disclosure. Each figure may correspond to a next cycle of processing by the microarchitecture 5700. Values that are italicized are incoming values (into the queues) and values that are bolded are outgoing values (out of the queues). All other values with normal fonts are retained values already existing in the queues.

Figure 63A:
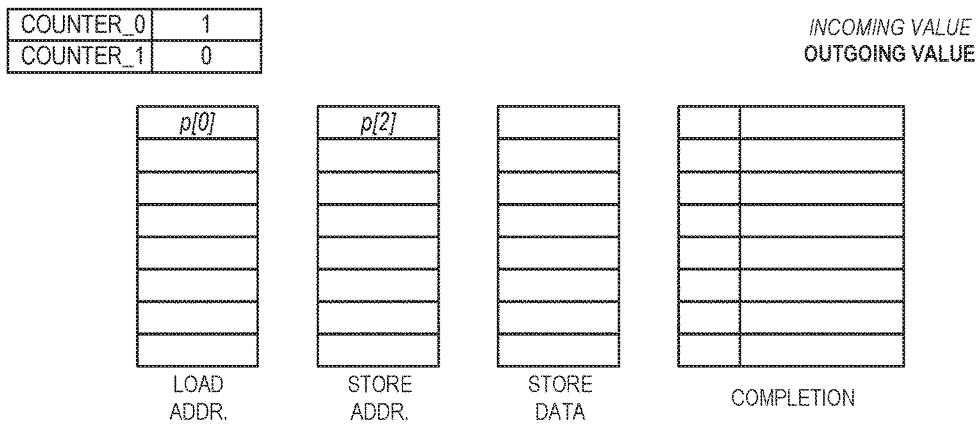
FIGS. 63A, 63B, 63C, 63D, 63E, 63F, 63G, and 63H are block diagrams illustrating functional flow of load operations and store operations for an exemplary program through queues of the microarchitecture of FIG. 63B according to embodiments of the disclosure.

In FIG. 63A, the address p[0] is incoming into the load address queue 5722, and the address p[2] is incoming into the store address queue 5724, starting the control flow process. Note that counter C0, for dependency input for the load address queue, is "1" and counter C1, for dependency output, is zero. In contrast, the "1" of C0 indicates a dependency out value for the store operation. This indicates an incoming dependency for the load operation of p[0] and an outgoing dependency for the store operation of p[2]. These values, however, are not yet active, but will become active, in this way, in FIG. 63B.

Figure 63B:
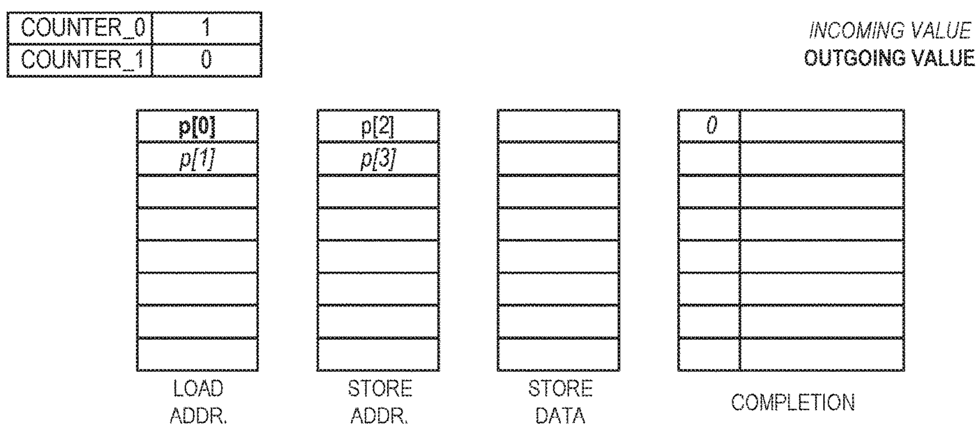

In FIG. 63B, address p[0] is bolded to indicate it is outgoing in this cycle. A new address p[1] is incoming into the load address queue and a new address p[3] is incoming into the store address queue. A zero ("0")-valued bit in the completion queue 5742 is also incoming, which indicates any data present for that indexed entry is invalid. As mentioned, the values for the counters C0 and C1 are now indicated as incoming, and are thus now active this cycle.

Figure 63C:
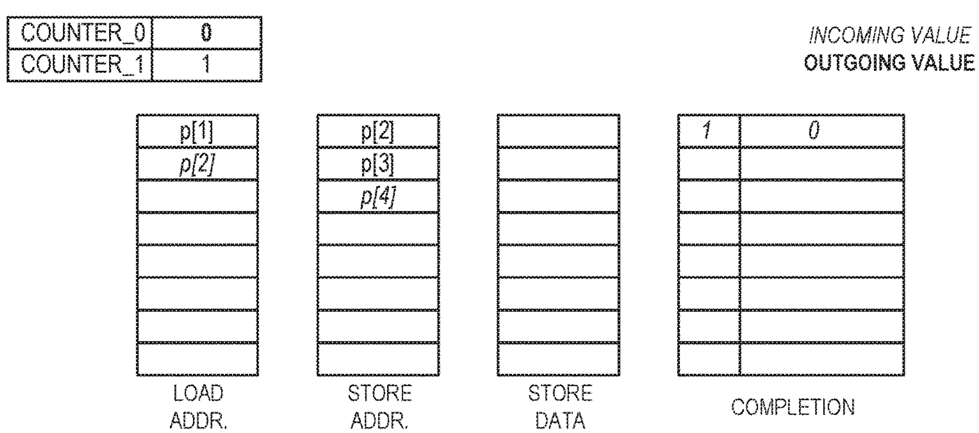

In FIG. 63C, the outgoing address p[0] has now left the load address queue and a new address p[2] is incoming into the load address queue. And, the data ("0") is incoming into the completion queue for address p[0]. The validity bit is set to "1" to indicate that the data in the completion queue is valid. Furthermore, a new address p[4] is incoming into the store address queue. The value for counter C0 is indicated as outgoing and the value for counter C1 is indicated as incoming. The value of "1" for C1 indicates an incoming dependency for store operation to address p[4].

Note that the address p[2] for the newest load operation is dependent on the value that first needs to be stored by the store operation for address p[2], which is at the top of the store address queue. Later, the indexed entry in the completion queue for the load operation from address p[2] may remain buffered until the data from the store operation to the address p[2] is completed (see FIGS. 63F-63H).

Figure 63D:
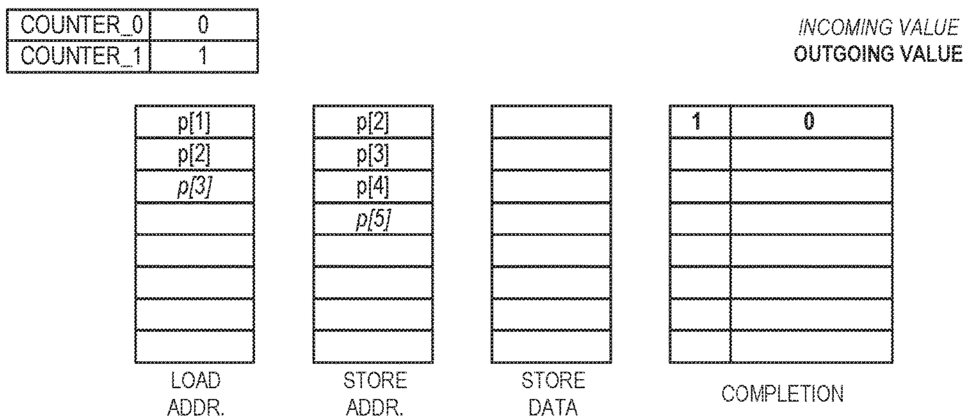

In FIG. 63D, the data ("0") is outgoing from the completion queue for address p[0], which is therefore being sent out to the acceleration hardware 5302. Furthermore, a new address p[3] is incoming into the load address queue and a new address p[5] is incoming into the store address queue. The values for the counters C0 and C1 remain unchanged.

Figure 63E:
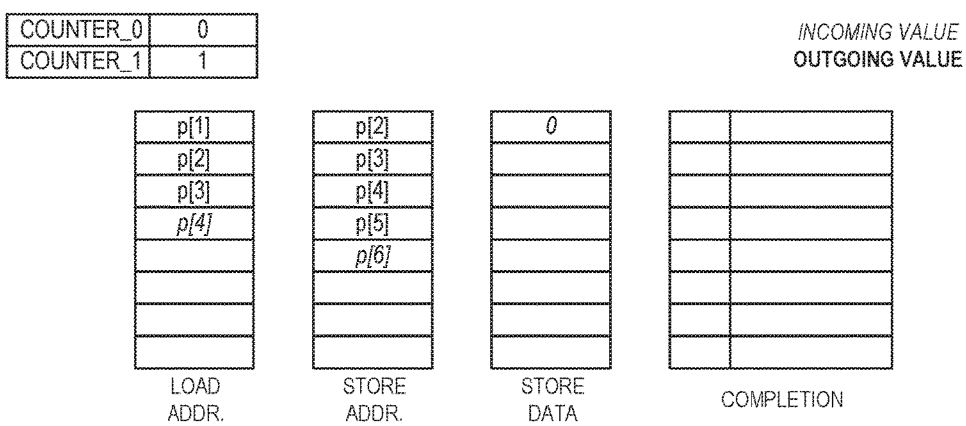

In FIG. 63E, the value ("0") for the address p[2] is incoming into the store data queue, while a new address p[4] comes into the load address queue and a new address p[6] comes into the store address queue. The counter values for C0 and C1 remain unchanged.

Figure 63F:
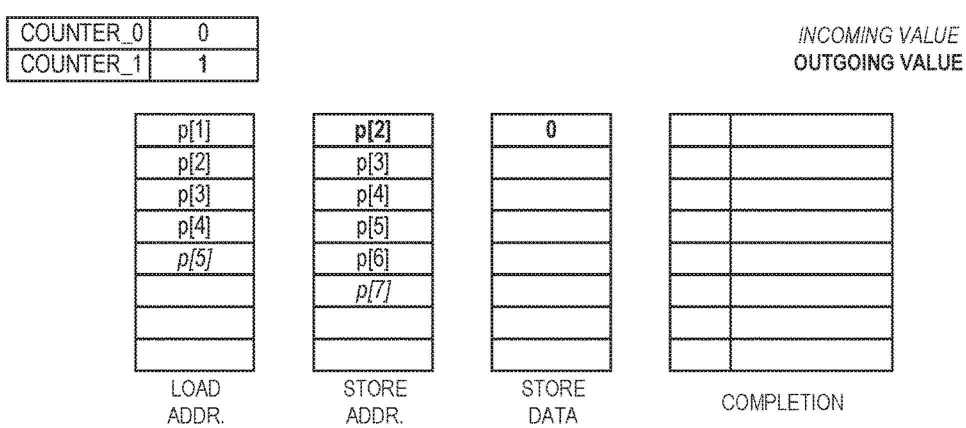

In FIG. 63F, the value ("0") for the address p[2] in the store data queue, and the address p[2] in the store address queue are both outgoing values. Likewise, the value for the counter C1 is indicated as outgoing, while the value ("0") for counter C0 remain unchanged. Furthermore, a new address p[5] is incoming into the load address queue and a new address p[7] is incoming into the store address queue.

Figure 63G:
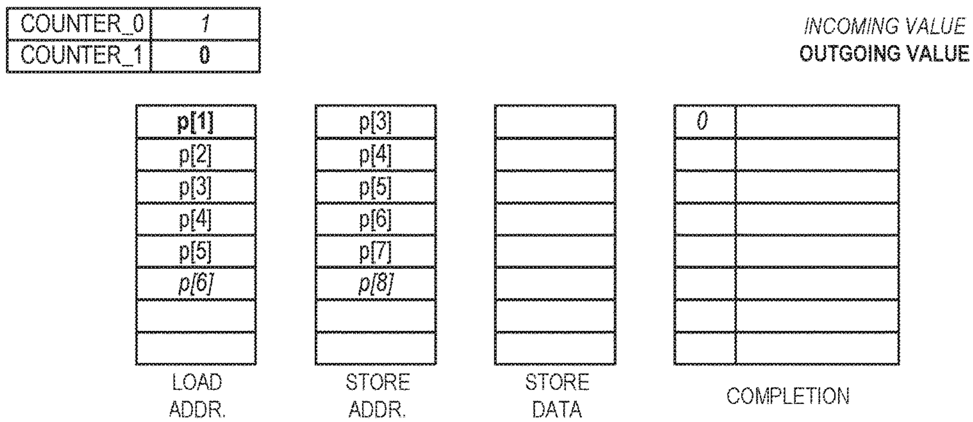

In FIG. 63G, the value ("0") is incoming to indicate the indexed value within the completion queue 5742 is invalid. The address p[1] is bolded to indicate it is outgoing from the load address queue while a new address p[6] is incoming into the load address queue. A new address p[8] is also incoming into the store address queue. The value of counter C0 is incoming as a "1," corresponding to an incoming dependency for the load operation of address p[6] and an outgoing dependency for the store operation of address p[8]. The value of counter C1 is now "0," and is indicated as outgoing.

Figure 63H:
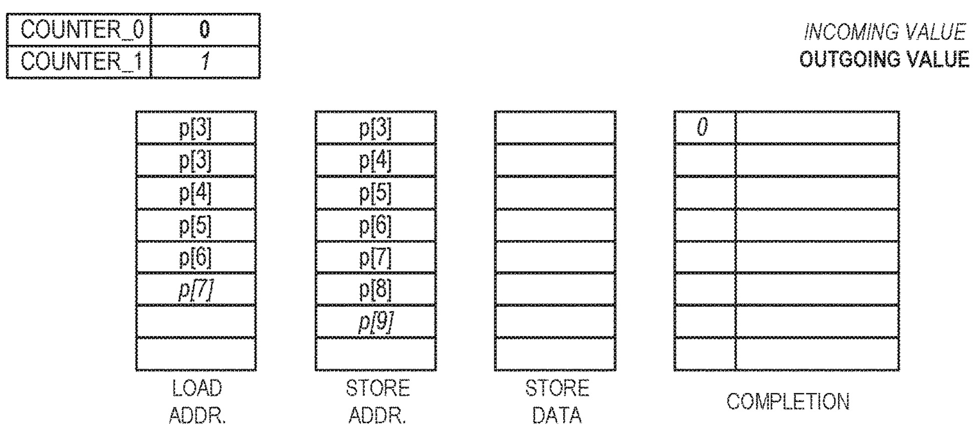

In FIG. 63H, a data value of "1" is incoming into the completion queue 5742 while the validity bit is also incoming as a "1," meaning that the buffered data is valid. This is the data needed to complete the load operation for p[2]. Recall that this data had to first be stored to address p[2], which happened in FIG. 63F. The value of "0" for counter C0 is outgoing, and a value of "1," for counter C1 is incoming. Furthermore, a new address p[7] is incoming into the load address queue and a new address p[9] is incoming into the store address queue.

In the present embodiment, the process of executing the code of FIGS. 61A and 61B may continue on with bouncing dependency tokens between "0" and "1" for the load operations and the store operations. This is due to the tight dependencies between p[i] and p[i+2]. Other code with less frequent dependencies may generate dependency tokens at a slower rate, and thus reset the counters C0 and C1 at a slower rate, causing the generation of tokens of higher values (corresponding to further semantically-separated memory operations).

Figure 64:
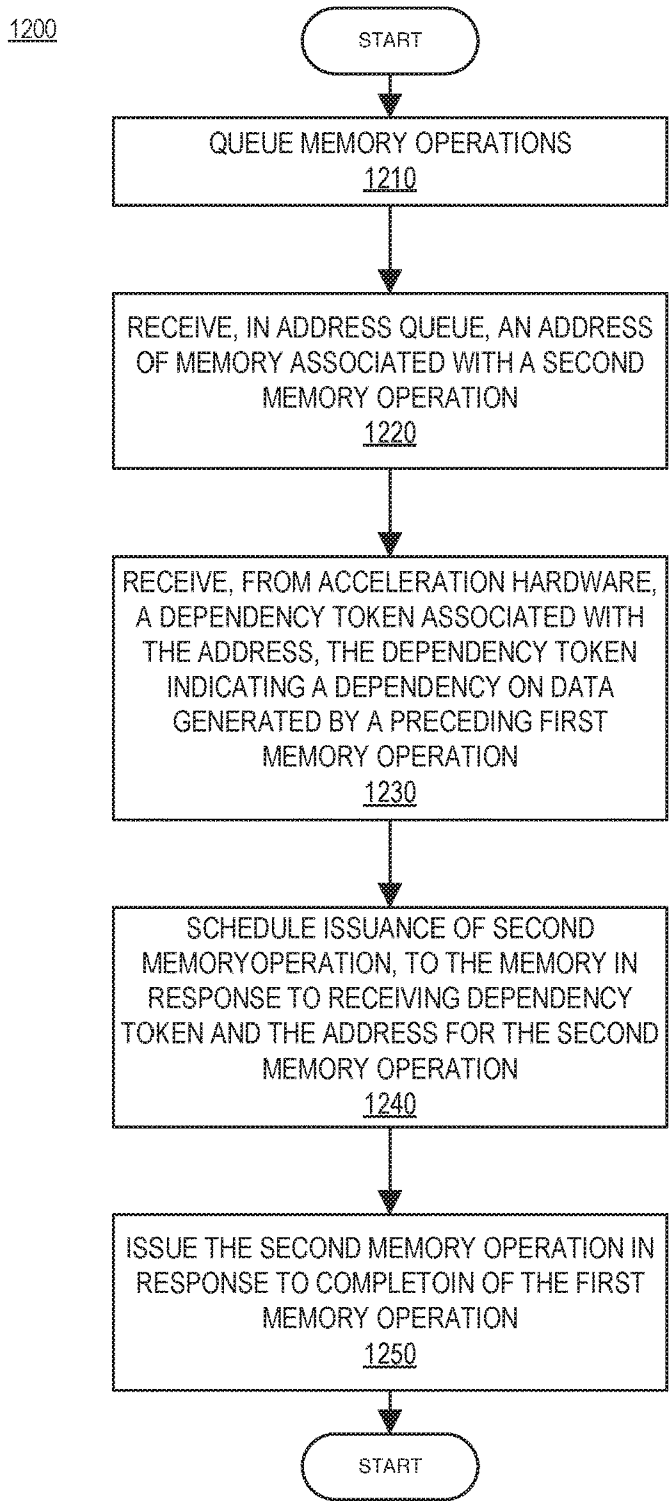
FIG. 64 is a flow chart of a method for ordering memory operations between an acceleration hardware and an out-of-order memory subsystem according to embodiments of the disclosure.

FIG. 64 is a flow chart of a method 6400 for ordering memory operations between acceleration hardware and an out-of-order memory subsystem, according to an embodiment of the present disclosure. The method 6400 may be performed by a system that may include hardware (e.g., circuitry, dedicated logic, and/or programmable logic), software (e.g., instructions executable on a computer system to perform hardware simulation), or a combination thereof. In an illustrative example, the method 6400 may be performed by the memory ordering circuit 5305 and various subcomponents of the memory ordering circuit 5305.

More specifically, referring to FIG. 64, the method 6400 may start with the memory ordering circuit queuing memory operations in an operations queue of the memory ordering circuit (6410). Memory operation and control arguments may make up the memory operations, as queued, where the memory operation and control arguments are mapped to certain queues within the memory ordering circuit as discussed previously. The memory ordering circuit may work to issue the memory operations to a memory in association with acceleration hardware, to ensure the memory operations complete in program order. The method 6400 may continue with the memory ordering circuit receiving, in set of input queues, from the acceleration hardware, an address of the memory associated with a second memory operation of the memory operations (6420). In one embodiment, a load address queue of the set of input queues is the channel to receive the address. In another embodiment, a store address queue of the set of input queues is the channel to receive the address. The method 6400 may continue with the memory ordering circuit receiving, from the acceleration hardware, a dependency token associated with the address, wherein the dependency token indicates a dependency on data generated by a first memory operation, of the memory operations, which precedes the second memory operation (6430). In one embodiment, a channel of a dependency queue is to receive the dependency token. The first memory operation may be either a load operation or a store operation.

The method 6400 may continue with the memory ordering circuit scheduling issuance of the second memory operation to the memory in response to receiving the dependency token and the address associated with the dependency token (6440). For example, when the load address queue receives the address for an address argument of a load operation and the dependency queue receives the dependency token for a control argument of the load operation, the memory ordering circuit may schedule issuance of the second memory operation as a load operation. The method 6400 may continue with the memory ordering circuit issuing the second memory operation (e.g., in a command) to the memory in response to completion of the first memory operation (6450). For example, if the first memory operation is a store, completion may be verified by acknowledgement that the data in a store data queue of the set of input queues has been written to the address in the memory. Similarly, if the first memory operation is a load operation, completion may be verified by receipt of data from the memory for the load operation.

9. Summary

Supercomputing at the ExaFLOP scale may be a challenge in high-performance computing, a challenge which is not likely to be met by conventional von Neumann architectures. To achieve ExaFLOPs, embodiments of a CSA provide a heterogeneous spatial array that targets direct execution of (e.g., compiler-produced) dataflow graphs. In addition to laying out the architectural principles of embodiments of a CSA, the above also describes and evaluates embodiments of a CSA which showed performance and energy of larger than 10× over existing products. Compiler-generated code may have significant performance and energy gains over roadmap architectures. As a heterogeneous, parametric architecture, embodiments of a CSA may be readily adapted to all computing uses. For example, a mobile version of CSA might be tuned to 32-bits, while a machine-learning focused array might feature significant numbers of vectorized 8-bit multiplication units. The main advantages of embodiments of a CSA are high performance and extreme energy efficiency, characteristics relevant to all forms of computing ranging from supercomputing and datacenter to the internet-of-things.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes forming a loop construct, wherein the dataflow graph is to be overlaid into the interconnect network and the plurality of processing elements with each node represented as a dataflow operator in the plurality of processing elements and at least one dataflow operator controlled by a sequencer dataflow operator of the plurality of processing elements, and the plurality of processing elements is to perform a second operation when an incoming operand set arrives at the plurality of processing elements and the sequencer dataflow operator generates control signals for the at least one dataflow operator in the plurality of processing elements. The dataflow operator may be or include a pick operator. The dataflow operator may be or include a switch operator. The plurality of processing elements may perform the second operation when the incoming operand set arrives at the plurality of processing elements and the sequencer dataflow operator generates control signals for a first dataflow operator representing a first node of the dataflow graph and a second dataflow operator representing a second node of the dataflow graph. The first dataflow operator representing the first node may be a pick operator. The second dataflow operator representing the second node may be a switch operator. The sequencer dataflow operator may generate the control signals for the first dataflow operator representing the first node and the second dataflow operator representing the second node to perform a loop iteration of the loop construct in a single cycle of the processing elements. The sequencer dataflow operator may generate a next set of control signals for a loop iteration when both a base data token and a stride data token are received.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes forming a loop construct; overlaying the dataflow graph into a plurality of processing elements of the processor and an interconnect network between the plurality of processing elements of the processor with each node represented as a dataflow operator in the plurality of processing elements and at least one dataflow operator controlled by a sequencer dataflow operator of the plurality of processing elements; and performing a second operation of the dataflow graph with the interconnect network and the plurality of processing elements by a respective, incoming operand set arriving at each of the dataflow operators of the plurality of processing elements and the sequencer dataflow operator generating control signals for the at least one dataflow operator in the plurality of processing elements. The dataflow operator may be or include a pick operator. The dataflow operator may be or include a switch operator. The performing may include performing the second operation of the dataflow graph with the interconnect network and the plurality of processing elements by the respective, incoming operand set arriving at each of the dataflow operators of the plurality of processing elements and the sequencer dataflow operator generating control signals for a first dataflow operator representing a first node of the dataflow graph and a second dataflow operator representing a second node of the dataflow graph. The first dataflow operator representing the first node may be a pick operator. The second dataflow operator representing the second node may be a switch operator. The sequencer dataflow operator may generate the control signals for the first dataflow operator representing the first node and the second dataflow operator representing the second node to perform a loop iteration of the loop construct in a single cycle of the processing elements. The method may include the sequencer dataflow operator generating a next set of control signals for a loop iteration when both a base data token and a stride data token are received.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes forming a loop construct; overlaying the dataflow graph into a plurality of processing elements of the processor and an interconnect network between the plurality of processing elements of the processor with each node represented as a dataflow operator in the plurality of processing elements and at least one dataflow operator controlled by a sequencer dataflow operator of the plurality of processing elements; and performing a second operation of the dataflow graph with the interconnect network and the plurality of processing elements by a respective, incoming operand set arriving at each of the dataflow operators of the plurality of processing elements and the sequencer dataflow operator generating control signals for the at least one dataflow operator in the plurality of processing elements. The dataflow operator may be or include a pick operator. The dataflow operator may be or include a switch operator. The performing may include performing the second operation of the dataflow graph with the interconnect network and the plurality of processing elements by the respective, incoming operand set arriving at each of the dataflow operators of the plurality of processing elements and the sequencer dataflow operator generating control signals for a first dataflow operator representing a first node of the dataflow graph and a second dataflow operator representing a second node of the dataflow graph. The first dataflow operator representing the first node may be a pick operator. The second dataflow operator representing the second node may be a switch operator. The sequencer dataflow operator may generate the control signals for the first dataflow operator representing the first node and the second dataflow operator representing the second node to perform a loop iteration of the loop construct in a single cycle of the processing elements. The method may include the sequencer dataflow operator generating a next set of control signals for a loop iteration when both a base data token and a stride data token are received.

In another embodiment, a processor includes a core with a decoder to decode an instruction into a decoded instruction and an execution unit to execute the decoded instruction to perform a first operation; and means to receive an input of a dataflow graph comprising a plurality of nodes forming a loop construct, wherein the dataflow graph is to be overlaid into the means with each node represented as a dataflow operator and at least one dataflow operator controlled by a sequencer dataflow operator, and the means is to perform a second operation when an incoming operand set arrives at the means and the sequencer dataflow operator generates control signals for the at least one dataflow operator.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements are to perform a second operation by a respective, incoming operand set arriving at each of the dataflow operators of the plurality of processing elements. A processing element of the plurality of processing elements may stall execution when a backpressure signal from a downstream processing element indicates that storage in the downstream processing element is not available for an output of the processing element. The processor may include a flow control path network to carry the backpressure signal according to the dataflow graph. A dataflow token may cause an output from a dataflow operator receiving the dataflow token to be sent to an input buffer of a particular processing element of the plurality of processing elements. The second operation may include a memory access and the plurality of processing elements comprises a memory-accessing dataflow operator that is not to perform the memory access until receiving a memory dependency token from a logically previous dataflow operator. The plurality of processing elements may include a first type of processing element and a second, different type of processing element.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements by a respective, incoming operand set arriving at each of the dataflow operators of the plurality of processing elements. The method may include stalling execution by a processing element of the plurality of processing elements when a backpressure signal from a downstream processing element indicates that storage in the downstream processing element is not available for an output of the processing element. The method may include sending the backpressure signal on a flow control path network according to the dataflow graph. A dataflow token may cause an output from a dataflow operator receiving the dataflow token to be sent to an input buffer of a particular processing element of the plurality of processing elements. The method may include not performing a memory access until receiving a memory dependency token from a logically previous dataflow operator, wherein the second operation comprises the memory access and the plurality of processing elements comprises a memory-accessing dataflow operator. The method may include providing a first type of processing element and a second, different type of processing element of the plurality of processing elements.

In yet another embodiment, an apparatus includes a data path network between a plurality of processing elements; and a flow control path network between the plurality of processing elements, wherein the data path network and the flow control path network are to receive an input of a dataflow graph comprising a plurality of nodes, the dataflow graph is to be overlaid into the data path network, the flow control path network, and the plurality of processing elements with each node represented as a dataflow operator in the plurality of processing elements, and the plurality of processing elements are to perform a second operation by a respective, incoming operand set arriving at each of the dataflow operators of the plurality of processing elements. The flow control path network may carry backpressure signals to a plurality of dataflow operators according to the dataflow graph. A dataflow token sent on the data path network to a dataflow operator may cause an output from the dataflow operator to be sent to an input buffer of a particular processing element of the plurality of processing elements on the data path network. The data path network may be a static, circuit switched network to carry the respective, input operand set to each of the dataflow operators according to the dataflow graph. The flow control path network may transmit a backpressure signal according to the dataflow graph from a downstream processing element to indicate that storage in the downstream processing element is not available for an output of the processing element. At least one data path of the data path network and at least one flow control path of the flow control path network may form a channelized circuit with backpressure control. The flow control path network may pipeline at least two of the plurality of processing elements in series.

In another embodiment, a method includes receiving an input of a dataflow graph comprising a plurality of nodes; and overlaying the dataflow graph into a plurality of processing elements of a processor, a data path network between the plurality of processing elements, and a flow control path network between the plurality of processing elements with each node represented as a dataflow operator in the plurality of processing elements. The method may include carrying backpressure signals with the flow control path network to a plurality of dataflow operators according to the dataflow graph. The method may include sending a dataflow token on the data path network to a dataflow operator to cause an output from the dataflow operator to be sent to an input buffer of a particular processing element of the plurality of processing elements on the data path network. The method may include setting a plurality of switches of the data path network and/or a plurality of switches of the flow control path network to carry the respective, input operand set to each of the dataflow operators according to the dataflow graph, wherein the data path network is a static, circuit switched network. The method may include transmitting a backpressure signal with the flow control path network according to the dataflow graph from a downstream processing element to indicate that storage in the downstream processing element is not available for an output of the processing element. The method may include forming a channelized circuit with backpressure control with at least one data path of the data path network and at least one flow control path of the flow control path network.

In yet another embodiment, a processor includes a core with a decoder to decode an instruction into a decoded instruction and an execution unit to execute the decoded instruction to perform a first operation; a plurality of processing elements; and a network means between the plurality of processing elements to receive an input of a dataflow graph comprising a plurality of nodes, wherein the dataflow graph is to be overlaid into the network means and the plurality of processing elements with each node represented as a dataflow operator in the plurality of processing elements, and the plurality of processing elements are to perform a second operation by a respective, incoming operand set arriving at each of the dataflow operators of the plurality of processing elements.

In another embodiment, an apparatus includes a data path means between a plurality of processing elements; and a flow control path means between the plurality of processing elements, wherein the data path means and the flow control path means are to receive an input of a dataflow graph comprising a plurality of nodes, the dataflow graph is to be overlaid into the data path means, the flow control path means, and the plurality of processing elements with each node represented as a dataflow operator in the plurality of processing elements, and the plurality of processing elements are to perform a second operation by a respective, incoming operand set arriving at each of the dataflow operators of the plurality of processing elements.

In one embodiment, a processor includes a core with a decoder to decode an instruction into a decoded instruction and an execution unit to execute the decoded instruction to perform a first operation; and an array of processing elements to receive an input of a dataflow graph comprising a plurality of nodes, wherein the dataflow graph is to be overlaid into the array of processing elements with each node represented as a dataflow operator in the array of processing elements, and the array of processing elements is to perform a second operation when an incoming operand set arrives at the array of processing elements. The array of processing element may not perform the second operation until the incoming operand set arrives at the array of processing elements and storage in the array of processing elements is available for output of the second operation. The array of processing elements may include a network (or channel(s)) to carry dataflow tokens and control tokens to a plurality of dataflow operators. The second operation may include a memory access and the array of processing elements may include a memory-accessing dataflow operator that is not to perform the memory access until receiving a memory dependency token from a logically previous dataflow operator. Each processing element may perform only one or two operations of the dataflow graph.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing elements may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into an array of processing elements of the processor with each node represented as a dataflow operator in the array of processing elements; and performing a second operation of the dataflow graph with the array of processing elements when an incoming operand set arrives at the array of processing elements. The array of processing element may not perform the second operation until the incoming operand set arrives at the array of processing elements and storage in the array of processing elements is available for output of the second operation. The array of processing elements may include a network carrying dataflow tokens and control tokens to a plurality of dataflow operators. The second operation may include a memory access and the array of processing elements comprises a memory-accessing dataflow operator that is not to perform the memory access until receiving a memory dependency token from a logically previous dataflow operator. Each processing element may performs only one or two operations of the dataflow graph.

In another embodiment, a processor includes a core with a decoder to decode an instruction into a decoded instruction and an execution unit to execute the decoded instruction to perform a first operation; and means to receive an input of a dataflow graph comprising a plurality of nodes, wherein the dataflow graph is to be overlaid into the means with each node represented as a dataflow operator in the means, and the means is to perform a second operation when an incoming operand set arrives at the means.

In one embodiment, a processor includes a core with a decoder to decode an instruction into a decoded instruction and an execution unit to execute the decoded instruction to perform a first operation; a plurality of processing elements; and an interconnect network between the plurality of processing elements to receive an input of a dataflow graph comprising a plurality of nodes, wherein the dataflow graph is to be overlaid into the interconnect network and the plurality of processing elements with each node represented as a dataflow operator in the plurality of processing elements, and the plurality of processing elements is to perform a second operation when an incoming operand set arrives at the plurality of processing elements. The processor may further comprise a plurality of configuration controllers, each configuration controller is coupled to a respective subset of the plurality of processing elements, and each configuration controller is to load configuration information from storage and cause coupling of the respective subset of the plurality of processing elements according to the configuration information. The processor may include a plurality of configuration caches, and each configuration controller is coupled to a respective configuration cache to fetch the configuration information for the respective subset of the plurality of processing elements. The first operation performed by the execution unit may prefetch configuration information into each of the plurality of configuration caches. Each of the plurality of configuration controllers may include a reconfiguration circuit to cause a reconfiguration for at least one processing element of the respective subset of the plurality of processing elements on receipt of a configuration error message from the at least one processing element. Each of the plurality of configuration controllers may a reconfiguration circuit to cause a reconfiguration for the respective subset of the plurality of processing elements on receipt of a reconfiguration request message, and disable communication with the respective subset of the plurality of processing elements until the reconfiguration is complete. The processor may include a plurality of exception aggregators, and each exception aggregator is coupled to a respective subset of the plurality of processing elements to collect exceptions from the respective subset of the plurality of processing elements and forward the exceptions to the core for servicing. The processor may include a plurality of extraction controllers, each extraction controller is coupled to a respective subset of the plurality of processing elements, and each extraction controller is to cause state data from the respective subset of the plurality of processing elements to be saved to memory.

In another embodiment, a method includes decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In yet another embodiment, a non-transitory machine readable medium that stores code that when executed by a machine causes the machine to perform a method including decoding an instruction with a decoder of a core of a processor into a decoded instruction; executing the decoded instruction with an execution unit of the core of the processor to perform a first operation; receiving an input of a dataflow graph comprising a plurality of nodes; overlaying the dataflow graph into a plurality of processing elements of the processor and an interconnect network between the plurality of processing elements of the processor with each node represented as a dataflow operator in the plurality of processing elements; and performing a second operation of the dataflow graph with the interconnect network and the plurality of processing elements when an incoming operand set arrives at the plurality of processing elements. The method may include loading configuration information from storage for respective subsets of the plurality of processing elements and causing coupling for each respective subset of the plurality of processing elements according to the configuration information. The method may include fetching the configuration information for the respective subset of the plurality of processing elements from a respective configuration cache of a plurality of configuration caches. The first operation performed by the execution unit may be prefetching configuration information into each of the plurality of configuration caches. The method may include causing a reconfiguration for at least one processing element of the respective subset of the plurality of processing elements on receipt of a configuration error message from the at least one processing element. The method may include causing a reconfiguration for the respective subset of the plurality of processing elements on receipt of a reconfiguration request message; and disabling communication with the respective subset of the plurality of processing elements until the reconfiguration is complete. The method may include collecting exceptions from a respective subset of the plurality of processing elements; and forwarding the exceptions to the core for servicing. The method may include causing state data from a respective subset of the plurality of processing elements to be saved to memory.

In another embodiment, a processor includes a core with a decoder to decode an instruction into a decoded instruction and an execution unit to execute the decoded instruction to perform a first operation; a plurality of processing elements; and means between the plurality of processing elements to receive an input of a dataflow graph comprising a plurality of nodes, wherein the dataflow graph is to be overlaid into the m and the plurality of processing elements with each node represented as a dataflow operator in the plurality of processing elements, and the plurality of processing elements is to perform a second operation when an incoming operand set arrives at the plurality of processing elements.

In yet another embodiment, an apparatus comprises a data storage device that stores code that when executed by a hardware processor causes the hardware processor to perform any method disclosed herein. An apparatus may be as described in the detailed description. A method may be as described in the detailed description.

In another embodiment, a non-transitory machine readable medium that stores code that when executed by a machine causes the machine to perform a method comprising any method disclosed herein.

An instruction set (e.g., for execution by a core) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, July 2017; and see Intel® Architecture Instruction Set Extensions Programming Reference, April 2017; Intel is a trademark of Intel Corporation or its subsidiaries in the U.S. and/or other countries.).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 65A:
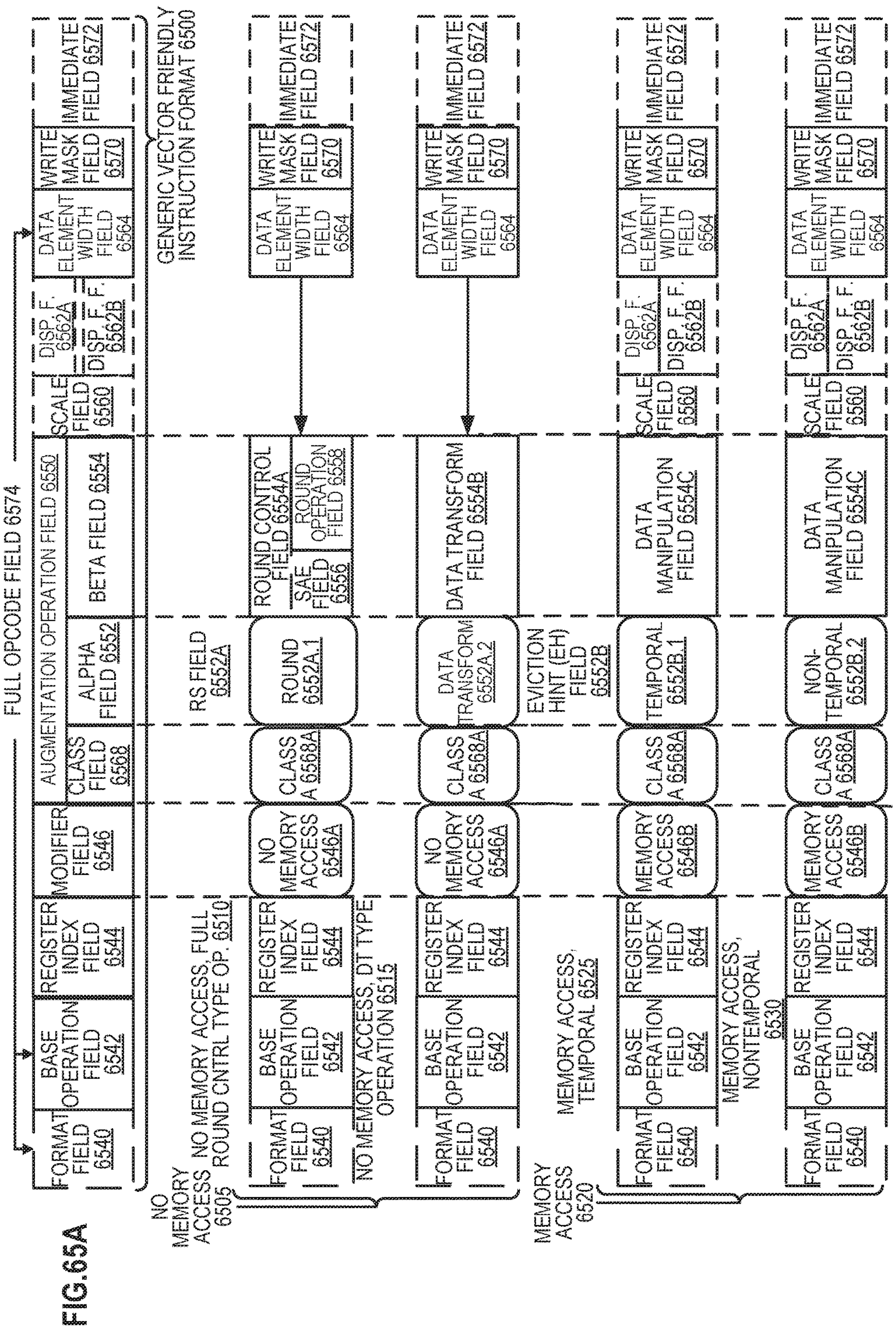
FIG. 65A is a block diagram illustrating a generic vector friendly instruction format and class A instruction templates thereof according to embodiments of the disclosure.
Figure 65B:
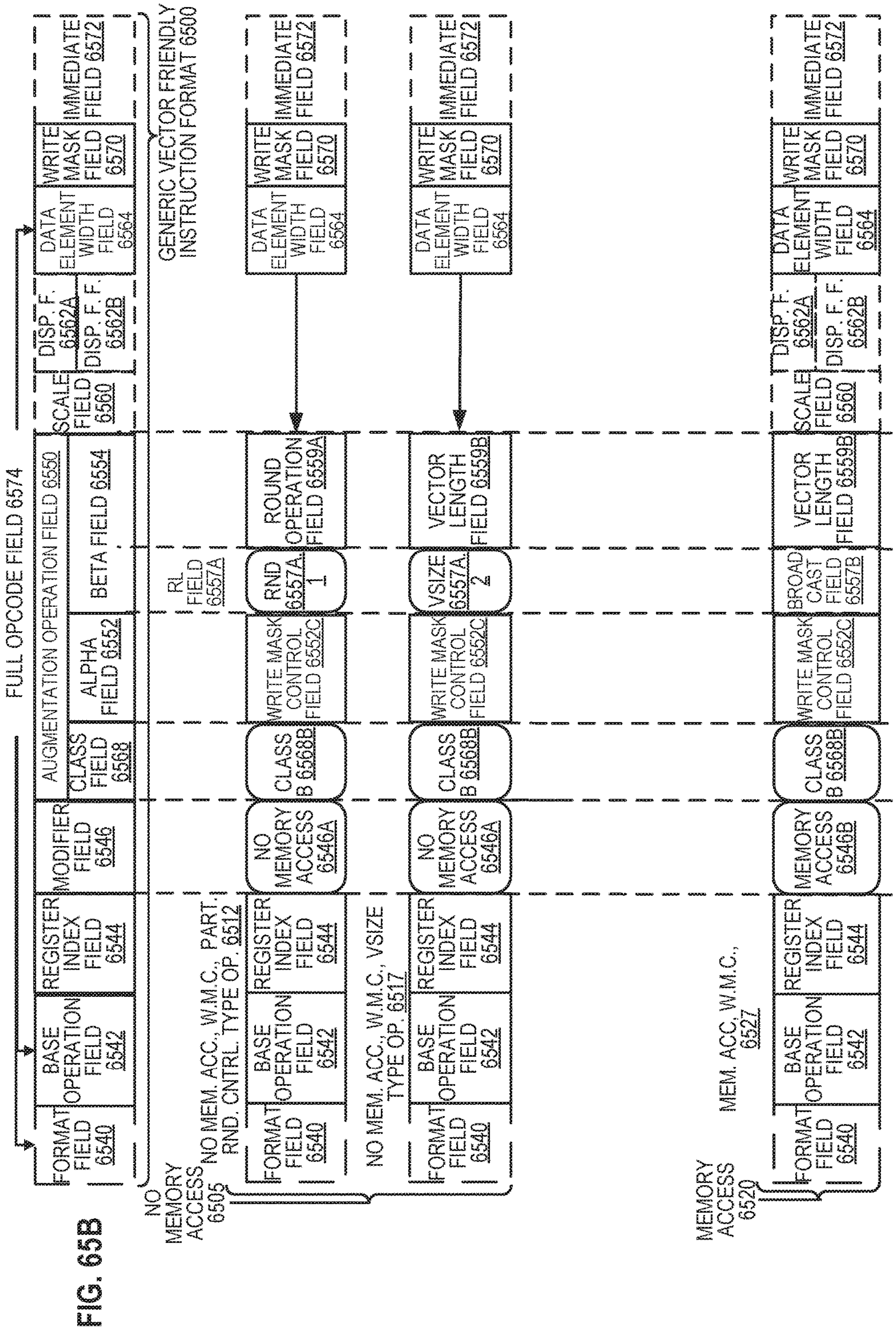
FIG. 65B is a block diagram illustrating the generic vector friendly instruction format and class B instruction templates thereof according to embodiments of the disclosure.

FIGS. 65A-65B are block diagrams illustrating a generic vector friendly instruction format and instruction templates thereof according to embodiments of the disclosure. FIG. 65A is a block diagram illustrating a generic vector friendly instruction format and class A instruction templates thereof according to embodiments of the disclosure; while FIG. 65B is a block diagram illustrating the generic vector friendly instruction format and class B instruction templates thereof according to embodiments of the disclosure. Specifically, a generic vector friendly instruction format 6500 for which are defined class A and class B instruction templates, both of which include no memory access 6505 instruction templates and memory access 6520 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 65A include: 1) within the no memory access 6505 instruction templates there is shown a no memory access, full round control type operation 6510 instruction template and a no memory access, data transform type operation 6515 instruction template; and 2) within the memory access 6520 instruction templates there is shown a memory access, temporal 6525 instruction template and a memory access, non-temporal 6530 instruction template. The class B instruction templates in FIG. 65B include: 1) within the no memory access 6505 instruction templates there is shown a no memory access, write mask control, partial round control type operation 6512 instruction template and a no memory access, write mask control, vsize type operation 6517 instruction template; and 2) within the memory access 6520 instruction templates there is shown a memory access, write mask control 6527 instruction template.

The generic vector friendly instruction format 6500 includes the following fields listed below in the order illustrated in FIGS. 65A-65B.

Format field 6540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 6542—its content distinguishes different base operations.

Register index field 6544—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 6546—its content distinguishes occurrences of instructions in the generic vector instruction format that specify memory access from those that do not; that is, between no memory access 6505 instruction templates and memory access 6520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 6550—its content distinguishes which one of a variety of different operations to be performed in addition to the base operation. This field is context specific. In one embodiment of the disclosure, this field is divided into a class field 6568, an alpha field 6552, and a beta field 6554. The augmentation operation field 6550 allows common groups of operations to be performed in a single instruction rather than 2, 3, or 4 instructions.

Scale field 6560—its content allows for the scaling of the index field's content for memory address generation (e.g., for address generation that uses $2^{scale}$*index+base).

Displacement Field 6562A—its content is used as part of memory address generation (e.g., for address generation that uses $2^{scale}$*index+base+displacement).

Displacement Factor Field 6562B (note that the juxtaposition of displacement field 6562A directly over displacement factor field 6562B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 6574 (described later herein) and the data manipulation field 6554C. The displacement field 6562A and the displacement factor field 6562B are optional in the sense that they are not used for the no memory access 6505 instruction templates and/or different embodiments may implement only one or none of the two.

Data element width field 6564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 6570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 6570 allows for partial vector operations, including loads, stores, arithmetic, logical, etc. While embodiments of the disclosure are described in which the write mask field's 6570 content selects one of a number of write mask registers that contains the write mask to be used (and thus the write mask field's 6570 content indirectly identifies that masking to be performed), alternative embodiments instead or additional allow the mask write field's 6570 content to directly specify the masking to be performed.

Immediate field 6572—its content allows for the specification of an immediate. This field is optional in the sense that is it not present in an implementation of the generic vector friendly format that does not support immediate and it is not present in instructions that do not use an immediate.

Class field 6568—its content distinguishes between different classes of instructions. With reference to FIGS. 65A-B, the contents of this field select between class A and class B instructions. In FIGS. 65A-B, rounded corner squares are used to indicate a specific value is present in a field (e.g., class A 6568A and class B 6568B for the class field 6568 respectively in FIGS. 65A-B).

Instruction Templates of Class A

In the case of the non-memory access 6505 instruction templates of class A, the alpha field 6552 is interpreted as an RS field 6552A, whose content distinguishes which one of the different augmentation operation types are to be performed (e.g., round 6552A.1 and data transform 6552A.2 are respectively specified for the no memory access, round type operation 6510 and the no memory access, data transform type operation 6515 instruction templates), while the beta field 6554 distinguishes which of the operations of the specified type is to be performed. In the no memory access 6505 instruction templates, the scale field 6560, the displacement field 6562A, and the displacement scale filed 6562B are not present.

No-Memory Access Instruction Templates—Full Round Control Type Operation

In the no memory access full round control type operation 6510 instruction template, the beta field 6554 is interpreted as a round control field 6554A, whose content(s) provide static rounding. While in the described embodiments of the disclosure the round control field 6554A includes a suppress all floating point exceptions (SAE) field 6556 and a round operation control field 6558, alternative embodiments may support may encode both these concepts into the same field or only have one or the other of these concepts/fields (e.g., may have only the round operation control field 6558).

SAE field 6556—its content distinguishes whether or not to disable the exception event reporting; when the SAE field's 6556 content indicates suppression is enabled, a given instruction does not report any kind of floating-point exception flag and does not raise any floating point exception handler.

Round operation control field 6558—its content distinguishes which one of a group of rounding operations to perform (e.g., Round-up, Round-down, Round-towards-zero and Round-to-nearest). Thus, the round operation control field 6558 allows for the changing of the rounding mode on a per instruction basis. In one embodiment of the disclosure where a processor includes a control register for specifying rounding modes, the round operation control field's 6550 content overrides that register value.

No Memory Access Instruction Templates—Data Transform Type Operation

In the no memory access data transform type operation 6515 instruction template, the beta field 6554 is interpreted as a data transform field 6554B, whose content distinguishes which one of a number of data transforms is to be performed (e.g., no data transform, swizzle, broadcast).

In the case of a memory access 6520 instruction template of class A, the alpha field 6552 is interpreted as an eviction hint field 6552B, whose content distinguishes which one of the eviction hints is to be used (in FIG. 65A, temporal 6552B.1 and non-temporal 6552B.2 are respectively specified for the memory access, temporal 6525 instruction template and the memory access, non-temporal 6530 instruction template), while the beta field 6554 is interpreted as a data manipulation field 6554C, whose content distinguishes which one of a number of data manipulation operations (also known as primitives) is to be performed (e.g., no manipulation; broadcast; up conversion of a source; and down conversion of a destination). The memory access 6520 instruction templates include the scale field 6560, and optionally the displacement field 6562A or the displacement scale field 6562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 6552 is interpreted as a write mask control (Z) field 6552C, whose content distinguishes whether the write masking controlled by the write mask field 6570 should be a merging or a zeroing.

In the case of the non-memory access 6505 instruction templates of class B, part of the beta field 6554 is interpreted as an RL field 6557A, whose content distinguishes which one of the different augmentation operation types are to be performed (e.g., round 6557A.1 and vector length (VSIZE) 6557A.2 are respectively specified for the no memory access, write mask control, partial round control type operation 6512 instruction template and the no memory access, write mask control, VSIZE type operation 6517 instruction template), while the rest of the beta field 6554 distinguishes which of the operations of the specified type is to be performed. In the no memory access 6505 instruction templates, the scale field 6560, the displacement field 6562A, and the displacement scale filed 6562B are not present.

In the no memory access, write mask control, partial round control type operation 6510 instruction template, the rest of the beta field 6554 is interpreted as a round operation field 6559A and exception event reporting is disabled (a given instruction does not report any kind of floating-point exception flag and does not raise any floating point exception handler).

Round operation control field 6559A—just as round operation control field 6558, its content distinguishes which one of a group of rounding operations to perform (e.g., Round-up, Round-down, Round-towards-zero and Round-to-nearest). Thus, the round operation control field 6559A allows for the changing of the rounding mode on a per instruction basis. In one embodiment of the disclosure where a processor includes a control register for specifying rounding modes, the round operation control field's 6550 content overrides that register value.

In the no memory access, write mask control, VSIZE type operation 6517 instruction template, the rest of the beta field 6554 is interpreted as a vector length field 6559B, whose content distinguishes which one of a number of data vector lengths is to be performed on (e.g., 128, 256, or 512 byte).

In the case of a memory access 6520 instruction template of class B, part of the beta field 6554 is interpreted as a broadcast field 6557B, whose content distinguishes whether or not the broadcast type data manipulation operation is to be performed, while the rest of the beta field 6554 is interpreted the vector length field 6559B. The memory access 6520 instruction templates include the scale field 6560, and optionally the displacement field 6562A or the displacement scale field 6562B.

With regard to the generic vector friendly instruction format 6500, a full opcode field 6574 is shown including the format field 6540, the base operation field 6542, and the data element width field 6564. While one embodiment is shown where the full opcode field 6574 includes all of these fields, the full opcode field 6574 includes less than all of these fields in embodiments that do not support all of them. The full opcode field 6574 provides the operation code (opcode).

The augmentation operation field 6550, the data element width field 6564, and the write mask field 6570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 66 is a block diagram illustrating an exemplary specific vector friendly instruction format according to embodiments of the disclosure. FIG. 66 shows a specific vector friendly instruction format 6600 that is specific in the sense that it specifies the location, size, interpretation, and order of the fields, as well as values for some of those fields. The specific vector friendly instruction format 6600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 65 into which the fields from FIG. 66 map are illustrated.

It should be understood that, although embodiments of the disclosure are described with reference to the specific vector friendly instruction format 6600 in the context of the generic vector friendly instruction format 6500 for illustrative purposes, the disclosure is not limited to the specific vector friendly instruction format 6600 except where claimed. For example, the generic vector friendly instruction format 6500 contemplates a variety of possible sizes for the various fields, while the specific vector friendly instruction format 6600 is shown as having fields of specific sizes. By way of specific example, while the data element width field 6564 is illustrated as a one bit field in the specific vector friendly instruction format 6600, the disclosure is not so limited (that is, the generic vector friendly instruction format 6500 contemplates other sizes of the data element width field 6564).

The generic vector friendly instruction format 6500 includes the following fields listed below in the order illustrated in FIG. 66A.

EVEX Prefix (Bytes 0-3) 6602—is encoded in a four-byte form.

Format Field 6540 (EVEX Byte 0, bits [7:0])—the first byte (EVEX Byte 0) is the format field 6540 and it contains 0×62 (the unique value used for distinguishing the vector friendly instruction format in one embodiment of the disclosure).

The second-fourth bytes (EVEX Bytes 1-3) include a number of bit fields providing specific capability.

REX field 6605 (EVEX Byte 1, bits [7-5])—consists of a EVEX.R bit field (EVEX Byte 1, bit [7]—R), EVEX.X bit field (EVEX byte 1, bit [6]—X), and 6557BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 6510—this is the first part of the REX' field 6510 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD RIM field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 6615 (EVEX byte 1, bits [3:0]—mmmm)—its content encodes an implied leading opcode byte (OF, OF 38, or OF 3).

Data element width field 6564 (EVEX byte 2, bit [7]—W)—is represented by the notation EVEX.W. EVEX.W is used to define the granularity (size) of the datatype (either 32-bit data elements or 64-bit data elements).

EVEX.vvvv 6620 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 6620 encodes the 4 low-order bits of the first source register specifier stored in inverted (1s complement) form. Depending on the instruction, an extra different EVEX bit field is used to extend the specifier size to 32 registers.

EVEX.U 6568 Class field (EVEX byte 2, bit [2]—U)—If EVEX.U=0, it indicates class A or EVEX.U0; if EVEX.U=1, it indicates class B or EVEX.U1.

Prefix encoding field 6625 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 6552 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 6554 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 6510—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 6570 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 6630 (Byte 4) is also known as the opcode byte. Part of the opcode is specified in this field.

MOD R/M Field 6640 (Byte 5) includes MOD field 6642, Reg field 6644, and R/M field 6646. As previously described, the MOD field's 6642 content distinguishes between memory access and non-memory access operations. The role of Reg field 6644 can be summarized to two situations: encoding either the destination register operand or a source register operand, or be treated as an opcode extension and not used to encode any instruction operand. The role of R/M field 6646 may include the following: encoding the instruction operand that references a memory address, or encoding either the destination register operand or a source register operand.

Scale, Index, Base (SIB) Byte (Byte 6)—As previously described, the scale field's 6550 content is used for memory address generation. SIB.xxx 6654 and SIB.bbb 6656—the contents of these fields have been previously referred to with regard to the register indexes Xxxx and Bbbb.

Displacement field 6562A (Bytes 7-10)—when MOD field 6642 contains 10, bytes 7-10 are the displacement field 6562A, and it works the same as the legacy 32-bit displacement (disp32) and works at byte granularity.

Displacement factor field 6562B (Byte 7)—when MOD field 6642 contains 01, byte 7 is the displacement factor field 6562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 6562B is a reinterpretation of disp8; when using displacement factor field 6562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 6562B substitutes the legacy x86 instruction set 8-bit displacement. Thus, the displacement factor field 6562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 6572 operates as previously described.

Full Opcode Field

FIG. 66B is a block diagram illustrating the fields of the specific vector friendly instruction format 6600 that make up the full opcode field 6574 according to one embodiment of the disclosure. Specifically, the full opcode field 6574 includes the format field 6540, the base operation field 6542, and the data element width (W) field 6564. The base operation field 6542 includes the prefix encoding field 6625, the opcode map field 6615, and the real opcode field 6630.

Register Index Field

FIG. 66C is a block diagram illustrating the fields of the specific vector friendly instruction format 6600 that make up the register index field 6544 according to one embodiment of the disclosure. Specifically, the register index field 6544 includes the REX field 6605, the REX' field 6610, the MODR/M.reg field 6644, the MODR/M.r/m field 6646, the VVVV field 6620, xxx field 6654, and the bbb field 6656.

Augmentation Operation Field

Figure 66D:
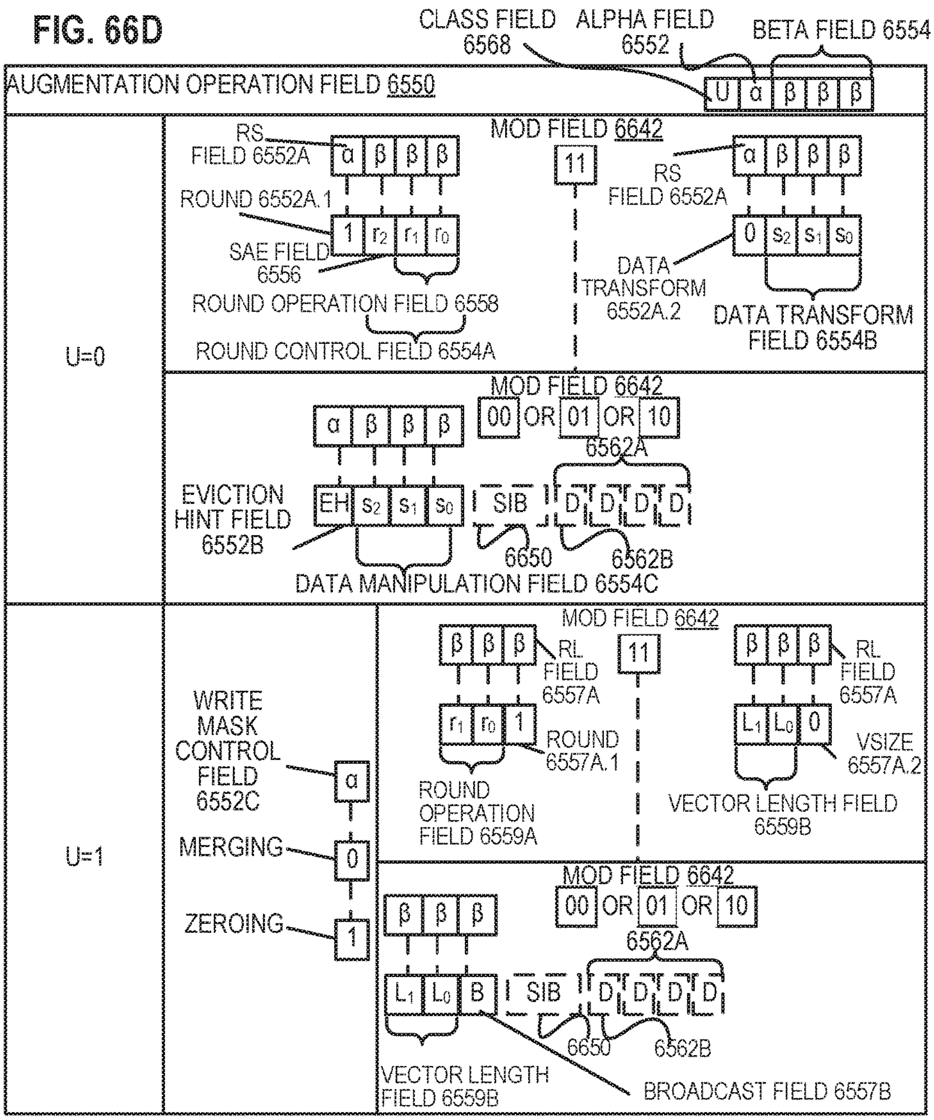
FIG. 66D is a block diagram illustrating the fields of the specific vector friendly instruction format in FIG. 66A that make up the augmentation operation field 6550 according to one embodiment of the disclosure.

FIG. 66D is a block diagram illustrating the fields of the specific vector friendly instruction format 6600 that make up the augmentation operation field 6550 according to one embodiment of the disclosure. When the class (U) field 6568 contains 0, it signifies EVEX.U0 (class A 6568A); when it contains 1, it signifies EVEX.U1 (class B 6568B). When U=0 and the MOD field 6642 contains 11 (signifying a no memory access operation), the alpha field 6552 (EVEX byte 3, bit [7]—EH) is interpreted as the rs field 6552A. When the rs field 6552A contains a 1 (round 6552A.1), the beta field 6554 (EVEX byte 3, bits [6:4]—SSS) is interpreted as the round control field 6554A. The round control field 6554A includes a one bit SAE field 6556 and a two bit round operation field 6558. When the rs field 6552A contains a 0 (data transform 6552A.2), the beta field 6554 (EVEX byte 3, bits [6:4]—SSS) is interpreted as a three bit data transform field 6554B. When U=0 and the MOD field 6642 contains 00, 01, or 10 (signifying a memory access operation), the alpha field 6552 (EVEX byte 3, bit [7]—EH) is interpreted as the eviction hint (EH) field 6552B and the beta field 6554 (EVEX byte 3, bits [6:4]—SSS) is interpreted as a three bit data manipulation field 6554C.

When U=1, the alpha field 6552 (EVEX byte 3, bit [7]—EH) is interpreted as the write mask control (Z) field 6552C. When U=1 and the MOD field 6642 contains 11 (signifying a no memory access operation), part of the beta field 6554 (EVEX byte 3, bit [4]—$S_0$) is interpreted as the RL field 6557A; when it contains a 1 (round 6557A.1) the rest of the beta field 6554 (EVEX byte 3, bit [6-5]—$S_{2-1}$) is interpreted as the round operation field 6559A, while when the RL field 6557A contains a 0 (VSIZE 6557.A2) the rest of the beta field 6554 (EVEX byte 3, bit [6-5]—$S_{2-1}$) is interpreted as the vector length field 6559B (EVEX byte 3, bit [6-5]—$L_{1-0}$). When U=1 and the MOD field 6642 contains 00, 01, or 10 (signifying a memory access operation), the beta field 6554 (EVEX byte 3, bits [6:4]—SSS) is interpreted as the vector length field 6559B (EVEX byte 3, bit [6-5]—$L_{1-0}$) and the broadcast field 6557B (EVEX byte 3, bit [4]—B).

Exemplary Register Architecture

Figure 67:
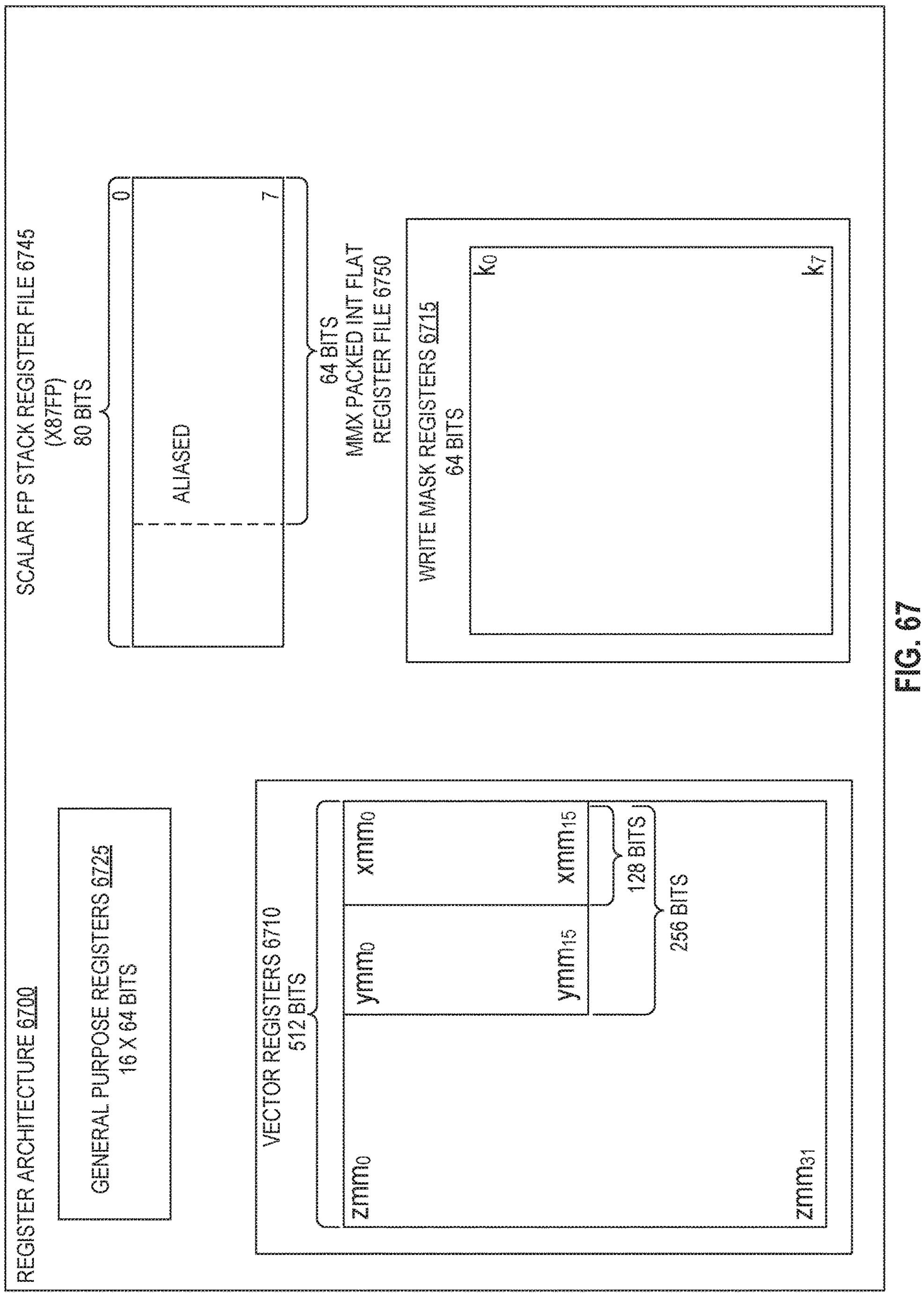
FIG. 67 is a block diagram of a register architecture according to one embodiment of the disclosure

FIG. 67 is a block diagram of a register architecture 6700 according to one embodiment of the disclosure. In the embodiment illustrated, there are 32 vector registers 6710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 6600 operates on these overlaid register file as illustrated in the below tables.

| Adjustable Vector Length | Class | Operations | Registers |
|---|---|---|---|
| Instruction Templates that do not include the vector length field 6559B | A (FIG. 65A; U = 0) | 6510, 6515, 6525, 6530 | zmm registers (the vector length is 64 byte) |
| | B (FIG. 65B; U = 1) | 6512 | zmm registers (the vector length is 64 byte) |
| Instruction templates that do include the vector length field 6559B | B (FIG. 65B; U = 1) | 6517, 6527 | zmm, ymm, or xmm registers (the vector length is 64 byte, 32 byte, or 16 byte) depending on the vector length field 6559B |

In other words, the vector length field 6559B selects between a maximum length and one or more other shorter lengths, where each such shorter length is half the length of the preceding length; and instructions templates without the vector length field 6559B operate on the maximum vector length. Further, in one embodiment, the class B instruction templates of the specific vector friendly instruction format 6600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 6715—in the embodiment illustrated, there are 8 write mask registers (k0 through k7), each 64 bits in size. In an alternate embodiment, the write mask registers 6715 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 6725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (×87 stack) 6745, on which is aliased the MMX packed integer flat register file 6750—in the embodiment illustrated, the ×87 stack is an eight-element stack used to perform scalar floating-point operations on 32/64/80-bit floating point data using the ×87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 68A:
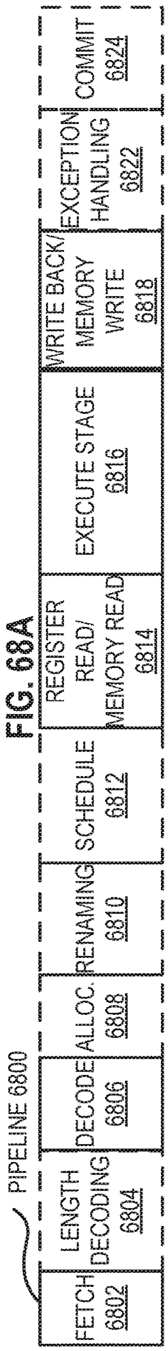
FIG. 68A is a block diagram illustrating both an exemplary in-order pipeline and an exemplary register renaming, out-of-order issue/execution pipeline according to embodiments of the disclosure.
Figure 68B:
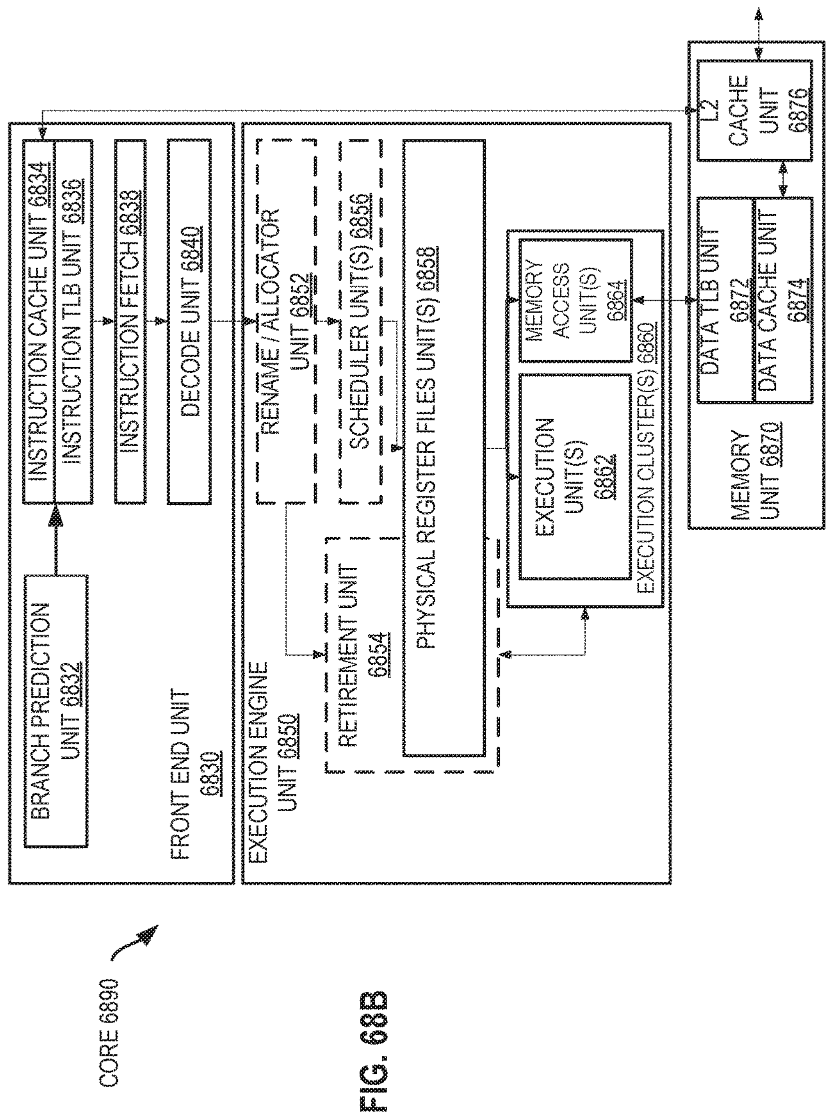
FIG. 68B is a block diagram illustrating both an exemplary embodiment of an in-order architecture core and an exemplary register renaming, out-of-order issue/execution architecture core to be included in a processor according to embodiments of the disclosure.

FIG. 68A is a block diagram illustrating both an exemplary in-order pipeline and an exemplary register renaming, out-of-order issue/execution pipeline according to embodiments of the disclosure. FIG. 68B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 68A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 68A, a processor pipeline 6800 includes a fetch stage 6802, a length decode stage 6804, a decode stage 6806, an allocation stage 6808, a renaming stage 6810, a scheduling (also known as a dispatch or issue) stage 6812, a register read/memory read stage 6814, an execute stage 6816, a write back/memory write stage 6818, an exception handling stage 6822, and a commit stage 6824.

FIG. 68B shows processor core 6890 including a front end unit 6830 coupled to an execution engine unit 6850, and both are coupled to a memory unit 6870. The core 6890 may be a reduced instruction set computing (RISC) core, a complex instruction set computing (CISC) core, a very long instruction word (VLIW) core, or a hybrid or alternative core type. As yet another option, the core 6890 may be a special-purpose core, such as, for example, a network or communication core, compression engine, coprocessor core, general purpose computing graphics processing unit (GPGPU) core, graphics core, or the like.

The front end unit 6830 includes a branch prediction unit 6832 coupled to an instruction cache unit 6834, which is coupled to an instruction translation lookaside buffer (TLB) 6836, which is coupled to an instruction fetch unit 6838, which is coupled to a decode unit 6840. The decode unit 6840 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 6840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 6890 includes a microcode ROM or other medium that stores microcode for certain macro-instructions (e.g., in decode unit 6840 or otherwise within the front end unit 6830). The decode unit 6840 is coupled to a rename/allocator unit 6852 in the execution engine unit 6850.

The execution engine unit 6850 includes the rename/allocator unit 6852 coupled to a retirement unit 6854 and a set of one or more scheduler unit(s) 6856. The scheduler unit(s) 6856 represents any number of different schedulers, including reservations stations, central instruction window, etc. The scheduler unit(s) 6856 is coupled to the physical register file(s) unit(s) 6858. Each of the physical register file(s) units 6858 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 6858 comprises a vector registers unit, a write mask registers unit, and a scalar registers unit. These register units may provide architectural vector registers, vector mask registers, and general purpose registers. The physical register file(s) unit(s) 6858 is overlapped by the retirement unit 6854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 6854 and the physical register file(s) unit(s) 6858 are coupled to the execution cluster(s) 6860. The execution cluster(s) 6860 includes a set of one or more execution units 6862 and a set of one or more memory access units 6864. The execution units 6862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 6856, physical register file(s) unit(s) 6858, and execution cluster(s) 6860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 6864). It should also be understood that where separate pipelines are used, one or more of these pipelines may be out-of-order issue/execution and the rest in-order.

The set of memory access units 6864 is coupled to the memory unit 6870, which includes a data TLB unit 6872 coupled to a data cache unit 6874 coupled to a level 2 (L2) cache unit 6876. In one exemplary embodiment, the memory access units 6864 may include a load unit, a store address unit, and a store data unit, each of which is coupled to the data TLB unit 6872 in the memory unit 6870. The instruction cache unit 6834 is further coupled to a level 2 (L2) cache unit 6876 in the memory unit 6870. The L2 cache unit 6876 is coupled to one or more other levels of cache and eventually to a main memory.

By way of example, the exemplary register renaming, out-of-order issue/execution core architecture may implement the pipeline 6800 as follows: 1) the instruction fetch 6838 performs the fetch and length decoding stages 6802 and 6804; 2) the decode unit 6840 performs the decode stage 6806; 3) the rename/allocator unit 6852 performs the allocation stage 6808 and renaming stage 6810; 4) the scheduler unit(s) 6856 performs the schedule stage 6812; 5) the physical register file(s) unit(s) 6858 and the memory unit 6870 perform the register read/memory read stage 6814; the execution cluster 6860 perform the execute stage 6816; 6) the memory unit 6870 and the physical register file(s) unit(s) 6858 perform the write back/memory write stage 6818; 7) various units may be involved in the exception handling stage 6822; and 8) the retirement unit 6854 and the physical register file(s) unit(s) 6858 perform the commit stage 6824.

The core 6890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 6890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 6834/6874 and a shared L2 cache unit 6876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 69B:
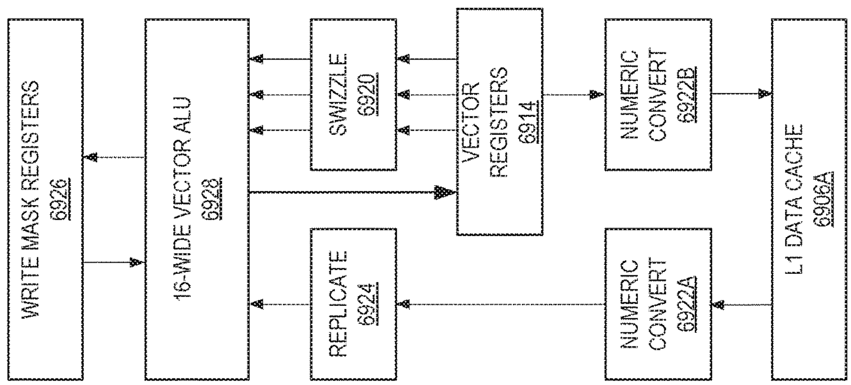
FIG. 69B is an expanded view of part of the processor core in FIG. 69A according to embodiments of the disclosure.
Figure 69A:
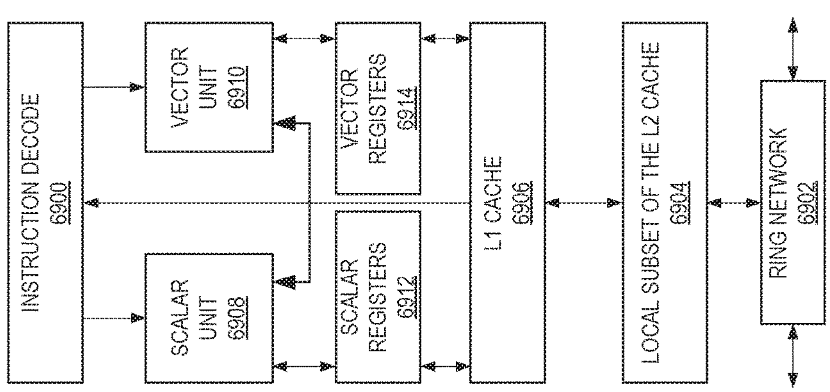
FIG. 69A is a block diagram of a single processor core, along with its connection to the on-die interconnect network and with its local subset of the Level 2 (L2) cache, according to embodiments of the disclosure.

FIGS. 69A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 69A is a block diagram of a single processor core, along with its connection to the on-die interconnect network 6902 and with its local subset of the Level 2 (L2) cache 6904, according to embodiments of the disclosure. In one embodiment, an instruction decode unit 6900 supports the x86 instruction set with a packed data instruction set extension. An L1 cache 6906 allows low-latency accesses to cache memory into the scalar and vector units. While in one embodiment (to simplify the design), a scalar unit 6908 and a vector unit 6910 use separate register sets (respectively, scalar registers 6912 and vector registers 6914) and data transferred between them is written to memory and then read back in from a level 1 (L1) cache 6906, alternative embodiments of the disclosure may use a different approach (e.g., use a single register set or include a communication path that allow data to be transferred between the two register files without being written and read back).

The local subset of the L2 cache 6904 is part of a global L2 cache that is divided into separate local subsets, one per processor core. Each processor core has a direct access path to its own local subset of the L2 cache 6904. Data read by a processor core is stored in its L2 cache subset 6904 and can be accessed quickly, in parallel with other processor cores accessing their own local L2 cache subsets. Data written by a processor core is stored in its own L2 cache subset 6904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 69B is an expanded view of part of the processor core in FIG. 69A according to embodiments of the disclosure. FIG. 69B includes an L1 data cache 6906A part of the L1 cache 6904, as well as more detail regarding the vector unit 6910 and the vector registers 6914. Specifically, the vector unit 6910 is a 16-wide vector processing unit (VPU) (see the 16-wide ALU 6928), which executes one or more of integer, single-precision float, and double-precision float instructions. The VPU supports swizzling the register inputs with swizzle unit 6920, numeric conversion with numeric convert units 6922A-B, and replication with replication unit 6924 on the memory input. Write mask registers 6926 allow predicating resulting vector writes.

Figure 70:
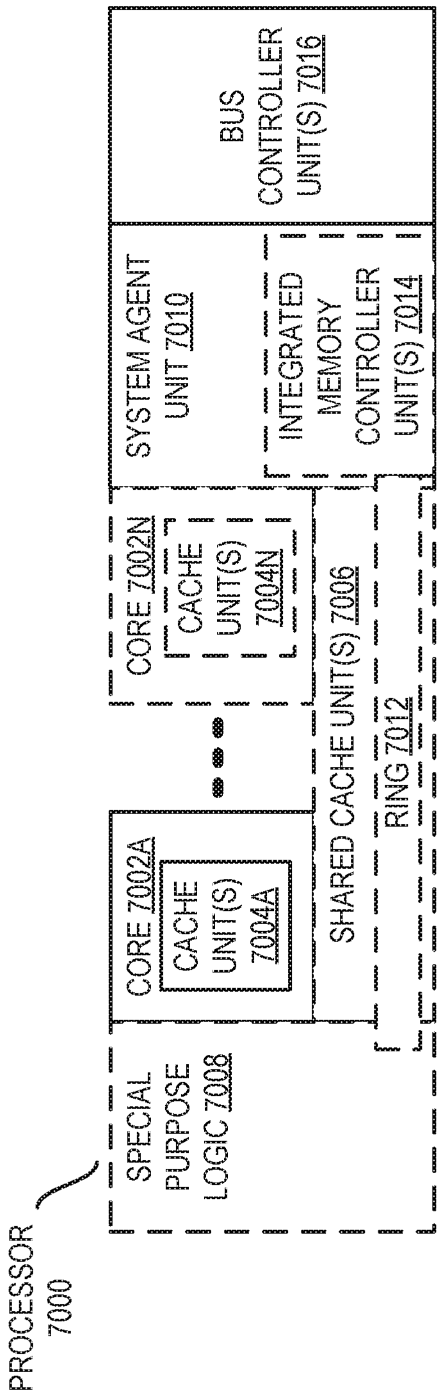
FIG. 70 is a block diagram of a processor that may have more than one core, may have an integrated memory controller, and may have integrated graphics according to embodiments of the disclosure.

FIG. 70 is a block diagram of a processor 7000 that may have more than one core, may have an integrated memory controller, and may have integrated graphics according to embodiments of the disclosure. The solid lined boxes in FIG. 70 illustrate a processor 7000 with a single core 7002A, a system agent 7010, a set of one or more bus controller units 7016, while the optional addition of the dashed lined boxes illustrates an alternative processor 7000 with multiple cores 7002A-N, a set of one or more integrated memory controller unit(s) 7014 in the system agent unit 7010, and special purpose logic 7008.

Thus, different implementations of the processor 7000 may include: 1) a CPU with the special purpose logic 7008 being integrated graphics and/or scientific (throughput) logic (which may include one or more cores), and the cores 7002A-N being one or more general purpose cores (e.g., general purpose in-order cores, general purpose out-of-order cores, a combination of the two); 2) a coprocessor with the cores 7002A-N being a large number of special purpose cores intended primarily for graphics and/or scientific (throughput); and 3) a coprocessor with the cores 7002A-N being a large number of general purpose in-order cores. Thus, the processor 7000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 7000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 7006, and external memory (not shown) coupled to the set of integrated memory controller units 7014. The set of shared cache units 7006 may include one or more mid-level caches, such as level 2 (L2), level 3 (L3), level 4 (L4), or other levels of cache, a last level cache (LLC), and/or combinations thereof. While in one embodiment a ring based interconnect unit 7012 interconnects the integrated graphics logic 7008, the set of shared cache units 7006, and the system agent unit 7010/integrated memory controller unit(s) 7014, alternative embodiments may use any number of well-known techniques for interconnecting such units. In one embodiment, coherency is maintained between one or more cache units 7006 and cores 7002-A-N.

In some embodiments, one or more of the cores 7002A-N are capable of multi-threading. The system agent 7010 includes those components coordinating and operating cores 7002A-N. The system agent unit 7010 may include for example a power control unit (PCU) and a display unit. The PCU may be or include logic and components needed for regulating the power state of the cores 7002A-N and the integrated graphics logic 7008. The display unit is for driving one or more externally connected displays.

The cores 7002A-N may be homogenous or heterogeneous in terms of architecture instruction set; that is, two or more of the cores 7002A-N may be capable of execution the same instruction set, while others may be capable of executing only a subset of that instruction set or a different instruction set.

Exemplary Computer Architectures

FIGS. 71-74 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 71:
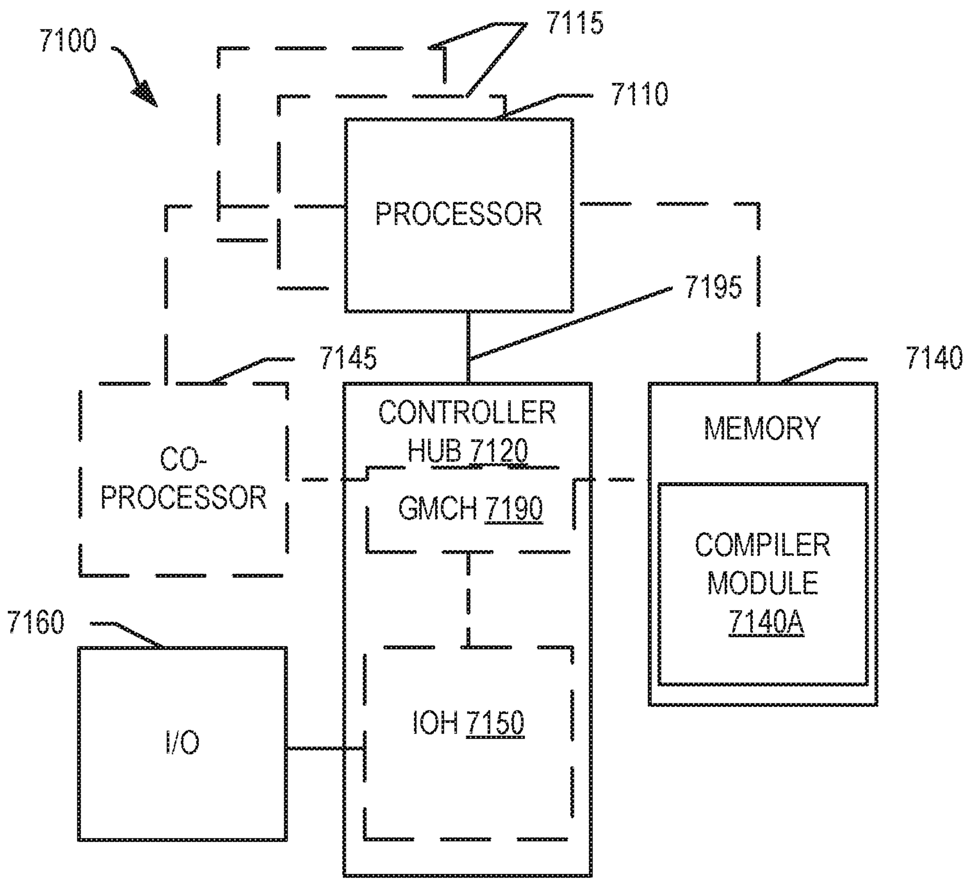
FIG. 71 is a block diagram of a system in accordance with one embodiment of the present disclosure.

Referring now to FIG. 71, shown is a block diagram of a system 7100 in accordance with one embodiment of the present disclosure. The system 7100 may include one or more processors 7110, 7115, which are coupled to a controller hub 7120. In one embodiment the controller hub 7120 includes a graphics memory controller hub (GMCH) 7190 and an Input/Output Hub (IOH) 7150 (which may be on separate chips); the GMCH 7190 includes memory and graphics controllers to which are coupled memory 7140 and a coprocessor 7145; the IOH 7150 is couples input/output (I/O) devices 7160 to the GMCH 7190. Alternatively, one or both of the memory and graphics controllers are integrated within the processor (as described herein), the memory 7140 and the coprocessor 7145 are coupled directly to the processor 7110, and the controller hub 7120 in a single chip with the IOH 7150. Memory 7140 may include a compiler module 7140A, for example, to store code that when executed causes a processor to perform any method of this disclosure.

The optional nature of additional processors 7115 is denoted in FIG. 71 with broken lines. Each processor 7110, 7115 may include one or more of the processing cores described herein and may be some version of the processor 7000.

The memory 7140 may be, for example, dynamic random access memory (DRAM), phase change memory (PCM), or a combination of the two. For at least one embodiment, the controller hub 7120 communicates with the processor(s) 7110, 7115 via a multi-drop bus, such as a frontside bus (FSB), point-to-point interface such as QuickPath Interconnect (QPI), or similar connection 7195.

In one embodiment, the coprocessor 7145 is a special-purpose processor, such as, for example, a high-throughput MIC processor, a network or communication processor, compression engine, graphics processor, GPGPU, embedded processor, or the like. In one embodiment, controller hub 7120 may include an integrated graphics accelerator.

There can be a variety of differences between the physical resources 7110, 7115 in terms of a spectrum of metrics of merit including architectural, microarchitectural, thermal, power consumption characteristics, and the like.

In one embodiment, the processor 7110 executes instructions that control data processing operations of a general type. Embedded within the instructions may be coprocessor instructions. The processor 7110 recognizes these coprocessor instructions as being of a type that should be executed by the attached coprocessor 7145. Accordingly, the processor 7110 issues these coprocessor instructions (or control signals representing coprocessor instructions) on a coprocessor bus or other interconnect, to coprocessor 7145. Coprocessor(s) 7145 accept and execute the received coprocessor instructions.

Figure 72:
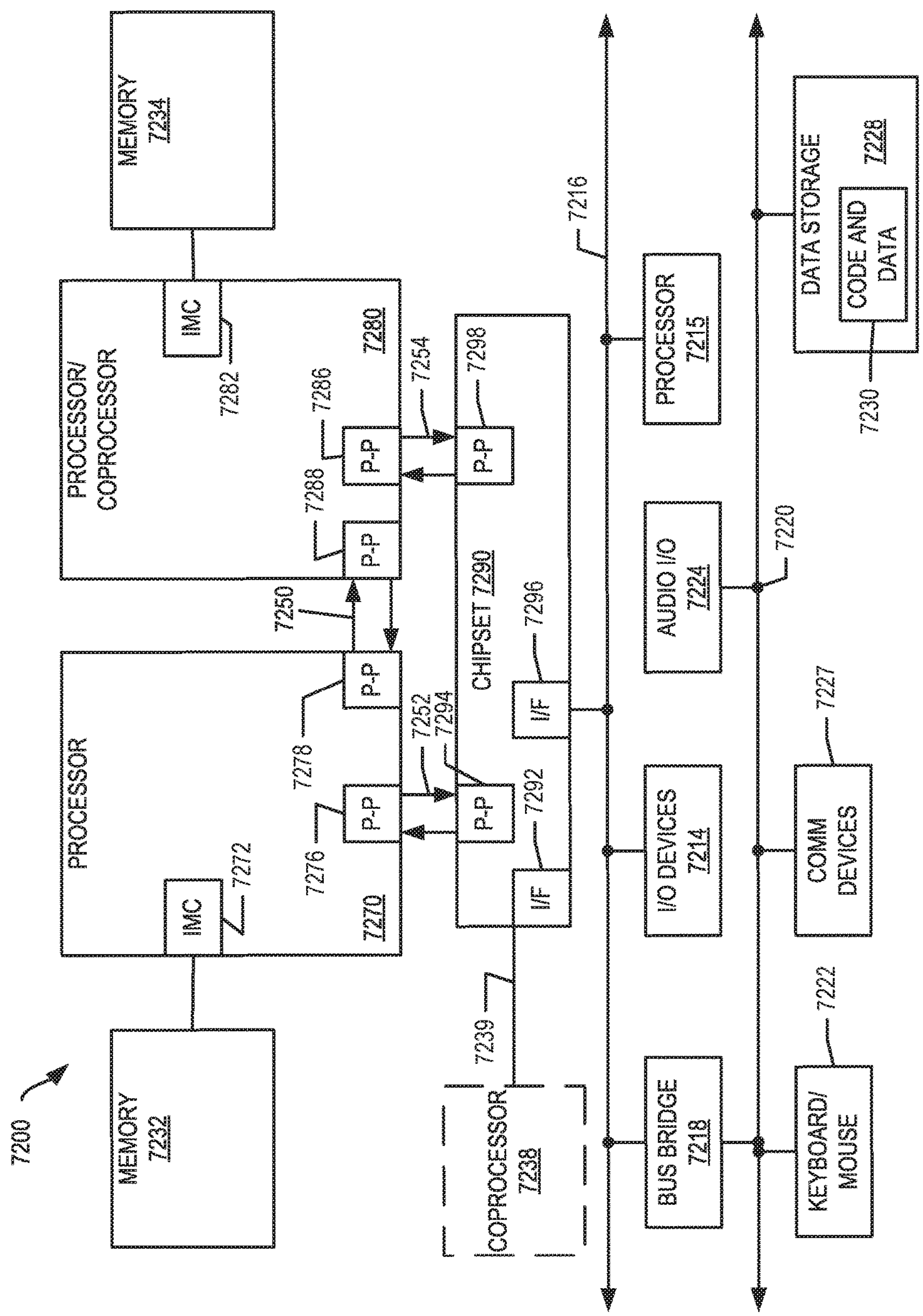
FIG. 72 is a block diagram of a more specific exemplary system in accordance with an embodiment of the present disclosure.

Referring now to FIG. 72, shown is a block diagram of a first more specific exemplary system 7200 in accordance with an embodiment of the present disclosure. As shown in FIG. 72, multiprocessor system 7200 is a point-to-point interconnect system, and includes a first processor 7270 and a second processor 7280 coupled via a point-to-point interconnect 7250. Each of processors 7270 and 7280 may be some version of the processor 7000. In one embodiment of the disclosure, processors 7270 and 7280 are respectively processors 7110 and 7115, while coprocessor 7238 is coprocessor 7145. In another embodiment, processors 7270 and 7280 are respectively processor 7110 coprocessor 7145.

Processors 7270 and 7280 are shown including integrated memory controller (IMC) units 7272 and 7282, respectively. Processor 7270 also includes as part of its bus controller units point-to-point (P-P) interfaces 7276 and 7278; similarly, second processor 7280 includes P-P interfaces 7286 and 7288. Processors 7270, 7280 may exchange information via a point-to-point (P-P) interface 7250 using P-P interface circuits 7278, 7288. As shown in FIG. 72, IMCs 7272 and 7282 couple the processors to respective memories, namely a memory 7232 and a memory 7234, which may be portions of main memory locally attached to the respective processors.

Processors 7270, 7280 may each exchange information with a chipset 7290 via individual P-P interfaces 7252, 7254 using point to point interface circuits 7276, 7294, 7286, 7298. Chipset 7290 may optionally exchange information with the coprocessor 7238 via a high-performance interface 7239. In one embodiment, the coprocessor 7238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 7290 may be coupled to a first bus 7216 via an interface 7296. In one embodiment, first bus 7216 may be a Peripheral Component Interconnect (PCI) bus, or a bus such as a PCI Express bus or another third generation I/O interconnect bus, although the scope of the present disclosure is not so limited.

As shown in FIG. 72, various I/O devices 7214 may be coupled to first bus 7216, along with a bus bridge 7218 which couples first bus 7216 to a second bus 7220. In one embodiment, one or more additional processor(s) 7215, such as coprocessors, high-throughput MIC processors, GPGPU's, accelerators (such as, e.g., graphics accelerators or digital signal processing (DSP) units), field programmable gate arrays, or any other processor, are coupled to first bus 7216. In one embodiment, second bus 7220 may be a low pin count (LPC) bus. Various devices may be coupled to a second bus 7220 including, for example, a keyboard and/or mouse 7222, communication devices 7227 and a storage unit 7228 such as a disk drive or other mass storage device which may include instructions/code and data 7230, in one embodiment. Further, an audio I/O 7224 may be coupled to the second bus 7220. Note that other architectures are possible. For example, instead of the point-to-point architecture of FIG. 72, a system may implement a multi-drop bus or other such architecture.

Figure 73:
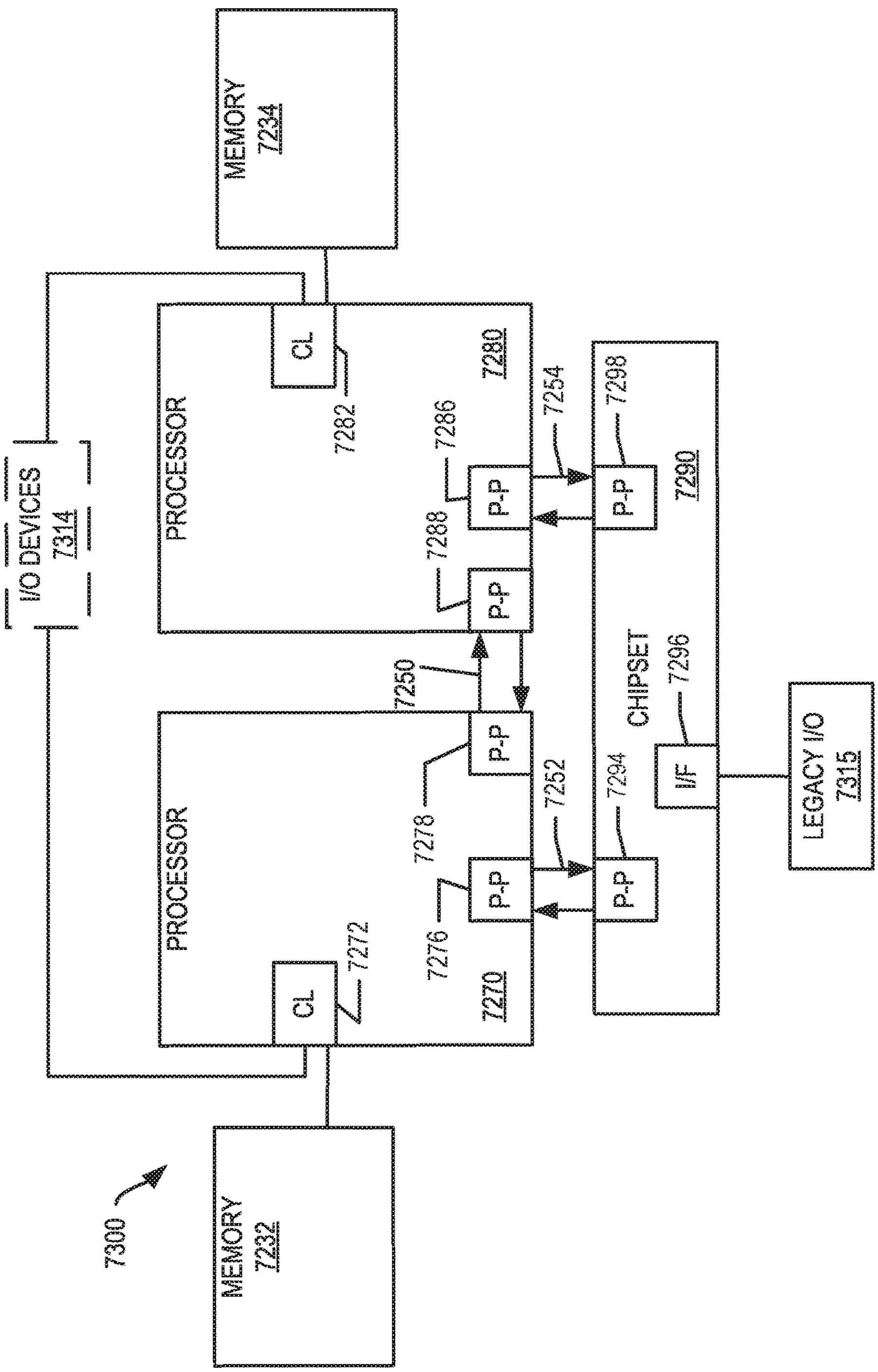
FIG. 73, shown is a block diagram of a second more specific exemplary system in accordance with an embodiment of the present disclosure.

Referring now to FIG. 73, shown is a block diagram of a second more specific exemplary system 7300 in accordance with an embodiment of the present disclosure Like elements in FIGS. 72 and 73 bear like reference numerals, and certain aspects of FIG. 72 have been omitted from FIG. 73 in order to avoid obscuring other aspects of FIG. 73.

FIG. 73 illustrates that the processors 7270, 7280 may include integrated memory and I/O control logic ("CL") 7272 and 7282, respectively. Thus, the CL 7272, 7282 include integrated memory controller units and include I/O control logic. FIG. 73 illustrates that not only are the memories 7232, 7234 coupled to the CL 7272, 7282, but also that I/O devices 7314 are also coupled to the control logic 7272, 7282. Legacy I/O devices 7315 are coupled to the chipset 7290.

Figure 74:
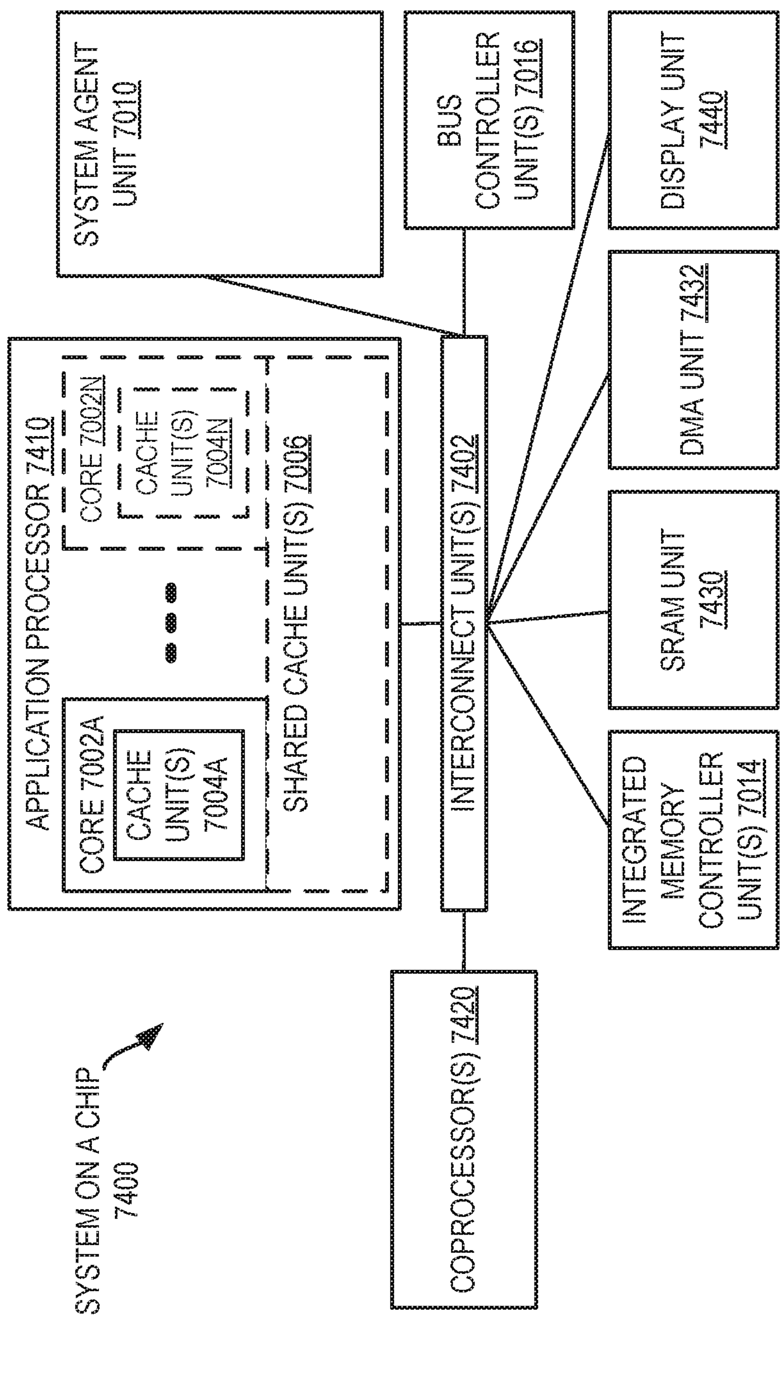
FIG. 74, shown is a block diagram of a system on a chip (SoC) in accordance with an embodiment of the present disclosure.

Referring now to FIG. 74, shown is a block diagram of a SoC 7400 in accordance with an embodiment of the present disclosure. Similar elements in FIG. 70 bear like reference numerals. Also, dashed lined boxes are optional features on more advanced SoCs. In FIG. 74, an interconnect unit(s) 7402 is coupled to: an application processor 7410 which includes a set of one or more cores 202A-N and shared cache unit(s) 7006; a system agent unit 7010; a bus controller unit(s) 7016; an integrated memory controller unit(s) 7014; a set or one or more coprocessors 7420 which may include integrated graphics logic, an image processor, an audio processor, and a video processor; an static random access memory (SRAM) unit 7430; a direct memory access (DMA) unit 7432; and a display unit 7440 for coupling to one or more external displays. In one embodiment, the coprocessor(s) 7420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 7230 illustrated in FIG. 72, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 75:
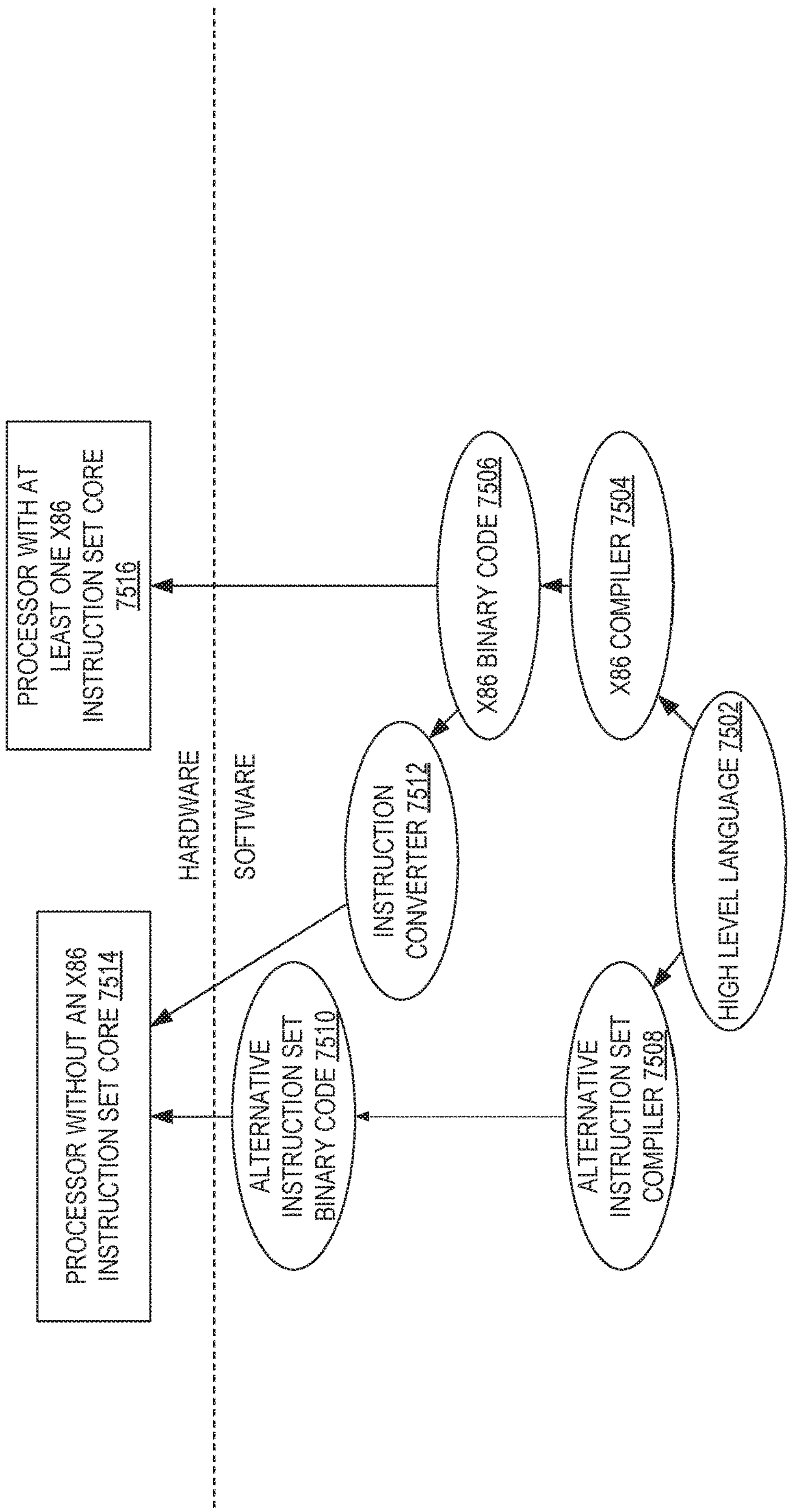
FIG. 75 is a block diagram contrasting the use of a software instruction converter to convert binary instructions in a source instruction set to binary instructions in a target instruction set according to embodiments of the disclosure.

FIG. 75 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 75 shows a program in a high level language 7502 may be compiled using an x86 compiler 7504 to generate x86 binary code 7506 that may be natively executed by a processor with at least one x86 instruction set core 7516. The processor with at least one x86 instruction set core 7516 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 7504 represents a compiler that is operable to generate x86 binary code 7506 (e.g., object code) that can, with or without additional linkage processing, be executed on the processor with at least one x86 instruction set core 7516. Similarly, FIG. 75 shows the program in the high level language 7502 may be compiled using an alternative instruction set compiler 7508 to generate alternative instruction set binary code 7510 that may be natively executed by a processor without at least one x86 instruction set core 7514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 7512 is used to convert the x86 binary code 7506 into code that may be natively executed by the processor without an x86 instruction set core 7514. This converted code is not likely to be the same as the alternative instruction set binary code 7510 because an instruction converter capable of this is difficult to make; however, the converted code will accomplish the general operation and be made up of instructions from the alternative instruction set. Thus, the instruction converter 7512 represents software, firmware, hardware, or a combination thereof that, through emulation, simulation or any other process, allows a processor or other electronic device that does not have an x86 instruction set processor or core to execute the x86 binary code 7506.

What is claimed is:

1. A processor comprising:

a core with a decoder to decode an instruction into a decoded instruction and an execution unit to execute the decoded instruction to perform a first operation;

a plurality of processing elements; and an interconnect network between the plurality of processing elements to receive an input of a dataflow graph comprising a plurality of nodes forming a loop construct, wherein the dataflow graph is to be overlaid into the interconnect network and the plurality of processing elements with a first node of the plurality of nodes represented as a first dataflow operator and a second node of the plurality of nodes represented as a second dataflow operator in the interconnect network and the plurality of processing elements, the first dataflow operator and the second dataflow operator are controlled by a sequencer dataflow operator, and the interconnect network and the plurality of processing elements are to perform a second operation when an incoming operand set arrives at the first dataflow operator and the second dataflow operator and the sequencer dataflow operator generates control values for the first dataflow operator and the second dataflow operator.

2. The processor of claim 1, wherein the plurality of processing elements comprises the sequencer dataflow operator.

3. The processor of claim 1, wherein the first dataflow operator is a first processing element of the plurality of processing elements.

4. The processor of claim 3, wherein the second dataflow operator is a second processing element of the plurality of processing elements.

5. The processor of claim 1, wherein the first dataflow operator representing the first node is a pick operator.

6. The processor of claim 5, wherein the second dataflow operator representing the second node is a switch operator.

7. The processor of claim 1, wherein the sequencer dataflow operator generates the control values for the first dataflow operator representing the first node and the second dataflow operator representing the second node to perform a loop iteration of the loop construct in a single cycle of the processing elements.

8. The processor of claim 1, wherein the sequencer dataflow operator generates a next set of control values for a loop iteration when both a base data token and a stride data token are received.

9. A method comprising:

decoding an instruction with a decoder of a core of a processor into a decoded instruction;

executing the decoded instruction with an execution unit of the core of the processor to perform a first operation;

receiving an input of a dataflow graph comprising a plurality of nodes forming a loop construct;

overlaying the dataflow graph into a plurality of processing elements of the processor and an interconnect network between the plurality of processing elements of the processor with a first node of the plurality of nodes represented as a first dataflow operator and a second node of the plurality of nodes represented as a second dataflow operator in the interconnect network and the plurality of processing elements, and the first dataflow operator and the second dataflow operator are controlled by a sequencer dataflow operator; and performing a second operation of the dataflow graph with the interconnect network and the plurality of processing elements by a respective, incoming operand set arriving at the first dataflow operator and the second dataflow operator and the sequencer dataflow operator generating control values for the first dataflow operator and the second dataflow operator.

10. The method of claim 9, wherein the plurality of processing elements comprises the sequencer dataflow operator.

11. The method of claim 9, wherein the first dataflow operator is a first processing element of the plurality of processing elements.

12. The method of claim 11, wherein the second dataflow operator is a second processing element of the plurality of processing elements.

13. The method of claim 9, wherein the first dataflow operator representing the first node is a pick operator.

14. The method of claim 13, wherein the second dataflow operator representing the second node is a switch operator.

15. The method of claim 9, wherein the sequencer dataflow operator generates the control values for the first dataflow operator representing the first node and the second dataflow operator representing the second node to perform a loop iteration of the loop construct in a single cycle of the processing elements.

16. The method of claim 9, further comprising the sequencer dataflow operator generating a next set of control values for a loop iteration when both a base data token and a stride data token are received.

17. A non-transitory machine readable medium that stores code that when executed by a machine causes the machine to perform a method comprising:

decoding an instruction with a decoder of a core of a processor into a decoded instruction;

executing the decoded instruction with an execution unit of the core of the processor to perform a first operation;

receiving an input of a dataflow graph comprising a plurality of nodes forming a loop construct;

overlaying the dataflow graph into a plurality of processing elements of the processor and an interconnect network between the plurality of processing elements of the processor with a first node of the plurality of nodes represented as a first dataflow operator and a second node of the plurality of nodes represented as a second dataflow operator in the interconnect network and the plurality of processing elements, and the first dataflow operator and the second dataflow operator are controlled by a sequencer dataflow operator; and performing a second operation of the dataflow graph with the interconnect network and the plurality of processing elements by a respective, incoming operand set arriving at the first dataflow operator and the second dataflow operator and the sequencer dataflow operator generating control values for the first dataflow operator and the second dataflow operator.

18. The non-transitory machine readable medium of claim 17, wherein the plurality of processing elements comprises the sequencer dataflow operator.

19. The non-transitory machine readable medium of claim 17, wherein the first dataflow operator is a first processing element of the plurality of processing elements.

20. The non-transitory machine readable medium of claim 19, wherein the second dataflow operator is a second processing element of the plurality of processing elements.

21. The non-transitory machine readable medium of claim 17, wherein the first dataflow operator representing the first node is a pick operator.

22. The non-transitory machine readable medium of claim 21, wherein the second dataflow operator representing the second node is a switch operator.

23. The non-transitory machine readable medium of claim 17, wherein the sequencer dataflow operator generates the control values for the first dataflow operator representing the first node and the second dataflow operator representing the second node to perform a loop iteration of the loop construct in a single cycle of the processing elements.

24. The non-transitory machine readable medium of claim 17, wherein the method further comprises the sequencer dataflow operator generating a next set of control values for a loop iteration when both a base data token and a stride data token are received.

* * * * *